(12) United States Patent
Roche et al.

(10) Patent No.: US 7,805,444 B2
(45) Date of Patent: Sep. 28, 2010

(54) METHOD AND SYSTEM FOR RESPONDING TO USER-INPUT BASED ON SEMANTIC EVALUATIONS OF USER-PROVIDED RESOURCES

(75) Inventors: Emmanuel Roche, Belmont, MA (US); Yves Schabes, Newton, MA (US)

(73) Assignee: SAS Institute Inc., Cary, NC (US)

( * ) Notice: Subject to any disclaimer, the term of this patent is extended or adjusted under 35 U.S.C. 154(b) by 93 days.

(21) Appl. No.: 11/622,856

(22) Filed: Jan. 12, 2007

(65) Prior Publication Data

US 2007/0219781 A1 Sep. 20, 2007

Related U.S. Application Data

(63) Continuation of application No. 11/376,528, filed on Mar. 15, 2006, now abandoned.

(60) Provisional application No. 60/804,182, filed on Jun. 8, 2006.

(51) Int. Cl.
*G06F 7/00* (2006.01)
*G06F 17/30* (2006.01)

(52) U.S. Cl. ...................................... 707/736

(58) Field of Classification Search ........................ None
See application file for complete search history.

(56) References Cited

U.S. PATENT DOCUMENTS 4,839,853 A * 6/1989 Deerwester et al. ............ 707/5
4,914,590 A * 4/1990 Loatman et al. ................ 704/8
5,377,103 A * 12/1994 Lamberti et al. ............... 704/9
2003/0195811 A1 * 10/2003 Hayes et al. ................. 705/26

OTHER PUBLICATIONS

Woods, W.A, Augmented Transition Networks for Natural Language Analysis, Dec. 1969, National Science Foundation, general background.*
JSR 63: Java API for XML Processing 1.1, Final release document: Sep. 10, 2002, Sun Microsystems, http://jcp.org/en/jsr/detail?id=063.*
Galante, Converting XML to HTML Using Sun's Java API for XML Processing and Microsoft's MSXML 3.0 API, 15 seconds, http://www.15seconds.com/issue/010810.htm.*

(Continued)

*Primary Examiner*—Pierre M. Vital
*Assistant Examiner*—Jason Liao
(74) *Attorney, Agent, or Firm*—Gregory Stephens

(57) ABSTRACT

A method for processing user input includes the step of receiving, during a first session between a user and an interaction environment, via one of a plurality of media gateways, from the user, a resource including a plurality of predefined markers and at least one expression. An expression type is identified, responsive to an evaluation of the semantic structure and to one of the predefined markers. A determination is made as to whether to store at least one of: an identification of the user and the at least one expression. The resource is displayed in a viewable display format, responsive to a second predefined marker. A second expression is received. An expression type is identified, responsive to an evaluation of a semantic structure of the second expression. Based on the expression type and on the resource received during the first session, a response to the second expression is generated.

21 Claims, 70 Drawing Sheets

OTHER PUBLICATIONS

Wallace, "Eliza, Computer therapist", HTML, '96-'06, manifestation.com, http://www.manifestation.com/neurotoys/eliza.php3 (Accessed: Apr. 30, 2009).*

Unknown but hosted by Kampis, ELIZA.BAS, Text, Unknown but hosting webpage (c) 1999, hps.elte.hu, http://hps.elte.hu/~gk/Eliza/ELIZA.BAS, linked through http://hps.elte.hu/~gk/Eliza/index.html (Accessed: Apr. 30, 2009).*

Estier et al, "The BNF Web Club Language", HTML, 1998, chu.unige.ch, http://cui.unige.ch/db-research/Enseignement/analyseinfo/BNFweb.html (Accessed: Apr. 30, 2009).*

Estier, What is BNF Notation? HTML, cui.unige.ch, http://www.cui.unige.ch/db-research/Enseignement/analyseinfo/AboutBNF.html (Accessed: Apr. 30, 2009).*

Extensible Stylesheet Language (XSL), Dec. 16, 2004, W3C, Version 1.1, Working Draft.*

Lehti, Design and Implementation of a Data Manipulation Processor for an XML Query Language, Aug. 2001, Technische Universitat Darmstadt.*

Kepser, A Simple Proof for the Turing-Completeness of XSLT and XQuery, Aug. 2-6, 2004, Extreme Markup Languagex 2004.*

Extensible Markup Language (XML), Nov. 14, 1996, W3C, Working Draft, Header.*

* cited by examiner

1. Is it a formal command
2. Is it an answer
3. Does it have results in exact match search
4. Is it recognized as an implicit statement addition

FIG. 48

```
Get a new conversation with session-key and gadid.
  1.  If there exist a c in C s.t. session-key.conversation==c
  2.    return c
  3.  Else if there exist a free c in C
  4.    Bind(c,gadid)
  5.    Bind(session-key,c)
  6.  Else if conversation can create a new c
  7.    c=create_new_conversation
  8.    Bind(c,gadid)
  9.    Bind(session-key,c)
 10. Else
 11.   Take c which has the oldest last time use
 12.   If current time – lasttime>threshold
 13.     Clear(c)
 14.     Bind(c,gadid)
 15.     Bind(session-key,c)
 16.   Else
 17.     Return NULL /* Unable to create a new conversation */
```

FIG. 49

METHOD AND SYSTEM FOR RESPONDING TO USER-INPUT BASED ON SEMANTIC EVALUATIONS OF USER-PROVIDED RESOURCES

CROSS-REFERENCE TO RELATED APPLICATIONS

The present application claims priority to U.S. patent application Ser. No. 11/376,528, entitled "Information Repository and Answering System," filed Mar. 15, 2006, which is incorporated herein by reference, and to U.S. Provisional Patent Application Ser. No. 60/804,182, entitled "Information Repository for Browsing and Searching," filed Jun. 8, 2006, which is incorporated herein by reference.

FIELD OF THE INVENTION

The present invention relates to methods and systems for processing user input. In particular, the present invention relates to methods and systems for responding to user-input based on semantic evaluations of user-provided resources.

BACKGROUND OF THE INVENTION

Conventional systems for information retrieval, including systems for querying hypertext-networked databases, typically require users to provide precise search terms and may require users to express search terms using Boolean logic. Other systems for information retrieval, such as those for querying relational databases, may require users to express queries using database programming languages. Many users would prefer to use natural language phrases to express their queries and providing queries using these precise formats is not intuitive for many users.

Additionally, systems for information retrieval are typically limited to the retrieval of previously stored information, especially in conventional systems for querying networked resources, such as network search engines. Such systems do not typically provide the functionality required to allow a user to modify previously stored information or to add information to stored data. For example, many systems provide users with functionality for searching within a document or amongst many, networked document. However, if a user viewing the search results wished to add information to the collection of documents searched, access to a different system would be required. Similarly, a user interacting with a system for information retrieval typically does not have access to functionality for modifying the information retrieval system. For example, the user may wish to modify a display of search results or to modify a particular search result but typically does not have access to functionality for doing so.

SUMMARY OF THE INVENTION

In one aspect, a method for processing user input includes the step of receiving, during a first session between a user and an interaction environment, via one of a plurality of media gateways, from a user, a resource including a plurality of predefined markers and at least one expression having a semantic structure. The resource is stored. The semantic structure of the at least one expression is evaluated. An expression type is identified, responsive to the evaluation of the semantic structure and to one of the plurality of predefined markers. A determination is made as to whether to store at least one of: an identification of the user and the at least one expression. The resource is displayed in a viewable display format, responsive to a second of the plurality of predefined markers. During a second session, a second expression having a semantic structure is received from a user, via one of a plurality of media gateways. The semantic structure of the second expression is evaluated. An expression type is identified, responsive to the evaluation of the semantic structure of the second expression. Based on the expression type and on the resource received during the first session, a response to the second expression is generated.

In one embodiment, the resource includes a plurality of predefined markers identifying an expression type and the resource including the at least one expression having the semantic structure. In another embodiment, the resource includes including a plurality of predefined markers expressed in a programming language and the resource including the at least one expression having the semantic structure. In still another embodiment, the resource includes a plurality of predefined markers expressed in an Extensible Markup Language (XML) and the resource including the at least one expression having the semantic structure. In yet another embodiment, the resource includes a plurality of predefined markers identifying a display format and the at least one expression having the semantic structure.

In one embodiment, the at least one expression is identified as a database query. In another embodiment, the at least one expression is identified as a request for information. In still another embodiment, the at least one expression is identified as an implicit question. In yet another embodiment, the at least one expression is identified as a command.

In one embodiment, information is retrieved in response to the at least one expression. In another embodiment, a computer program is executed in response to the at least one expression. In still another embodiment, the resource is transformed from a first format into a second format, responsive to a second of the plurality of predefined markers.

In another aspect, a system for processing user input includes an interaction environment, an information retrieval component, and a user interface module. The interaction environment executes in a virtual machine. The interaction environment provides the information retrieval component, which is in communication with a search index and a collection of information. The interaction environment provides the user interface module, which is in communication with the information retrieval component, and which comprises a transceiver, a semantic evaluator, a display component, and a response generating component. The transceiver receives, during a first session between a user and an interaction environment, via one of a plurality of media gateways, from the user, a resource including a plurality of predefined markers and at least one expression having a semantic structure, stores the resource, and receives, during a second session between the user and the interaction environment, a second expression having a semantic structure. The semantic evaluator identifies an expression type for the received expression responsive to an evaluation of the semantic structure of the received expression and to one of the plurality of predefined markers, and identifies an expression type for the second expression responsive to an evaluation of the semantic structure of the second expression. A display component displays the resource in a viewable display format, responsive to a second of the plurality of predefined markers. The response generating component provides a response to the second expression based on the identified expression type and to the resource received during the first session.

In one embodiment, the semantic evaluator evaluates a linguistic pattern of an expression. In another embodiment, the semantic evaluator evaluates a word order of an expression. In still another embodiment, the response generating component responds to the second expression by transmitting, to the user, data stored in a repository. In yet another embodiment, the display format displays the resource in a viewable display format, responsive to the second of the plurality of predefined markers.

BRIEF DESCRIPTION OF THE DRAWINGS

The foregoing and other objects, aspects, features, and advantages of the invention will become more apparent and better understood by referring to the following description taken in conjunction with the accompanying drawings, in which:

FIG. 48 is a screen shot depicting one embodiment of a system for retrieving user-provided information;

FIG. 49 lists one embodiment of pseudo-code for programming language code in a system for supporting multiple conversations;

DETAILED DESCRIPTION OF THE INVENTION

Figure 1A:
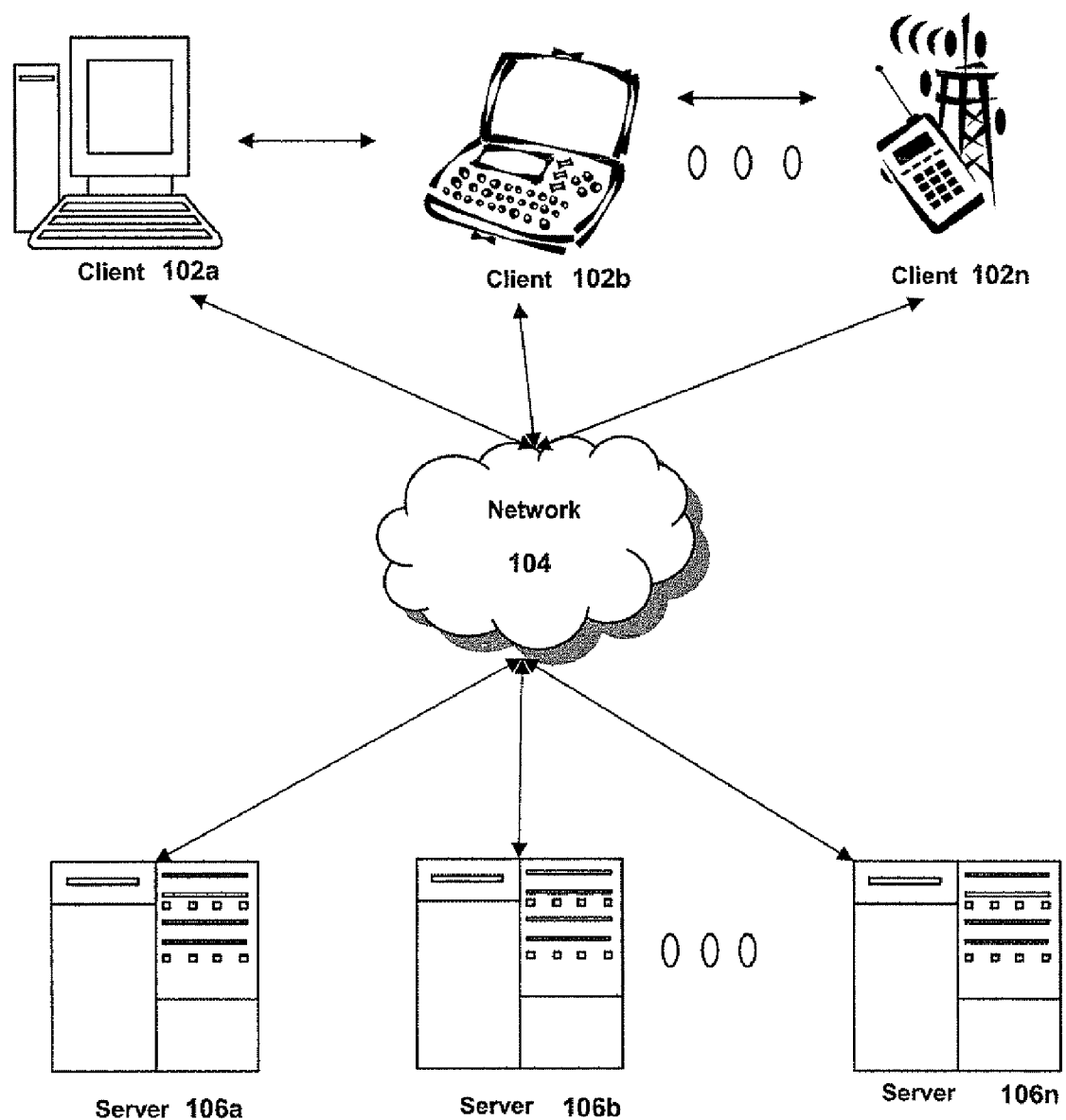
FIG. 1A is a block diagram depicting an embodiment of a network environment comprising client machines in communication with server machines.

Referring now to FIG. 1A, an embodiment of a network environment is depicted. In brief overview, the network environment comprises one or more clients 102a-102n (also generally referred to as local machine(s) 102, endpoint(s) 102, or client machine(s) 102) in communication with one or more servers 106a-106n (also generally referred to as server(s) 106, or remote machine(s) 106) via one or more networks 104.

The network 104 can be a local-area network (LAN), such as a company Intranet, a metropolitan area network (MAN), or a wide area network (WAN), such as the Internet or the World Wide Web. In some embodiments, there are multiple networks 104 between the clients 102 and the servers 106. In one of these embodiments, a network 104' may be a private network and a network 104 may be a public network. In another of these embodiments, a network 104 may be a private network and a network 104' a public network. In still another embodiment, networks 104 and 104' may both be private networks.

The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 and network topology may be of any such network or network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS or UMTS. In some embodiments, different types of data may be transmitted via different protocols. In other embodiments, the same types of data may be transmitted via different protocols.

In some embodiments, the servers 106 may be geographically dispersed from each other or from the clients 102. The servers 106 and the clients 102 may be heterogeneous. One or more of the servers 106 or clients 102 can operate according to one type of operating system platform (e.g., WINDOWS NT, manufactured by Microsoft Corp. of Redmond, Wash.), while one or more of the other servers 106 or clients 102 can operate on according to another type of operating system platform (e.g., Unix or Linux). Data transmission speeds between servers 106 and clients 102 can be increased if the servers 106 and the clients 102 are connected using a local-area network (LAN) connection or some form of direct connection.

A server 106 may be referred to as a file server, application server, web server, proxy server, or gateway server. In one embodiment, a server 106 may include an Active Directory. The clients 102 may also be referred to as client nodes, client machines, endpoint nodes, or endpoints. In some embodiments, a client 102 has the capacity to function as both a client node seeking access to resources provided by a server and as a server providing access to hosted resources for other clients 102a-102n.

In some embodiments, a client 102 communicates with a server 106. In one embodiment, the client 102 communicates directly with one of the servers 106. In another embodiment, the client 102 communicates with a server 106 through a network 104. Over the network 104, the client 102 can, for example, request access to resources hosted by the servers 106a-106n. In other embodiments, a client 102a communicates with a client 102b. In one of these embodiments, the client 102a communicates directly with the client 102b. In another of these embodiments, the client 102a communicates with the client 102b through a network 104.

In one embodiment, the server 106 provides the functionality of a web server. In another embodiment, the server 106a receives requests from the client 102, forwards the requests to a second server 106b and responds to the request by the client 102 with a response to the request from the server 106b. In some embodiments, the web server 106 comprises an opensource web server, such as the APACHE servers maintained by the Apache Software Foundation of Delaware. In other embodiments, the web server executes proprietary software, such as the Internet Information Services (IIS) products provided by Microsoft Corporation of Redmond, Wash., the SUN JAVA web server products provided by Sun Microsystems, of Santa Clara, Calif., or the BEA WEBLOGIC products provided by BEA Systems, of Santa Clara, Calif. In still other embodiments, the web server 106 provides support for security features such as authentication, authorization, or secure hyper-text transfer protocol. In yet other embodiments, the web server 106 provides support for dynamic content technologies.

In some embodiments, the server 106 may be running one or more applications. In other embodiments, any of the applications may comprise any type of hosted service or products, such as GOTOMEETING provided by Citrix Online Division, Inc. of Santa Barbara, Calif., WEBEX provided by WebEx, Inc. of Santa Clara, Calif., or Microsoft Office LIVE MEETING provided by Microsoft Corporation of Redmond, Wash. In still other embodiments, the server 106 may function as a web or Internet server, or a desktop sharing server, or a collaboration server.

A client 102 may execute, operate or otherwise provide an application, which can be any type and/or form of software, program, or executable instructions such as any type and/or form of web browser, web-based client, client-server application, an ActiveX control, or a Java applet, or any other type and/or form of executable instructions capable of executing on client 102. The application can use any type of protocol and it can be, for example, an HTTP client, an FTP client, an Oscar client, or a Telnet client. In one embodiment, the application comprises any type of software related to voice over internet protocol (VoIP) communications, such as a soft IP telephone. In another embodiment, the application comprises any application related to real-time data communications, such as applications for streaming video and/or audio.

Figure 1B:
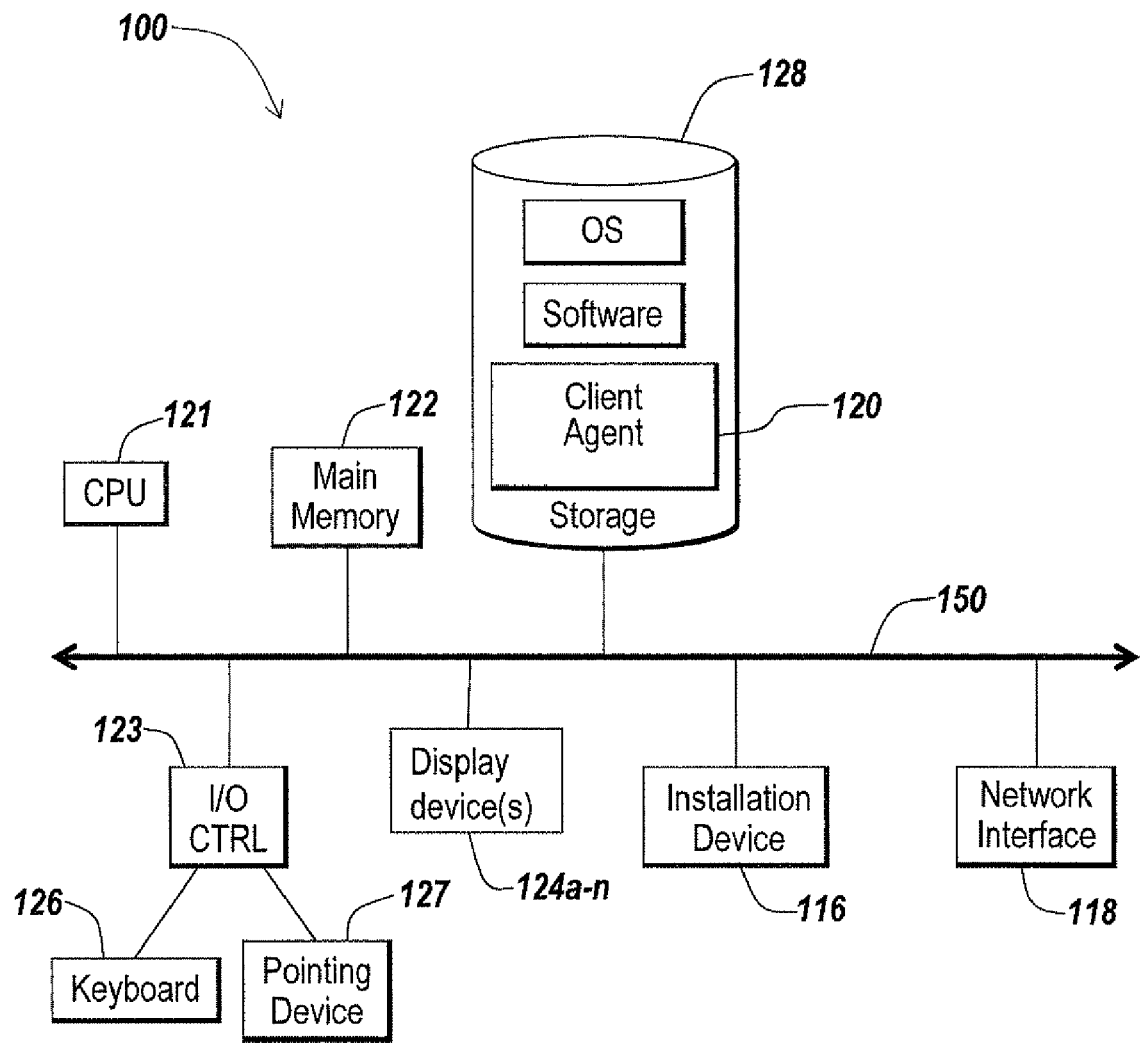
FIG. 1B is a block diagram depicting an embodiment of a computer useful in connection with the methods and systems described herein.

The client 102 and server 106 may be deployed as and/or executed on any type and form of computing device, such as a computer, network device or appliance capable of communicating on any type and form of network and performing the operations described herein. FIG. 1B depicts a block diagram of a computing device 100 useful for practicing an embodiment of the client 102 or a server 106. As shown in FIG. 1B, each computing device 100 includes a central processing unit 121, and a main memory unit 122. As shown in FIG. 1B, a computing device 100 may include a visual display device 124, a keyboard 126 and/or a pointing device 127, such as a mouse.

The central processing unit 121 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

The computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices may be present in the computing device 100. Input devices include keyboards, mice, trackpads, trackballs, microphones, and drawing tablets. Output devices include video displays, speakers, inkjet printers, laser printers, and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, or a Serial Attached small computer system interface bus.

A computing device 100 of the sort depicted in FIG. 1B typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MAC OS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In some embodiments, the computing device 100 may have different processors, operating systems, and input devices consistent with the device. For example, in one embodiment the computing device 100 is a Treo 180, 270, 600, 650, 680, 700 p or 700 w smart phone manufactured by Palm, Inc. In some of these embodiments, the Treo smart phone is operated under the control of the PalmOS operating system and includes a stylus input device as well as a five-way navigator device.

In other embodiments the computing device 100 is a mobile device, such as a JAVA-enabled cellular telephone or personal digital assistant (PDA), such as the i55sr, i58sr, i85s, i88s, i90c, i95cl, or the im11000, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea.

In still other embodiments, the computing device 100 is a Blackberry handheld or smart phone, such as the devices manufactured by Research In Motion Limited, including the Blackberry 7100 series, 8700 series, 7700 series, 7200 series, the Blackberry 7520, or the Blackberry Pearl 8100. In yet other embodiments, the computing device 100 is a smart phone, Pocket PC, Pocket PC Phone, or other handheld mobile device supporting Microsoft Windows Mobile Software. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Figure 2A:
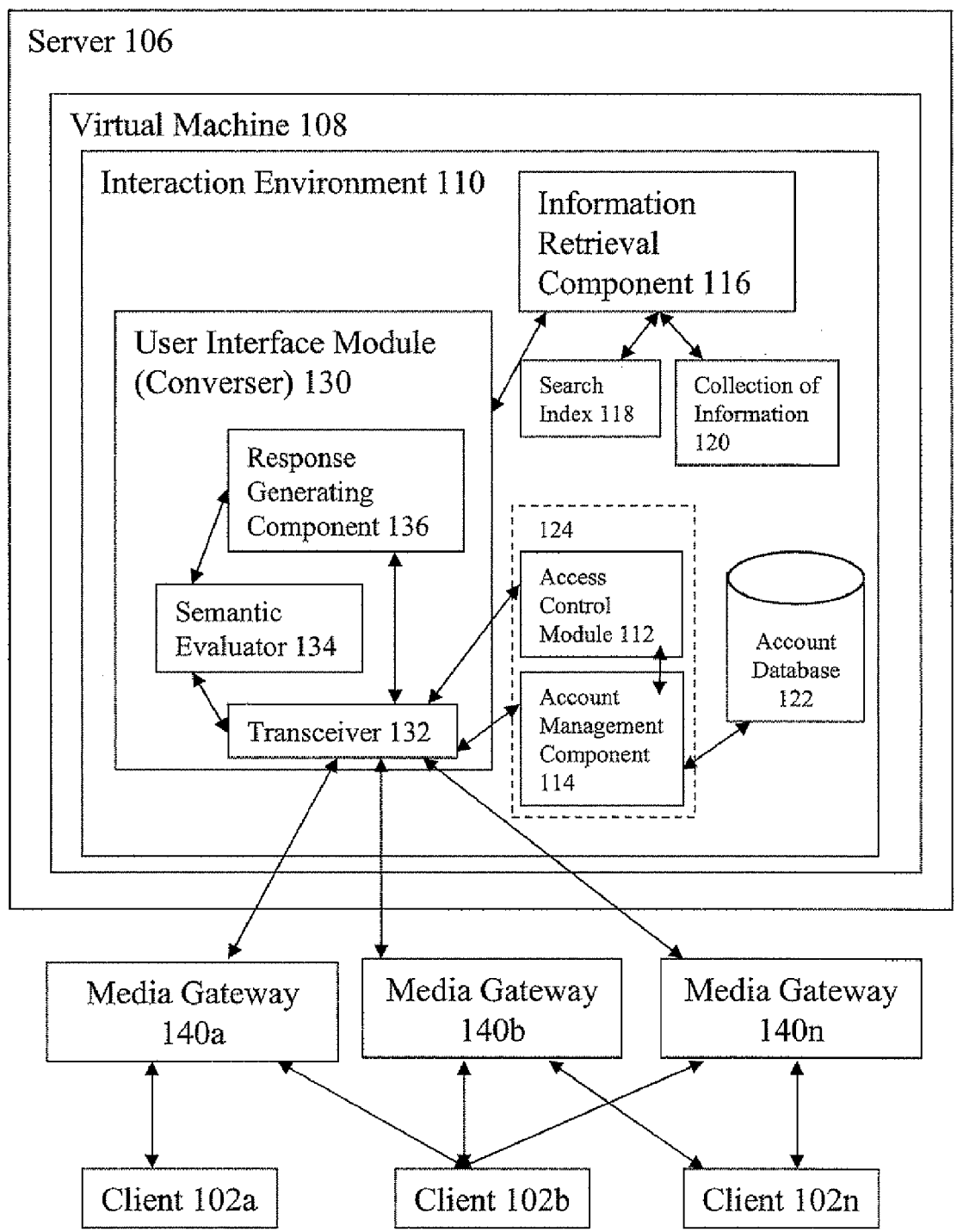
FIG. 2A is a block diagram depicting one embodiment of a system for processing user input.

Referring now to FIG. 2A, a block diagram depicts one embodiment of a system for processing user input. In brief overview, the system includes a client 102 and a server 106. An interaction environment 110 executes in a virtual machine 108, which executes on the server 106. The interaction environment 110 provides an information retrieval component 116 and a user interface module 130. The information retrieval component 116 is in communication with a search index 118 and a collection of information 120. The user interface module 130 comprises a transceiver 132, a semantic evaluator 134, and a response generating component 136. The transceiver 132 receives, via a plurality of media gateways 140, an expression having a semantic structure. The transceiver 132 is in communication with an access control module 112 and an account management component 114. The semantic evaluator 134 identifies an expression type for the received expression responsive to an evaluation of the semantic structure of the received expression. The response generating component 136 provides a response to the expression based on the identified expression type. Although FIG. 2A depicts a limited number of clients 102 and servers 106, it should be understood that the system may provide multiple ones of any or each of those components.

Referring still to FIG. 2A, and in greater detail, the interaction environment 110 executes in the virtual machine 108. In one embodiment, the virtual machine executes on a server. In some embodiments, the server is a server 106 as described above in connection with FIG. 1A and FIG. 1B. In other embodiments, the interaction environment 110 includes an information repository. In one of these embodiments, the interaction environment 110 executes a computer program to retrieve information from the information repository and provide the retrieved information to a user of the interaction environment 110. In another of these embodiments, the interaction environment 110 executes a computer program to display retrieved information to a user of the interaction environment 110 in a particular format.

In some embodiments, the interaction environment 110 may be referred to as a "GAD". The user interface module 130, which may be referred to as a converser, determines whether user input is a query or a new piece of information. In some embodiments a semantic evaluator 134 determines whether a user-provided expression comprises a new piece of information (referred to here as a statement) or a query, as described in greater detail below in connection with FIG. 28B, step 2850. If the input is categorized as a new piece of information, a module for adding information to the interaction environment, such as a response generation component 136, adds the information to a search index 118. If the user input is categorized as a query then the user interface module may query a search index 118, directly or via a search component, such as the information retrieval component 116.

In some embodiments, the interaction environment 110 comprises a collaborative web site. In one of these embodiments, the interaction environment 110 comprises a web site implementing server software, such as Wiki software, to allow users of the interaction environment 110 to view, add, and modify data displayed on the interaction environment 110. In another of these embodiments, the interaction environment 110 includes a computer program, such as a CGI script incorporated into a web site. In other embodiments, a user interacts with the interaction environment 110 via electronic mail messages. In still other embodiments, a user interacts with the interaction environment 110 via a short message service. In yet other embodiments, a user interacts with the interaction environment 110 via an instant messaging service.

In some embodiments, the interaction environment 110 provides a plurality of media gateways 140 through which users may access the interaction environment 110. In one of these embodiments, a first media gateway 140a in the plurality of media gateways 140 accepts user input via a type of media different from a type of media accepted by a second media gateway 140b in the plurality of media gateways 140. In another of these embodiments, each media gateway in the plurality of media gateways 140 accepts user input via a different type of media. For example, one media gateway 140a may receive user input via electronic mail messages while another media gateway 140b may receive user input via a web site.

In one embodiment, a media gateway 140 resides on a server, such as a server 106 as described above in connection with FIGS. 1A and 1B. In another embodiment, a media gateway 140 resides on a client 102. In still another embodiment, a web server 106 includes a media gateway 140. In yet another embodiment, a media gateway 140 is software executing on a client or a server.

In some embodiments, the gateway is provided by a CGI script executing in a web page displayed to the user and forwarding user input to the transceiver 132. In one embodiment, a user interface element receiving user input and expressions from a user. In another embodiment, the user interface module 130 provides the user interface element for receiving user input. In still another embodiment, the user interface element is a text box into which the user may enter textual expressions. In yet another embodiment, the user interface element includes a drawing area into which the user may enter non-textual expressions, such as drawings, mouse or pointer input, or other non-text-based input.

Figure 2B:
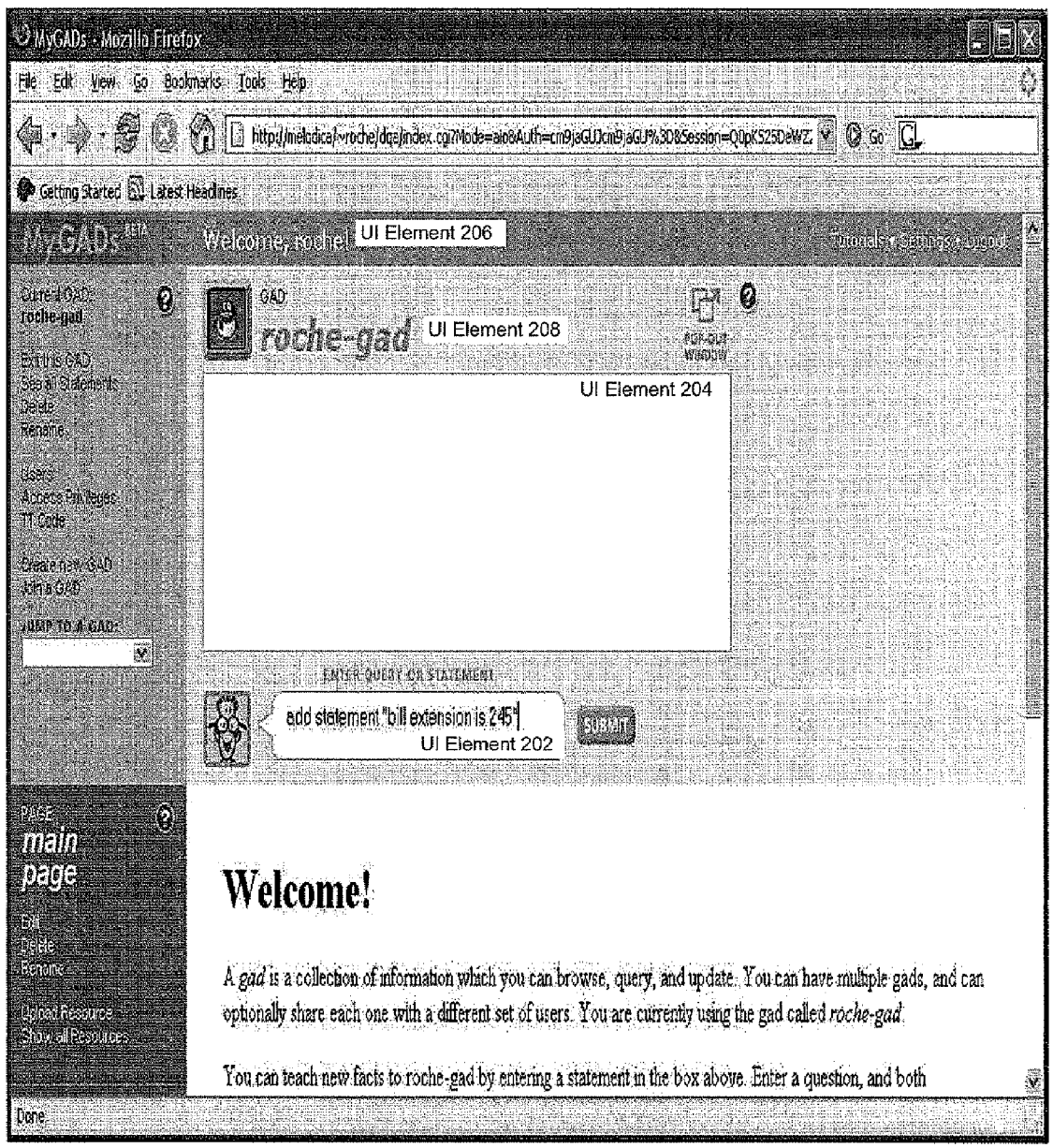
FIG. 2B is a screen shot depicting one embodiment of an interaction environment 110 accessed by a user via a media gateway.

Referring now to FIG. 2B, a screen shot depicts one embodiment of an interaction environment 110 accessed by a user via a media gateway. As depicted by FIG. 2B, the interaction environment 110 provides user interface elements for receiving user-provided information, such as via the text element 202, and for displaying, such as via the text element 204, the information to the user during the session, the stored information associated with the user. The interaction environment 110 displays a username and a text element. For example, as shown in FIG. 2B, the interaction environment 110 may display a string of text 206 including the username, such as "Welcome, roche!", where "roche" is the username. The interaction environment 110 may be associated with an identifier and displays this identifier to the user. For example, FIG. 2B shows the identifier 208 displaying the string "GAD: roche-gad", indicating that the current interaction environment has an identifier of "roche-gad".

In one embodiment, a user enters text into a user interface element, such as a text box, to interact with the interaction environment 110. As depicted in FIG. 2B, the user may enter expressions, including commands to store data in the interaction environment 110. For example, FIG. 2B shows that the user has typed in the expression "Add statement 'bill extension is 245'" into the user interface element 202. This expression includes an explicit command to add a statement to the interaction environment 110, in this case a telephone number. In other embodiments, the expression may include a natural language statement. In one of these embodiments, the expression includes an explicit command and a natural language statement.

In some embodiments, the interaction environment 110 stores information including a user profile and user preferences. In one of these embodiments, the information in the user profile and the user preferences is specified by the user, for example, upon creation of the user's account with the interaction environment.

Referring back to FIG. 2A, the information retrieval component 116 provided by the interaction environment 110 is in communication with the search index 118 and the collection of information 120. In one embodiment, the search index 118 is part of the information retrieval component 116. In another embodiment, the information retrieval component 116 accesses a remotely-located search index 118. In still another embodiment, the collection of information 120 resides in the interaction environment 110. In yet another embodiment, the collection of information 120 resides in a remote location, such as a central database or remote server 106b.

The user interface module 130 provided by the interaction environment 110 is in communication with the information retrieval component 116. In one embodiment, the user interface module 130 is referred to as a "converser" and a session in which a user interacts with the user interface module 130, and the interaction environment 110, is referred to as a conversation. In another embodiment, the user interface module 130 accesses the information retrieval component 116 to retrieve information from an information repository, or collection of information 120, to generate a response to user-input received during a conversation.

The user interface module 130 comprises a transceiver 132, a semantic evaluator 134, and a response generating component 136. The transceiver 132 receives, via one of a plurality of media gateways 140, an expression having a semantic structure. In one embodiment, the transceiver 132 receives, during a session between a user and the interaction environment 110, via one of the plurality of media gateways 140, from the user, the expression having a semantic structure. In another embodiment, the transceiver 132 receives the expression from the user in an electronic mail message. In still another embodiment, the transceiver 132 the expression from the user via a text messaging service. In yet another embodiment, the transceiver 132 receives the expression from the user via an instant messaging service.

In some embodiments, a client 102a interacts with a media gateway 140a during a first session with the interaction environment 110 and interacts with a media gateway 140b during a second session with the interaction environment 110. In other embodiments, a client 102a interacts with a single media gateway 140a during a session with the interaction environment 110. In still other embodiments, a client 102a interacts with a media gateway 140a and with a media gateway 140b during a first session with the interaction environment 110. In yet other embodiments, a client 102a interacts with a plurality of media gateways over a plurality of sessions with an interaction environment 110. In some embodiments, the user input provided by the client 102a and the responses generated by the interaction environment 110 are stored for the duration of the session between the client 102a and the interaction environment 110. In other embodiments, the user input provided by the client 102a is stored for the duration of the session between the client 102a and the interaction environment 110 for the duration of a session between a second client 102b and the interaction environment 110.

A user may interact with one or more interaction environments 110 simultaneously or during different sessions. For example, the user of the client 102a may interact with the interaction environments 110 during a first session and may interact with the interaction environments 110' during a second session. In another embodiment, the user of the client 102 may interact with both an interaction environments 110 and with an interaction environment 110' during a first session.

In one embodiment, the transceiver 132 receives the expression having a semantic structure from a media gateway 140a displaying, to a user, a Hypertext Markup Language (HTML) user interface. In another embodiment, the transceiver 132 receives the expression having a semantic structure from a media gateway 140a displaying, to the user, a user interface on a collaborative web site. In still another embodiment, the collaborative web site incorporates server software, such as Wiki software, that enables the user to add or modify information stored in the interaction environment 110.

In some embodiments, the transceiver 132 further comprises a receiver. In one of these embodiments, the receiver receives, during a session, via one of a plurality of media gateways 140, from a user, a string having a semantic structure. In another of these embodiments, the receiver receives, from a user, a plurality of words having a semantic structure. In still another of these embodiments, the receiver receives, from a user, a command having a semantic structure, such as a command in a programming language. In yet another of these embodiments, the receiver receives, from a user, a question having a semantic structure. In other embodiments, the expression comprises a word. In still other embodiments, the expression comprises a natural language phrase.

In one embodiment, an access control module 112 resides in the user interface module 130. In another embodiment, an account management component 114 resides in the user interface module 130. In still another embodiment, the user interface module 130 is in communication with an access control module 112. In still another embodiment, the user interface module 130 is in communication with an account management component 114. In some embodiments, the transceiver 132 is in communication with the access control module 112. In other embodiments, the transceiver 132 is in communication with the account management component 114. In still other embodiments, the account management component 114, which may include, or be in communication with, an access control module 112, interacts with an account database 122 to receive user-input, such as a query or a statement to generate a query, and an identifier of the interaction environment 110.

In one embodiment, the transceiver 132 receives an expression having a semantic structure from a user during a session between the user and the interaction environment 110. In anther embodiment, the transceiver 132 receives an identification of the user during a session between the user and the interaction environment 110. In still another embodiment, the transceiver 132 forwards the identification of the user to an account management component 114. In some embodiments, the functionality of the access control module 112 and of the account management component 114 are provided by a single component, an account management and access control component 124.

In some embodiments, the account management component 114 determines whether the user is authorized to access the interaction environment 110. In one of these embodiments, the account management component 114 accesses the access control module 112 to determine whether the user is authorized to access the interaction environment 110.

In some embodiments, the transceiver 132 resides on the account management component 114. In one of these embodiments, the transceiver 132 receives the user input from the user during the session between the user and the interaction environment 110. In other embodiments, the access control module 112 resides on the account management component 114. In one of these embodiments, the access control module 112 receives the user input from the user during the session between the user and the interaction environment 110. In still other embodiments, the account management component 114 receives the user input from the user during the session between the user and the interaction environment 110 and accesses the access control module 112 to determine whether the user is authorized to access the interaction environment 110. In one of these embodiments, the user input includes an identification of the user. In another of these embodiments, the user input includes a string, or expression, provided by the user to the interaction environment 110. In still another of these embodiments, the user input includes an identification of the interaction environment 110. In yet other embodiments, no authorization is required for the user to access the interaction environment 110.

In one embodiment, a component making an access control decision accesses an account database 122 to determine whether the user is authorized to access the interaction environment 110. In some embodiments, the account database 122 stores data in an ODBC-compliant database. For example, the account database 122 may be provided as an ORACLE database, manufactured by Oracle Corporation of Redwood Shores, Calif. In other embodiments, the account database 122 can be a Microsoft ACCESS database or a Microsoft SQL server database, manufactured by Microsoft Corporation of Redmond, Wash.

In one embodiment, the access control module 112 accesses the account database 122 to determine whether the user is authorized to access the interaction environment 110. In another embodiment, the account management component 114 accesses the account database 122 to determine whether the user is authorized to access the interaction environment 110. In still another embodiment, a component making an access control decision accesses an account database 122 to determine whether the user is authorized to modify the interaction environment 110.

Figure 2C:
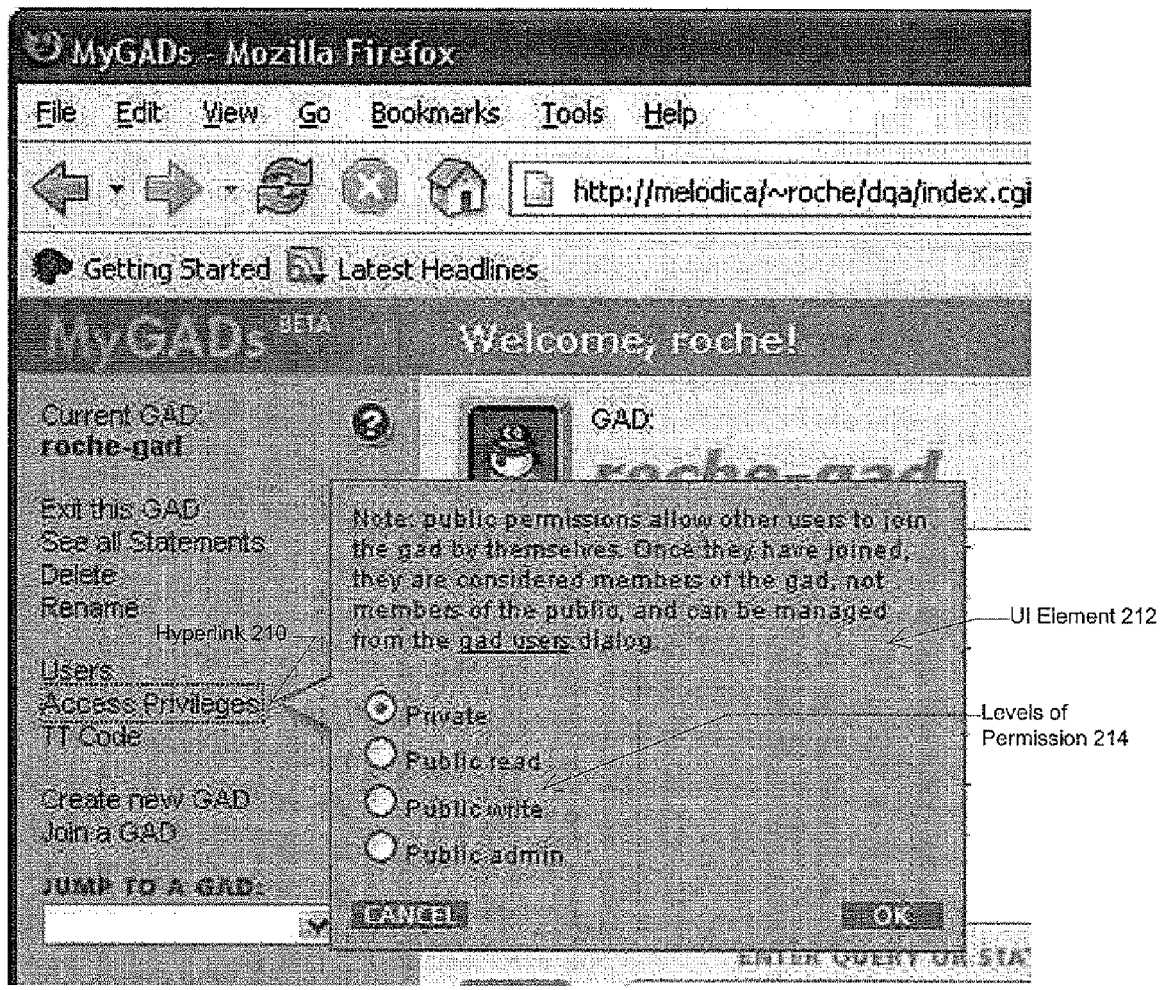
FIG. 2C is a screen shot depicting one embodiment of a graphical user interface for associating an interaction environment with a level of permission.

In one embodiment where an account management component 114 makes a determination regarding user authorization, a graphical user interface enables a creator of an interaction environment 110 to associate a level of permission with the interaction environment 110. Referring now to FIG. 2C, a screen shot depicts one embodiment of a graphical user interface for associating an interaction environment 110 with a level of permission. In some embodiments, upon creation of an interaction environment 110, at least one level of permission is associated with the interaction environment 110. As depicted in FIG. 2C, a hyperlink 210 provide access to a user interface element 212, which lists one or more levels of permission 214 available for association with the interaction environment 110. In one of these embodiments, the interaction environment 110 may be created as a private interaction environment, allowing only the creator of the interaction environment 110 to read or modify the contents of the interaction environment 110. In another of these the embodiments, the interaction environment 110 may be created as a public interaction environment in which members of the public can view the contents of the interaction environment 110. In still another of these the embodiments, the interaction environment 110 may be created as a public interaction environment in which members of the public can view and modify the contents of the interaction environment 110. In yet another of these embodiments, the interaction environment 110 may be created as a public interaction environment in which members of the public can view and modify the contents of the interaction environment 110 and can modify the permissions of the interaction environment 110.

Referring back to FIG. 2A, the semantic evaluator 134 identifies an expression type for the received expression responsive to an evaluation of the semantic structure of the received expression. In one embodiment, the semantic evaluator 134 further comprises means for evaluating a linguistic pattern of the expression. In another embodiment, the semantic evaluator 134 further comprises means for evaluating a word order of the expression. In some embodiments, the semantic evaluator 134 includes an enumeration of pre-defined expressions. In one of these embodiments, the semantic evaluator 134 accesses a list of predefined key words or sequences of key words. In another of these embodiments, the semantic evaluator 134 identifies a predefined key word, or sequence of key words, within the user-provided expression as a predefined key word, or sequence of keywords, included in the enumeration of predefined expressions as a command. In still another of these embodiments, a user has predefined a command in the enumeration of predefined expressions. In yet another of these embodiments, the semantic evaluator 134 executes the command identified in the expression.

In one of these embodiments, the semantic evaluator 134 forwards the command to the response generating component 136 for execution. In another of these embodiments, the semantic evaluator 134 forwards the command to the information retrieval component 116 for execution. In still another of these embodiments, the enumeration of predefined expressions enumerates commands, including, but not limited to commands to search for data within the collection of information 120, to store data in the collection of information 120, to modify data stored in the collection of information 120, and to enumerate one or more expressions stored in the collection of information 120.

In some embodiments, the expression includes a command to add data to the interaction environment 110, the data identified in the expression. In one of these embodiments, the data is data associated with the user, such as contact information, dates for events having significance to the user, or other personal information. In another of these embodiments, the data is not limited to data associated with, or relevant to the user, and may include information relevant to other users.

In one embodiment, the semantic evaluator 134 further comprises means for identifying the expression as a request for information. In another embodiment, the semantic evaluator 134 further comprises means for identifying the expression as a request for stored data, such as data stored in the collection of information 120. In some embodiments, the semantic evaluator 134 queries an information repository for the expression exactly as provided by the user. In one of these embodiments, the semantic evaluator 134 accesses a search index to determine whether information stored in a collection of information 120 is associated with the expression. In another of these embodiments, the semantic evaluator 134 forwards the expression provided by the user to the information retrieval component 116 for retrieval of information stored in the collection of information 120 and associated with the expression.

In some embodiments, the semantic evaluator 134 further comprises means for querying an information repository using a modified version of the expression provided by the user. In one of these embodiments, the semantic evaluator 134 converts the expression from one expression type to a second expression type. For example, and in another of these embodiments, the semantic evaluator 134 may convert the expression from one expression type, such a plurality of words, or a string, into a second expression type, such as a Boolean expression, or an expression including Boolean logic. In another of these embodiments, the semantic evaluator 134 converts the expression from a statement into a question.

In one embodiment, the semantic evaluator 134 identifies the expression as an implicit request for execution of a command. In another embodiment, the semantic evaluator 134 identifies a linguistic pattern associated with a command to add data to an information repository, such as a collection of information 120. In still another embodiment, the semantic evaluator 134 identifies a linguistic pattern or word order of the expression and determines that the linguistic pattern or word order of the expression matches a linguistic pattern or word order listed in an enumeration of linguistic patterns or word orders, the enumeration including a corresponding enumeration of commands associated with the enumerated linguistic patterns or word orders. In yet another embodiment, the semantic evaluator 134 further comprises means for identifying the expression as a command to execute a computer program.

In one embodiment, the semantic evaluator 134 further comprises means for identifying the expression as a query. In another embodiment, the semantic evaluator 134 includes a question-answering component. In still another embodiment, the question-answering component identifies the expression as an implicit question, a noun phrase that implicitly requests information. In still another embodiment, the question-answering component identifies the expression as an explicit question, such as, for example, an expression including a question word. Methods for identifying an expression as a query and systems for question-answering are described in additional detail in U.S. Pat. No. 6,859,800, issued Feb. 22, 2005, titled "System for Fulfilling an Information Need;" U.S. Pat. No. 7,120,627, filed Nov. 26, 2006, titled "Method for Detecting and Fulfilling an Information Need Corresponding to Simple Queries;" U.S. Patent Publication No. 2006/0259510, published Nov. 16, 2006, titled "Methods for Detecting and Fulfilling an Information Need Corresponding to Simple Queries;" U.S. patent application Ser. No. 09/845,571, filed Apr. 30, 2001, titled "System for Answering Natural Language Questions;" U.S. patent application Ser. No. 10/004,952, filed Dec. 5, 2001, titled "System for Fulfilling an Information Need Using Extended Matching Techniques;" U.S. Provisional Patent Application No. 60/200,766, filed Apr. 28, 2000, titled "System for Answering Natural Language Questions;" and U.S. Provisional Patent Application No. 60/251,608, filed Dec. 5, 2000, titled "System for Fulfilling an Information Needing Using an Extended Matching Technique," each of which are incorporated herein by reference.

The response generating component 136 provides a response to the expression based on the identified expression type. In one embodiment, the response generating component 136 provides a response that answers a question identified in the expression, based on an identification of the expression as a type of question. In another embodiment, the response generating component 135 provides a response to the expression by transmitting, to the user, information answering an implicit question, based on an identification of the expression as an implicit question.

In one embodiment the response generating component 136 generates a response to the expression by executing a command. In another embodiment, the response generating component 136 provides a response by adding data to the collection of information 120, based on an identification of the expression as a type of command, for example, a command to store data in an information repository. In still another embodiment the response generating component 136 provides a response by transmitting, to the user, data stored in the collection of information 120, based on an identification of the expression as a type of command, for example, a command retrieve information from an information repository, such as the collection of information 120.

In one embodiment, the response generating component 136 generates a response to the expression by transmitting, to the user, data stored in the collection of information during a previous session between the user and the interaction environment. In another embodiment, the response generating component 136 further comprises means for querying the information retrieval component 116, using a modified version of the expression, to generate a response, responsive to the identified expression type. In still another embodiment, the response generating component 136 transmits, to the user, a result of querying the information retrieval component 116 for information stored in the collection of information 120, or in other information repositories.

In some embodiments, the response generating component 136 generates a response to the expression by executing a computer program. In one of these embodiments, the response generating component 136 executes a computer program written in a programming language. In another of these embodiments, the response generating component 136 executes a computer program written in a scripting language. In still another of these embodiments, the response generating component 136 requests execution of the computer program by a browser application executing on the client 102. In yet another of these embodiments, the response generating component 136 includes output data resulting from an execution of a computer program in the response to the expression displayed to the user. In other embodiments, the virtual machine 108 executing on the server 106 executes the computer program.

In some embodiments, the user interface module 130 determines whether to store information provided by, or to, a user during a session between the user and the interaction environment 110. In one of these embodiments, the response generating component 136 determines whether to store a received expression, a response to the received expression and an identification of the user providing the expression. In another of these embodiments, the response generating component 136 determines to store an entire session—also referred to as a conversation—between the user and the interaction environment, including a plurality of received expressions, a corresponding plurality of responses, and an identification of the user. In still another of these embodiments, the response generating component 136 makes the determination responsive to the identified expression type. In yet another of these embodiments, the response generating component 136 makes the determination responsive to a type of response generated.

In some embodiments, the received expression and the corresponding response to the expression are stored in the search index 118. In other embodiments, the received expression and the corresponding response to the expression are stored in the collection of information 120. In still other embodiments, the received expression and the corresponding response to the expression are stored in a database.

Figure 2D:
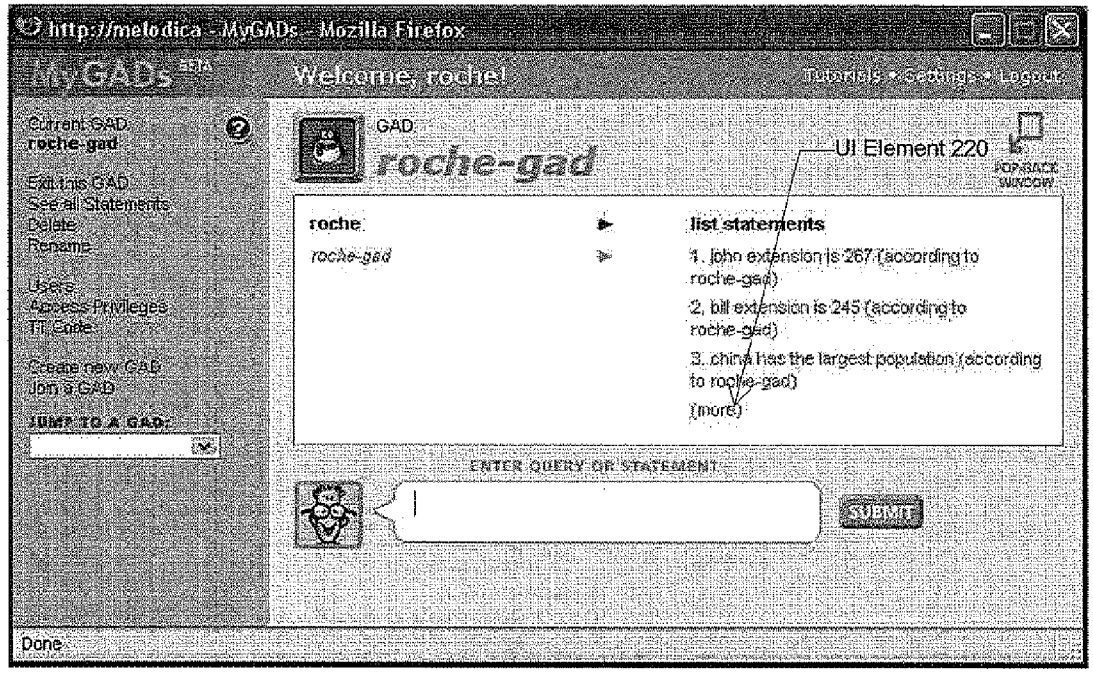
FIGS. 2D and 2E are screen shots depicting user interfaces allowing a user to request information stored in a conversation object.
Figure 2E:
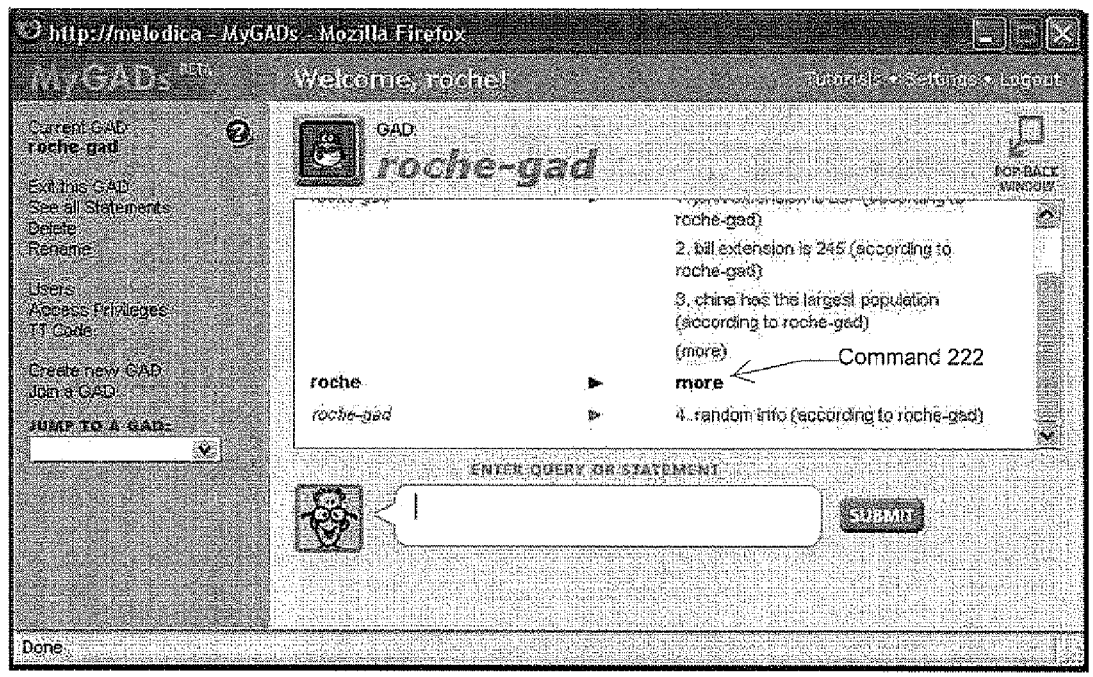

Referring now to FIGS. 2D and 2E, two screen shots depict user interfaces allowing a user to interact with stored conversations. In one embodiment, a conversation is an object that stores particular elements of interactions between the user and the interaction environment 110. In another embodiment, a conversation may store the last query or queries entered by a user, or the last answer provided by the GAD, or anything relevant to the current interaction. Referring to the object as a "conversation" reflects the fact that this object stores data exchanged between the user and the interaction environment and related to the user's current session. In still another embodiment, data exchanged between different users and different gads will be stored distinct conversation objects. In some embodiments, when a user logs out and then back, the user may lose access to the initial conversation and have another conversation object created. In other embodiments, when a user logs out and then back, the interaction environment has stored information relating to a particular USER-GAD pair. FIG. 2D depicts a request from a user that results in a response containing more answers than can be displayed, which is indicated to the user by the user interface element 220 "(more)" displayed by the GAD. FIG. 2E depicts a command 222 (the text string "more") received from the user requesting the additional answers. Because the system stored the last question and stored how many answers it already displayed in the conversation object for the session, the system knows what it needs to retrieve to generate the response including the next set of answers to the previous request.

In one embodiment, the stored expression received from a first user in a first session and a corresponding response to the stored expression are made available to the first user in a second session with the interaction environment 110. In another embodiment, the stored expression received from a first user in a first session and a corresponding response to the stored expression are made available to a second user in a session between the second user and the interaction environment 110.

In other embodiments, the user interface module 130 determines not to store a received expression, a corresponding response to the expression, or an identification of the user. For example, the user interface module 130 may determine that the received expression is duplicative of information already stored in the collection of information 120. In another example, the response generating component 136 may identify the received expression as a type of question that a rule or policy indicates the response generating component 136 should not store. In still another example, the user requests storage of the received expression or the corresponding response. In yet another example, the account management component 112 determines that the user is not authorized to store a received expression or a corresponding response.

Figure 3:
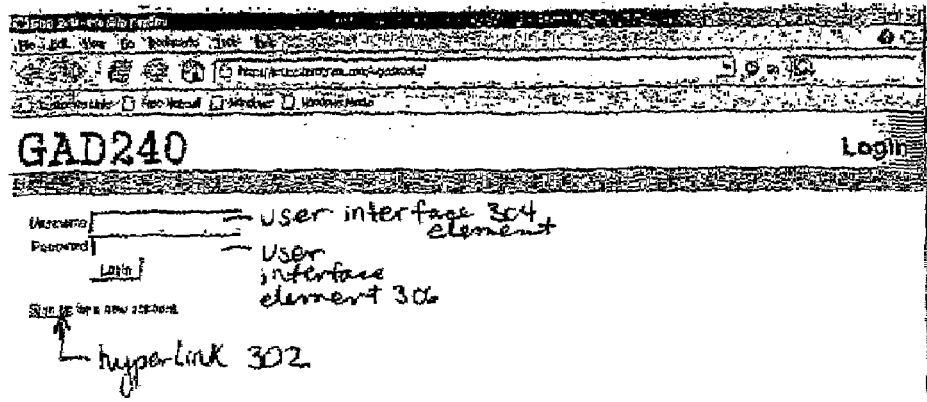
FIG. 3 through FIG. 27 are screen shots depicting various embodiments of a system for processing user input.
Figure 4:
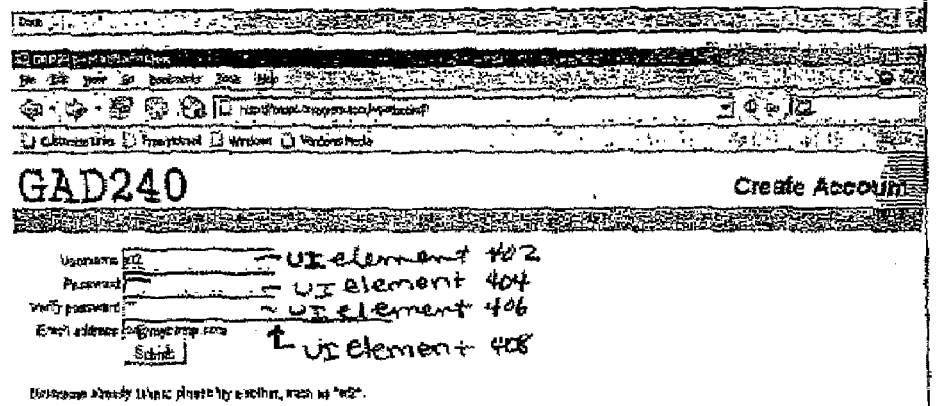
Figure 5:
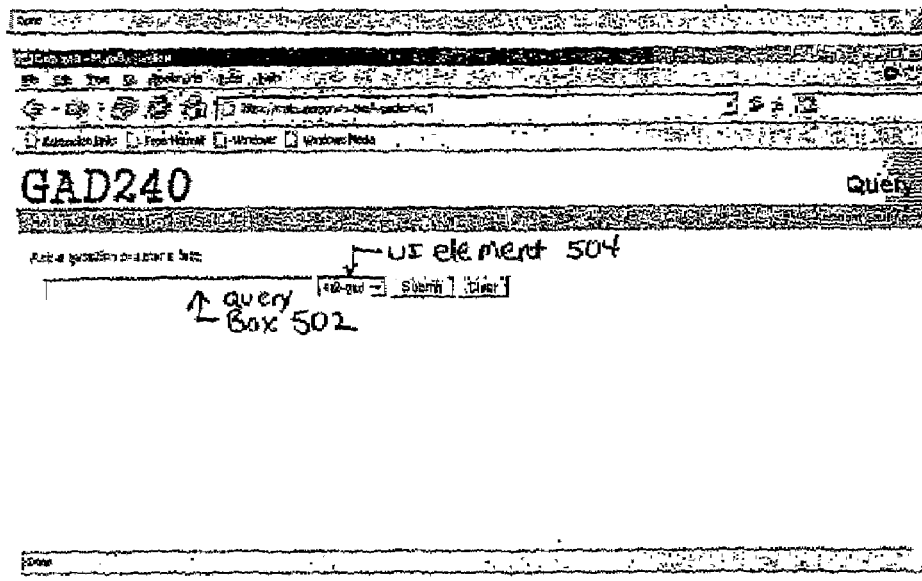
Figure 6:
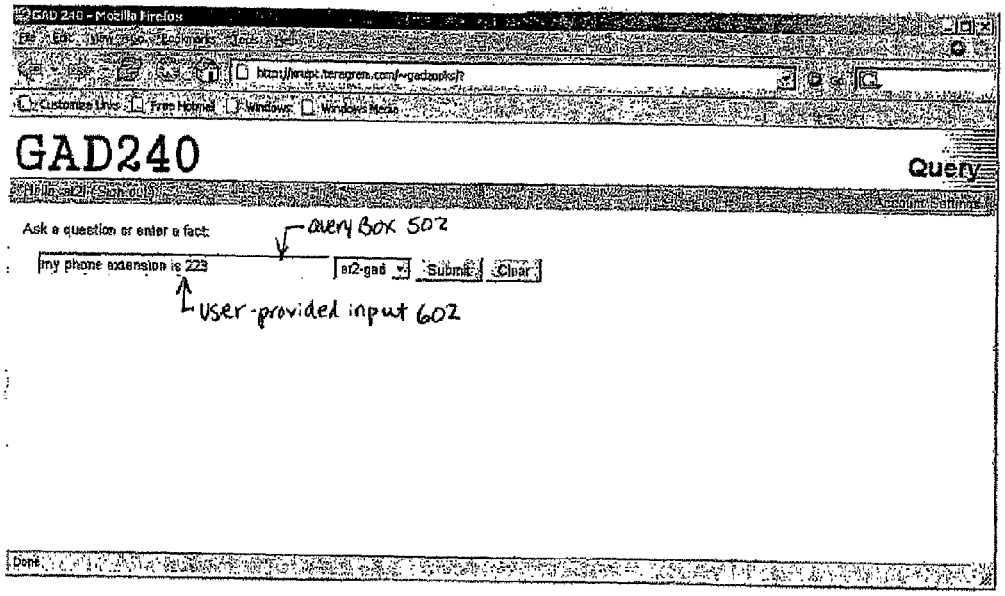
Figure 7:
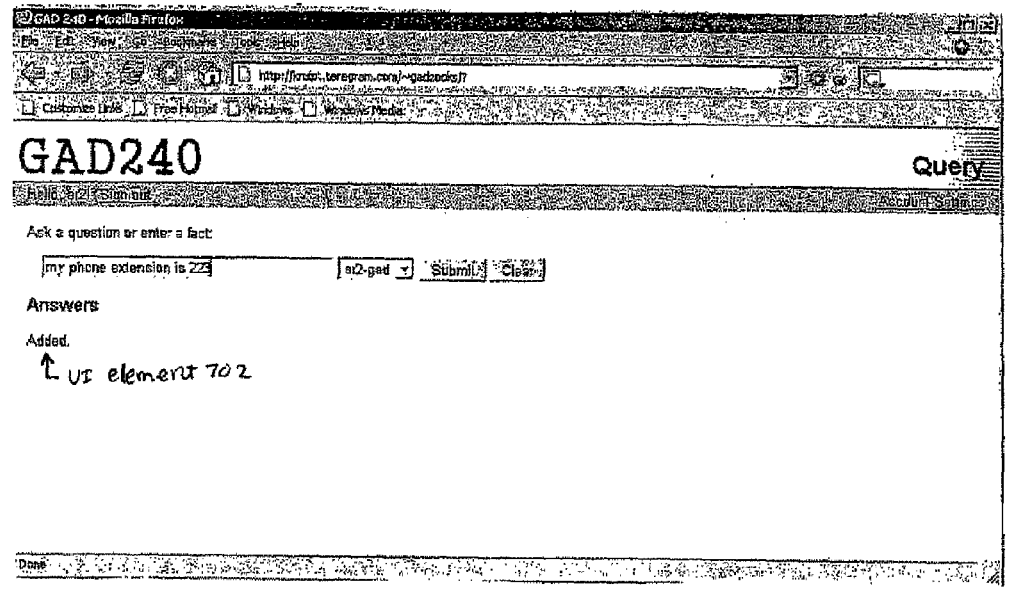

Referring now to FIG. 3, a screen shot illustrates one embodiment of an entry screen. As depicted in FIG. 3, the user can either sign up for a new account by selecting hyperlink 302 or login into the system, if the user already has signed up, by providing a username and password via user interface elements 304 and 306. If a user clicks on "Sign Up", the text displayed by hyperlink 302, the system generates the screen shown in FIG. 4 and allows the entry of a new user name and password into user interface elements 402, 404, and 406. In FIG. 4 the user chooses as user name "er2", enters a password for his login, and enters his email address (er@mycomp.com) into user interface element 408. After entering this information and submitting to the system, a new user account is created for the user. Once a user account is created, the user can start adding information to the information repository 120 of the interaction environment 110 (i.e., a GAD) which is named, in some embodiments, after the user name (in this case the user name is "er2"). As shown in FIG. 5, the interaction environment 110 associated by default with this user is called "er2-gad." Note that in FIG. 5 a query box 502 appears with the instruction to "Ask a question or enter a fact." The name of the default GAD for the user is listed in the user interface element 504. As shown in FIG. 6, the user may enter user-provided input 602, such as a fact for storage by the system, into the query box 502 depicted in FIG. 5, such as the fact "my phone extension is 223." The system answers by acknowledging that the statement has been added to "er2-gad", such as by displaying a user interface element 702 confirming the addition by displaying a string ("added") as shown in FIG. 7.

Figure 8:
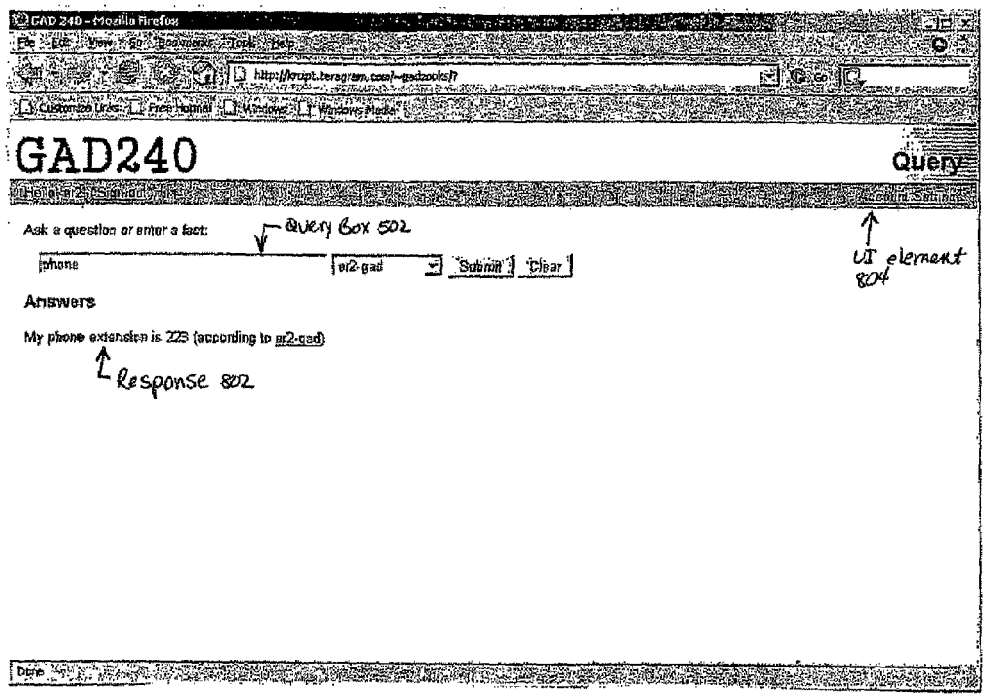
Figure 9A:
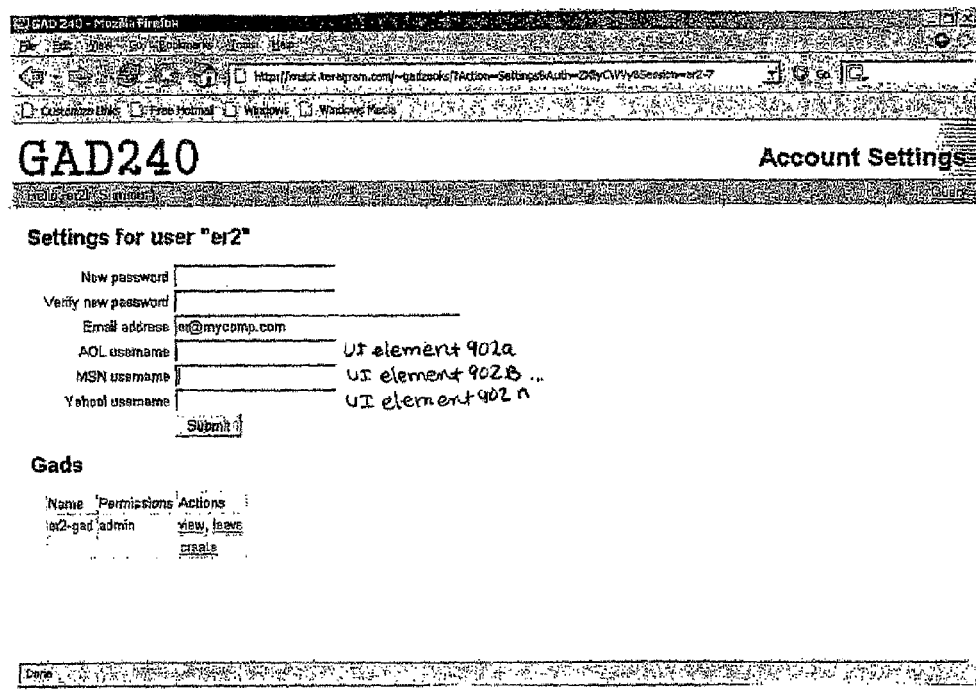
Figure 9B:
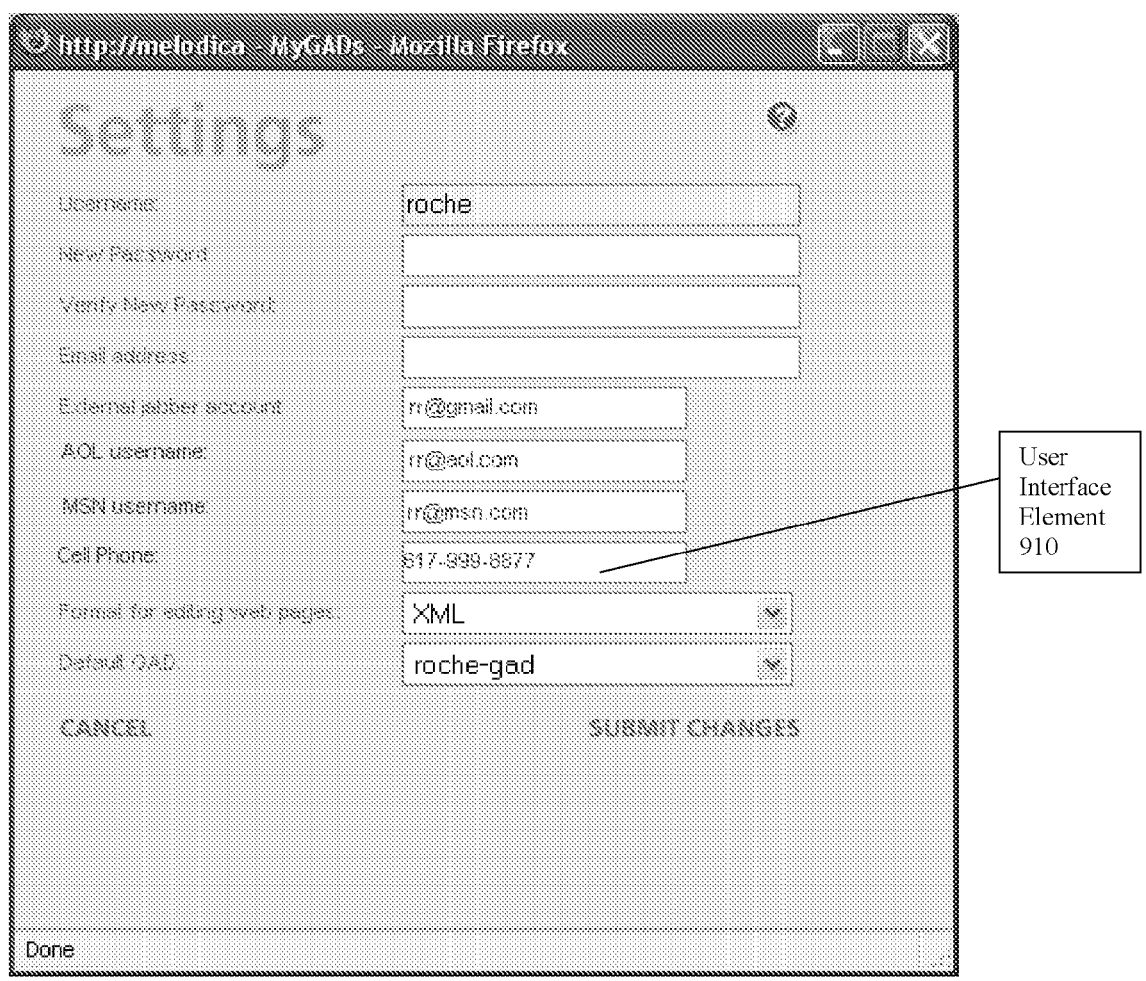

The user can then search the data immediately as shown in FIG. 8. As shown in FIG. 8, the user enters "phone" into the box and the system responds with "my phone extension is 223 (according to the GAD er2-gad)." FIG. 8 depicts an embodiment of the system in which the semantic evaluator 134 determines that the expression entered by the user is an implicit question for a telephone number and displays response 802 to the user. Using this interaction, the user could continue adding or retrieving information from the same web interface by entering text into a single user interface element displayed by the user interface module 130. The user may also interact with the interaction environment 110 using other media gateways, such as via an interface to an instant messaging service. When the user then clicks on a user interface element 804 "Account Settings" in the upper right-hand portion of FIG. 8, the screen depicted in FIG. 9A is displayed to the user, including user interface elements 902a-n that allow the user to specify user names within different instant messaging systems, such as AOL, MSN and Yahoo. In some embodiments, in addition to providing instant message service user names, the user may specify user identifiers associated with a mobile phone service, for example, a cell phone number. FIG. 9B is a screen shot depicting one embodiment of a user interface providing a user interface element 910 with which the user may specify an cell phone number.

Figure 10:
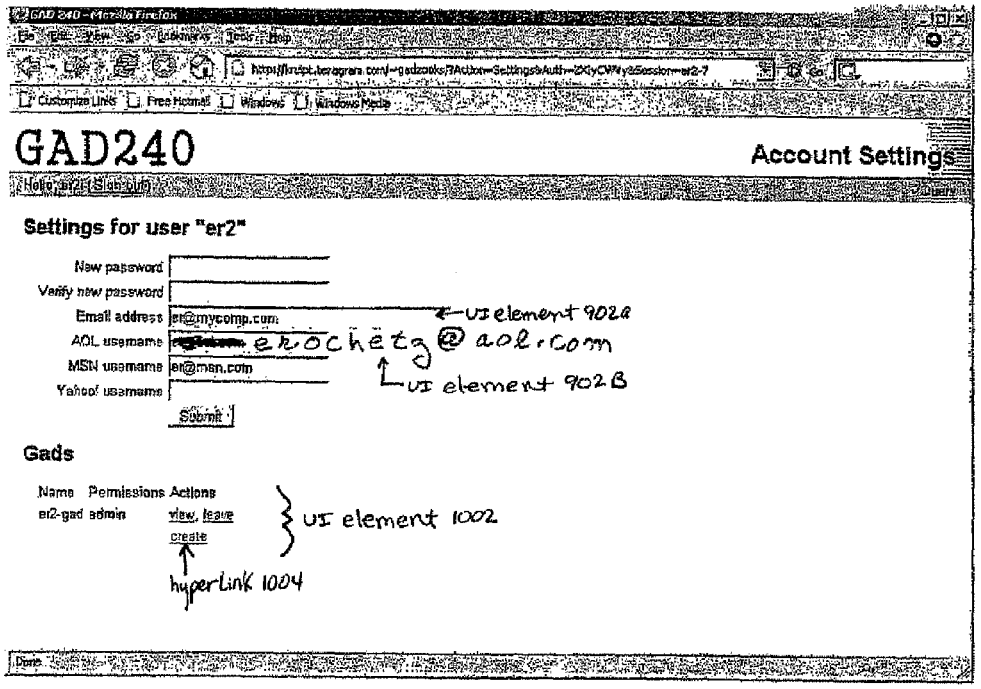

FIG. 10 shows that the user has added AOL and MSN user names. In FIG. 10, AOL and MSN user names (erochetg@aol.com and er@msn.com) entered in user interface elements 902a and 902b are user names for user accounts in the AMERICA ONLINE INSTANT MESSENGER and the Microsoft WINDOWS LIVE MESSENGER instant messaging services, which will allow the user to interact with the interaction environment 110 via an instant message gateway.

In some embodiments, the GAD relies on the user account with the instant messaging service for authentication. For example, as depicted in FIG. 9B and FIG. 10, the user may provide a user name associated with an account provided by the AMERICA ONLINE INSTANT MESSENGER service. The instant message service may require the user to provide a username and password and may authenticate the user prior to allowing the user to send or receive instant messages. The GAD system may provide a separate authentication process, or the GAD system may rely on the instant messaging service for authentication. In FIG. 9B, the screen shot depicts an embodiment in which a user may provide user names for one or more communications services and in which the interaction environment 110 uses the provided user names to authenticate the user. If, for example, a user intends to use the system through cell phone (using SMS for instance), the user can specify a cell phone number in the user interface elements provided. When the interaction environment 110 receives a message from the user, for example, an SMS request, the interaction environment 110 verifies that that sender's cell phone number corresponds to a number provided by an authorized user. This mechanism enables seamless user identification for SMS and cell phones. In FIG. 9B, the user has also provided a user name, rr@gmail.com, associated with an external email account. In one embodiment, the interaction environment 110 authenticates a user logged into the email account with the user name rr@gmail.com by determining that the email address is associated with an authorized user of the interaction environment 110. In another embodiment, the interaction environment 110 may grant a request for interaction from a user providing the user name rr@aol.com to an AMERICA ONLINE INSTANT MESSENGER system based on a determination that the user name rr@aol.com is associated with an account for an authorized user of the interaction environment. In some embodiments, a user can access the GAD system from mobile phone or via a third-party chat system (such as Microsoft WINDOWS LIVE MESSENGER, Yahoo! MESSENGER, or external JABBER accounts supported by the Jabber Software Foundation, such as Google TALK). In one of these embodiments, the GAD system will rely on authentication of the user by the mobile phone or third-party chat system. In another of these embodiments, the third-party system requires the user to provide a login/password to authenticate to the system and the GAD system relies on that authentication in determining whether to authenticate a user requesting access to the GAD system. In still another embodiment, the GAD system accepts the authentication of the user by the third-party system but also verifies that the username of the user requesting access is associated with a username provided in the account settings for an authorized GAD user.

Figure 11:
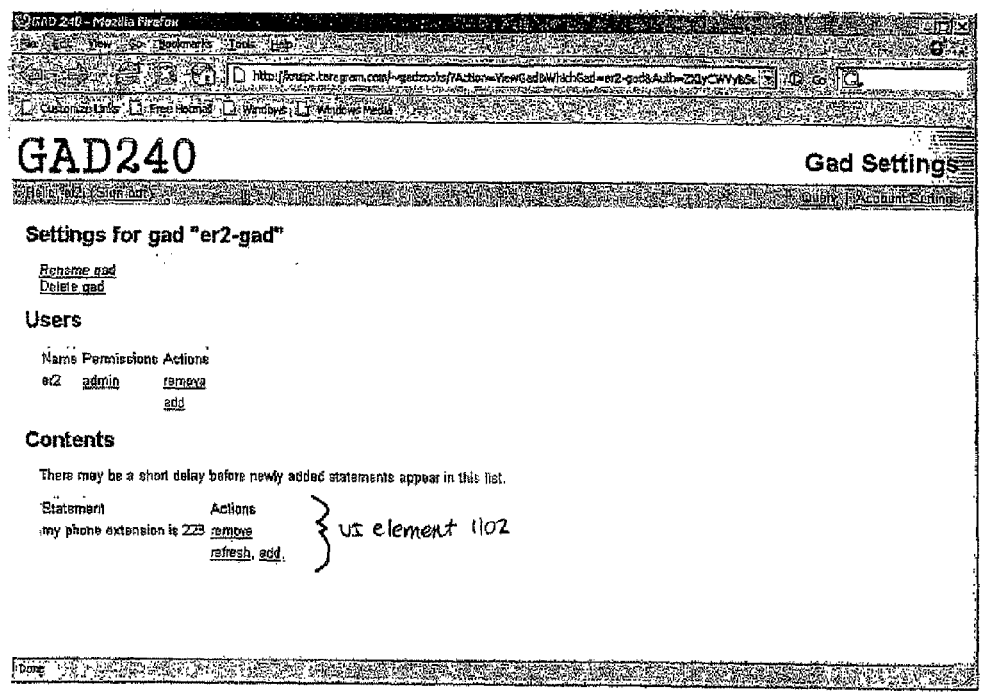

As depicted in FIG. 10, the user may view and change the informational content of the interaction environment 110. In FIG. 10, under the GAD headline, the names of the GADs associated with the user are listed. Although only one GAD is listed in the user interface element 1002 depicted by FIG. 10 (er2-gad), more than one GAD can be associated with a user. A GAD can also exist independently of any user. If one clicks on "er2-gad"/"view" in FIG. 10, the screen shown in FIG. 11 appears that summarizes the information about the GAD "er2-gad". In particular, the screen in FIG. 11 shows all the statements that have been added to the information repository associated with the interaction environment 110. In the embodiment depicted by this screen shot, the user has added one statement and this statement is displayed to the user in user interface element 1102.

Figure 12:
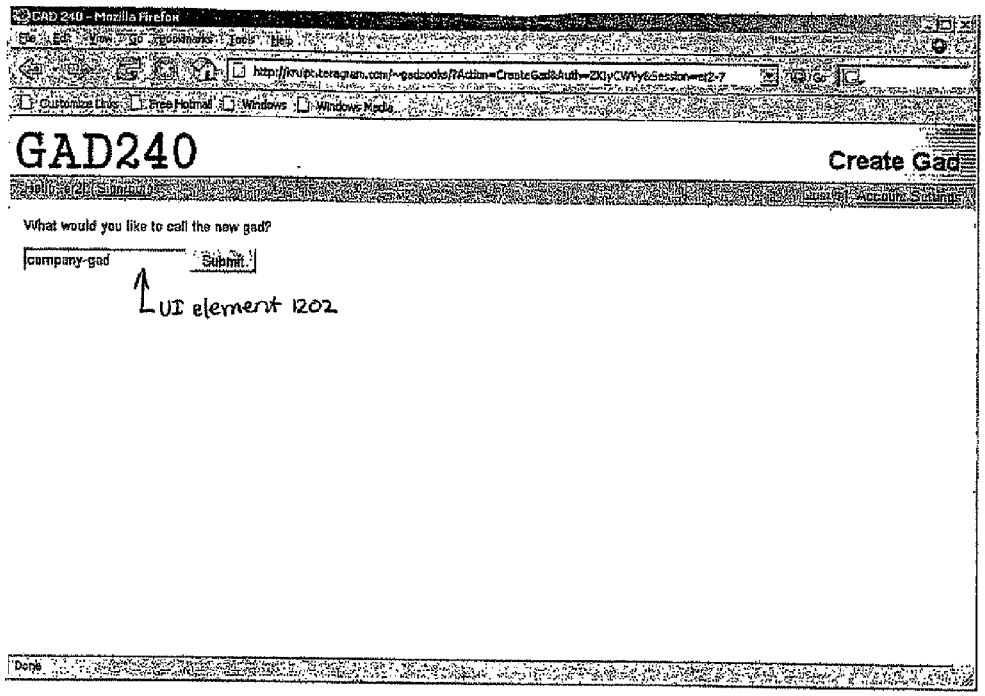

A user can also create a new GAD from the screen of FIG. 10 by clicking on the hyperlink 1004 within the user interface element 1002, labeled "create", which will generate the screen shown in FIG. 12. The user types the desired name for a new GAD into a user interface element 1202 and the system creates a new GAD named "company-gad."

Figure 13:
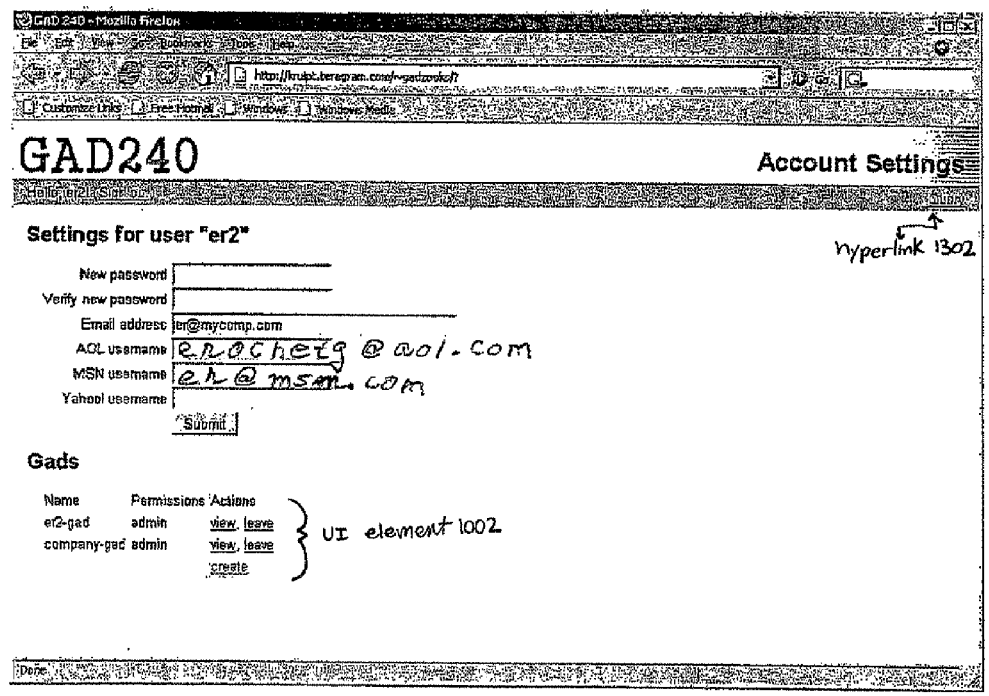

FIG. 13 shows a screen shot depicting an embodiment in which two GADs are available, namely, "er2-gad" and "company-gad", and both GADs are displayed in user interface element 1002. Clicking on the hyperlink 1302 labeled "Query" in FIG. 13 results in the screen shot depicted in FIG. 14, which has two GADs available in the drop down menu. New statements may be added to the "company-gad" by typing statements into the user interface element 1402 in FIG. 14 when "company-gad" is selected from user interface element 1404. For example, from FIG. 14, the user can query any of the two GADs or add information from any of the two GADs. For example, in FIG. 14, the user adds "John phone extension is 224" to company-gad by typing this fact into the text box element 1402 and selecting "company-gad" in the drop down menu element 1404. Similarly, the user can add "Er phone extension is 223" to company-gad, or any other statement by typing the statement into the user interface element.

Figure 14:
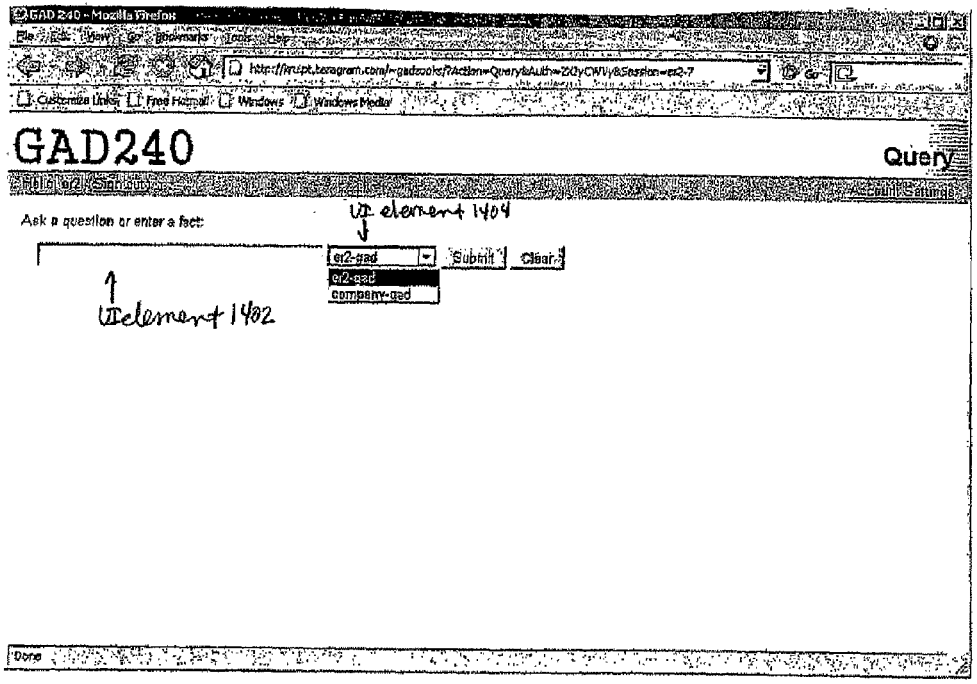
Figure 15:
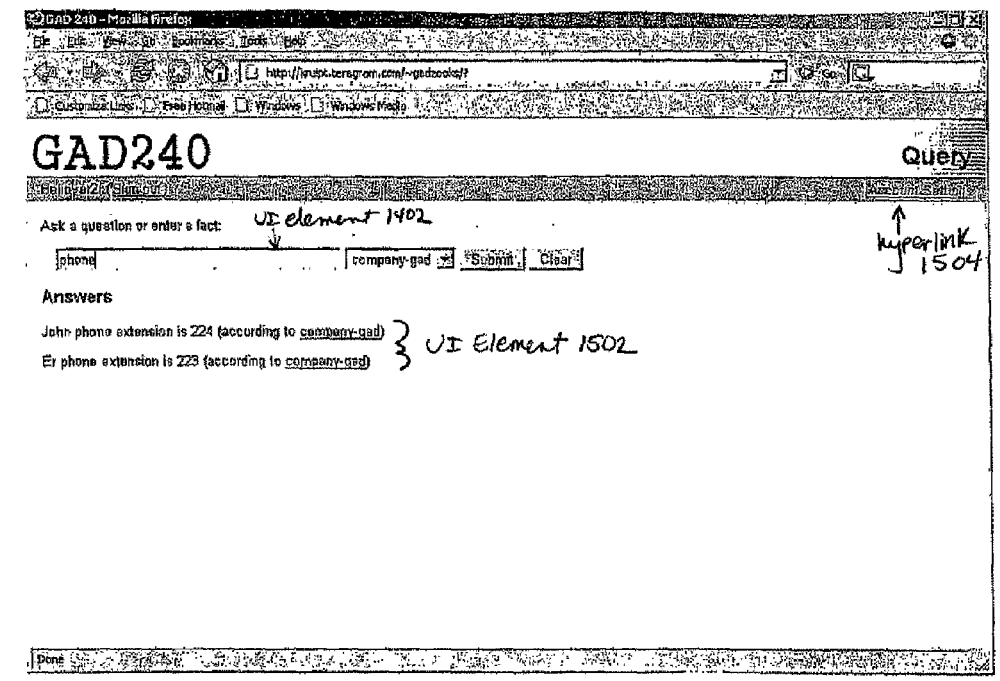

Similarly, statements can be retrieved by typing queries into the user interface element 1402 depicted by FIG. 14 while "company-gad" is selected. For example, when a user types "phone" into the user interface element 1402, as shown in FIG. 15, the system retrieves the two statements added to the "company-gad" that include the word "phone" and displays them to the user via user interface element 1502.

At this point the user "er2" who created both GADs is the only person that can both access and write new information both to "er2-gad" and "company-gad". In one embodiment, the system enables the user to specify permission such as read, write and administration permissions on each GAD owned by the user.

Figure 16:
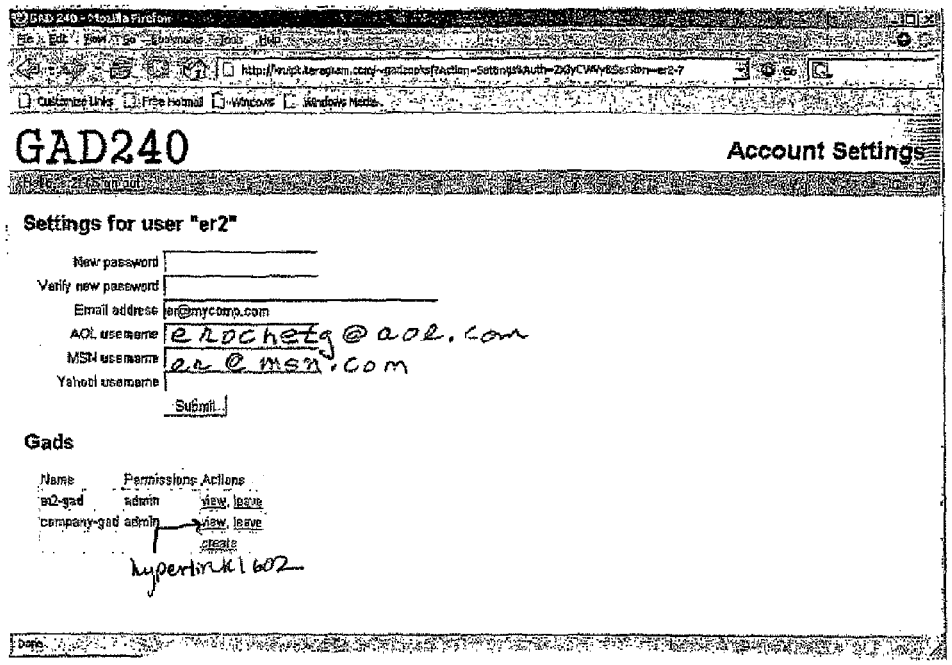
Figure 17:
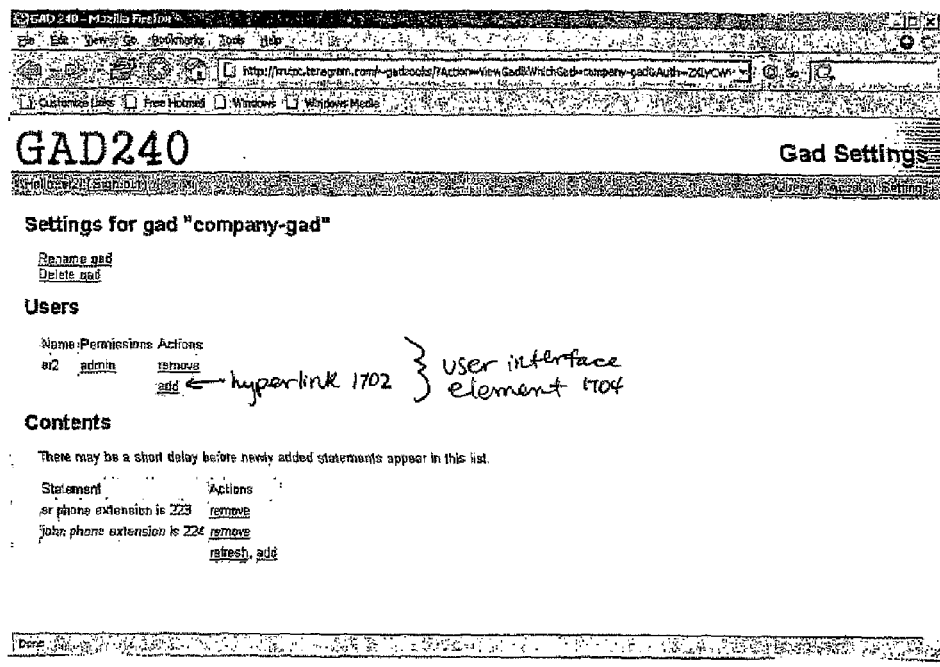
Figure 18:
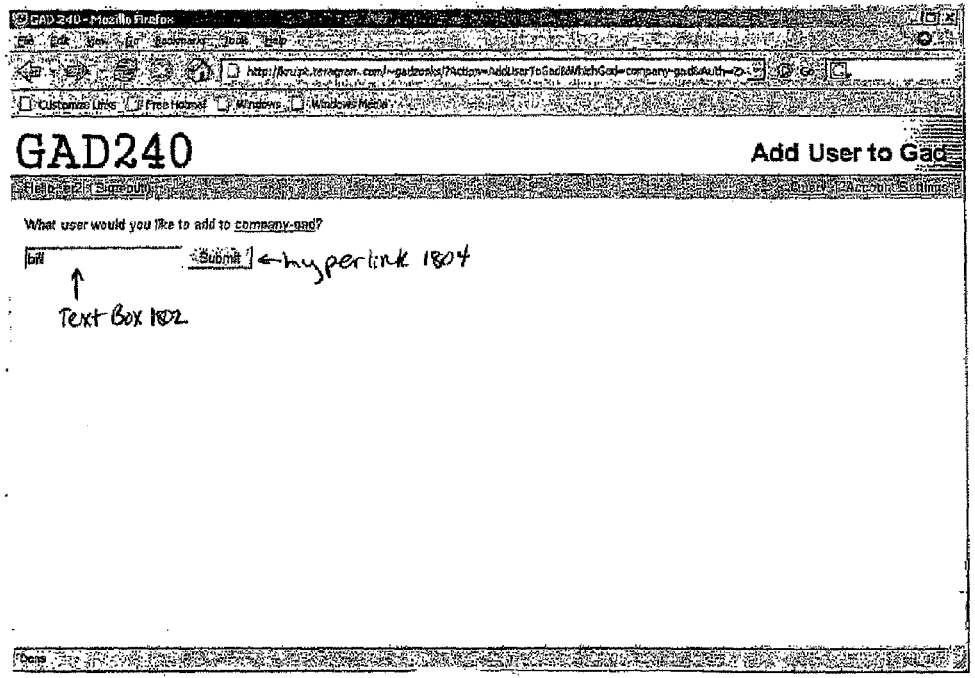
Figure 19A:
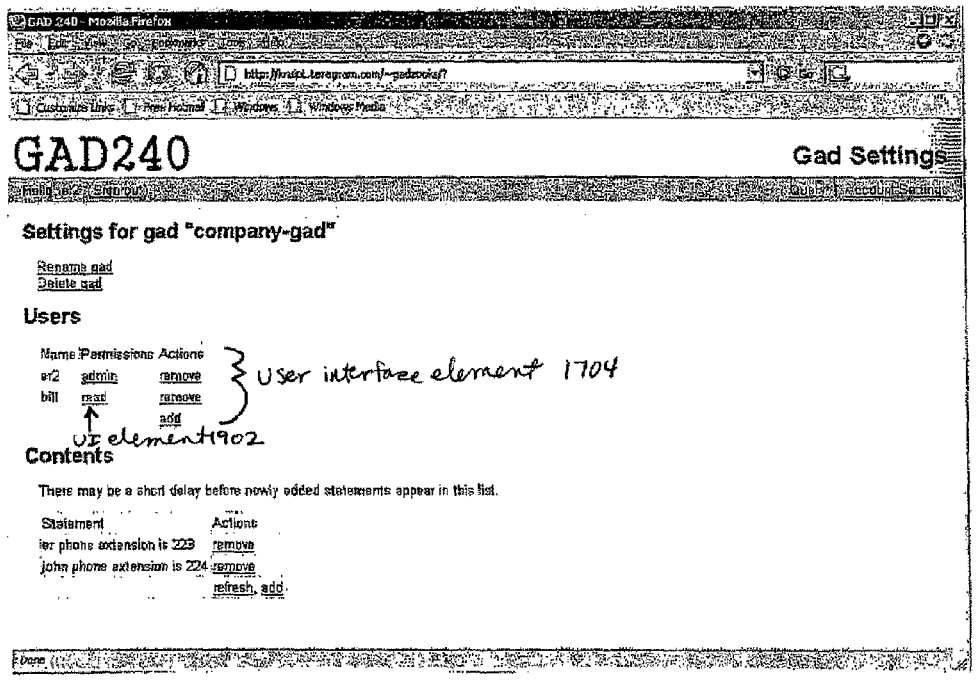
Figure 19B:
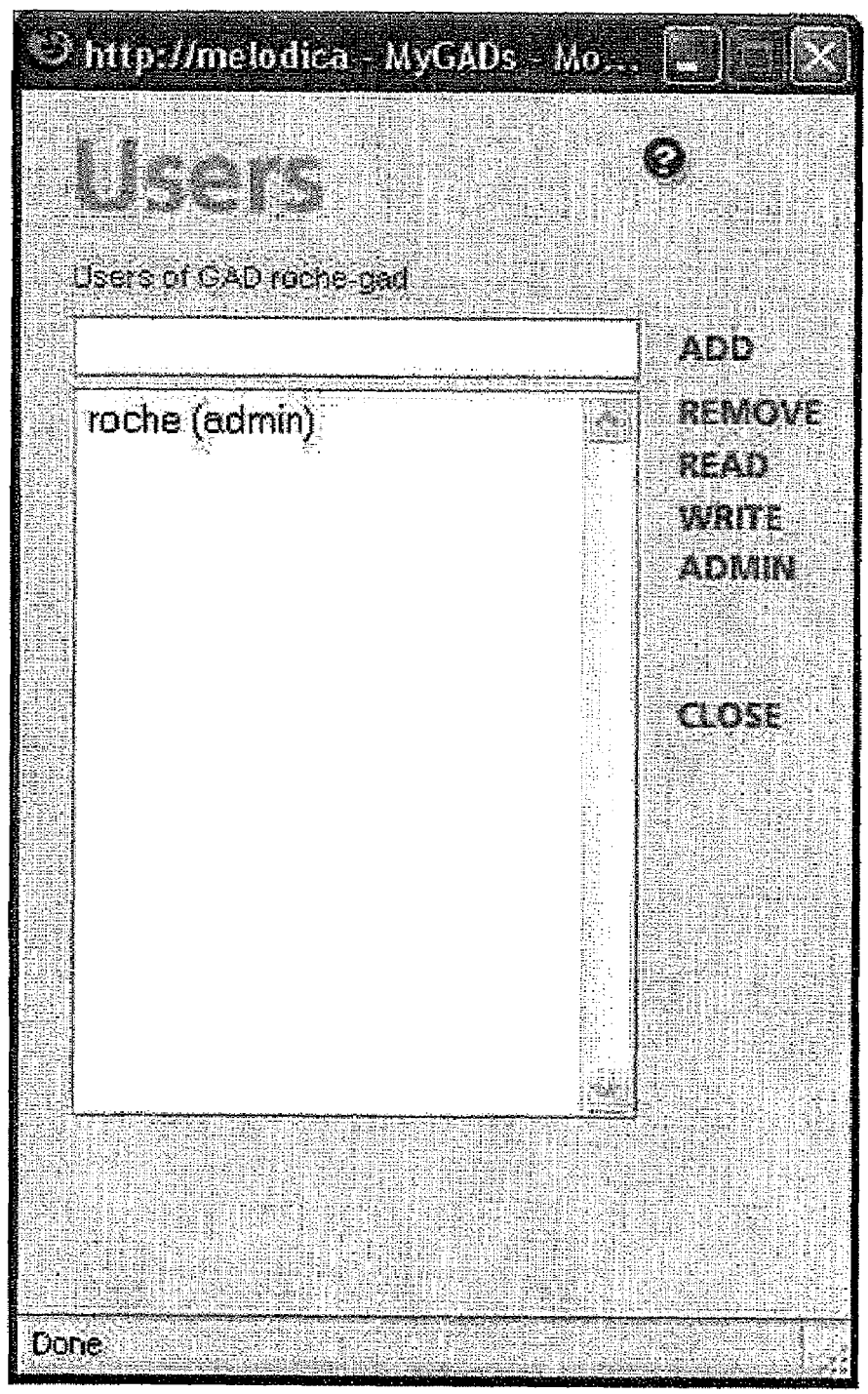

In one embodiment, the user may click on a user interface element, such as an "Account Settings" hyperlink 1504, to create an information repository that can be accessed by a group of people, such as people within a family, community, or organization. The screen in FIG. 16 appears. In another embodiment, the user may click on a hyperlink 1602 (labeled "view" in FIG. 16, located next to the name ("company-gad") of the GAD to be modified), which results in the screen shown in FIG. 17. In still another embodiment, the user may click on hyperlink 1702 (labeled "add" and under "Users/Actions" in FIG. 17). In yet another embodiment, clicking on hyperlink 1702 results in a display of the screen shown in FIG. 18 to the user. FIG. 18 depicts a text box 1802 in which the user may add a username (for example, "bill") to the "company-gad". Clicking on hyperlink 1804 (labeled "Submit") brings up the screen of FIG. 19 that shows that user "bill" has read access permission to "company-ad" in user interface element 1704. This allows user Bill to look for existing information but not add information himself. Access rights for user Bill may be changed by clicking on user interface element 1902 (labeled "read") and associating a different level of access with the user Bill. As shown in FIG. 20, a user interface element 2002 allows the user to determine a level of access to associate with the user Bill, for example, and as shown in FIG. 20, "write" permissions (being able to add statements) or "admin" permissions which would allow Bill to invite other users to join the interaction environment 110. Referring back to FIG. 19B, a screen shot depicts another embodiment of a user interface for adding a user. In this embodiment, when a user clicks on the hyperlink 1702, the screen depicted in FIG. 19B appears.

Figure 19C:
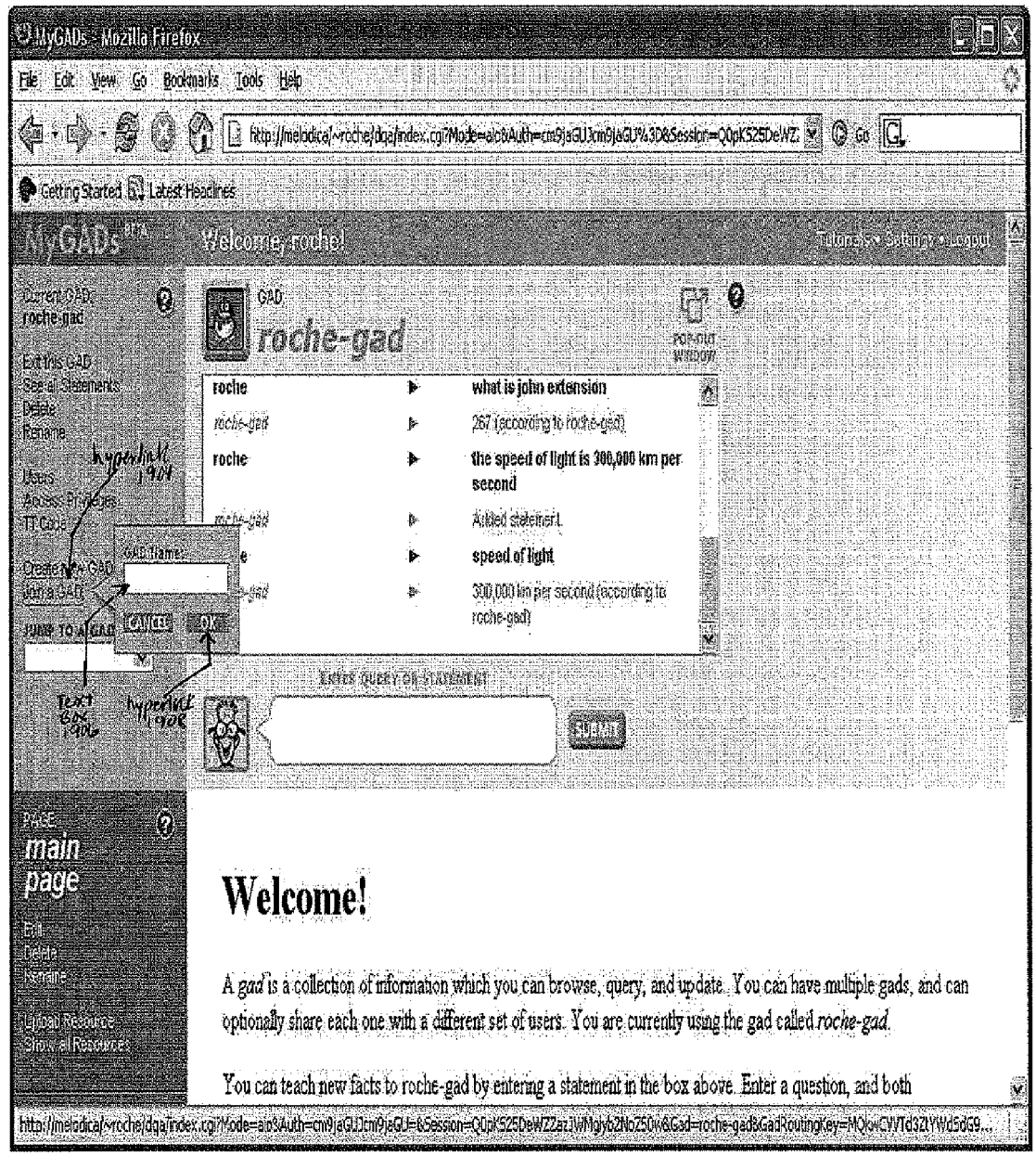
Figure 20:
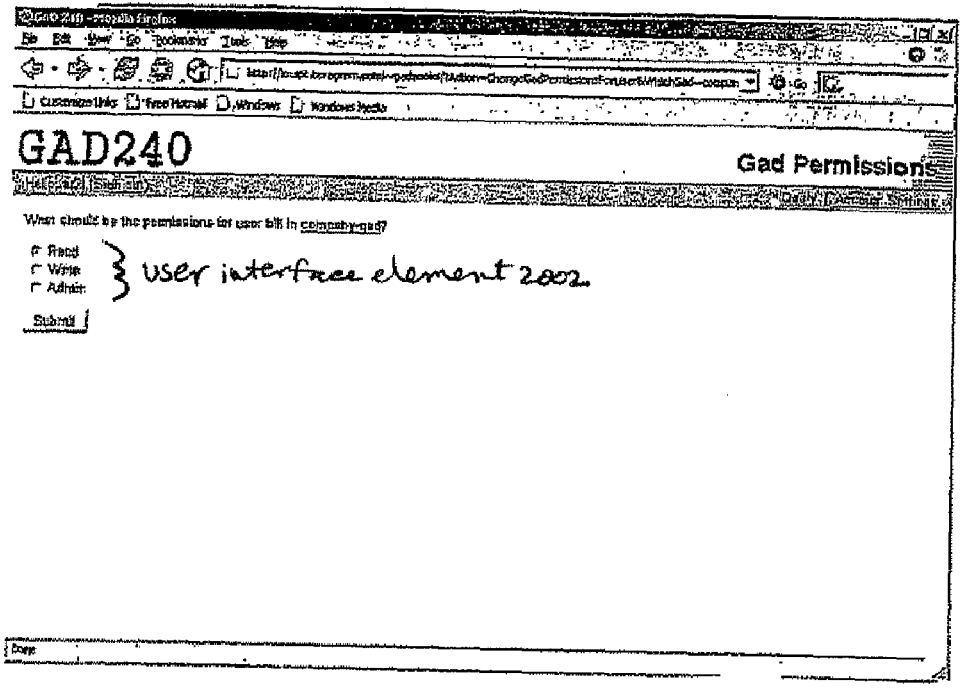

Referring now to FIG. 19C, a screen shot depicts a user interface element allowing a user to request access to an interaction environment 110. In this embodiment, instead of the creator of the interaction environment 110 adding a user, the user requests access. The user selects the hyperlink 1904 and a text box 1906 appears. The user may enter a username into the text box 1906 and select a hyperlink 1908 (labeled "ok" in FIG. 19C) to request access to the interaction environment 110. In some embodiments, the creator of the interaction environment 110 associates the interaction environment 110 with an access control level that authorizes public users to access the interaction environment 110. In one of these embodiments, the requesting user enters an identification of the desired interaction environment 110 into the user interface. In an embodiment such as that depicted in FIG. 19C where Bill requests permission, the account management component or access control module may make a determination as to whether to allow Bill to access the interaction environment.

Figure 21:
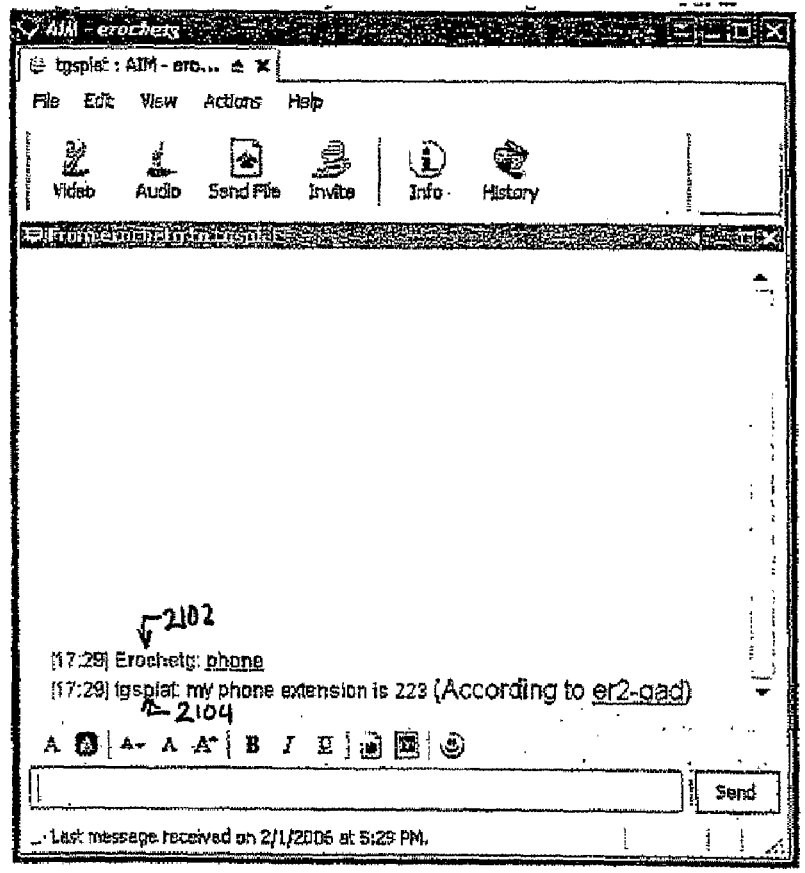

The same information repository (GAD) can be accessed through a chat or instant messaging interface. In the example depicted by FIG. 21, the AOL instant messaging (AIM) user (identified by a screen name 2102, labeled "erochetg") interacts with the GAD (shown with a screen name 2104, labeled "tgsplat") via the GAD chat gateway. The GAD chat gateway shows the GAD as an AIM user "tgsplat" the AIM user erochetg can chat with it. The GAD gateway 140 makes the connection between the AIM user and the corresponding GAD user. As described above in connection with FIG. 10, the AIM user erochetg@aol.com is associated with the GAD user name "er2". Therefore, when AIM user "erochetg" chats with the GAD gateway, the user actually chats with the GAD "er2". The chat gateway is a convenient way to make a third-party instant messaging system correspond with the GAD system. In the case that the instant messaging system and the GAD system are controlled by a single entity, the CHAT gateway could be eliminated by identifying directly the GAD username with the instant messaging user name, thus eliminating need for a gateway.

Figure 22:
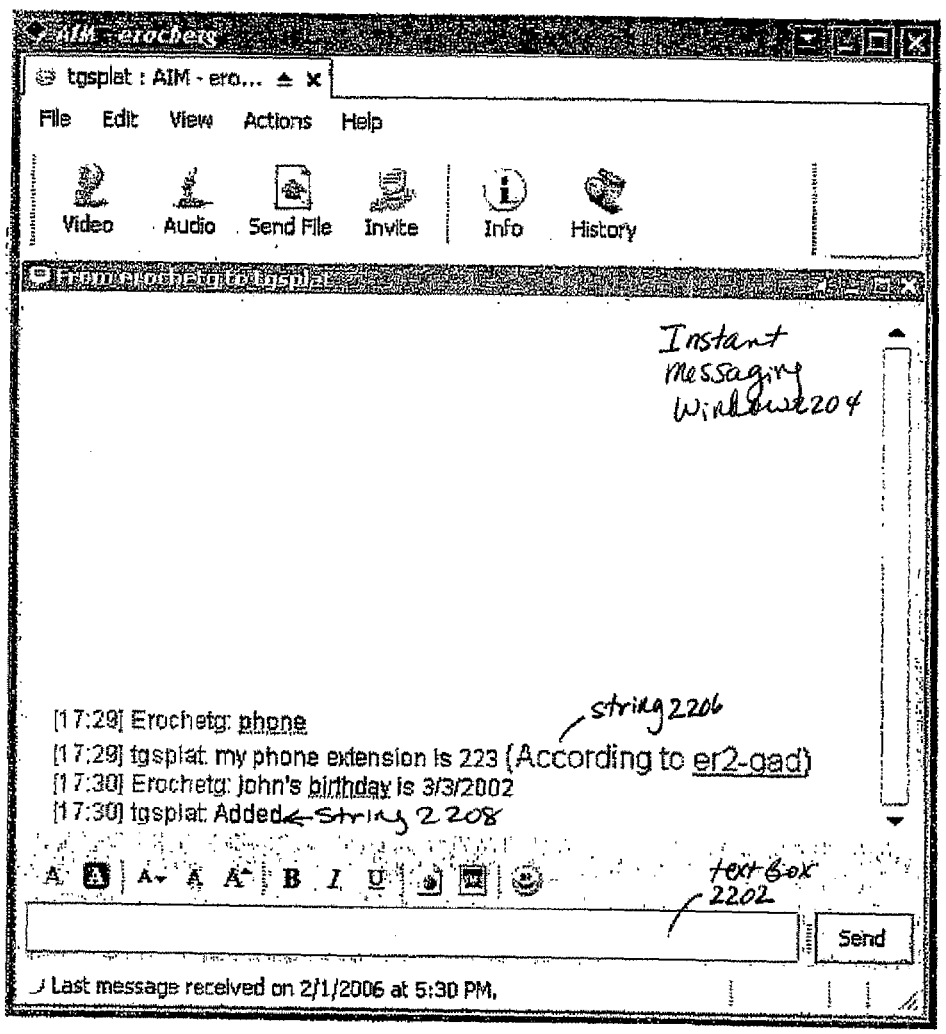

Assuming the GAD user and the instant messaging user have been linked (either through a gateway or directly), the user can interact with the GAD within the instant messaging interface. For example, the user can immediately search for existing information but can also add new information as shown in FIG. 22. In FIG. 22, the user "erochetg" has typed "phone" into a text box 2202 displayed within an instant messaging window 2204 and the GAD returned string 2206 ("my phone extension is 223 (according to er2-gad)"). This is an example of retrieving information from a GAD through the instant messaging interface. In FIG. 22, the user "erochetg" has also typed "john's birthday is Mar. 3, 2002" into the text box 2202 and the GAD returned string 2208 ("added") indicating that this fact has been added to the user GAD.

Figure 23:
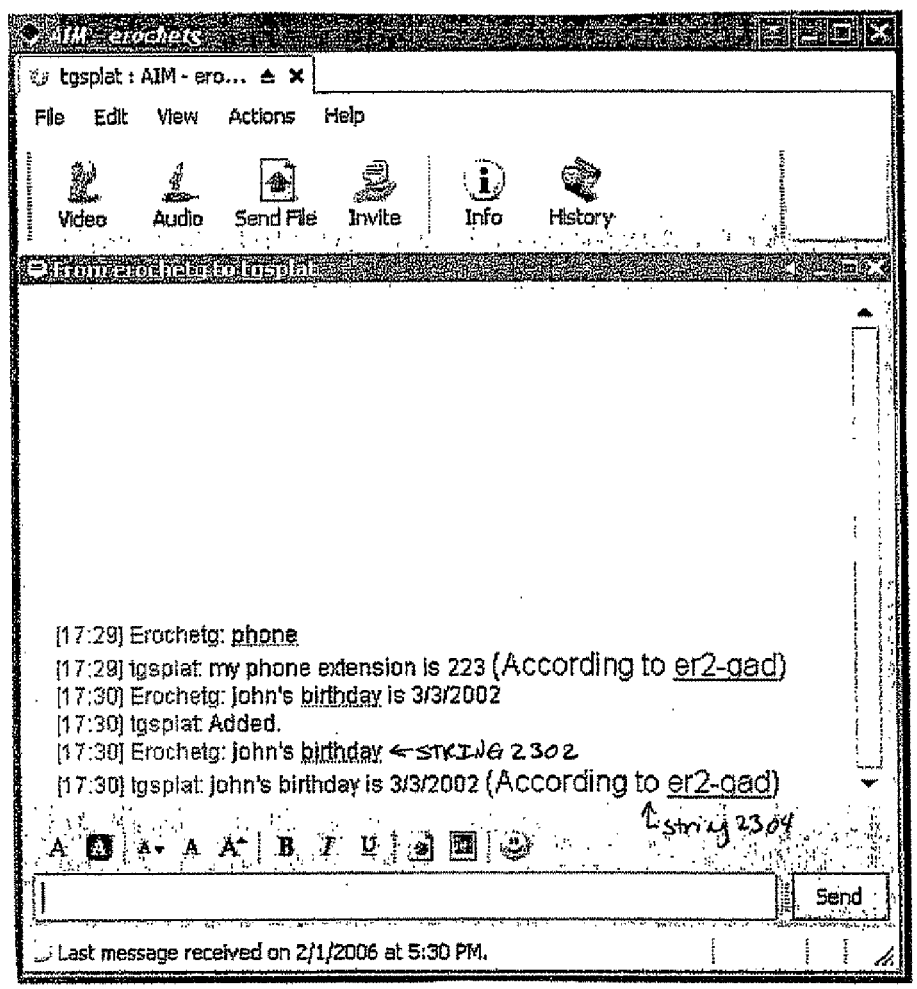

The user can also query the GAD via instant messages as shown in FIG. 23. In FIG. 23, the user "erochetg" continues to chat with the GAD and enters string 2302 ("john's birthday"). In response, the GAD returns string 2304 ("john's birthday is Mar. 3, 2002 (according to er2-gad)").

Figure 24:
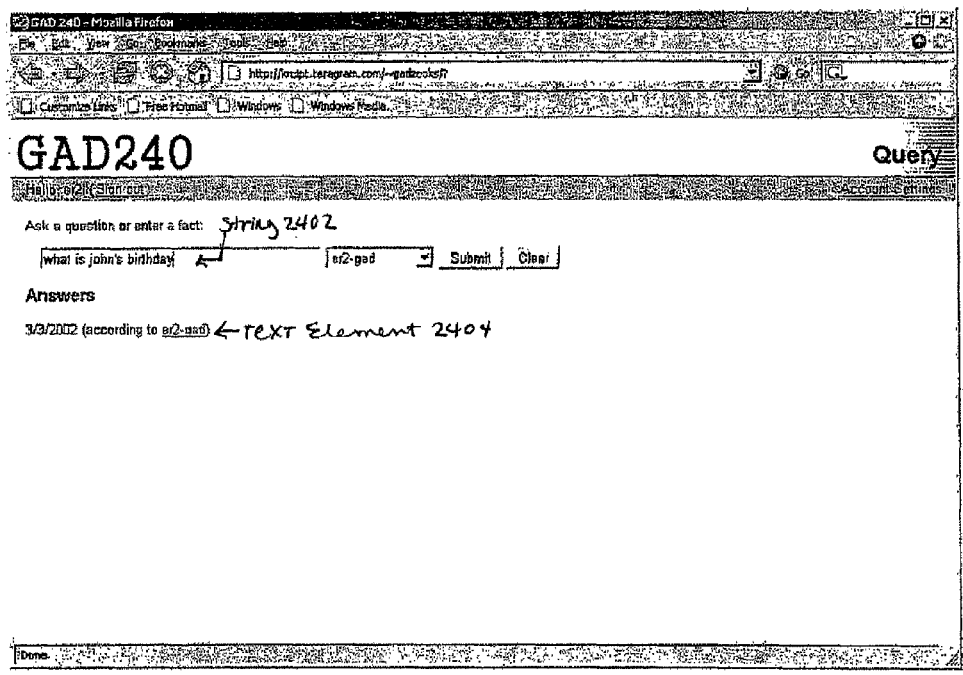
Figure 25:
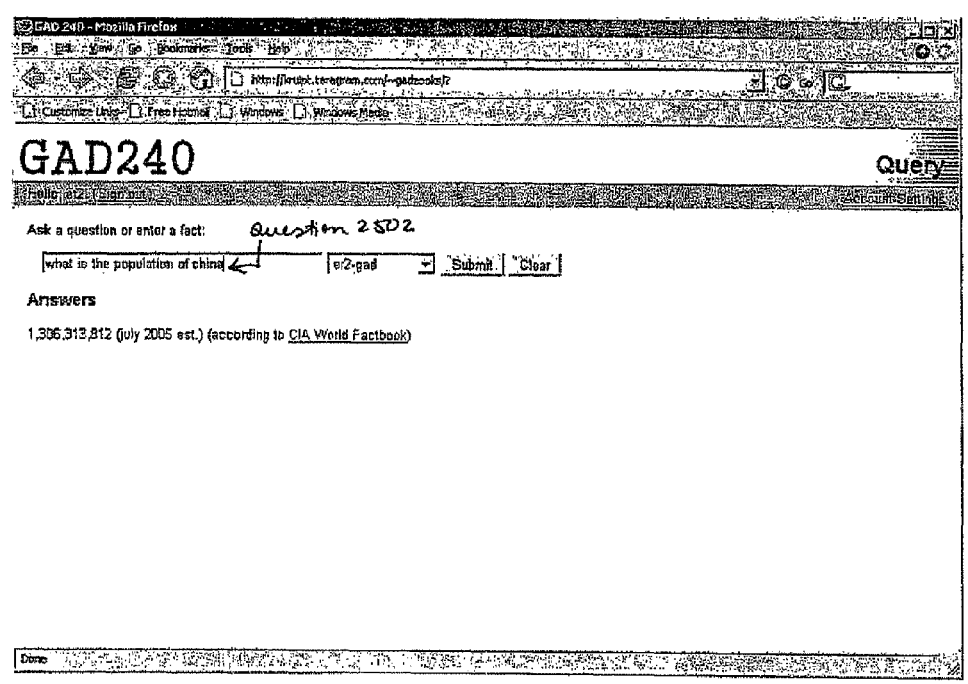

Referring now to FIGS. 24-27, GADs with question-answering functionality are described. As shown in FIG. 24 it is possible to ask questions directly by entering a string 2402 (such as "what is john's birthday") and have the GAD answer the question according to the user information stored in the GAD, in this example by displaying a text element 2404 ("Mar. 3, 2002 (according to er2-gad)"). In addition to user-specific information, users may also add general information and allow a general question answering system to be used in addition. It is then also possible to ask generic questions, such as the question 2502 shown in FIG. 25 ("what is the population of china"). As shown in FIGS. 24 and 25, the respective answers are given according to a question-answering system in addition to the information found in the user GAD.

Figure 26:
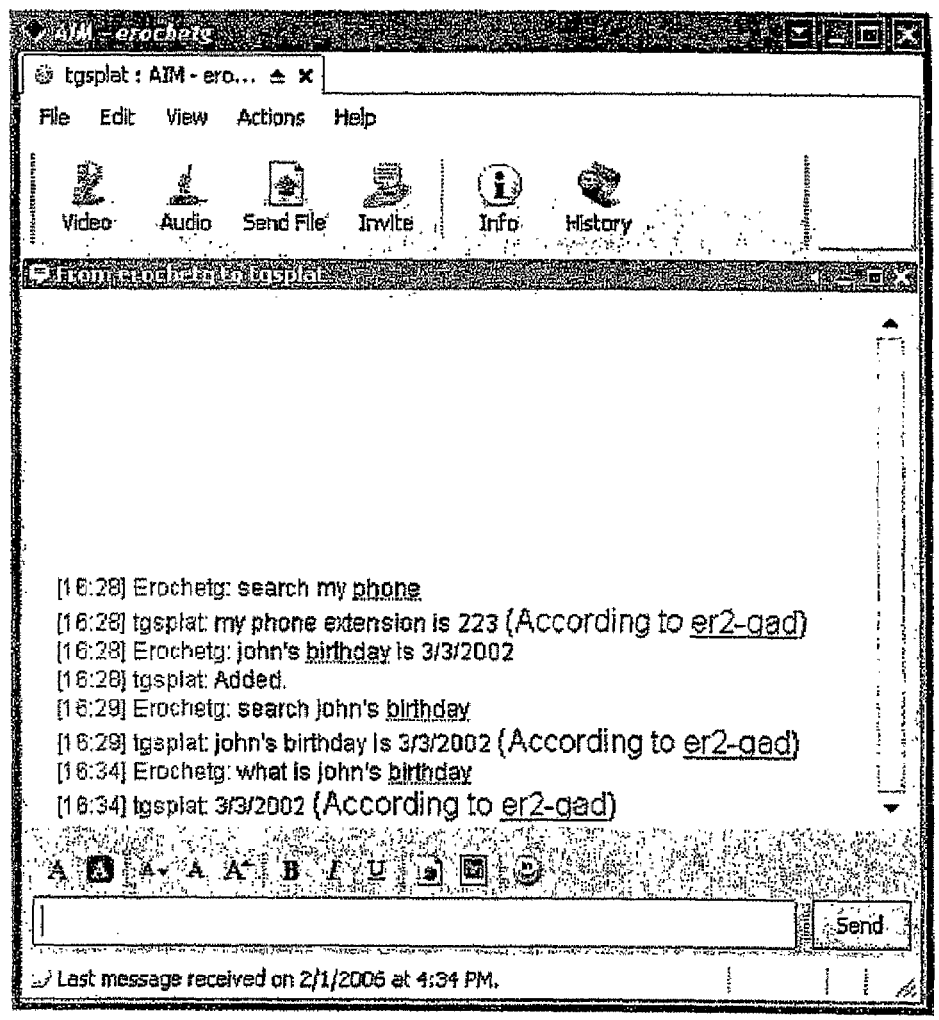
Figure 27:
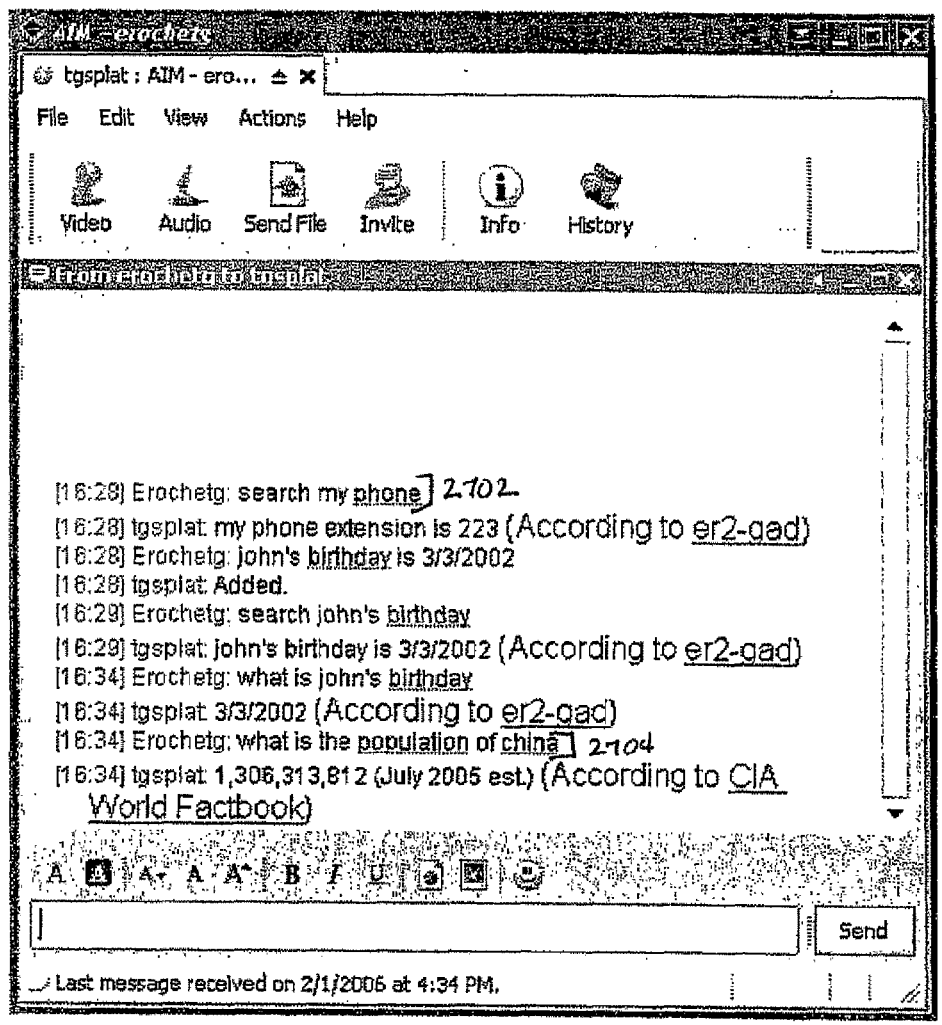

A chat interface may provide similar functionality for asking questions and receiving answers, as shown in FIG. 26 and FIG. 27. FIG. 26 and FIG. 27 show an example of a user requesting an explicit search result. In FIG. 26, expression 2602 includes a keyword "search" followed by search terms. In this example the terms are "search my phone". FIG. 27 depicts an embodiment in which the user has asked a both user-specific question 2702, for information such as phone numbers and facts associated with the user, and general questions 2704, for information such as the population in China.

Figure 28A:
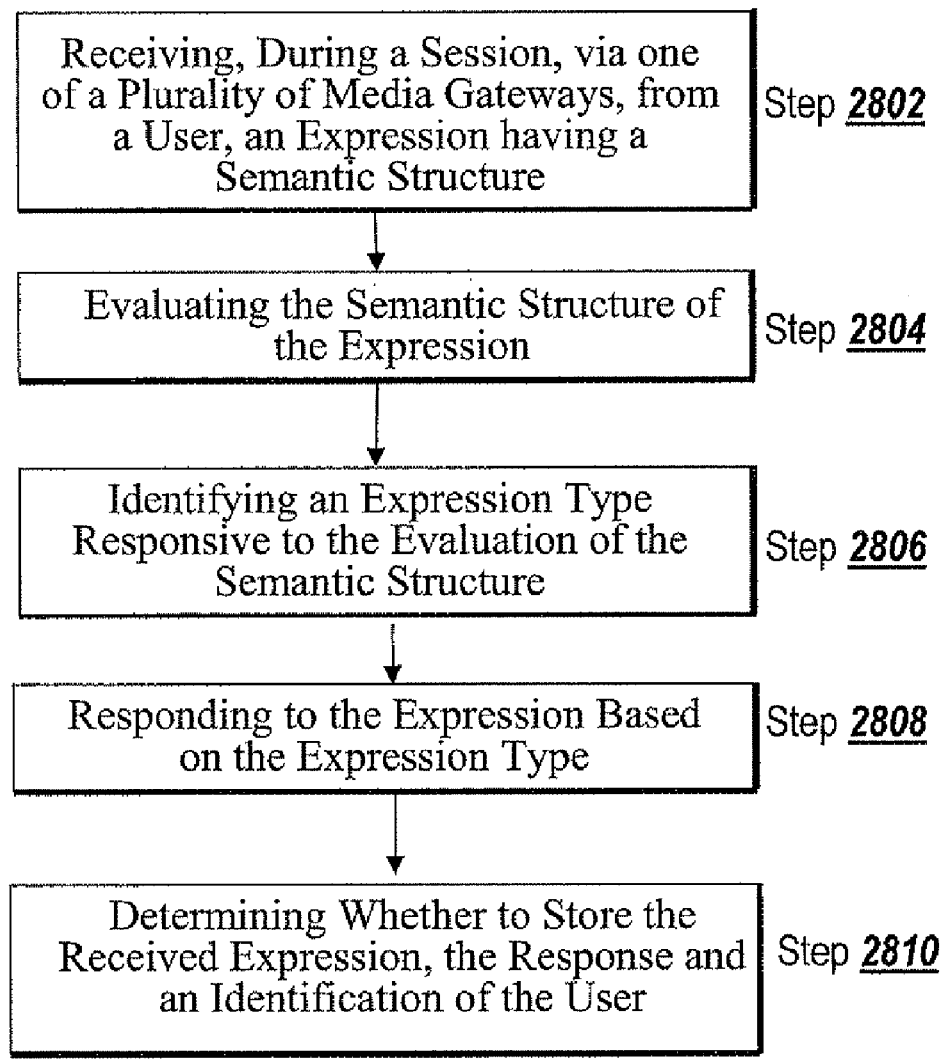
FIG. 28A is a flow diagram depicting one embodiment of the steps taken in a method for processing user input.

Referring now to FIG. 28A, a flow diagram depicts one embodiment of the steps taken in a method for processing user input. In brief overview, the method includes the step of receiving, during a session, via one of a plurality of media gateways, from a user, an expression having a semantic structure (step 2802). The semantic structure of the expression is evaluated (step 2804). An expression type of the expression is identified, responsive to the evaluation of the semantic structure (step 2806). A response to the expression is generated, based on the expression type (step 2808). A determination is made as to whether to store the received expression, the response and the identification of the user (step 2810).

During a session, an expression having a semantic structure is received, via one of a plurality of media gateways, from a user (step 2802). In one embodiment, the expression having a semantic structure is received, during a session between the user and the interaction environment 110, via one of the plurality of media gateways 140, from the user. In another embodiment, a string having a semantic structure is received from the user. In still another embodiment, a plurality of words having a semantic structure is received from the user. In yet another embodiment, a question having a semantic structure is received from the user.

In one embodiment, one of the plurality of media gateways receiving the expression having the semantic structure forwards the expression to an account management component 114. In another embodiment, one of the plurality of media gateways receiving the expression having the semantic structure forwards the expression to an access control module 112. In still another embodiment, one of the plurality of media gateways receiving the expression having the semantic structure forwards the expression to a transceiver 132 on the user interface module 130. In still another embodiment, one of the plurality of media gateways receiving the expression having the semantic structure forwards the expression to a semantic evaluator 134 on the user interface module 130.

The semantic structure of the expression is evaluated (step 2804). In one embodiment, a linguistic pattern of the expression is evaluated. In another embodiment, a word order of the expression is evaluated. In still another embodiment, the semantic evaluator 314 evaluates the semantic structure of the expression. In some embodiments a semantic evaluator 134 evaluates the expression as described in greater detail below in connection with FIG. 28B, step 2850, and with FIG. 28C.

An expression type of the expression is identified, responsive to the evaluation of the semantic structure (step 2806). In one embodiment, the semantic evaluator 134 identifies the expression type, responsive to the evaluation of the semantic structure of the expression. In another embodiment, the semantic evaluator 134 identifies the expression as a query. In still another embodiment, the semantic evaluator 134 identifies the expression as an implicit question. In yet another embodiment, the semantic evaluator 134 identifies the expression as an explicit question.

In one embodiment, the semantic evaluator 134 identifies the expression as a request for information. In another embodiment, the semantic evaluator 134 identifies the expression as a request for stored data.

In some embodiments, the semantic evaluator 134 identifies the expression as a command. In one of these embodiments, the semantic evaluator 134 identifies the expression as a command to store data in an information repository, such as the collection of information 120. In another of these embodiments, the semantic evaluator 134 identifies the expression as a command to modify stored data. In still another of these embodiments, the semantic evaluator 134 queries an enumeration of predefined commands for a command associated with the expression.

In other embodiments, the semantic evaluator 134 identifies the expression as a command to execute a computer program. In one of these embodiments, executing the computer program identifies the expression type of the expression. In another of these embodiments, executing the computer program identifies a type of response to generate for the expression. In still another of these embodiments, executing the computer program identifies a display format for displaying the expression, the response, or both. In some embodiments a semantic evaluator 134 evaluates the expression as described in greater detail below in connection with FIG. 28B, step 2850, and with FIG. 28C.

In still other embodiments, the semantic evaluator 134 queries a database to identify the expression type of the expression. In one of these embodiments, the semantic evaluator 134 forwards the expression to the information retrieval component 116 for identification of the expression type.

In yet other embodiments, the semantic evaluator 134 queries a database for a response to the expression and determines the expression type of the expression based on the type of response returned by the database. In one of these embodiments, the semantic evaluator 134 queries a database with a modified version of the expression to identify the expression type of the expression. In another of these embodiments, querying a database, such as the search index 118, with the expression as provided by the user results in an identification of information stored by the interaction environment 110 and associated with the expression. In still another of these embodiments, querying a database with a modified version of the expression, such as an expression including Boolean logic or an expression converted into a Boolean search statement, results in an identification of information stored by the interaction environment 110 and associated with the expression. In yet another of these embodiments, if a query of the database for information associated either with the expression as provided by the user or with a modified version of the expression returns a response, the semantic evaluator 134 identifies the expression as a query for stored data.

Figure 28B:
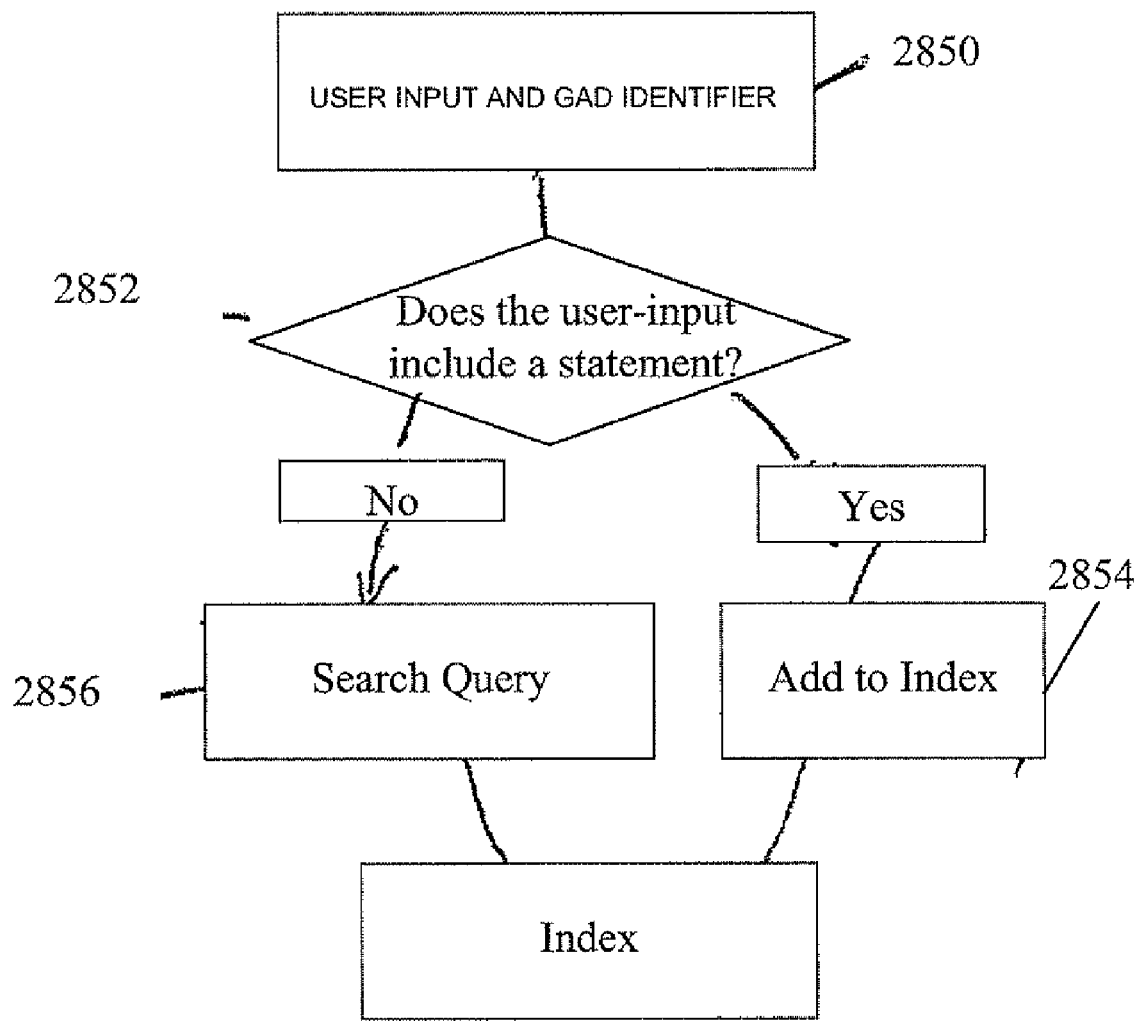
FIG. 28B is a flow diagram depicting one embodiment of the steps taken to identify an expression type of a user-provided expression.

Referring now to FIG. 28B, a flow diagram depicts one embodiment of the steps taken to identify an expression type of a user-provided expression. User-input is received at step 2850. In some embodiments, the user-input includes an expression having a semantic structure. In other embodiments, the user-input includes an identifier of a user. In still other embodiments, the user-input includes an identifier of the interaction environment 110 to which the user provides input. A determination is made as to whether the user-input is a statement at step 2852. If the user-input is determined to be a statement, the statement is added to the search index 118 at step 2854. If the user-input is determined not to be a statement, then a search query is generated based on the expression at step 2856 and the search index 118 is queried.

At step 2850 an element, such as the transceiver 132, receives user-input, such as an expression, and an identification of an interaction environment 110. At step 2852, a module, such as the semantic evaluator 134, determines whether a user-provided expression comprises a new piece of information (referred to here as a statement) or a query. In one embodiment, the semantic evaluator 134 determines whether the user input is a statement or a query by determining whether the user input starts with an interrogatory pronoun or adjective (including, but not limited to, "who", "whom", "which", "where", "how", "to whom", "to who", and "in which"). In another embodiment, if the user-input starts with an interrogatory pronoun or adjective, the semantic evaluator 134 identifies the user-input as a query. Otherwise, the semantic evaluator 134 further processes the user-input to determine whether the user-input may be categorized as an information-seeking query (such as "Bob's phone number" or "Oregon Senators") as described in U.S. patent application Ser. No. 10/305,221 filed Nov. 26, 2002 and entitled "Method for Detecting and Fulfilling an Information Need Corresponding to Simple Queries." If the user-input is categorized as an information-seeking query, the techniques described in U.S. patent application Ser. No. 09/845,571 filed Apr. 30, 2001 and entitled "System for Answering Natural Language Questions" are used to determine whether the user-input is a statement. The semantic evaluator 134 may further process the user-input to identify the user-input as a query or a statement as predefined by a user.

Figure 28C:
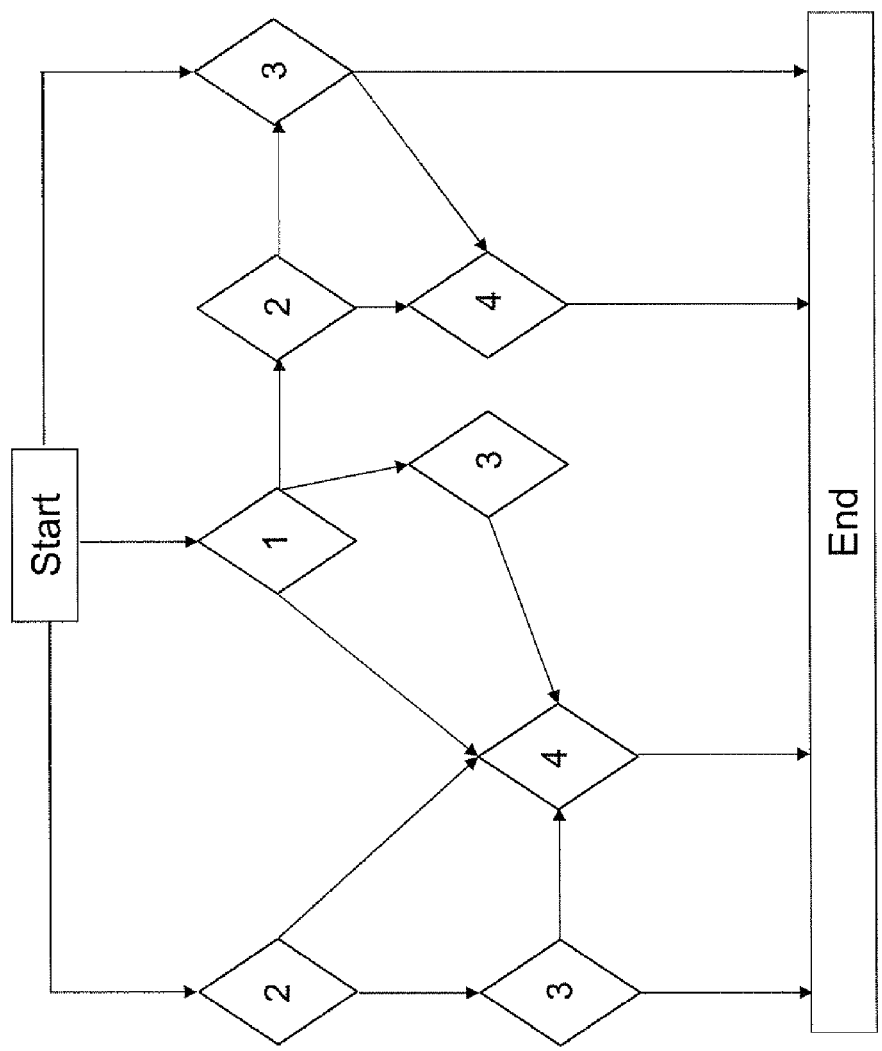
FIG. 28C is a flow diagram depicting one embodiment of the combinations of determinations which the semantic evaluator 134 may make in identifying an expression type.

Referring now to FIG. 28C, a flow diagram depicts one embodiment of the combinations of determinations which the semantic evaluator 134 may make in identifying an expression type. In one embodiment, the semantic evaluator 134 performs one of the combinations of determinations depicted in FIG. 28C. In another embodiment, the semantic evaluator 134 makes other combinations of determinations not depicted in FIG. 28C.

In one embodiment, the semantic evaluator 134 starts, evaluates the expression to make determination 1 (does the expression match a formal command included in an enumeration of predefined commands?), and ends. In another embodiment, the semantic evaluator 134 starts, evaluates the expression to make determination 1 and determination 2 (is the expression an answer to a question?), and ends. In still another embodiment, the semantic evaluator 134 starts, evaluates the expression to make determination 1 and determination 2 and determination 3 (does a query of the search index 118 or the collection of information 120 using the expression exactly as phrased result in an identification of stored information associated with the expression?), and ends. In yet another embodiment, the semantic evaluator 134 starts, evaluates the expression to make determinations 1 through 3 and determination 4 (is the expression an implicit command to add data to the interaction environment 110?) and ends.

In one embodiment, the semantic evaluator 134 may select any combination of the determinations 1-4 to perform to identify the expression type of the expression. In another embodiment, the semantic evaluator 134 is programmed to perform a predefined combination of determinations to identify the expression type of the expression.

Referring back to FIG. 28A, a response to the expression is generated, based on the expression type (step 2808). In one embodiment, the response generating component 136 generates the response based on the identified expression type. In another embodiment, the response generating component 136 receives the identification of the expression type from the semantic evaluator 134. In still another embodiment, the response generating component 136 receives information to include in generating the response from the semantic evaluator 134. For example, the response generating component 136 may receive the results of a search of the search index 118, or of the collection of information 120, performed by either the semantic evaluator 134 or by the information retrieval component 116. As another example, the response generation component 136 may receive an instruction from the semantic evaluator 134 to execute an identified computer program to generate the response. In yet another embodiment, the response generating component 136 may receive information regarding how to display the response to the user. For example, the response generation component 136 may receive an instruction to execute an identified computer program to generate a display page including the response or to generate a display format for the response.

In one embodiment, the response generating component 136 receives an identification of the expression as a question and responds to the expression by answering the question. In another embodiment, the response generating component 136 answers a question by transmitting, to the user, data stored in a repository, such as the collection of information 120. In still another embodiment, the response generating component 136 receives an identification of the expression as a command and responds to the expression by executing the command. For example, the semantic evaluator 134 may identify the expression to the response generating component 136 as a command to store data in the collection of information 120 or as a command to modify data already stored in the collection of information 120, and the response generating component 136 may store or modify the data accordingly.

A determination is made as to whether to store the received expression, the response and the identification of the user (step 2810). In one embodiment, the user interface module 130 determines whether to store the received expression, the response, or the identification of the user. In another embodiment, the response generating component 136 determines whether to store the received expression, the response, or the identification of the user. In still another embodiment, an access control module 112 determines whether to store the received expression, the response, or the identification of the user.

In one embodiment, a determination is made to store at least one of the received expression, the response, and an identification of the user. In another embodiment, the access control module 112 determines that the user is authorized to store data in the interaction environment 110. In still another embodiment, the user interface module 130 determines that at least one of the received expression and the response are not duplicative of information already stored in a repository such as the collection of information 120. In yet another embodiment, the response generating component 136 determines that to respond to the expression provided by the user—such as a command to store data—the interaction environment 110 should store at least one of the expression and the response to the expression. In some embodiments, the at least one of the expression and the response are stored in a database. In one of these embodiments, information associated with the at least one of the expression and the response is stored in the search index 118. In another of these embodiments, at least one of the expression and the response to the expression are stored in a searchable index and associated with an identifier of the user.

In some embodiments, access to stored information, such as a stored expression or a stored response to an expression, are provided to the user during a second session between the user and the interaction environment 110. In other embodiments, access to stored information, such as a stored expression or a stored response to an expression, are provided to a second user during a session between the second user and the interaction environment 110.

In some embodiments, a determination is made not to store at least one of the received expression, the response, or an identification of the user. In one of these embodiments, a determination is made that the identified user does not have authorization to store data in the interaction environment 110. In another of these embodiments, a determination is made that the received expression or the response are duplicative of information already stored in the interaction environment 110.

Figure 29A:
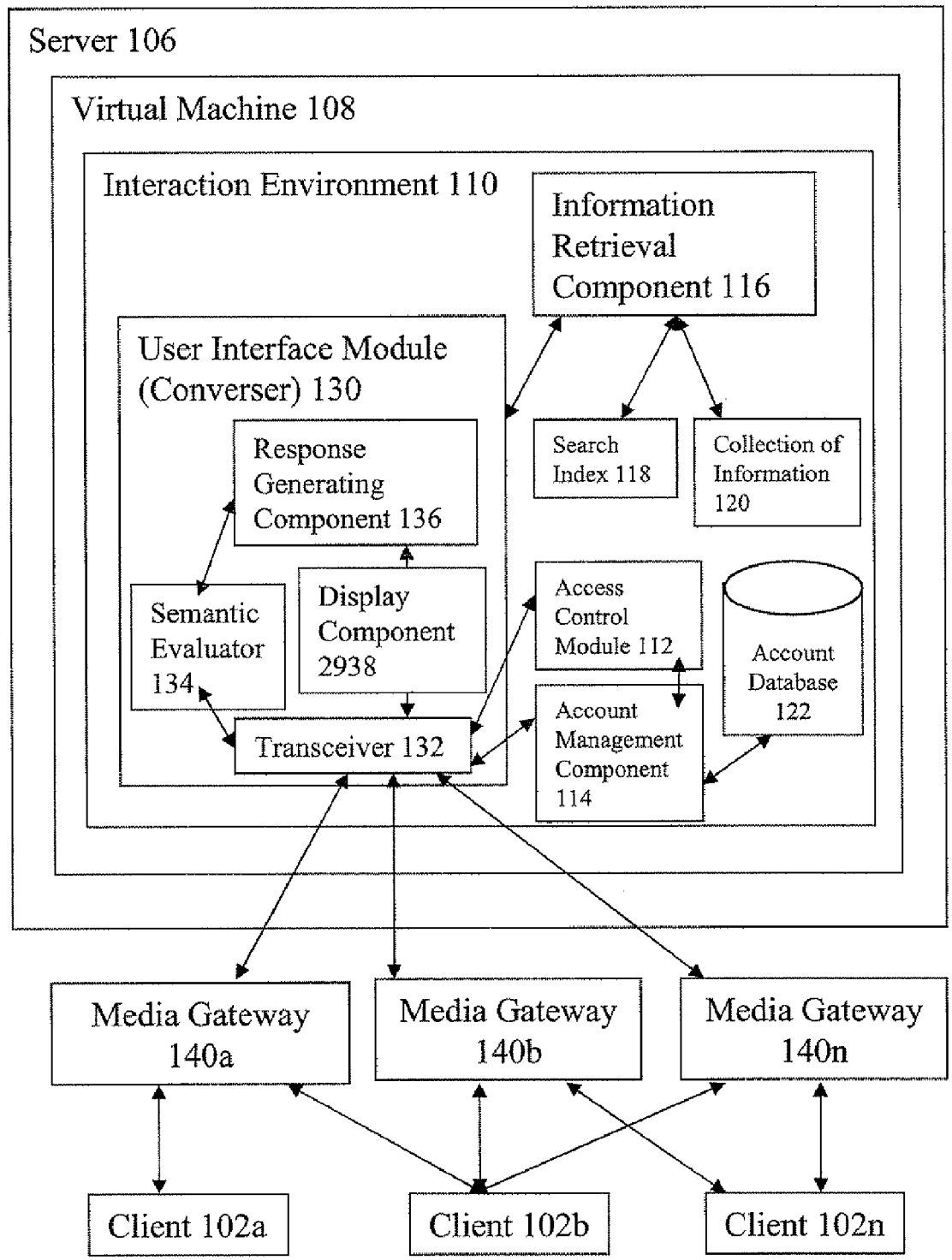
FIG. 29A is a block diagram depicting another embodiment of a system for processing user input.

As described in connection with FIGS. 2-28, a user may provide expressions to an interaction environment and receive responses to those expressions, including answers to questions or modifications to stored data. In some embodiments, as described above, the user provides one or more expressions to the interaction environment via a user interface. In other embodiments, as described below in connection with FIGS. 29-35, in addition to providing one or more expressions to the interaction environment via a user interface element, the user may upload the one or more expressions to the interaction environment. Referring now to FIG. 29A, a block diagram depicts one embodiment of a system for processing user input. In brief overview, the system includes a client 102 and a server 106. An interaction environment 110 executes in a virtual machine 108, which executes on the server 106. The interaction environment 110 provides an information retrieval component 116 and a user interface module 130. The information retrieval component 116 is in communication with a search index 118 and a collection of information 120. The user interface module 130 comprises a transceiver 132, a semantic evaluator 134, a response generating component 136, and a display component 2938.

The transceiver 132 receives, during a first session between a user and the interaction environment 110, via one of a plurality of media gateways 140, a resource including a plurality of predefined markers and at least one expression having a semantic structure. The transceiver 132 stores the resource. The transceiver 132 receives, during a second session between the user and the interaction environment 110, a second expression having a semantic structure. The transceiver 132 is in communication with an access control module 112 and an account management component 114. The semantic evaluator 134 identifies an expression type for the received at least one expression responsive to an evaluation of the semantic structure of the received expression and to one of the plurality of predefined markers. The semantic evaluator 134 identifies an expression type for the second expression responsive to an evaluation of the semantic structure of the second expression. The display component 2938 displays the resource in a viewable display format, responsive to a second of the plurality of predefined markers. The response generating component 136 provides a response to the second expression based on the identified expression type and to the resource received during the first session.

In some embodiments, the interaction environment 110 provides a plurality of means enabling a user to add information to the interaction environment 110. In other embodiments, the interaction environment 110 provides a plurality of means enabling a user to modify a display of information stored by the interaction environment 110. In still other embodiments, the interaction environment 110 provides a user interface module 130 allowing users to upload documents to the interaction environment 110. In one of these embodiments, the uploaded documents include expressions having semantic structures. In another of these embodiments, the uploaded documents include programming code for modifying a display provided to the user by the interaction environment 110. In still another of these embodiments, these documents are referred to as resources.

In some embodiments, an uploaded resource is stored for later use by the user. In one of these embodiments, the user may later modify the uploaded resource. In other embodiments, an uploaded resource is analyzed by one or more components provided by the interaction environment 110. In one of these embodiments, the analysis results in extraction of all the expressions provided by the user in the resource, where the expression has a semantic structure and may comprise individual statements or pieces of information. In another of these embodiments, extracted expressions may be stored in the interaction environment 110 and used to respond to other expressions.

Referring now to FIG. 29A, and in greater detail, the interaction environment 110 executes in the virtual machine 108. The interaction environment 110 provides the functionality described above in connection with FIG. 2A. As described above in connection with FIG. 2A, the information retrieval component 116 provided by the interaction environment 110 is in communication with the search index 118 and the collection of information 120 and provides functionality for searching for and retrieving information from the search index 118 and the collection of information 120. As described above in connection with FIG. 2A, the user interface module 130 provided by the interaction environment 110 is in communication with the information retrieval component 116 and provides the user with an interface and functionality for interacting with the interaction environment 110, forwarding received user-input to the appropriate components within the interaction environment 110. As described above in connection with FIG. 2A, the user interface module 130 comprises a transceiver 132, a semantic evaluator 134, a response generating component 136, and a display component 2938.

The transceiver 132 receives, during a first session between a user and the interaction environment 110, via one of a plurality of media gateways 140, a resource including a plurality of predefined markers and at least one expression having a semantic structure. In some embodiments, the transceiver 132 further comprises a receiver. In one of these embodiments, the receiver receives, during the first session between the user and the interaction environment 110, via one of the plurality of media gateways 140, from the user, the resource including a plurality of predefined markers identifying an expression type and the resource including the at least one expression having the semantic structure. In another of these embodiments, the receiver receives, during the first session between the user and the interaction environment, via one of the plurality of media gateways, from the user, the resource including a plurality of predefined markers expressed in a programming language and the resource including the at least one expression having the semantic structure. In still another of these embodiments, the receiver receives, during the first session between the user and the interaction environment, via one of the plurality of media gateways, the resource including a plurality of predefined markers expressed in an Extensible Markup Language (XML) and the resource including the at least one expression having the semantic structure. In yet another of these embodiments, the receiver receives, during the first session between the user and the interaction environment, via one of the plurality of media gateways, from the user, the resource including a plurality of predefined markers identifying a display format and the at least one expression having the semantic structure. In one embodiment, the transceiver 132 stores the received resource.

The display component 2938 displays the resource in a viewable display format, responsive to a second of the plurality of predefined markers. In one embodiment, the display component includes a user interface for displaying the resource to the user. In another embodiment, the display component 2938 is in communication with one of the plurality of media gateways 140, such as a web browser, chat interface or email service. In still another embodiment, the display component 2938 modifies a display provided by one of the plurality of media gateways 140, responsive to one of the plurality of predefined markers.

In some embodiments, the display component executes programming code included in the resource to display the resource in a viewable display format. In one of these embodiments, the predefined markers in the resource comprise programming code. In another of these embodiments, the display component 2938 transforms the resources from a display format not comprehensible to the user into a display format comprehensible to the user. For example, in some of these embodiments, the display component transforms programming code written in the Extensible Markup Language (XML), which may not be comprehensible to all users, into programming code written in Hypertext Markup Language, which a client browser may execute and display in a viewable, comprehensible form to the user.

The transceiver 132 receives, during a second session between the user and the interaction environment 110, a second expression having a semantic structure. In some embodiments, the transceiver 132 receives the second expression as described above in connection with FIG. 2A. In some embodiments, the transceiver 132 is in communication with an access control module 112 and an account management component 114. In one embodiment, an access control module 112 resides in the user interface module 130. In another embodiment, an account management component 114 resides in the user interface module 130. The access control module 112 and the account management component 114 may provide the functionality described above in connection with FIG. 2A.

The semantic evaluator 134 identifies an expression type for the received at least one expression in the resource, responsive to an evaluation of the semantic structure of the received expression and to one of the plurality of predefined markers. The semantic structure may be evaluated and the expression type identified as described above in connection with FIG. 2A and FIGS. 28A-C.

The semantic evaluator 134 identifies an expression type for the second expression responsive to an evaluation of the semantic structure of the second expression. In some embodiments, the semantic evaluator 134 identifies the expression type of the second expression as described above in connection with FIG. 2A and FIGS. 28A-C.

The response generating component 136 provides a response to the second expression based on the identified expression type and to the resource received during the first session. In some embodiments, the response generating component 136 generates the response as described above in connection with FIG. 2A and FIGS. 28A-C. In other embodiments, the generated response includes information added to the collection of information 120 by the user in the resource.

Figure 30:
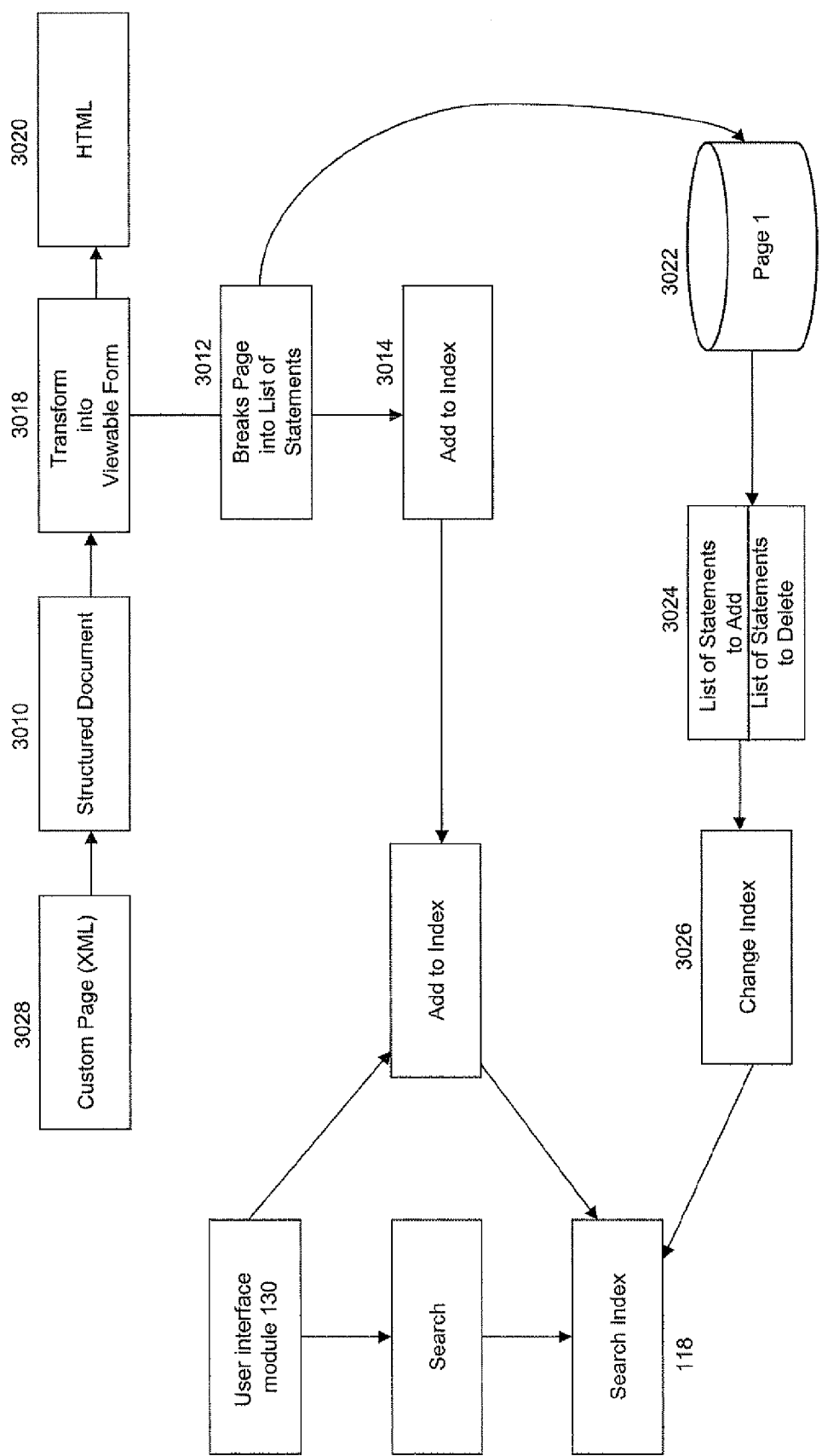
FIG. 30 is a flow diagram depicting one embodiment of the steps taken to process a user-provided resource.

Referring now to FIG. 30, a flow diagram depicts one embodiment of the steps taken to process a user-provided resource. In brief overview, a structured document received at step 3010 may include statements that are marked at the beginning and end of the statements. In some embodiments, there are three things to mark: statements, questions and answers, and attribute-values. Statements may include factual information such as "my extension is 223." At step 3012, the page is broken into a list of statements, as part of the process of transforming the document into viewable form (step 3018). The statements are checked to see if they are duplicative of statements already in a database and if not, at step 3014, the statement is added to search index block 118.

The structured document received at step 3010 may be a specific form of XML, which is not a visual language. The structural information in received at step 3010 is transformed into viewable form in a block 3018 into an HTML form in step 3020. HTML is a visual language. Visual information is separated from content.

Referring now to FIG. 30, and in greater detail, a structured document received at step 3010 includes predefined markers enabling the identification of individual statements. A page is broken into a list of statements at step 3012. At step 3020, the document is published in viewable form and a custom structured format is transformed into a predefined structured format by an XSLT transform operation. When a page is to be published, it is checked to see if statements are already in the database and only new information is added. In some embodiments, the user interface module 130 performs these steps. This operation is carried out in blocks 3022, 3024, and 3026.

In some embodiments, statements are stored in a storage medium 3022. In one of these embodiments, the storage medium 3022 is a database. In another of these embodiments, the storage medium 3022 is the collection of information 120. In still another of these embodiments, a numeric value based on, and associated with, a statement may be stored in the storage medium 3022. A list of statements to add or to delete is generated at step 3024; and change index block 3026 changes the search index 118 to include a reference to statements added or deleted at step 3024. In some embodiments, a custom page document identified at step 3028 includes a custom structured format, typically an HTML format. In one of these embodiments, the custom structured format is provided to the system as the structured document at step 3010. In other embodiments, the custom page document is displayed to a user and includes an interface for receiving the structured document at step 3010.

Figure 31A:
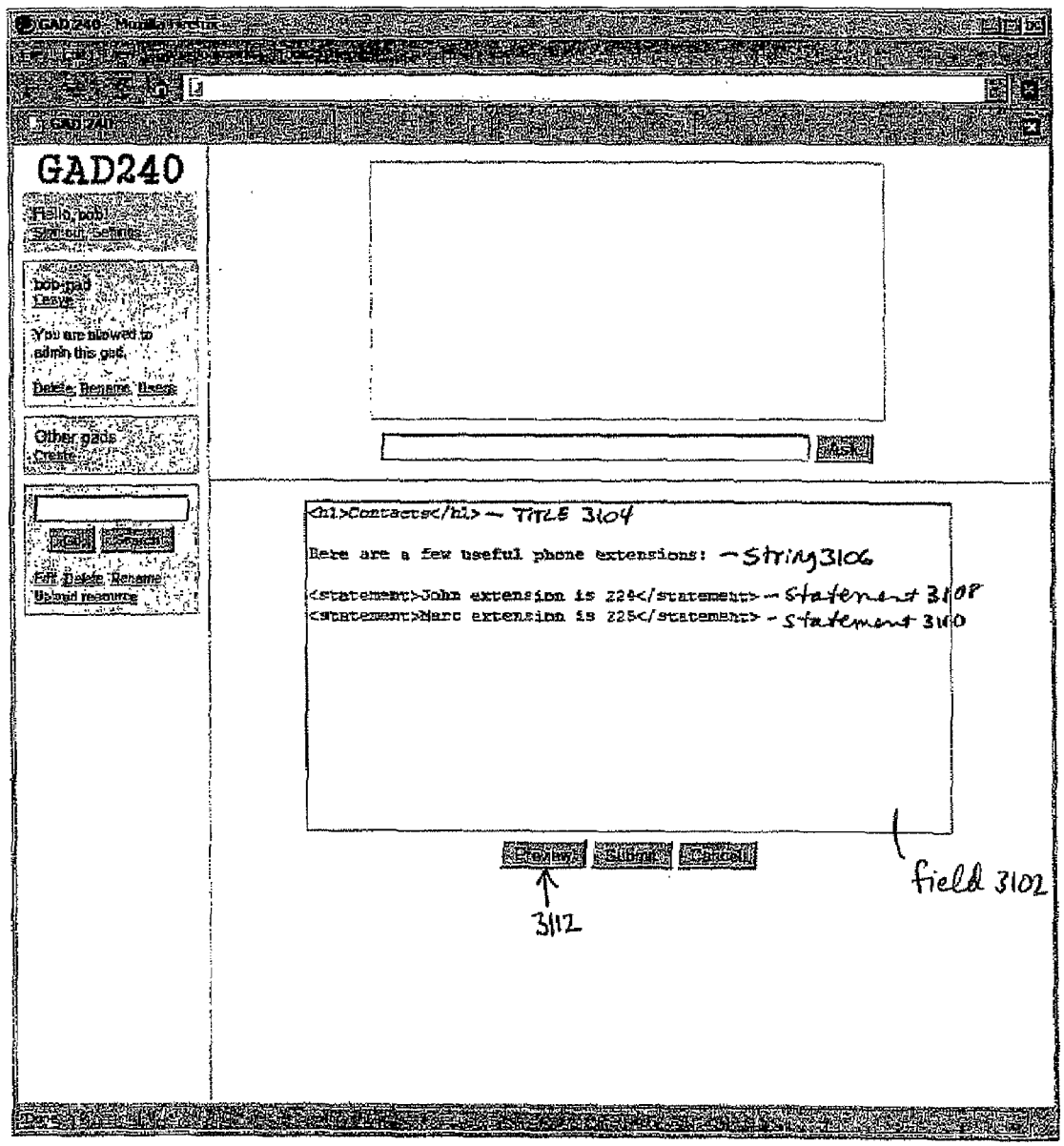
FIG. 31A is a screen shot depicting one embodiment of a user interface element into which a page can be typed using a markup-language.

Referring now to FIG. 31A, a screen shot depicts one embodiment of a user interface element, in this case a field 3102, into which a page can be typed using a markup-language. In this example, the page contains a title 3104 ("Contacts"), a string 3106 (the introduction sentence, "Here are a few useful phone extensions") as well as two statements 3108 and 3110 ("John extension is 224" and "Marc extension is 225", respectively).

Figure 31B:
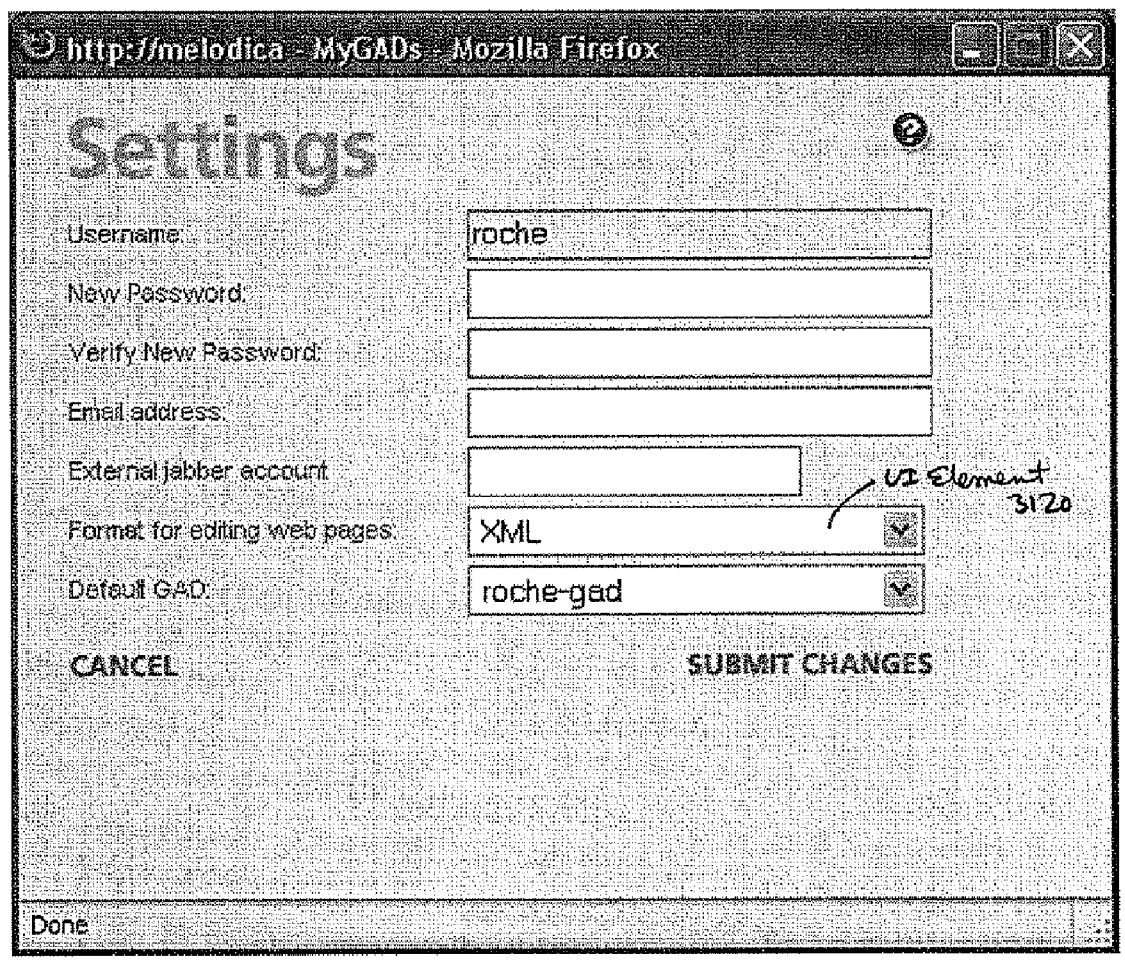
FIG. 31B is a screen shot depicting one embodiment of a user interface for specifying user preferences relating to user-provided resources.
Figure 32:
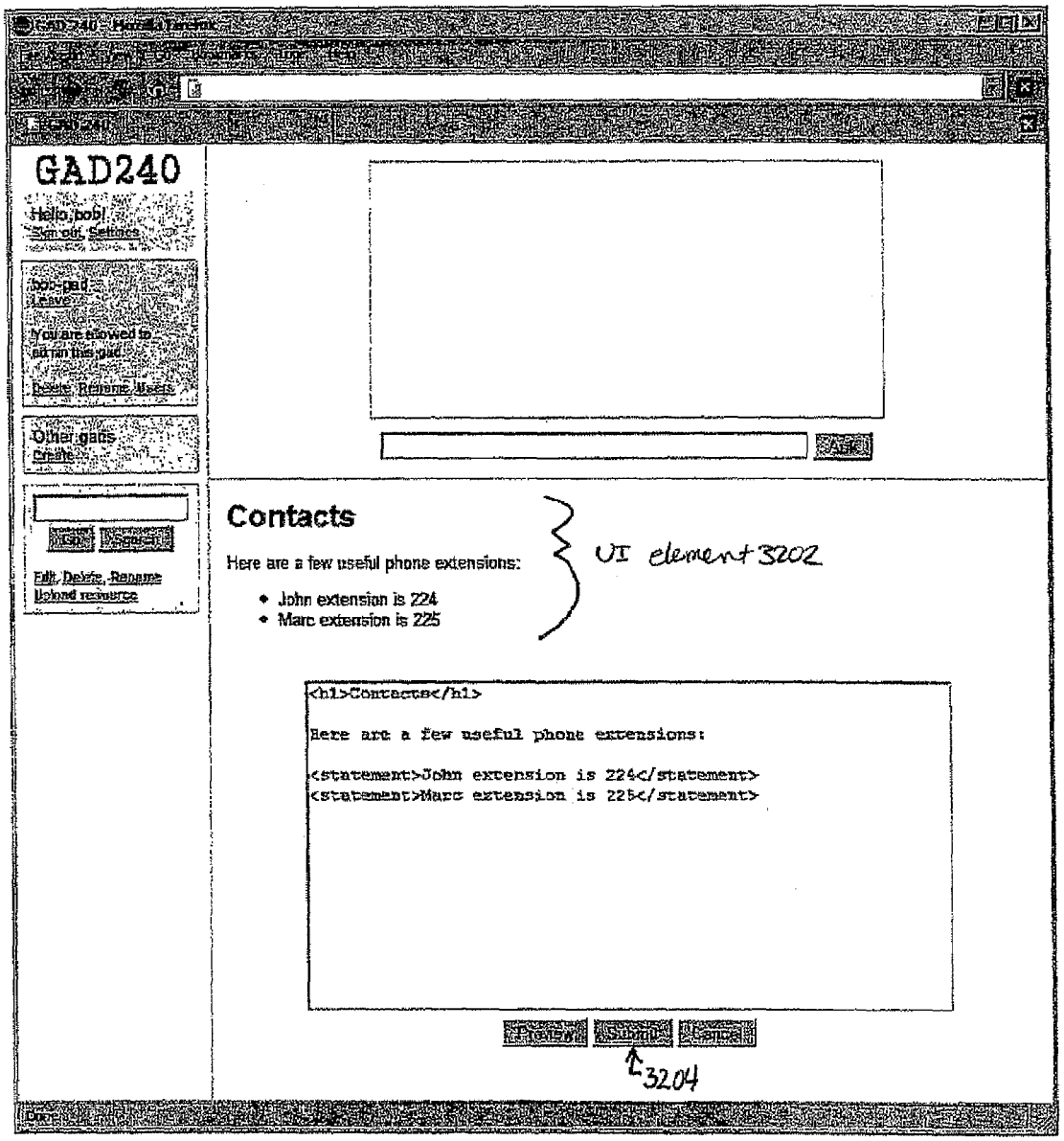
FIG. 32 is a screen shot depicting one embodiment of a user interface element including a preview of a display of user-provided input.

Referring now to FIG. 31B, a screen shot depicts one embodiment of a user interface for specifying a language in which the predetermined markers are written. In this embodiment, the user has the option of changing the format from HTML to XML for this interaction environment. FIG. 31B depicts a user interface element 3120, in this example, a pull-down menu, from which the user may select a format. In other embodiments, the user may specify other markup languages or scripting languages in which the user has written the predetermined markers.

The user may access functionality for previewing a page by clicking on a user interface element 3112 (in this example the "preview" button) depicted by FIG. 31A. The previewing functionality displays the screen shown in FIG. 32, in which the system uses the predefined markers to display the user-input in user interface element 3202. In the embodiment depicted by FIG. 32, the user interface element 3202 is a plurality of strings, each string having a display format specified by a predefined marker. In other embodiments, the user interface element 3202 may display different components, responsive to the predefined marker. If the text is satisfactory, the user then clicks on the "Submit" button 3204 and the page will then be available as shown in user interface element 3302 depicted in FIG. 33.

Figure 34:
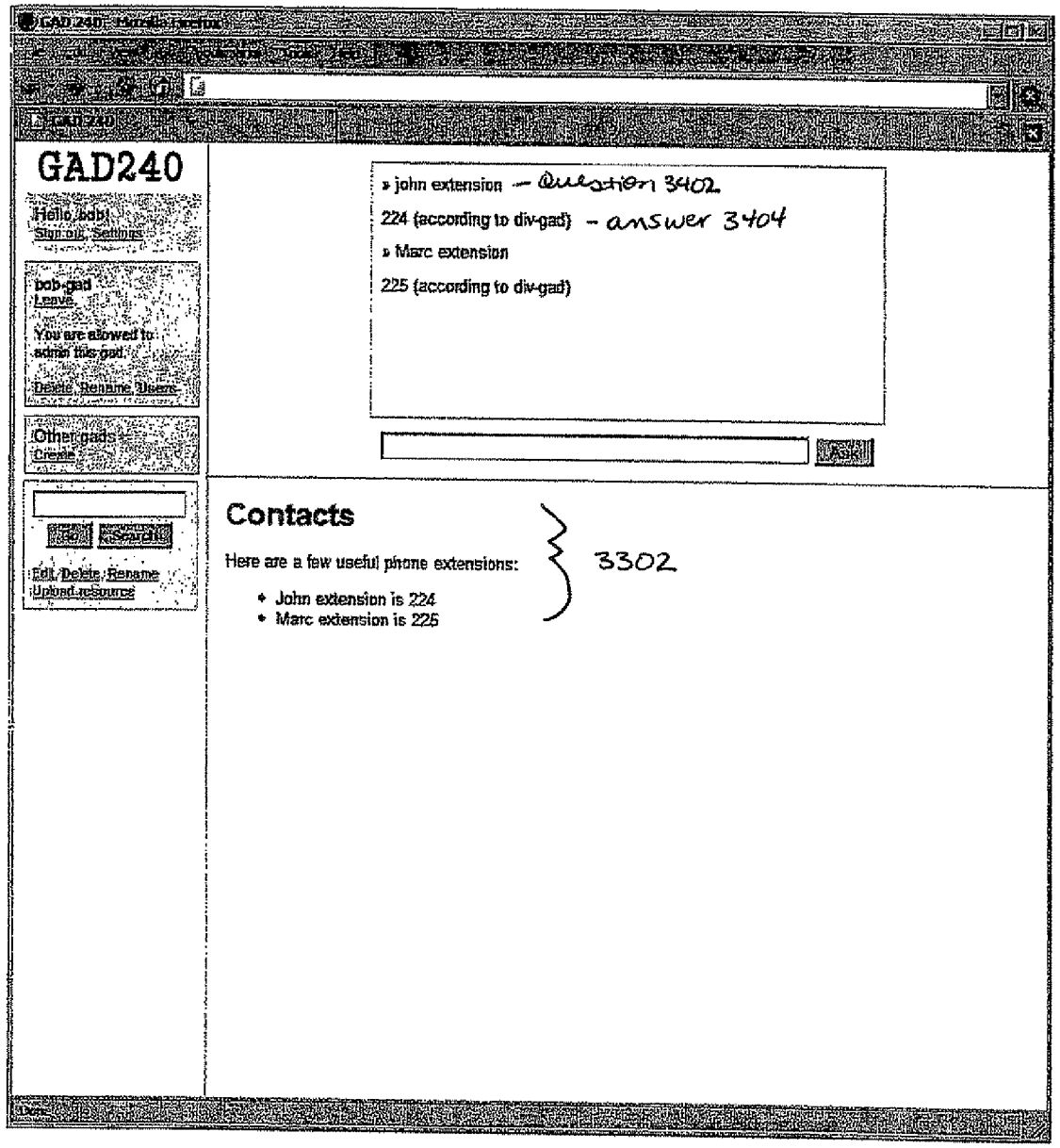
FIG. 34 is a screen shot depicting one embodiment of a user interface element for requesting from an interaction environment retrieval of user-provided input.

At this point, any statement is accessible in the same way it would have been if it had been entered through a chat interface as described above. For instance, in an embodiment depicted in the screen shot shown in FIG. 34, the information associated to each statement can be retrieved by the user. FIG. 34 depicts a screen shot showing both a query box (such as query box 502 described above) and the user interface element 3302. The user has entered a question 3402 and received an answer 3406, which includes information provided by a user and displayed in the user interface element 3302.

Figure 35:
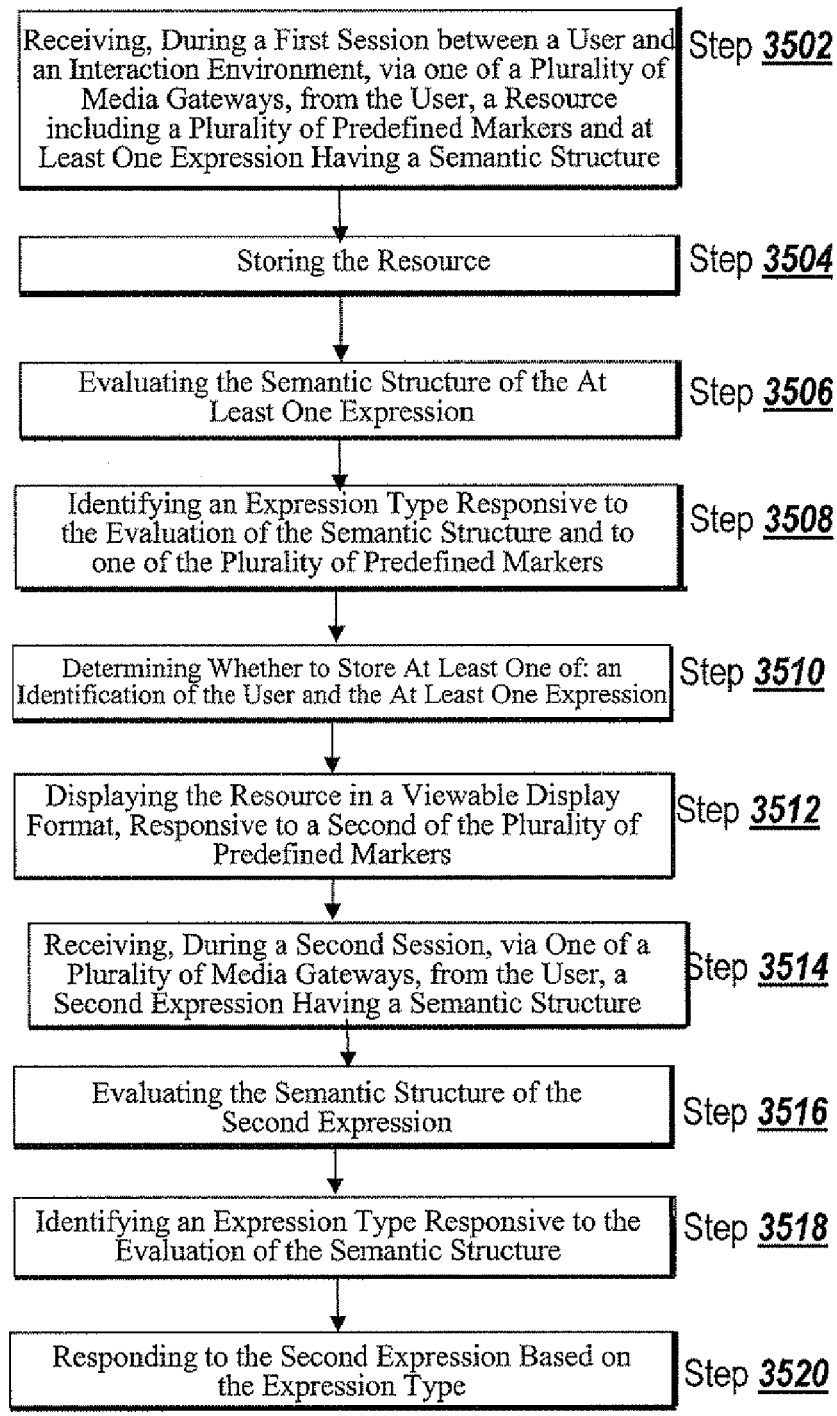
FIG. 35 is a flow diagram depicting one embodiment of the steps taken in a method for processing user input.

Referring now to FIG. 35, a flow diagram depicts one embodiment of the steps taken in a method for processing user input. In brief overview, a resource is received from a user, during a first session between the user and an interaction environment, via one of a plurality of media gateways, the resource including a plurality of predefined markers and at least one expression having a semantic structure (step 3502). The resource is stored (step 3504). The semantic structure of the at least one expression in the resource is evaluated (step 3506). An expression type is identified, responsive to the evaluation of the semantic structure and to one of the plurality of predefined markers (step 3508). A determination is made as to whether to store the at least one of an identification of the user and the at least one expression (step 3510). The resource is displayed in a viewable display format, responsive to a second of the plurality of predefined markers (step 3512). During a second session, a second expression having a semantic structure is received from the user via one of a plurality of media gateways (step 3514). The semantic structure of the second expression is evaluated (step 3516). An expression type of the second expression is identified responsive to the evaluation of the semantic structure (step 3518). A response to the expression is generated based on the expression type (step 3520).

Referring now to FIG. 35, and in greater detail, a resource is received from a user, during a first session between the user and an interaction environment, via one of a plurality of media gateways, the resource including a plurality of predefined markers and at least one expression having a semantic structure (step 3502). In some embodiments, the transceiver 132 includes a receiver receiving the resource. In one of these embodiments, the receiver receives, during the first session between the user and the interaction environment, via one of the plurality of media gateways, from the user, the resource including a plurality of predefined markers identifying an expression type and the resource including the at least one expression having the semantic structure. In another of these embodiments, the receiver receives during the first session between the user and the interaction environment, via one of the plurality of media gateways, from the user, the resource including a plurality of predefined markers expressed in a programming language and the resource including the at least one expression having the semantic structure. In still another of these embodiments, the receiver receives during the first session between the user and the interaction environment, via one of the plurality of media gateways, from the user, the resource including a plurality of predefined markers expressed in an Extensible Markup Language (XML) and the resource including the at least one expression having the semantic structure. In yet another of these embodiments, the receiver receives during the first session between the user and the interaction environment, via one of the plurality of media gateways, from the user, the resource including a plurality of predefined markers identifying a display format and the at least one expression having the semantic structure.

The resource is stored (step 3504). The semantic structure of the at least one expression in the resource is evaluated (step 3506). An expression type is identified, responsive to the evaluation of the semantic structure and to one of the plurality of predefined markers (step 3508). A determination is made as to whether to store the at least one of an identification of the user and the at least one expression (step 3510). The semantic structure may be evaluated and the expression type identified as described above in connection with FIG. 2A and FIGS. 28A-C. In some embodiments, one of the plurality of predefined markers identifies the at least one expression in the resource as an expression to be added to the collection of information 120 and to the search index 118.

The resource is displayed in a viewable display format, responsive to a second of the plurality of predefined markers (step 3512). In one embodiment, the display component 2938 includes a user interface for displaying the resource to the user in a viewable display format. In some embodiments, the display component 2938 executes programming code included in the resource to display the resource in a viewable display format. In one of these embodiments, some of the predefined markers in the resource comprise programming code. In another of these embodiments, the display component 2938 transforms the resources from a display format not comprehensible to the user into a display format comprehensible to the user. For example, in some of these embodiments, the display component 2938 transforms programming code written in the Extensible Markup Language (XML), which may not be comprehensible to all users, into programming code written in Hypertext Markup Language, which a client browser may execute and display in a viewable, comprehensible form to the user.

During a second session, a second expression having a semantic structure is received from the user via one of a plurality of media gateways (step 3514). In some embodiments, the transceiver 132 receives the second expression as described above in connection with FIG. 2A. In one embodiment, the second expression is received during a session between a second user and the interaction environment 110. In another embodiment, the second expression is received during the first session between the user and the interaction environment 110.

The semantic structure of a second expression is evaluated (step 3516). The semantic evaluator 134 identifies an expression type for the second expression, responsive to an evaluation of the semantic structure of the second expression and to one of the plurality of predefined markers. The semantic structure may be evaluated and the expression type identified as described above in connection with FIG. 2A and FIGS. 28A-28C.

An expression type of the second expression is identified responsive to the evaluation of the semantic structure (step 3518). In some embodiments, the semantic evaluator 134 identifies the expression type of the second expression as described above in connection with FIG. 2A and FIGS. 28A-C. A response to the second expression is generated based on the expression type (step 3520). The response generating component 136 may generate the response as described above in connection with FIG. 2A and FIGS. 28A-C. In some embodiments, the generated response includes the at least one expression received in the resource during the first session between the user and the interaction environment 110. In one of these embodiments, the at least one expression identified in the resource and added to the collection of information 120 from the resource is used in the same manner as if the user had provided the at least one expression directly to the interaction environment 110, as described above in connection with FIG. 2A.

In the embodiments described above in connection with FIG. 2A and 28A-C, when a user provides an expression to an interaction environment 110 via a user interface module 130, the interaction environment 110 analyzes the expression and generates a response. In the embodiments described below, in connection with FIGS. 36-38, the user may provide the interaction environment 110 with a definition specifying a type of response to generate for a particular type of expression, the expression type identified by determining that the expression has a semantic structure matching an expression format specified by the definition. Additionally, in some embodiments, as described below in connection with FIGS. 36-38, the user may provide executable code to the interaction environment, modifying the behavior of the interaction environment.

Figure 36:
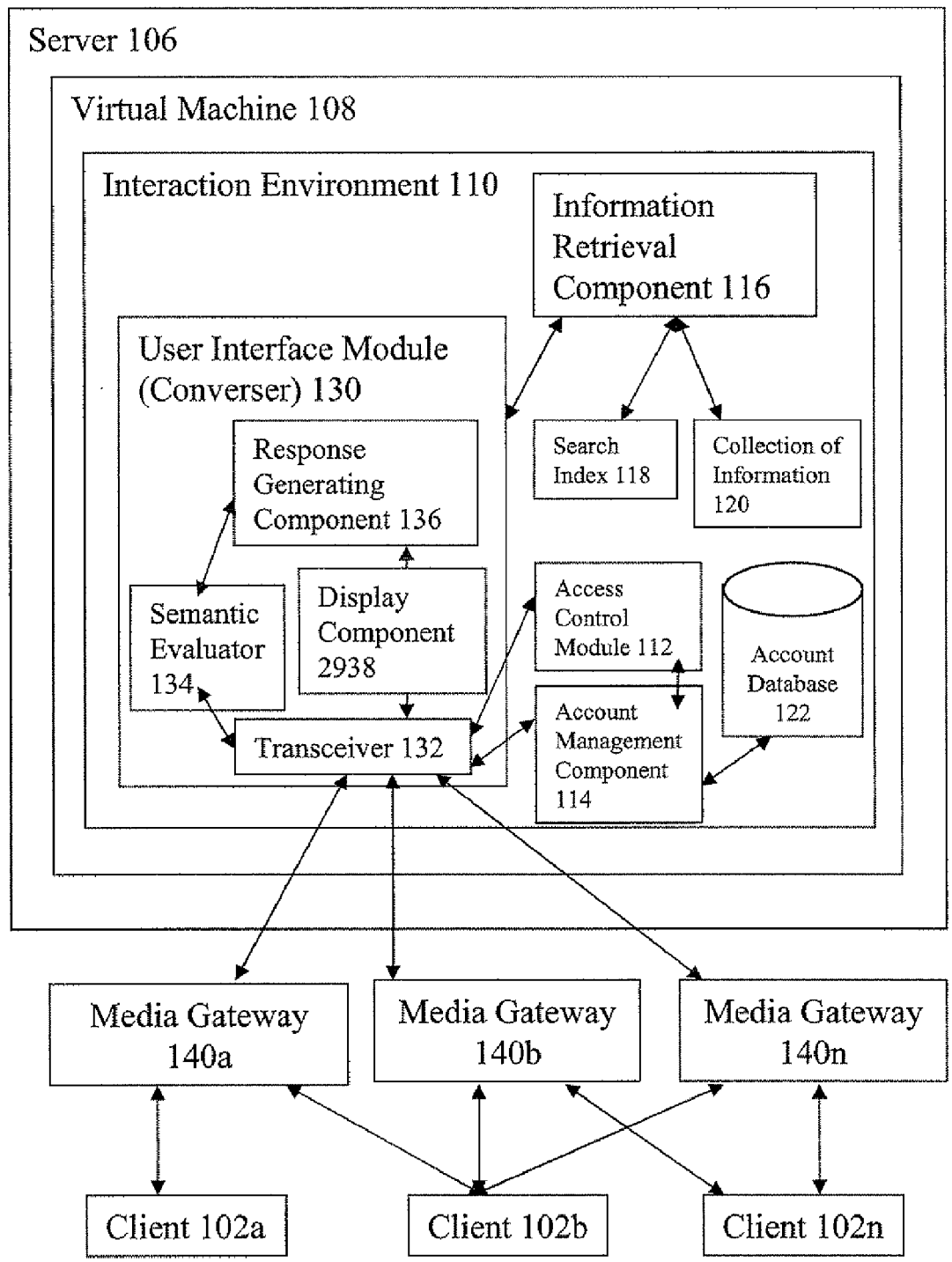
FIG. 36 is a block diagram depicting one embodiment of a system for hosting a programming environment.

Referring now to FIG. 36, a block diagram depicts one embodiment of a system for hosting a programming environment. In brief overview, the system includes a client 102 and a server 106. An interaction environment 110 executes in a virtual machine 108, which executes on the server 106. The interaction environment 110 provides an information retrieval component 116 and a user interface module 130. The information retrieval component 116 is in communication with a search index 118 and a collection of information 120. The user interface module 130 comprises a transceiver 132, a semantic evaluator 134, a response generating component 136, and a display component 2938.

The transceiver 132 receives, during a first session between a user and the interaction environment 110, via one of a plurality of media gateways 140, a definition of an expression type, the definition specifying an expression format and a response type. The transceiver 132 stores the definition of the expression type. The transceiver 132 receives, during a second session between a second user and the interaction environment 110, an expression having a semantic structure. The semantic evaluator 134 identifies an expression format of the received expression as the expression format specified by the definition of the expression type, responsive to an evaluation of the semantic structure of the expression. The response generating component 136 provides a response to the expression based on the identified expression format and responsive to an execution of a computer program associated with the response type specified by the definition of the expression type.

In some embodiments, the interaction environment 110 provides a plurality of means enabling a user to add information to the interaction environment 110. In other embodiments, the interaction environment 110 provides a user interface allowing users to upload documents to the interaction environment 110. In one of these embodiments, the uploaded documents include programming code for modifying a display provided to the user by the interaction environment 110. In another of these embodiments, the uploaded documents include programming code for execution by the interaction environment 110 upon evaluation of an expression having a specified semantic structure.

Referring now to FIG. 36, and in greater detail, the interaction environment 110 executes in the virtual machine 108. The interaction environment 110 provides the functionality described above in connection with FIG. 2A. In one embodiment, the interaction environment 110 provides a user interface element. In another embodiment, the interaction environment 110 stores information provided by the user via the user interface element. In still another embodiment, the interaction environment 110 stores a virtual machine state of a program executing in the virtual machine 108. In yet another embodiment, a program written in a programming language embedded within the user interaction module 130 executes in the virtual machine 108.

In some embodiments, when a user interacts with the interaction environment 110, the interaction environment 110 stores the information provided by the user and the information provided to the user in responses generated by the user interface module 130. In one of these embodiments, a session key is associated with a user and with information exchanged between the user and the interaction environment 110. In another of these embodiments, the information associated with the session key is referred to as a conversation.

As described above in connection with FIG. 2A, the information retrieval component 116 provided by the interaction environment 110 is in communication with the search index 118 and the collection of information 120 and provides functionality for searching for and retrieving information from the search index 118 and the collection of information 120. As described above in connection with FIG. 2A, the user interface module 130 provided by the interaction environment 110 is in communication with the information retrieval component 116 and provides the user with an interface and functionality for interacting with the interaction environment 110, forwarding received user-input to the appropriate components within the interaction environment 110. As described above in connection with FIG. 2A, the user interface module 130 comprises a transceiver 132, a semantic evaluator 134, a response generating component 136, and a display component 2938.

Figure 37A:
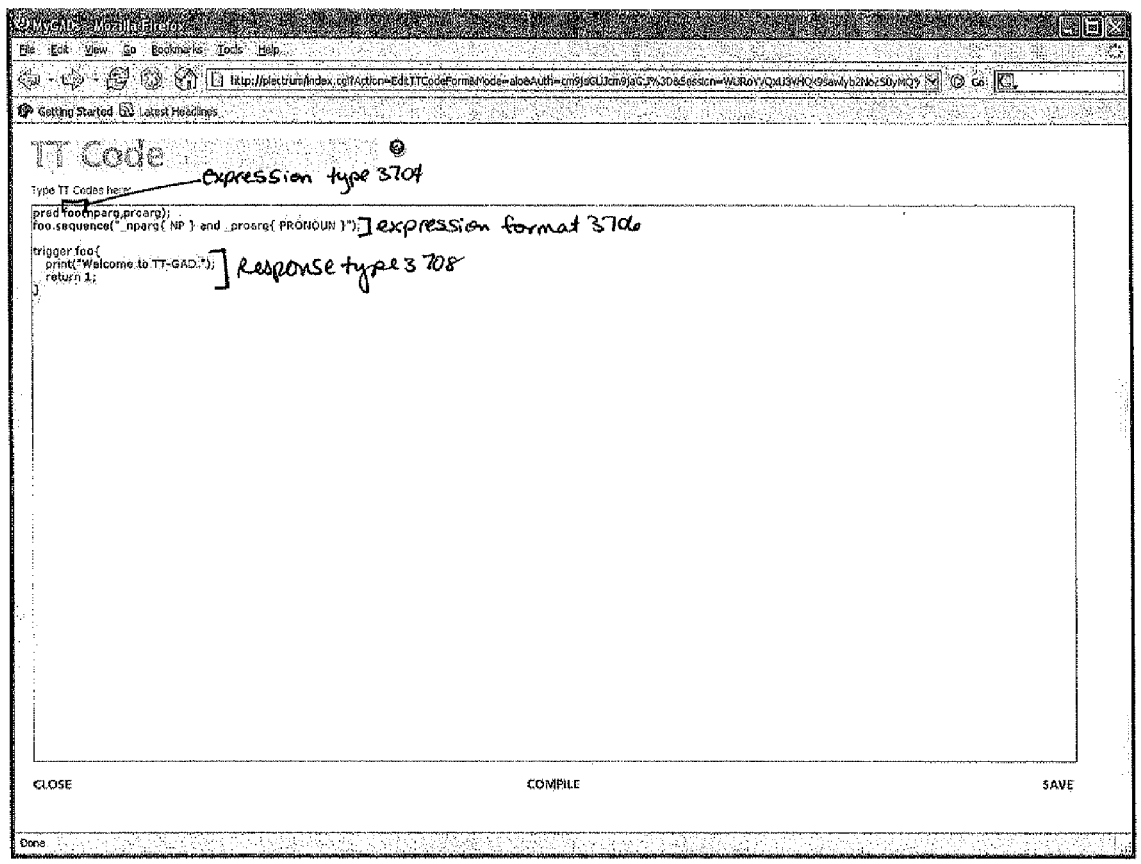
FIG. 37A and 37B are screen shots depicting embodiments of user interface elements through which a user may provide program code to an interaction environment.

Referring now to FIG. 37A, a screen shot depicts one embodiment of a user interface element through which a user may provide the definition of the element type. In one embodiment, a user interface element 3702 is displayed in a web page provided by the user interface module 130. In FIG. 37A, the user interface element 3702 is a text box. In one embodiment, the user enters programming code into the user interface element 3702. FIG. 37A depicts programming code including an expression type 3704 ("foo"), an expression format 3706 (specifying a semantic structure including a noun phrase followed by the word "and" followed by a pronoun), and a response type 3708 ("trigger foo"), which, in this example, includes an identification of a command to display a string of text to the user are defined by providing code written in a programming language to the interaction environment via the user interface element.

Figure 37B:
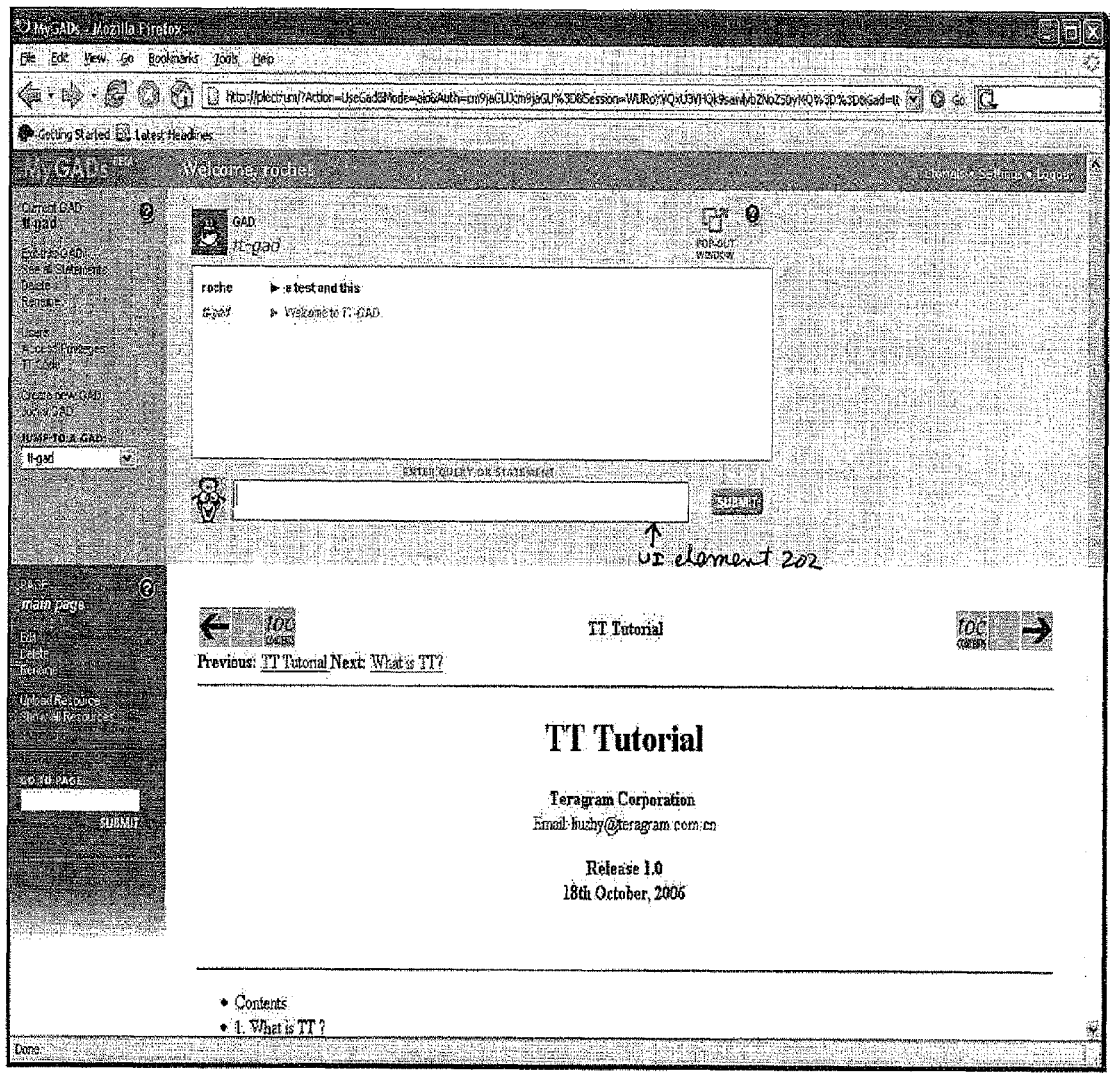

Referring now to FIG. 37B, a screen shot depicts another embodiment of a user interface element through which a user may provide the definition of the element type. In one embodiment, the user interface element includes a user interface element 202 used by the user for both querying the interaction environment 110 and for adding expressions to the interaction environment 110, as described above in connection with FIG. 2A. In another embodiment, the user enters the definition of the expression type into the user interface element 202.

In one embodiment, the user provides the interaction environment 110 with a command to enter a programming mode by typing the command into the user interface element. In another embodiment, the user then enters programming code into the interface element 110, via the user interface element. For example, a user may enter an expression (such as "switch to programming") that is evaluated by the semantic evaluator, identified as a command, and the response generated is to begin storing user-input as an application for later execution. In the following example, the user defined an expression type in which an expression format specifies that that the expression has a semantic structure including a noun, the word "and", and a demonstrative pronoun ("a test and this", "a cat and that") and in which a response type specifies responding to expressions of the defined expression type by displaying a welcome message to the user:

```
pred foo (nparg,proarg);
foo.sequence("_nparg{ NP } and _proarg{ PRONOUN }");
trigger foo{
    print("Welcome to TT-GAD.");
    return 1;
}
```

In this example, the user may enter the expression "switch tt" into the query box and submit the expression, and then enter the code, line by line, into the query box, followed by a command to exit the programming mode. Then the user may enter the string "a test and this" into the query box to see the output of the program. In one embodiment, the instructions are illustrated as follows:

```
switch tt
   tt code line 1
   tt code line 2 ...
   tt code line n
   exit
   this is a cat
```

The first two lines of the sample application declare a natural language predicate "foo" and its corresponding sequence. The predicate "foo" is defined using a "pred" keyword. In one embodiment, the expression format is referred to as a sequence of a predicate. In another embodiment, the sequence is a rule defining the natural language statements or phrases to be matched with the contents of all or part of an expression. In this example, the predicate "foo" matches statements composed of a pronoun, a word "is" and a noun phrase. The remaining code shown in this example defines a trigger named "foo". In one embodiment, a trigger is defined using the same name as the corresponding predicate, and the names create a linkage between a predicate and the action to be performed when it is matched. In this program, the trigger prints out a welcome message upon identification of a semantic structure of an expression as a pronoun, a word "is" and a noun phrase.

In one embodiment, a trigger is any expression associated with a command to execute user-provided program code. For example, a user may enter an expression that the semantic evaluator 134 identifies a part of the expression (such as the sequence of a pronoun, word "is", and a noun phrase described above) associated with a command to execute a program. In another embodiment, the semantic evaluator 134 makes this identification while identifying an expression type of an expression, as described above in connection with FIG. 28B (step 2850).

Referring back to FIG. 36, the transceiver 132 receives, during a first session between a user and the interaction environment 110, via one of a plurality of media gateways 140, a definition of an expression type, the definition specifying an expression format and a response type. In one embodiment, the transceiver 132 receives the definition via a user interface element displayed to the user in the user interface module 130. In some embodiments, the transceiver 132 further comprises a receiver. In one of these embodiments, the receiver receives, during the first session between the user and the interaction environment 110, via one of the plurality of media gateways 140, from the user, the definition of the expression type, the expression type identifying an expression as a command to execute a computer program. In another of these embodiments, the receiver receives, during the first session between the user and the interaction environment, via one of the plurality of media gateways, from the user, the definition of the expression type, the definition specifying an expression format identifying a linguistic pattern of an expression having the expression type. In still another of these embodiments, the receiver receives, during the first session between the user and the interaction environment, via one of the plurality of media gateways, the definition of the expression type, the definition specifying an expression format identifying a word order of an expression having the expression type. In yet another of these embodiments, the receiver receives, during the first session between the user and the interaction environment, via one of the plurality of media gateways, from the user, the definition of the expression type, the definition specifying a response type identifying a computer program for execution.

In some embodiments, the expression type categorizes an expression. In one of these embodiments, the expression type may identify an action to be taken by the interaction environment 110 upon evaluation of a semantic structure of an expression. In another of these embodiments, the expression type may identify an action to be taken by the interaction environment 110 upon identifying an expression format of a semantic structure as an expression format specified in the definition of the expression type. For example, if a semantic structure of an expression matches an expression format specified in a definition, the semantic evaluator 134 evaluating the expression may identify an expression type of the expression as the defined expression type. In other embodiments, the definition specifies a type of response to generate upon determination, by a semantic evaluator 134, that a semantic structure of an expression has an expression format as specified by a definition of an expression type which also specifies the type of response. In one of these embodiments, a type of response comprises a command to store the expression. In another of these embodiments, a type of response comprises a command to retrieve information from the collection of information 120 and include the retrieved information in a response to the expression. In still another of these embodiments, a type of response comprises a command to execute a computer program identified by a user. In yet another of these embodiments, a type of responses comprises a command to generate a response including output from an execution of a computer program identified by a user.

In one embodiment, the transceiver 132 stores the received definition. In another embodiment, the transceiver 132 transmits the definition to the information retrieval component 116 for storage. In still another embodiment, the transceiver 132 stores the definition in the interaction environment 110.

The transceiver 132 receives, during a second session between the user and the interaction environment 110, a second expression having a semantic structure. In some embodiments, the transceiver 132 receives the second expression as described above in connection with FIG. 2A. The semantic evaluator 134 identifies an expression type for the received at least one expression in the resource, responsive to an evaluation of the semantic structure of the received expression and to one of the plurality of predefined markers. The semantic structure may be evaluated and the expression type identified as described above in connection with FIG. 2A and FIGS. 28A-C. In one embodiment, the semantic evaluator 134 identifies the semantic structure as the structure defined by the expression format specified in the definition of the expression type.

The semantic evaluator 134 identifies an expression type for the second expression responsive to an evaluation of the semantic structure of the second expression. In some embodiments, the semantic evaluator 134 identifies the expression type of the second expression as described above in connection with FIG. 2A and FIGS. 28A-C. In one embodiment, the semantic evaluator 134 determines that the semantic structure of the expression matches an expression format specified in a definition of an expression type and identifies the expression type of the expression as the defined expression type.

The response generating component 136 provides a response to the second expression based on the identified expression type and responsive to an execution of a computer program associated with the response type specified by the definition of the expression type. In one embodiment, the response generating component 136 provides a response by executing a computer program. In another embodiment, the response generating component 136 generates a response by executing a command. For example, the response type may specify that the response should comprise a modification of information stored in the collection of information 120. In another example, the response type may specify that the response should comprise the results of a query sent to the information retrieval component 116.

Figure 38:
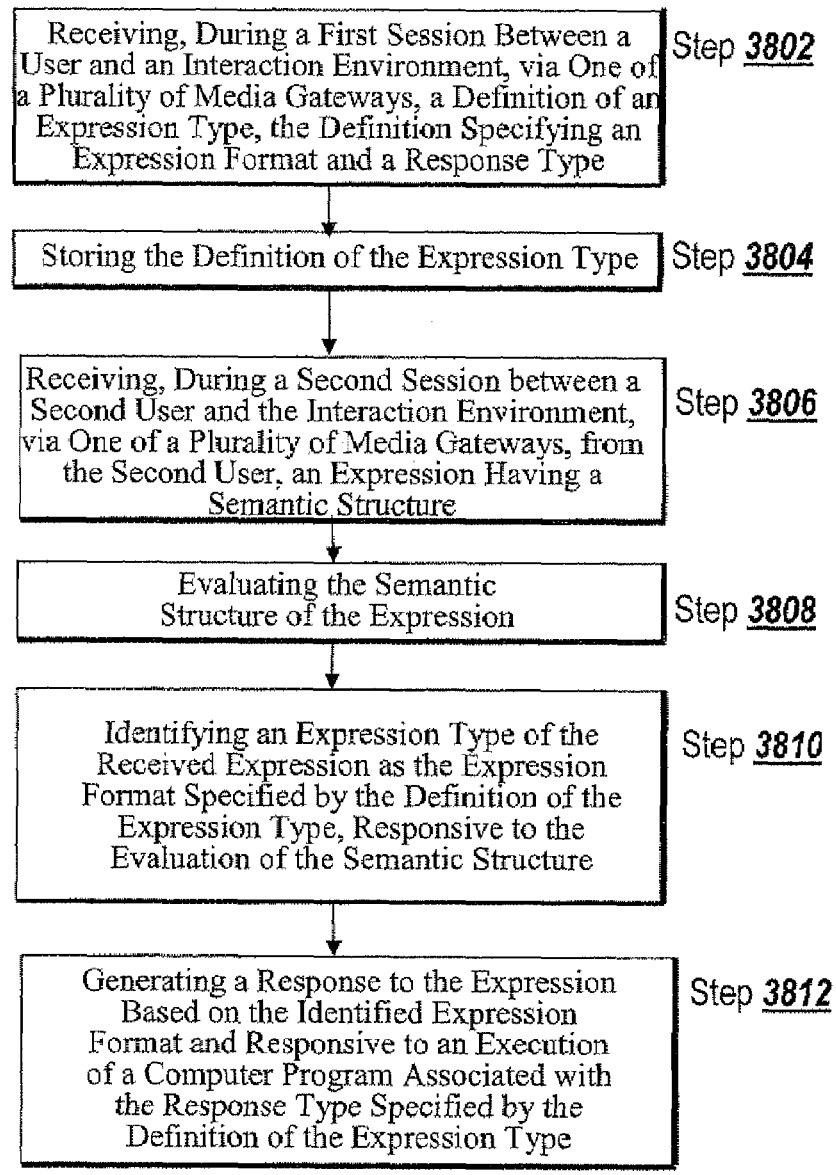
FIG. 38 is a flow diagram depicting one embodiment of the steps taken in a method for hosting a programming environment.

Referring now to FIG. 38, a flow diagram depicts one embodiment of the steps taken in a method for hosting a programming environment. In brief overview, during a first session between a user and an interaction environment, a definition of an expression type is received, via one of a plurality of media gateways, the definition specifying an expression format and a response type (step 3802). The definition of the expression type is stored (step 3804). During a second session between a second user and the interaction environment, an expression having a semantic structure is received from the second user, via one of a plurality of media gateways (step 3806). The semantic structure of the expression is evaluated (step 3808). An expression format of the received expression is identified as the expression format specified by the definition of the expression type, responsive to the evaluation of the semantic structure (step 3810). A response to the expression is generated based on the identified expression format and responsive to an execution of a computer program associated with the response type specified by the definition of the expression type (step 3812).

Referring now to FIG. 38, and in greater detail, during a first session between a user and an interaction environment, a definition of an expression type is received, via one of a plurality of media gateways, the definition specifying an expression format and a response type (step 3802). In some embodiments, the received definition specifies an expression format and a response type, the response type associated with a computer program provided by the user. In one of these embodiments, the response type includes an identification of a computer program for execution by the interaction environment 110 in generating a response to an expression identified as having the specified expression format. In another of these embodiments, the user provides code comprising the computer program in the definition of the expression type.

In other embodiments, the received definition specifies an expression format and a response type, the response type associated with a computer program transmitted, by the user, to the interaction environment 110. In one of these embodiments, the user may upload a copy of the computer program to the interaction environment 110. In another of these embodiments, the user may upload the computer program to the interaction environment 110 in a transmission separate from the transmission of the definition of the expression type. For example, the user may have transmitted the computer program to the interaction environment 110 in a previous session with the interaction environment 110.

In still other embodiments, the received definition specifies an expression format and a response type, the response type associated with a computer program identified by the user. In one of these embodiments, the user includes an identification of the computer program in the specification of the response type. In another of these embodiments, the user provides the identification of the computer program but does not provide a copy of the computer program to the interaction environment 110. For example, the user may provide an identification of a computer program previously provided by the user to the interaction environment 110. In another example, the user may provide an identification of a computer program provided by a second user to the interaction environment 110.

In one embodiment, the received definition specifies an expression type identifying an expression having the specified expression format as a command to execute a computer program. In another embodiment, the received definition specifies an expression type identifying an expression having the specified expression format as a command to store the expression in the interaction environment 110. In still another embodiment, the received definition specifies an expression type identifying an expression having the specified expression format as a command to retrieve information from the interaction environment 110. In yet another embodiment, the received definition specifies an expression type identifying an expression having the specified expression format as a command to modify a display provided to the user by the user interface module 130.

In one embodiment, the received definition specifies an expression format identifying a semantic structure of an expression. In another embodiment, the received definition specifies an expression format identifying a word order of an expression. In still another embodiment, the received definition specifies an expression format identifying a linguistic pattern of an expression. In some embodiments, if the semantic evaluator 130 evaluates a semantic structure of an expression and determines that the structure has the specified expression format, the semantic evaluator 130 identifies the expression type of the expression as the defined expression type.

The definition of the expression type is stored (step 3804). In one embodiment, the interaction environment 110 stores the definition of the expression type. In another embodiment, the search index 118 stores the definition of the expression type. In some embodiments, a determination is made not to store the definition of the expression type, responsive to an access control decision. In one of these embodiments, the account management component 114 determines not to store the definition of the expression type. In another of these embodiments, the account management component 114 accesses the access control module 112 to determine that the user is not authorized to store a definition of an expression type.

During a second session between a second user and the interaction environment, an expression having a semantic structure is received from the second user, via one of a plurality of media gateways (step 3806). In some embodiments, the transceiver 132 receives the expression having the semantic structure, from the second user, during the second session between the second user and the interaction environment 110 as described above in connection with FIG. 2A. The semantic structure of the expression is evaluated (step 3808). The semantic structure may be evaluated as described above in connection with FIG. 2A and FIGS. 28A-C.

An expression format of the received expression is identified as the expression format specified by the definition of the expression type, responsive to the evaluation of the semantic structure (step 3810). In one embodiment, the semantic evaluator 134 identifies the semantic structure as the structure defined by the expression format specified in the definition of the expression type. In another embodiment, the semantic evaluator 134 determines that a word order or linguistic pattern of the expression matches the expression format specified in the definition of the expression type.

A response to the expression is generated based on the identified expression format and responsive to an execution of a computer program associated with the response type specified by the definition of the expression type (step 3812). In one embodiment, the response generating component 136 provides a response by executing a computer program. In another embodiment, the response generating component 136 generates a response by executing a command. For example, the response type may specify that the response should comprise a modification of information stored in the collection of information 120. In another example, the response type may specify that the response should comprise the results of a query sent to the information retrieval component 116. In still another example, the response type may specify that the response should include the output of executing a computer program.

Figure 39:
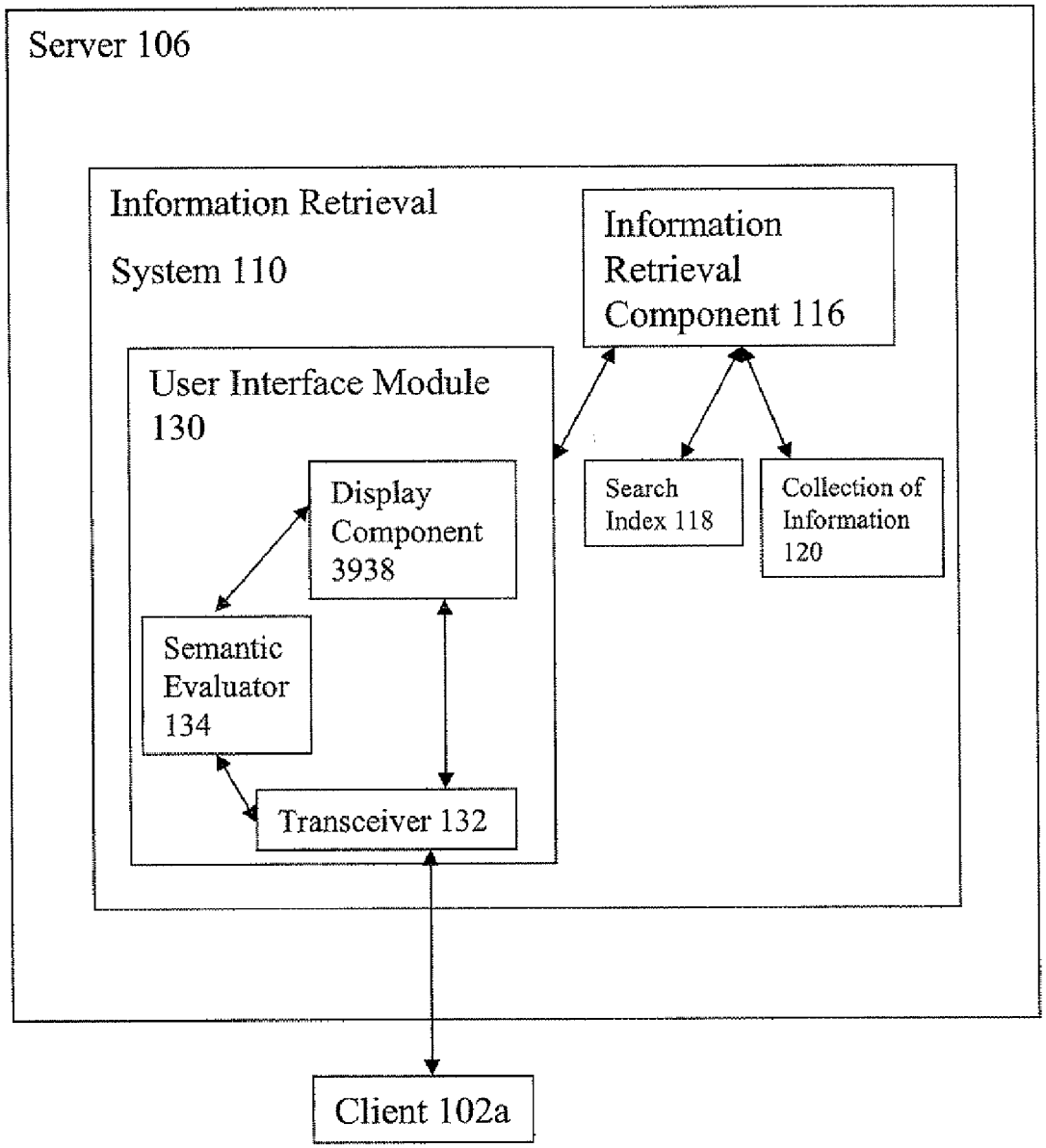
FIG. 39 is a block diagram depicting one embodiment of an information retrieval system for hosting a programming environment and processing user input.

Referring now to FIG. 39, a block diagram depicts one embodiment of an information retrieval system for hosting a programming environment and processing user input. In brief overview, the system includes a client 102 and a server 106. The interaction environment 110 provides an information retrieval component 116 and a user interface module 130. The information retrieval component 116 is in communication with a search index 118 and a collection of information 120. The user interface module 130 comprises a transceiver 132, a semantic evaluator 134, and a display component 3938.

The transceiver 132 receives, from a user, during a first session between a user and the information retrieval system 110, a definition of an expression type, the definition specifying an expression format, a response type, and a display format. The transceiver 132 receives, during a second session between the user and the information retrieval system 110, an expression having a semantic structure. The semantic evaluator 134 evaluates the semantic structure of the received expression. The display component 3938 displays, to the user, a generated response in a user interface displayed according to the display format specified by the definition of the expression type.

In some embodiments, the information retrieval system 110 provides a user interface allowing users to upload documents to the interaction environment 110. In one of these embodiments, the uploaded documents include programming code for modifying a display provided to the user by the interaction environment 110. In another of these embodiments, the uploaded documents include programming code for execution by the interaction environment 110 upon evaluation of an expression having a specified semantic structure.

Referring now to FIG. 39, and in greater detail, the information retrieval system 110 receives expressions and programming code from a user of the client 102. In one embodiment, the information retrieval system 110 comprises an interaction environment as described above in connection with FIG. 36. In another embodiment, the information retrieval system 110 comprises an Internet search engine. In still another embodiment, the information retrieval system 110 provides functionality, including a user interface and a search engine, for searching large databases, which may be accessible via a network 140.

The information retrieval component 116 provided by the interaction environment 110 and in communication with the search index 118 and the collection of information 120 provides functionality for searching for and retrieving information from the search index 118 and the collection of information 120. In some embodiments, the information retrieval component 116 provides the functionality described above in connection with FIG. 2A.

The user interface module 130 provided by the information retrieval system 110 is in communication with the information retrieval component 116 and provides the user with an interface and functionality for interacting with the information retrieval system 110, forwarding received user-input to the appropriate components within the information retrieval system 110. The user interface module 130 comprises a transceiver 132, a semantic evaluator 134, and a display component 3938. In some embodiments, the user interface module 130 provides the functionality described above in connection with FIG. 36.

The transceiver 132 receives, from a user, during a first session between the user and the information retrieval system 110, a definition of an expression type, the definition specifying an expression format, a response type, and a display format. In one embodiment, the transceiver 132 receives the definition via one of a plurality of media gateways. In another embodiment, the transceiver 132 receives the definition via a user interface element provided to the client 102 by the user interface module 130. In some embodiments, the transceiver 132 further comprises a receiver. In one of these embodiments, the receiver receives, during the first session between the user and the information retrieval system 110, from the user, the definition of the expression type, the expression type identifying an expression as a command to execute a computer program. In another of these embodiments, the receiver receives, during the first session between the user and the information retrieval system 110, from the user, the definition of the expression type, the definition specifying a display format identifying a format for an element of a user interface displaying a response of the specified response type to an expression having the defined expression format. In still another of these embodiments, the receiver receives, during the first session between the user and the interaction environment, the definition of the expression type, the definition specifying a display format modifying an element of a user interface displaying a response to the expression.

In one embodiment, the transceiver 132 stores the received definition. In another embodiment, the transceiver 132 transmits the definition to the information retrieval component 116 for storage.

The transceiver 132 receives, during a second session between the user and the information retrieval system 110, an expression having a semantic structure. In some embodiments, the transceiver 132 receives the expression as described above in connection with FIG. 2A.

The semantic evaluator 134 identifies an expression type for the received expression in the resource, responsive to an evaluation of the semantic structure of the received expression. The semantic structure may be evaluated and the expression type identified as described above in connection with FIG. 2A and FIGS. 28A-C. In one embodiment, the semantic evaluator 134 determines that the semantic structure of the expression matches an expression format specified in a definition of an expression type and identifies the expression type of the expression as the defined expression type. In another embodiment, the semantic evaluator 134 identifies the expression as a command to modify a user interface.

In some embodiments, a response generating component 136 generates a response to the expression based on the identified expression type and responsive to an execution of a computer program associated with the response type specified by the definition of the expression type. In one embodiment, the response generating component 136 provides a response by executing a computer program. In another embodiment, the response generating component 136 generates a response responsive to a response type specified in the definition of the expression type.

The display component 3938 displays a generated response to the user in a user interface displayed according to the display format specified by the definition of the expression type. In one embodiment, the display component 3938 in the information retrieval system 110 modifies the user interface to include output data resulting from an execution of code identified by the definition specifying the display format. In another embodiment, the display component 3938 transmits to the client 102 a command to execute a computer program for execution by a browser application displaying the user interface including the generated response on the client 102.

In some embodiments, the display component 3938 modifies a user interface displaying a generated response to a user during the first session between the user and the information retrieval system 110. In other embodiments, the display component 3938 modifies a user interface displaying a generated response to a user during a second session between the user and the information retrieval system 110. In still other embodiments, the display component 3938 modifies a user interface displaying a generated response to a second user during a first session between the second user and the information retrieval system 110. For example, the display component 3938 may store in the information retrieval system 110 a command to modify the user interface according to the specified display format for all subsequent sessions between the user, or a second user, and the information retrieval system 110, or for subsequent sessions in which the user, or a second user, provides an expression having the defined expression type.

Figure 40:
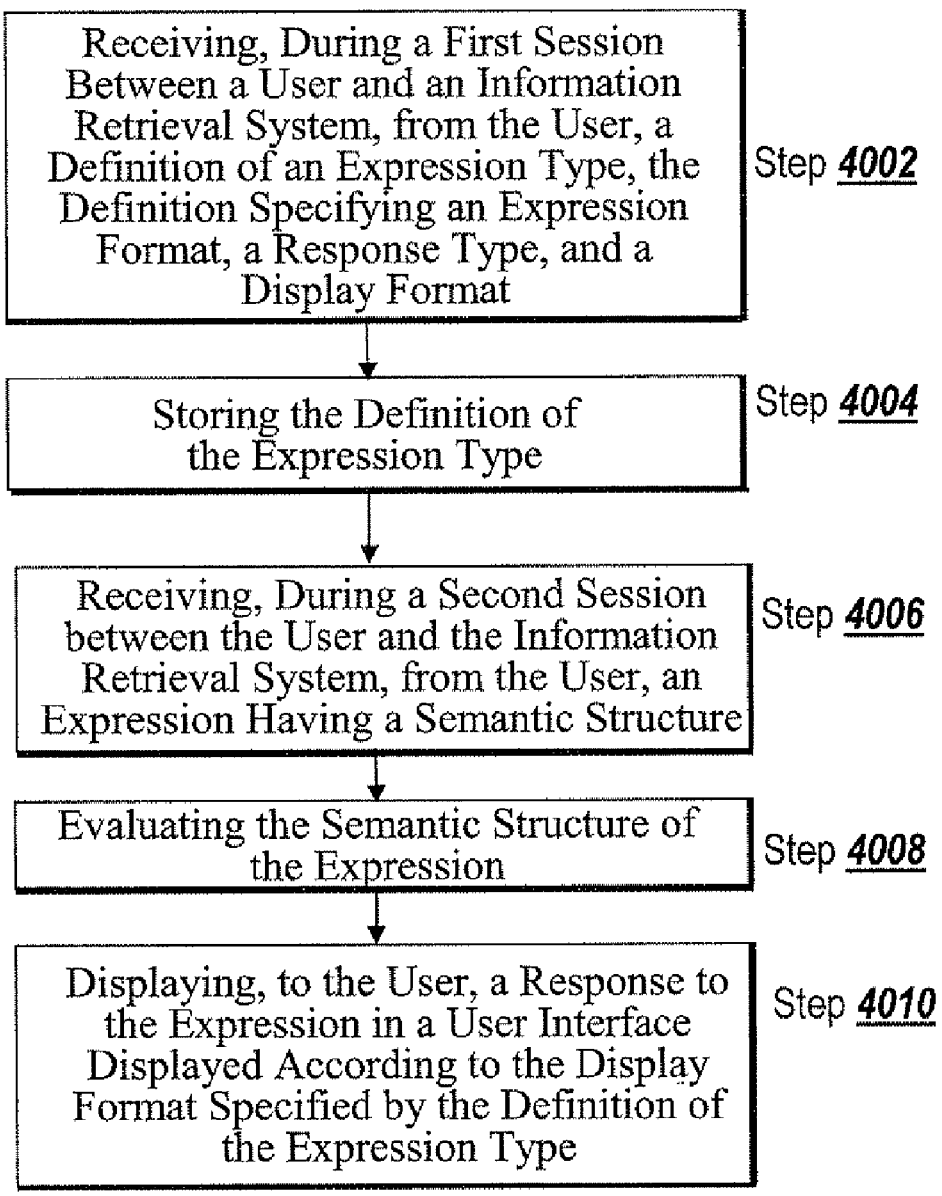
FIG. 40 is a flow diagram depicting one embodiment of the steps taken in a method for hosting a programming environment and processing user input within an information retrieval system.

Referring now to FIG. 40, a flow diagram depicts one embodiment of the steps taken in a method for hosting a programming environment and processing user input within an information retrieval system. In brief overview, during a first session between a user and an information retrieval system, a definition of an expression type is received from the user, the definition specifying an expression format, a response type, and a display format (step 4002). The definition of the expression type is stored (step 4004). During a second session between the user and the information retrieval system, an expression having a semantic structure is received from the user (step 4006). The semantic structure of the expression is evaluated (step 4008). A response to the expression is displayed to the user in a user interface displayed according to the display format specified by the definition of the expression type (step 4010).

Referring now to FIG. 40 and in greater detail, during a first session between a user and an information retrieval system, a definition of an expression type is received from the user, the definition specifying an expression format, a response type, and a display format (step 4002). In one embodiment, the definition of the expression type is received via one of a plurality of media gateways. In another embodiment, the expression type in the received definition identifies an expression having a specified expression format as a command to execute a computer program.

In one embodiment, a user interface is modified responsive to the display format specified in the received definition. In another embodiment, the display format specified in the received definition identifies a format for an element of a user interface displaying a response of the specified response type. In still another embodiment, the display format specified in the received definition modifies an existing user interface element in a user interface displayed to the user. In yet another embodiment, the display format specified in the received definition adds a user interface element to a user interface displayed to the user.

In some embodiments, the user uploads a resource to the information retrieval system 110, the resource including the definition of the expression type. In one of these embodiments, the information retrieval system 110 includes the functionality of the interaction environment 110 as described above in connection with FIGS. 29-35. In another of these embodiments, at least one predefined marker in the resource includes the definition of the expression type. In still another of these embodiments, the user uploads a resource including programming code specifying the definition of the expression type. In yet another of these embodiments, programming code may be written in a programming language, a scripting language, a markup language or other computer language.

In other embodiments, the user provides programming code to the information retrieval system 110 by typing code into a user interface element displayed to the user. In one of these embodiments, the information retrieval system 110 includes the functionality of the interaction environment 110 as described above in connection with FIGS. 36-38. In another of these embodiments, the programming code including the definition of the expression type may be written in a programming language, a scripting language, a markup language or other computer language.

The definition of the expression type is stored (step 4004). In one embodiment, the definition is stored in the information retrieval system 110. In another embodiment, the definition is stored with an identification of the user.

During a second session between the user and the information retrieval system, an expression having a semantic structure is received from the user (step 4006). In one embodiment, the expression is received from the user during the first session. In another embodiment, the expression having the semantic structure is received from a second user during a first session between the second user and the information retrieval system. In still another embodiment, the transceiver 132 receives the expression having the semantic structure. In yet another embodiment, the transceiver 132 receives the expression as described above in connection with FIG. 2A.

The semantic structure of the expression is evaluated (step 4008). In one embodiment, the semantic evaluator 134 identifies the semantic structure as having a format matching the expression format specified in the received definition. For example, the semantic structure of the expression may include a word order or linguistic pattern specified in the expression format. In another embodiment, the semantic evaluator 134 determines that the expression is a type of expression previously defined by the user, responsive to the evaluation of the semantic structure. In still another embodiment, the semantic evaluator 134 transmits the identification of the expression type and the expression to a response generating component for generation of a response based on the response type provided in the definition of the expression type. In yet another embodiment, the semantic evaluator 134 transmits, to the display component 3938, the identification of the expression type, the expression, and a response to the expression. In some embodiments, the semantic evaluator 134 provides the functionality described above in connection with FIGS. 29-35 and 36-38.

A response to the expression is displayed to the user in a user interface displayed according to the display format specified by the definition of the expression type (step 4010). In one embodiment, the definition of the expression type is associated with an identification of a user upon receiving the definition from the user. In another embodiment, the identification of the user is retrieved when the user accesses the information retrieval system. In still another embodiment, one or more definitions previously received from the user are retrieved when the user accesses the information retrieval system, responsive to the identification of the user. In yet another embodiment, the one or more definitions are applied to generate or modify the user interface displayed to the user when the user accesses the information retrieval system.

Figure 41:
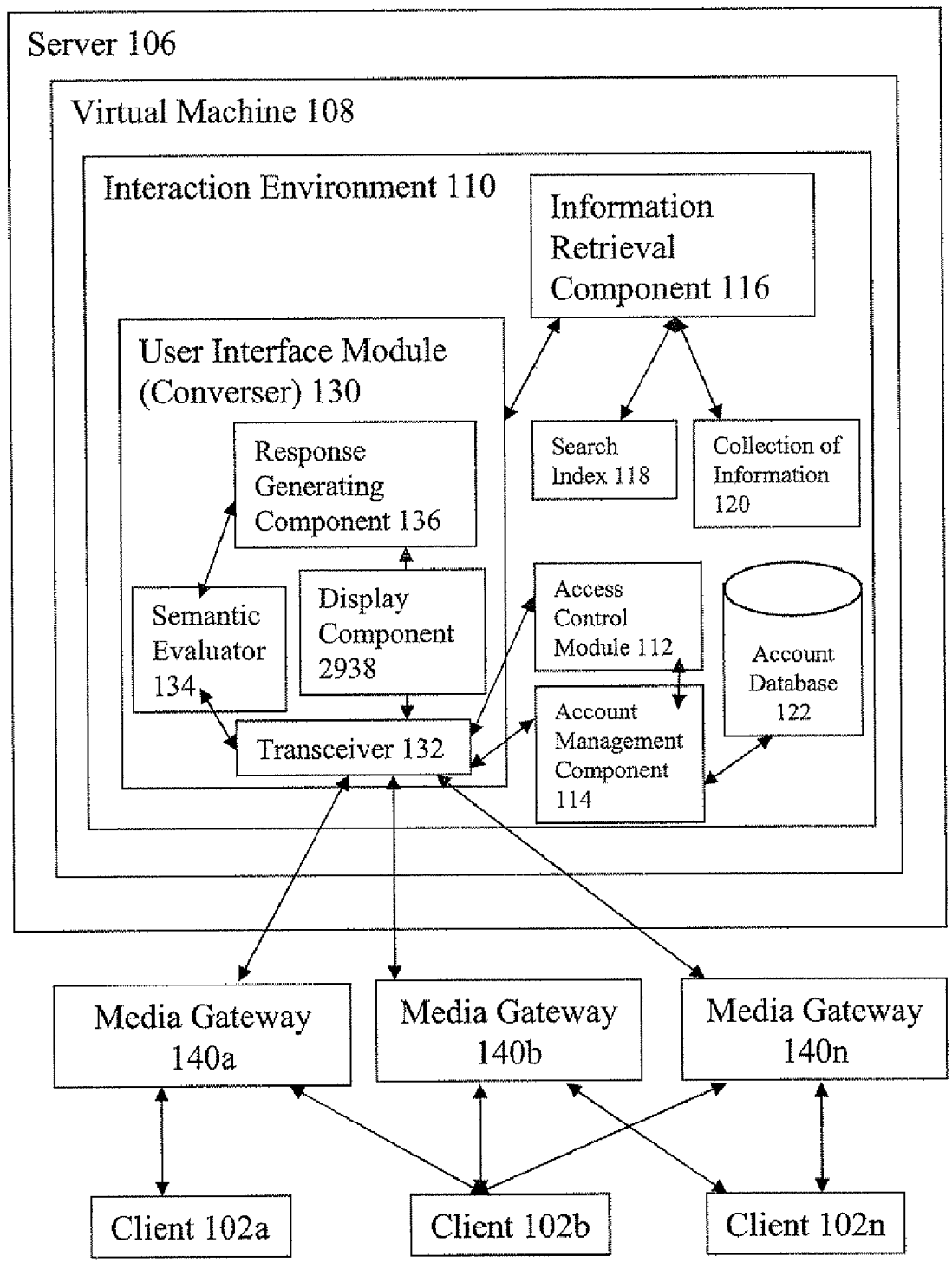
FIG. 41 is a block diagram depicting one embodiment of a system for receiving a user-defined display format and a user-identified computer program and displaying a user interface modified responsive to the received user input.

Referring now to FIG. 41, a block diagram depicts one embodiment of a system for receiving a user-defined display format and a user-identified computer program and displaying a user interface modified responsive to the received user input. In brief overview, the system includes a client 102 and a server 106. An interaction environment 110 executes in a virtual machine 108, which executes on the server 106. The interaction environment 110 provides an information retrieval component 116 and a user interface module 130. The information retrieval component 116 is in communication with a search index 118 and a collection of information 120. The user interface module 130 comprises a transceiver 132, a semantic evaluator 134, a response generating component 136, and a display component 2938.

The transceiver 132 receives, during a first session between a user and the interaction environment 110 displayed in a graphical user interface, a resource including a plurality of predefined markers and a first computer program executable by a browser on the client 102 displaying the graphical user interface, at least one of the plurality of predefined markers identifying a display format of at least one graphical user interface element in the graphical user interface. The transceiver 132 receives, from the user, a definition specifying a response type identifying a second computer program for execution by a remote machine, such as the server 106, upon user interaction with the at least one graphical user interface element in the graphical user interface.

The transceiver 132 receives, during a second session between the user and the interaction environment, an expression. The display component 2938 displays, during the second session between the user and the interaction environment, the resource and the at least one graphical user interface element formatted responsive to the at least one of the plurality of predefined markers in the resource. The response generating component 136 provides a response to the expression based on an execution of the second computer program identified by the response type specified by the definition received from the user, the response generated upon interaction, by the user, with the at least one graphical user interface element, the response displayed, by the display component, to the user, in a viewable display format, responsive to at least one of the plurality of predefined markers.

Referring now to FIG. 41, and in greater detail, the interaction environment 110 executes in the virtual machine 108. The interaction environment 110 provides the functionality described above in connection with FIG. 2A. As described above in connection with FIG. 2A, the information retrieval component 116 provided by the interaction environment 110 is in communication with the search index 118 and the collection of information 120 and provides functionality for searching for and retrieving information from the search index 118 and the collection of information 120. As described above in connection with FIG. 2A, the user interface module 130 provided by the interaction environment 110 is in communication with the information retrieval component 116 and provides the user with an interface and functionality for interacting with the interaction environment 110, forwarding received user-input to the appropriate components within the interaction environment 110. In some embodiments, as described above in connection with FIG. 2A, the user interface module 130 comprises a transceiver 132, a semantic evaluator 134, a response generating component 136, and a display component 2938.

The transceiver 132 receives, during a first session between a user and the interaction environment 110 displayed in a graphical user interface, a resource including a plurality of predefined markers and a first computer program executable by a browser on the client 102 displaying the graphical user interface, at least one of the plurality of predefined markers identifying a display format of at least one graphical user interface element in the graphical user interface. In one embodiment, the interaction environment 110 is accessed via the graphical user interface provided by a browser or other application for viewing network-accessible information. The browser may be provided on a computer, a mobile telephone, or other client device 102 as described above in connection with FIGS. 1A and 1B.

In some embodiments, the transceiver 132 further comprises a receiver. In one of these embodiments, the receiver receives, during the first session between the user and the interaction environment 110, from the user, the resource including a plurality of predefined markers identifying an expression type. In another of these embodiments, the receiver receives, during the first session between the user and the interaction environment, from the user, the resource including a plurality of predefined markers expressed in a markup language, such as a Hypertext Markup Language (HTML) or an Extensible Markup Language (XML). In still another of these embodiments, the receiver receives, during the first session between the user and the interaction environment, from the user, the resource including a plurality of predefined markers identifying a display format. In one embodiment, the transceiver 132 stores the received resource.

In some embodiments, the interaction environment receives the definition specifying the expression type as described above in connection with FIG. 29-FIG. 35. As described above, predefined markers may identify expressions contained in the resource—for example, by identifying an expression as a statement to be added to the interaction environment, or as a command for retrieval of information responsive to an implicit query. Also as described above, predefined markers may comprise executable code written in a programming language. The transceiver 132 receives, during a first session between a user and the interaction environment 110 displayed in a graphical user interface, a resource including a first computer program executable by a browser on the client 102 displaying the graphical user interface. In one embodiment, the first computer program comprises a second plurality of predefined markers. In another embodiment, a user interface presented to the user is modified to include output data resulting from an execution of the first computer program. For example, the user interface may be modified to include a table, defined in HTML code, within the resource, showing data contained in expressions identified in the resource. In another example, the user interface may be modified to include the output of executing JavaScript code, ActiveX code, or code written in a scripting language. In some embodiments, a browser on the client 102 executes code identified by the interaction environment 110.

At least one of the plurality of predefined markers in the resource identifies a display format of at least one graphical user interface element in the graphical user interface. In one embodiment, the at graphical user interface element comprises a graphical element, such as an image, a text box, an image of a button, an image of a radio button, an icon, or other graphical element. In another embodiment, the at least one graphical user interface element comprises an element in a graphical user interface such as a text string, a reference to a uniform resource locator, a table, or other textual element. In some embodiments, the graphical user interface previously displayed the graphical user interface element. In one of these embodiments, at least one of the predetermined markers identifies a modification to the formatting of the graphical user interface element. In other embodiments, the graphical user interface does not include the graphical user interface element at the time the predefined marker is received. In one of these embodiments, the predefined marker identifies a graphical user interface element to be added to the graphical user interface.

The transceiver 132 receives, from the user, a definition specifying a response type identifying a second computer program for execution by a remote machine, such as the server 106, upon user interaction with the at least one graphical user interface element in the graphical user interface. In one embodiment, the transceiver 132 receives the definition from the user during the first session. In another embodiment, the transceiver 132 receives the definition from the user during a second session. In still another embodiment, the transceiver 132 receives the definition from a second user.

In some embodiments, the transceiver 132 includes a receiver. In one of these embodiments, the receiver receives, from the user, a definition specifying an expression format. In another of these embodiments, the receiver receives, from the user, a definition specifying an expression format identifying a linguistic pattern or word order of an expression having the expression type. In still another of these embodiments, the receiver receives, from the user, a definition specifying an expression format identifying a type of image, icon, or drawing.

In one embodiment, the receiver receives, from the user, a definition specifying a response type identifying a second computer program for execution upon user interaction with a second graphical user interface element in the graphical user interface. For example, the response type may identify a computer program for execution by the server 106 upon clicking, by the user, on the identified interface element. In another embodiment, the receiver receives, from the user, a definition specifying a response type associated with a second computer program transmitted, by the user, to the interaction environment. In still another embodiment, the interaction environment receives a definition specifying a response type identifying a computer program from the user as described above in connection with FIG. 36-38.

The display component 2938 displays, during the second session between the user and the interaction environment, the resource and the at least one graphical user interface element formatted responsive to the at least one of the plurality of predefined markers in the resource. In one embodiment, the display component 2938 displays, in the graphical user interface on the client 102, the resource and at least one graphical user interface element formatted responsive to the at least one of the plurality of predefined markers in the resource. In some embodiments, the display component 2938 executes programming code included in the resource to display the resource in a viewable display format. In one of these embodiments, for example, the resource may include one or more expressions identified by a first subset of the plurality of predefined markers and a display format, identified by a second subset of the plurality of predefined markers, for displaying the one or more expressions. In other embodiments, the display component 2938 modifies the graphical user interface to include one or more user interface elements specified by the plurality of predefined markers in the resource, as described above in connection with FIGS. 29-35.

The transceiver 132 receives, during the second session between the user and the interaction environment 110, an expression. In some embodiments, the transceiver 132 receives the expression as described above in connection with FIG. 2A. In one of these embodiments, the user enters an expression having a semantic structure into a user interface element such as a text box. In other embodiments, the user enters an expression such as a drawing, a picture (for example, clip art or a drawing from a file), a diagram, a chart, or other non-textual object.

The user interacts with the at least one graphical user interface element displayed in the user interface according to the user-defined display format. In one embodiment, the user interacts with the graphical user interface element to request information retrieval. For example, the graphical user interface element may be a button on which the user clicks, using a pointing device, to request a search for a keyword entered into a text box. In another embodiment, the user interacts with the graphical user interface to request storage of data or modification of stored data. For example, the graphical user interface element may be a button on which the user clicks, using a pointing device, to request the transfer of a picture file from the client 102 to the interaction environment 110, or of a drawing entered by the user into a user interface displayed by a browser on a client 102, the drawing entered by using a pointing device.

The response generating component 136 provides a response to the expression based on an execution of the second computer program identified by the response type specified by the definition received from the user. In one embodiment, a user interaction with a user interface element—such as a mouse click on a button element—triggers execution of the second computer program. In another embodiment, programming code executed by a browser on the client 102—such as the execution of a plurality of predetermined markers comprising code written in a markup language—includes a command to execute a second computer program on the server 102 upon interaction, by the user, with a user interface element identified by at least one of the plurality of predetermined markers. In still another embodiment, the expression is transmitted to the second computer program executing on the server 106 with an identification of an expression type of the expression. In yet another embodiment, the second computer program generates a response to the expression based on a response type specified in a definition of the expression type identified as the expression type of the expression.

Figure 42:
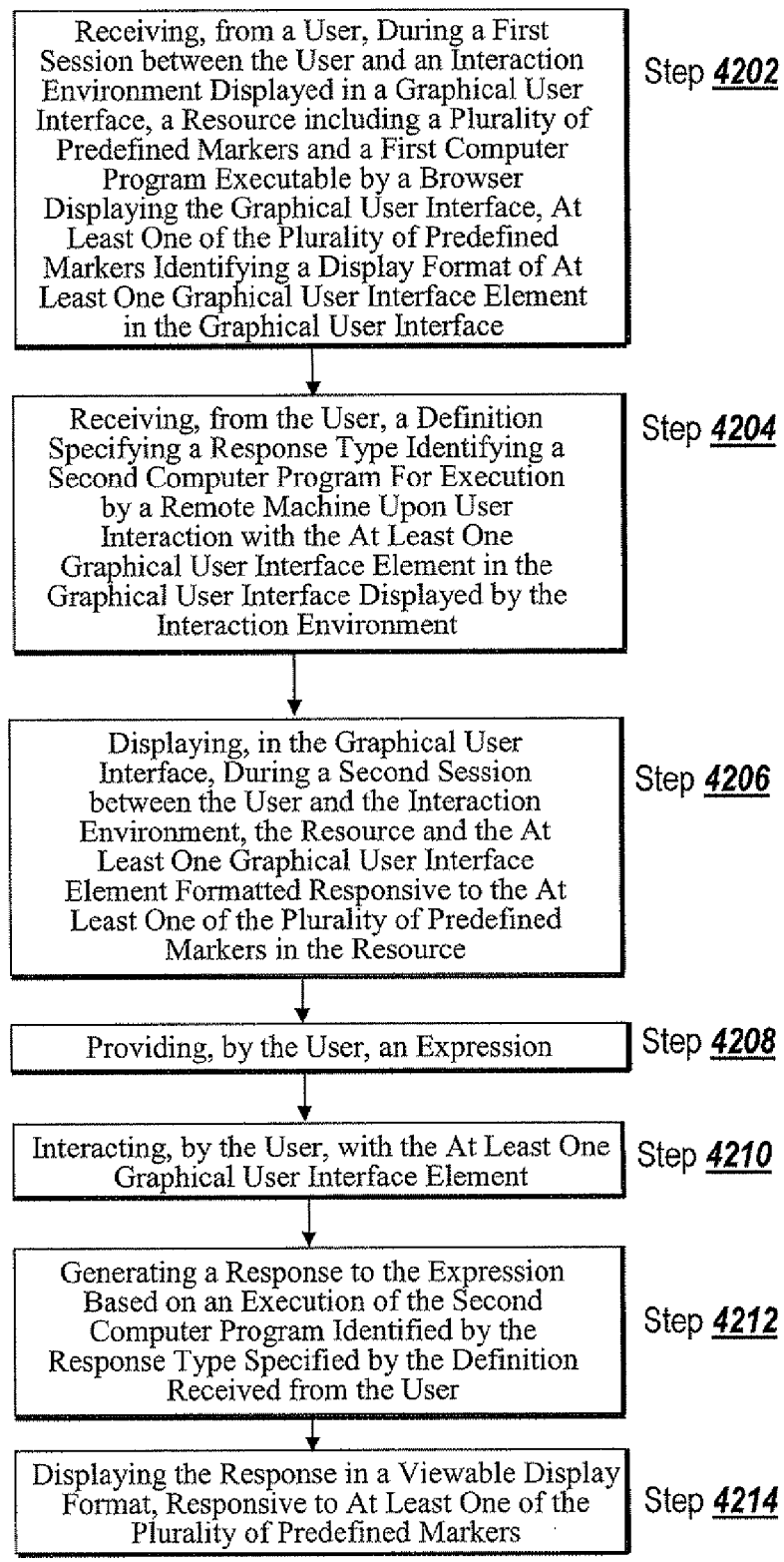
FIG. 42 is a flow diagram depicting one embodiment of the steps taken in a method for receiving a user-defined display format and a user-identified computer program and displaying a user interface modified responsive to the received user input.

Referring now to FIG. 42, a flow diagram depicts one embodiment of the steps taken in a method for receiving a user-defined display format and a user-identified computer program and displaying a user interface modified responsive to the received user input. In brief overview, during a first session between a user and an interaction environment displayed in a graphical user interface, a resource including a plurality of predefined markers and a first computer program executable by a browser displaying the graphical user interface is received from the user, at least one of the plurality of predefined markers identifying a display format of at least one graphical user interface element in the graphical user interface (step 4202). A definition specifying a response type is received from the user, the response type identifying a second computer program for execution by a remote machine upon user interaction with the at least one graphical user interface element in the graphical user interface displayed by the interaction environment (step 4204). During a second session between the user and the interaction environment, the graphical user interface displays the resource and the at least one graphical user interface element formatted responsive to the at least one of the plurality of predefined markers in the resource (step 4206). The user provides an expression (step 4208). The user interacts with the at least one graphical user interface element (step 4210). A response to the expression is generated based on an execution of the second computer program identified by the response type specified by the definition received from the user (step 4212). The response is displayed in a viewable display format, responsive to at least one of the plurality of predefined markers (step 4214).

Referring now to FIG. 42, and in greater detail, during a first session between a user and an interaction environment displayed in a graphical user interface, a resource including a plurality of predefined markers and a first computer program executable by a browser displaying the graphical user interface is received from the user, at least one of the plurality of predefined markers identifying a display format of at least one graphical user interface element in the graphical user interface (step 4202). In one embodiment, a resource is received from the user, the resource including a plurality of predefined markers identified an expression type. In another embodiment, a resource is received from the user, the resource including a plurality of predefined markers expressed in a programming language.

In one embodiment, a resource is received from a user, the resource including a plurality of predefined markers identifying a display format. In another embodiment, the plurality of predefined markers is expressed in a markup language, such as an Extensible Markup Language (XML) or a Hypertext Markup Language (HTML).

A definition specifying a response type is received from the user, the response type identifying a second computer program for execution by a remote machine upon user interaction with the at least one graphical user interface element in the graphical user interface displayed by the interaction environment (step 4204). In one embodiment, the interaction environment 110 receives, from the user, a definition specifying an expression format. In another embodiment, the interaction environment 110 receives, from the user, a definition specifying an expression format identifying a linguistic pattern or word order of an expression having the expression format. In still another embodiment, the interaction environment 110 receives, from the user, a definition specifying a response type associated with a first computer program transmitted, by the user, to the interaction environment. In yet another embodiment, the interaction environment 110 receives, from the user, a definition specifying a response type identifying a third computer program for execution upon user interaction with a second graphical user interface element in the graphical user interface. In some embodiments, the definition is stored. In one of these embodiments, the definition is retrieved and applied to graphical user interfaces displayed during subsequent sessions between the user who provided the definition and the interaction environment 110, or between other users and the interaction environment 110.

During a second session between the user and the interaction environment, the graphical user interface displays the resource and the at least one graphical user interface element formatted responsive to the at least one of the plurality of predefined markers in the resource (step 4206). In one embodiment, during the second session, the graphical user interface displays the resource and at least one graphical user interface element formatted responsive to the at least one of the plurality of predefined markers in the resource. In another embodiment, during the second session, the graphical user interface displays the resource and a second graphical user interface element formatted responsive to the at least one of the plurality of predefined markers in the resource. In some embodiments, the plurality of predefined markers in the resource comprises a computer program, which is executed to display the graphical user interface. In one of these embodiments, the plurality of predefined markers in the resource comprises a computer program, which is executed to modify an element in the graphical user interface.

The user provides an expression (step 4208). In one embodiment, the expression has a semantic structure. In another embodiment, the user provides a string or plurality of words having a semantic structure. In still another embodiment, the user provides a non-textual expression, including, but not limited to, a drawing, an icon, a picture, and an image file. In yet another embodiment, the interaction environment 110 receives the expression from the user as described above in connection with FIG. 2A and 28A-C.

The user interacts with the at least one graphical user interface element (step 4210). In one embodiment, the user interacts with the graphical user interface element to request information retrieval or modification of stored information.

A response to the expression is generated based on an execution of the second computer program identified by the response type specified by the definition received from the user (step 4212). In one embodiment, a user interaction with a user interface element—such as a mouse click on a button element—triggers execution of the second computer program. In another embodiment, programming code executed by a browser on the client 102—such as the execution of a plurality of predetermined markers comprising code written in a markup language—includes a command to execute a second computer program on the server 102 upon interaction, by the user, with a user interface element identified by at least one of the plurality of predetermined markers. In still another embodiment, the expression is transmitted to the second computer program executing on the server 106 with an identification of an expression type of the expression. In yet another embodiment, the second computer program generates a response to the expression based on a response type specified in a definition of the expression type identified as the expression type of the expression.

The response is displayed in a viewable display format, responsive to at least one of the plurality of predefined markers (step 4214). In one embodiment, the response includes an expression that is displayed. In another embodiment, the response includes modified graphical user interface elements. In still another embodiment, the response is displayed as described above in connection with FIGS. 29-35.

The following illustrative examples show how the methods and systems described above can be used for providing person-to-person, high-end design services. These examples are meant to illustrate and not to limit the invention.

EXAMPLE 1

In one embodiment, an interaction environment 110, referred to as a GAD, is a robot or software agent that can learn and store information as users interact with it. Users can interact with a GAD through a variety of media including, but not limited to, chat, email, and short message service (SMS). Since the GAD is a software program, it can also be accessed through Web Interfaces. This example includes both a description of a particular implementation, as well as a description of one embodiment of how this particular implementation can be modified.

GAD Overview

Once logged in the system, the user interacts with a GAD. In this example, the interaction occurs via a chatting service, such as instant messenger. This GAD is both an information repository and, more generally, an environment for interaction. In some embodiments, a GAD may be considered to be a robot, as it stores (or "knows") certain facts but is also "trained" to interact with users. FIG. 2B depicts a screen shot in which a user interacts with a GAD named "roche-gad". A GAD can have any name. In this example, a "default GAD" is created every time a user signs in and this "default GAD" takes the name USERNAME-gad. The screen in FIG. 2B identifies two pieces of data:

- who is logged in (indicated by the "Welcome USER-NAME")
- with which GAD the individual who has logged in (USER-NAME) is currently interacting (indicated by "GAD: GADNAME")

Figure 2F:
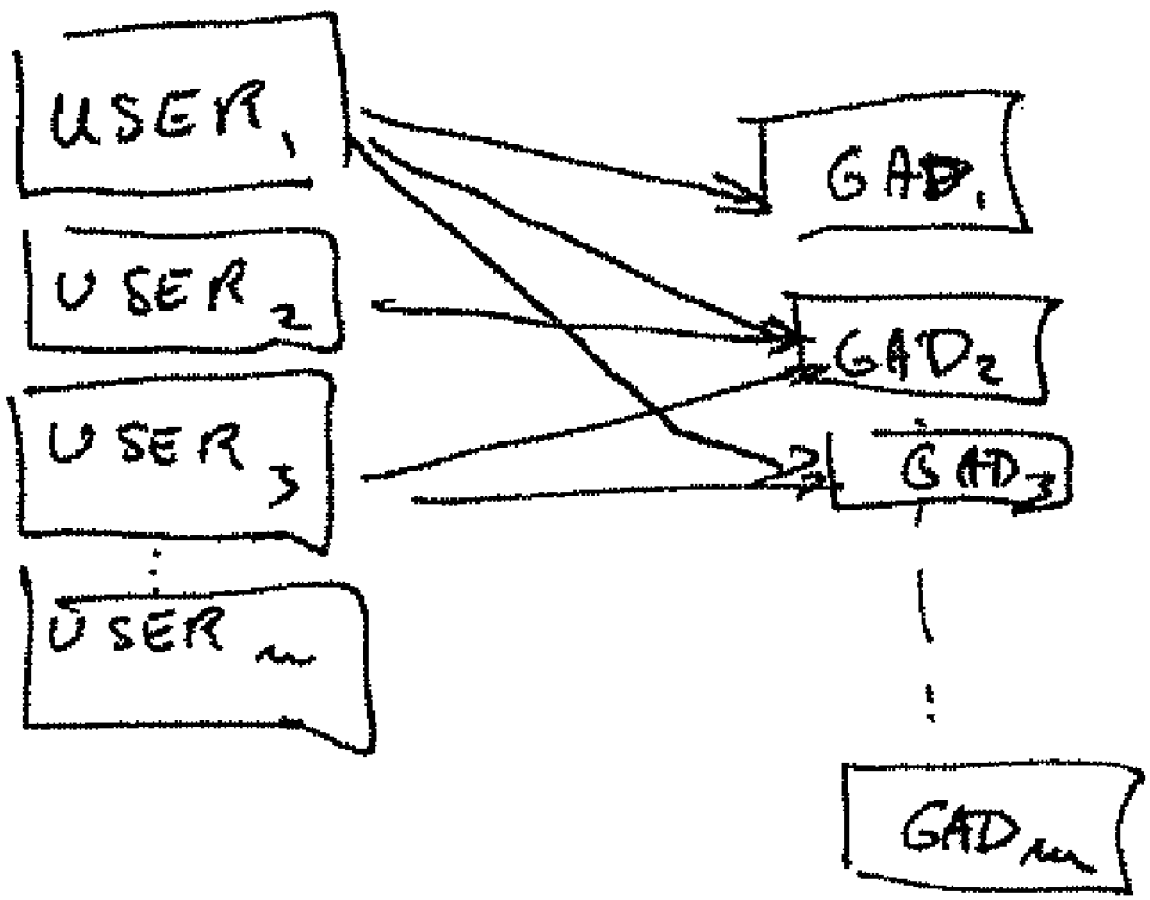
FIG. 2F is a block diagram depicting one embodiment of a number of users interacting with a plurality of systems for processing user input.

FIG. 2F shows that the system may handle an arbitrary number of users as well as an arbitrary number of GADs. Every user can interact with an arbitrary number of GADs in the system (although the set of GADs with which an actual user can interact may depend on particular permissions associated with each GAD).

Referring back to FIG. 2B, the screen shot depicts a user typing the following expression:

Add statement "bill extension is 245"

Figure 29B:
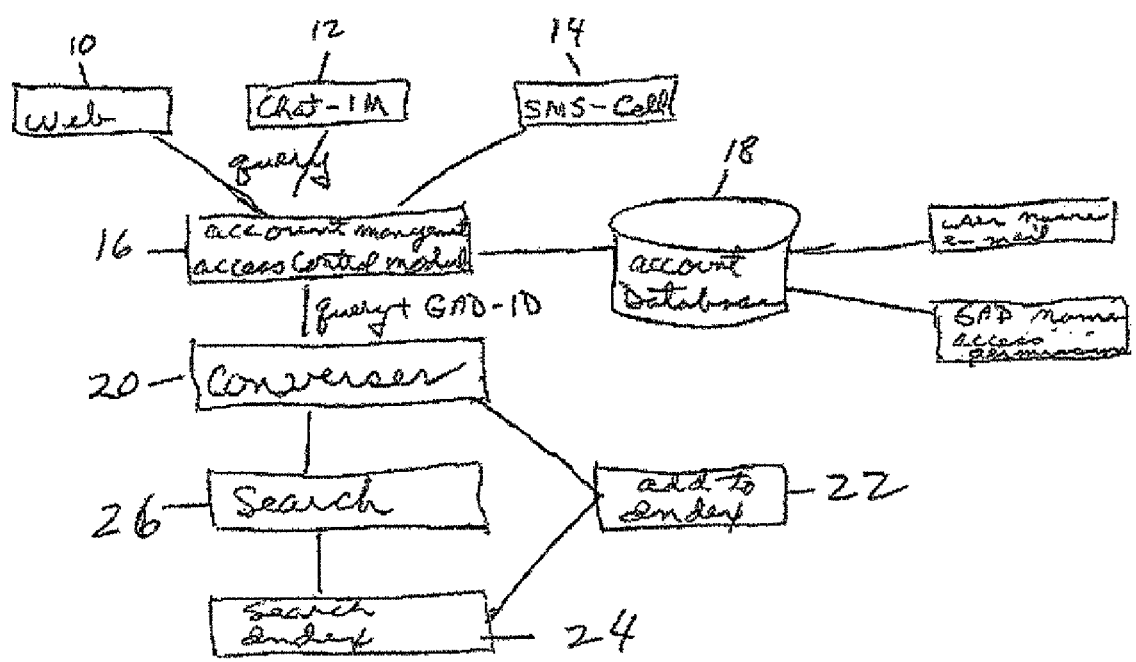
FIG. 29B is a block diagram depicting still another embodiment of a system for processing user input.

When the user presses the Enter key or clicks on the graphical user interface element labeled "SUBMIT", this client machine transmits this expression to the GAD system. FIG. 29B depicts one embodiment of a system for processing this user input.

In one embodiment, the GAD system receives expressions and requests from a "Gateway". FIG. 29B depicts three possible gateways, the WEB Gateway of Box 10, the Chat-IM Gateway of box 12 and the SMS-Call Gateway or box 14. In one embodiment, a gateway is code that receives user input and transmits the received user input to a receiver component within the GAD. In the case of the Web Gateway depicted by FIG. 2B, a gad is provided by a CGI script. In some embodiments, the user input is not only the string typed, but also an identifier of the GAD with which the user interacts and, optionally, an identifier of the user. Another module (box 16 in FIG. 29B) determines whether the user is registered in the system and, if so, whether the user has a level of permission necessary to access this GAD. In some embodiments, this module is optional. In one of these embodiments, a GAD system is an open system and no levels of permission are required (if the information is public or if the whole system is hidden behind a firewall and open to users behind the firewall, for instance). The converser module takes the input string, decides whether it is a request for information or whether it modifies the content of the GAD. In the case of the following string, the input expression includes an explicit command a statement:

Add statement "bill extension is 245"

Figure 43:
FIG. 43 is a screen shot depicting one embodiment of a system displaying an acknowledgement message to a user upon addition of user-provided input to the system.

The input expression contains the explicit command "add statement", which indicates that the part of the input expression in quotes should be added as additional content to the current GAD. FIG. 43 shows that the GAD acknowledges the addition of new content. The statement "bill extension is 245" is stored by the GAD.

Figure 44:
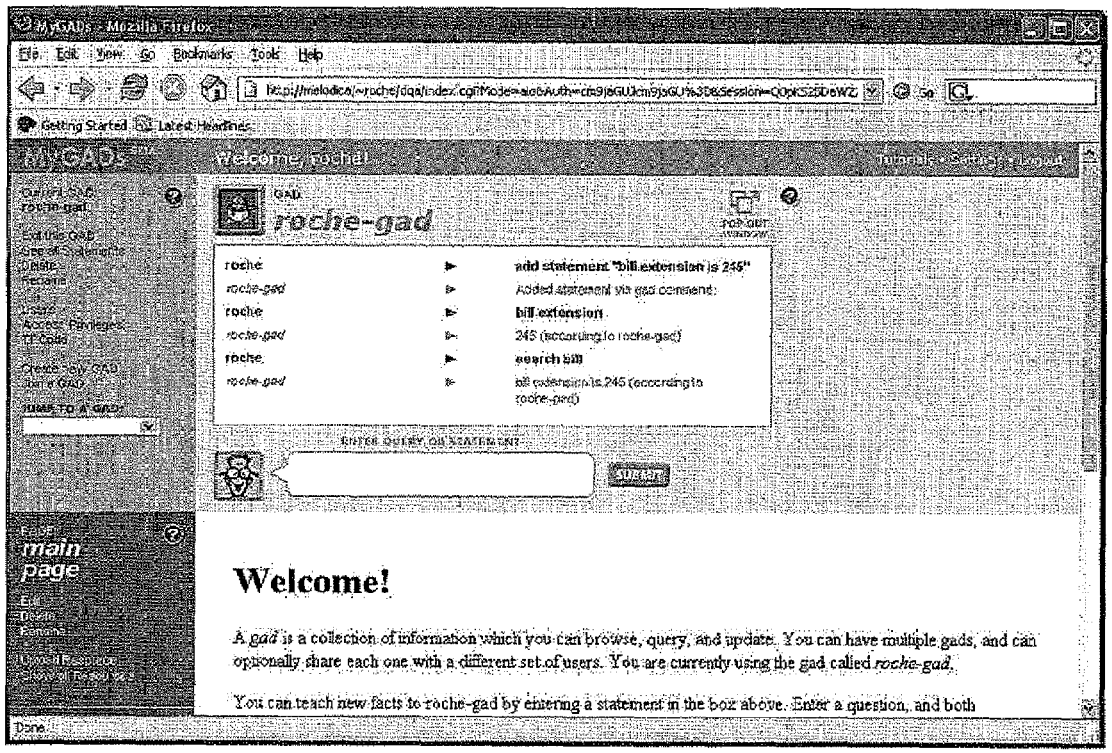
FIG. 44 is a screen shot depicting one embodiment of a system recognizing a request for information within an expression.

At this point, the information can be retrieved by anyone having access to the GAD. FIG. 44 shows that by typing "Bill extension", the system recognizes a request for information and produces the answer. In some embodiments, the system recognized an implicit request for information (based, for example, on the linguistic pattern or the word order of the query). In other embodiments, the user may explicitly search for relevant information as shown on FIG. 44 where the user explicitly enters a request ("search bill").

Figure 45:
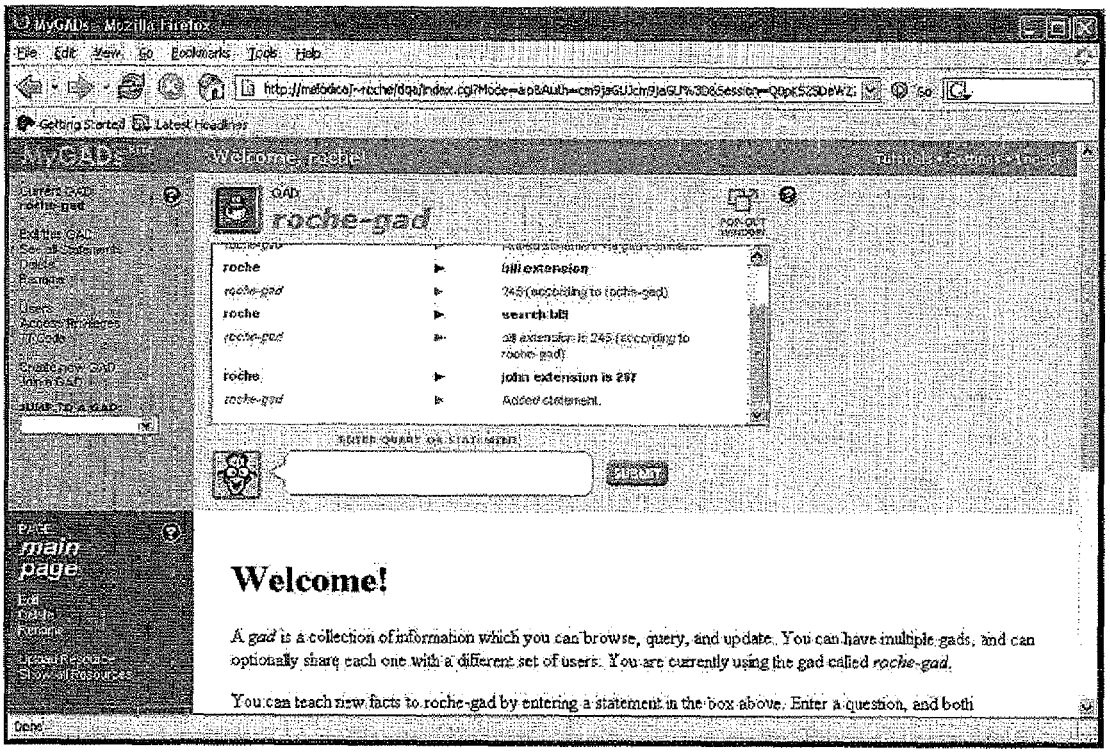
FIG. 45 is a screen shot depicting one embodiment of a system recognizing an implicit command to add an expression to the system.

Similarly, the addition of information can be done either explicitly or implicitly. The "Add statement "bill extension is 245"" expression described above was an example of an explicit addition of information. FIG. 45 shows an example of an implicit addition of information including the following string:

John extension is 267

Figure 46:
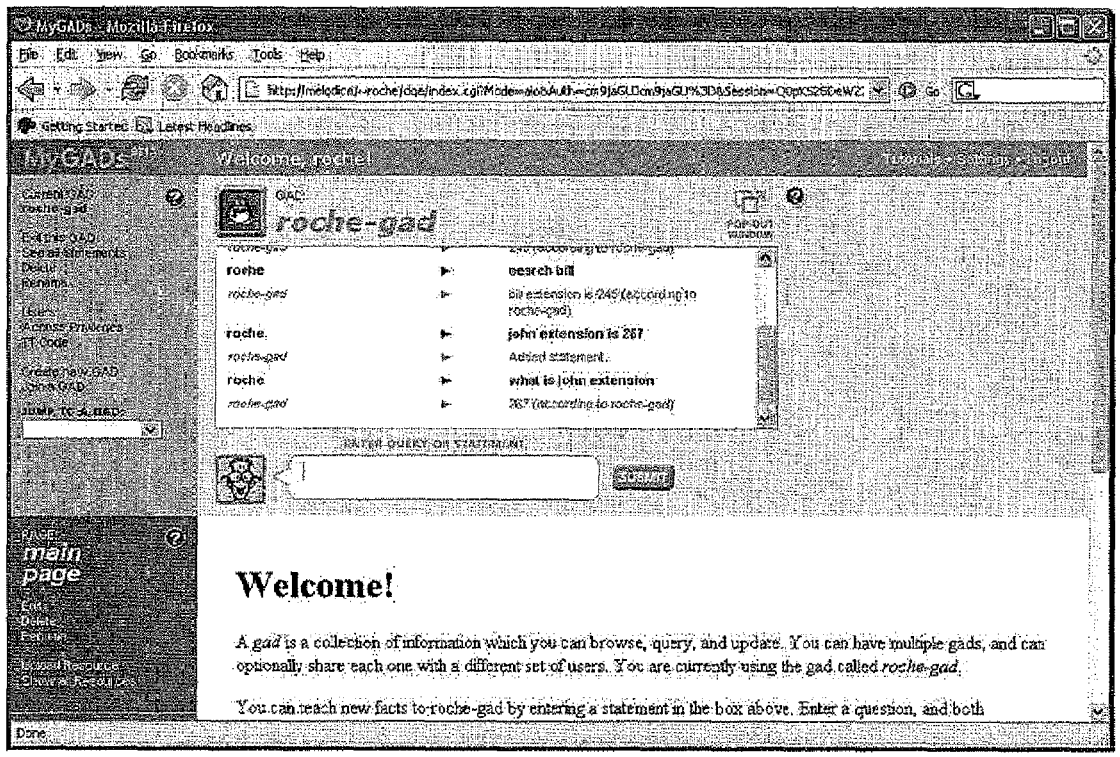
FIG. 46 is a screen shot depicting one embodiment of a system retrieving information requested in a natural language question.

FIG. 46 shows a screen shot in which information added by a user, either explicitly or implicitly, can be retrieved by explicit or implicit questions.

Figure 47:
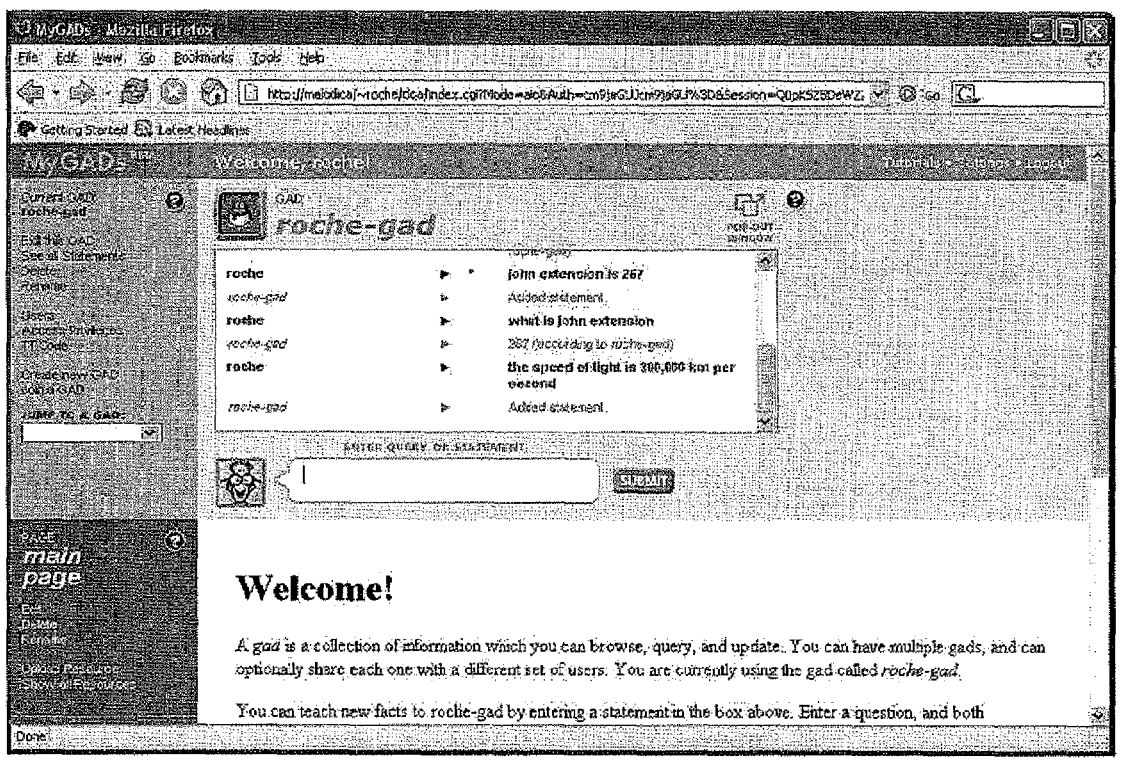
FIG. 47 is a screen shot depicting one embodiment of a system for storing user-provided information.

GADs can be used to store user-specific information (contact names, birthday dates, etc.) as well as general statements of fact. For instance, FIG. 47 shows the storing of a universal constant of the physical world. FIG. 48 is a screen shot depicting retrieval of this information using the same method that allows a user to retrieve personal information. FIG. 48 shows that GAD can be used in a wide variety of situations: storing personal information, storing completely public and universal information, storing a combination of the two, and so on. For example, a user could create a GAD storing information related to a family, sport team, working group, company, interest group, and so forth.

Referring back to FIG. 28B, a flow diagram depicts one embodiment of the steps taken by the converser. The converser identifies a type of user input, for example, identifying the user input as an information request or as input which modifies the content of the GAD. In the embodiment depicted by FIG. 28B, the information is stored in a search index. However, the information could also be stored in a database, such as a relational database. In some embodiments, the converser decides whether to ask for information or add information based on various sequence of tests. In one embodiment, the converser proceeds sequentially through the following four steps for each user input:

1. Is it a formal command? The converser has a list of predefined key word or key word sequences such as search, add statement, and list statements. The converser behaves in a predefined way upon identification of a predefined key word. In one embodiment, if a formal command is recognized within an expression then the converser does not proceed to the next steps.

2. Is it a question with an answer? As a second step, the converser will execute a question-answering method to recognize questions in expressions such as "what is bill phone number" and "who discovered electricity." The converser will also recognize implicit questions. Implicit questions are typically noun phrases that do not look like questions but that implicitly request information. For instance, if a user types "bill extension", the system interprets this as a request for information, namely what is the extension of bill. This is different from a noun phrase such as "green book," which would not be understood as a question. A process for recognizing a question is described in additional detail in U.S. Published Application No. 2004/0117352 published Jun. 17, 2004, titled "System for Answering Natural Language Questions," which is incorporated herein by reference. If the converser identifies the expression as a question with an answer, then the system can decide to stop the processing of the input there. In other embodiments, the converser continues to process the next steps.

3. Does running the user input as an exact phrase match return any GAD content? At this point, the converser performs a search using the expression entered by the user explicitly as provided by the user. For example, if the user types "bill phone extension", the search query will be exactly that phrase. In one embodiment, if a statement have only two or the three words, or if the three words are not exactly in sequence provided by the user, then the statement will not be matched with information stored by the GAD. The default type of search query, an exact phrase match, could be modified to allow a different query type (for example, by allowing modification of the phrase to include an "AND" between words, or to allow for a match with a phrase that includes the words of the user-provided phrase but with possible words interspersed, or any other query type). Another possible behavior is to constrain the search to have at least two words in a search phrase or to have more than a predefined number of words in a search phrase. For instance, if the user enters a single word, then the search is not performed. If there is no content matching the user input at this point, the system can decide to proceed to the final step.

4. Is the input recognized as an implicit request for adding information to the GAD? For instance, when analyzing the user input described above, "John extension is 267", the system may recognize the linguistic pattern NOUN_PHRASE IS NOUN_PHRASE and decide that this is a statement that should be added to an information repository. This sequence of 4 steps is by no means a necessity to a GAD system. It is merely one embodiment of GAD behavior, which may be customized both system-wide and at the level of any particular GAD or user. FIG. 28C describes possible sequences. For instance the sequence "Start 1 end" indicates that the GAD interaction will only respond to predefined commands whereas the sequence "Start 3 4 end" indicates that the system will only try explicit phrase search and recognizing statement additions. FIG. 28C does not attempt to show all possible combinations, but shows that there are many other meaningful way for the converser to decide what action to take.

User Permissions

In the previous section, different levels of permissions for GADs were described. Users creating a new GAD may want to restrict access to the GAD to themselves or to a group of people whom they trust. Additionally, a user deciding to grant access to a GAD to a large number of people, may choose to specify a level of access—for example allowing them to only access the information but not to modify it.

In one GAD configuration, a GAD will be a "private" GAD upon creation, allowing only the creator of the GAD to access information stored by the GAD (both for reading and writing). As described above in connection with FIG. 2C, however, the user may choose to set different level of permissions, including:

public read, which allows anyone to access the GAD and read the information but only allowing a creator of a GAD to modify GAD-stored information;

public write, which allows anyone to access the GAD and to modify the content;

public admin, which is a type of public write access. In addition, however, anyone can change the permissions and modify or delete the GAD.

If a user chooses the "Private" setting for GAD access privileges, the user still has the option of allowing a particular group of people to access the GAD. FIG. 19B shows a screen shot of window in which a user can add any number of additional users to a particular GAD. Each user may have either a "read", "write" or "admin" permission level. Although not depicted in FIG. 19B, a GAD system could also provide "user groups" (similar to traditional UNIX user groups) to make the permission levels easier to manage.

Once invited, the gad will be part of a user's "JUMP TO A GAD" pull-down menu. To request access to a public GAD, a user may click on a "Join a GAD" hyperlink and type in a GAD name, as shown in FIG. 19C.

Multiple Conversations

When a user interacts with a particular GAD, the converser creates an object called a conversation. A conversation is an object that stores particular elements of what is happening to the conversation. For instance, it may store the user's last query or queries, the last answer provided to the user, or anything relevant to the current interaction. The name conversation reflects the fact that this object stores data related to the current conversation. In some embodiments, this results in the following:

different users interacting with different gads will use distinct conversations when a user logs out and then back it will lose the initial conversation and have another one created FIGS. 2D and 2E show how a conversation object stores information about the current interaction. In FIG. 2D, a user makes a request that generates more answers than can be displayed. In the FIG. 2E, the user types "more" to request a display of more answers. Because the conversation stored the last question and stored how many answers it already displayed, the system knows that it needs to display the previously-undisplayed answers generated responsive to the previous request.

A conversation can store complex data. A conversation can store a Virtual Machine (VM) state of a programming language embedded within the converser. The size of the conversation object need not necessarily be small or null.

When a user starts interacting with a given GAD, a conversation is assigned to this interaction. A logged-in user will have a session-key associated to them and when the user starts using a new GAD, a conversation will be associated with this session key. FIG. 49 displays pseudo-code for allowing a converser process to handle multiple conversations.

In this pseudo-code, the input is a session-key and a gadid. On line 1, it checks whether the converser C contains a conversation associated with the current session key. If yes, it simply returns it. Otherwise (line 3), it checks whether there is a conversation which is currently not used inside the converser. If yes, it associates this conversation with the current GAD and the current session-key. Otherwise (line 6), it tries to create a new conversation which is then bound to the current GAD and the current session key. Otherwise (line 10) it means that the converser is unable to create a new conversation (because no more memory is available for instance or because a preset maximum number of conversation per converser has been reached. In that case, it will take the conversation that has not been used for the longest period of time and reassign it to the current GAD and the current session ID. This last part may terminate a conversation used by another user but it gives a mechanism for the system as a whole to be responsive under heavy usage. Obviously, other heuristics are possible: for instance, the system could refuse to create a new conversation until somebody else in the system releases one.

Failover

This is section addresses a system including failover functionality to minimize loss of data and to enable users to interact with GADs, even if a particular server becomes unavailable.

Figure 50:
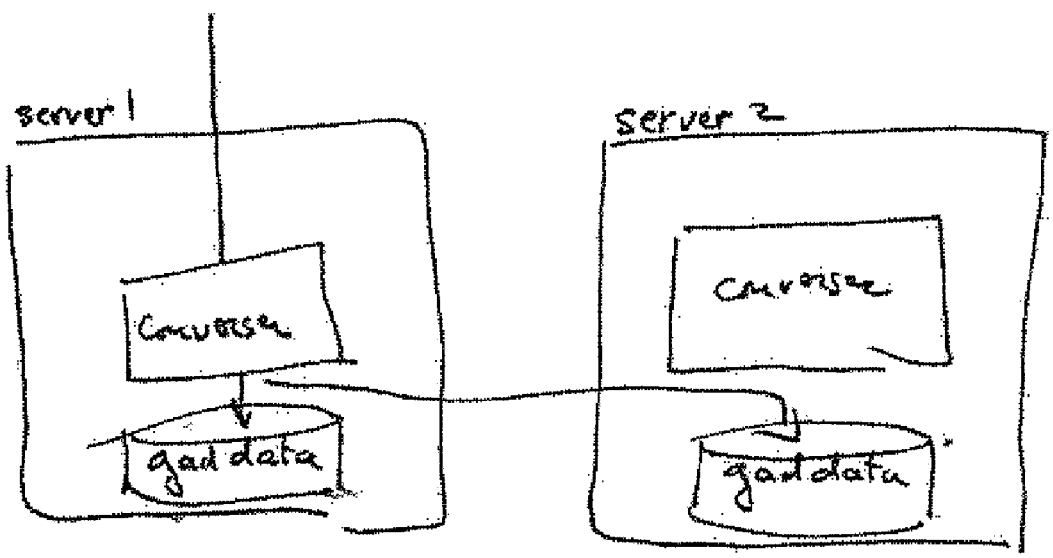
FIG. 50 is a block diagram of one embodiment of a system providing failover functionality by servers processing user input.

FIG. 50 shows a converser on one server saving data associated with a GAD on another server. In one embodiment, the servers are functionally identical and provide the following advantages:

multiple user will be able to access either server which will distribute the computing load;

if one server fails (due to a hardware failure, for instance), the other server will be able to process user requests and the data associated with GADs provided by the failed server will not be lost.

Figure 51:
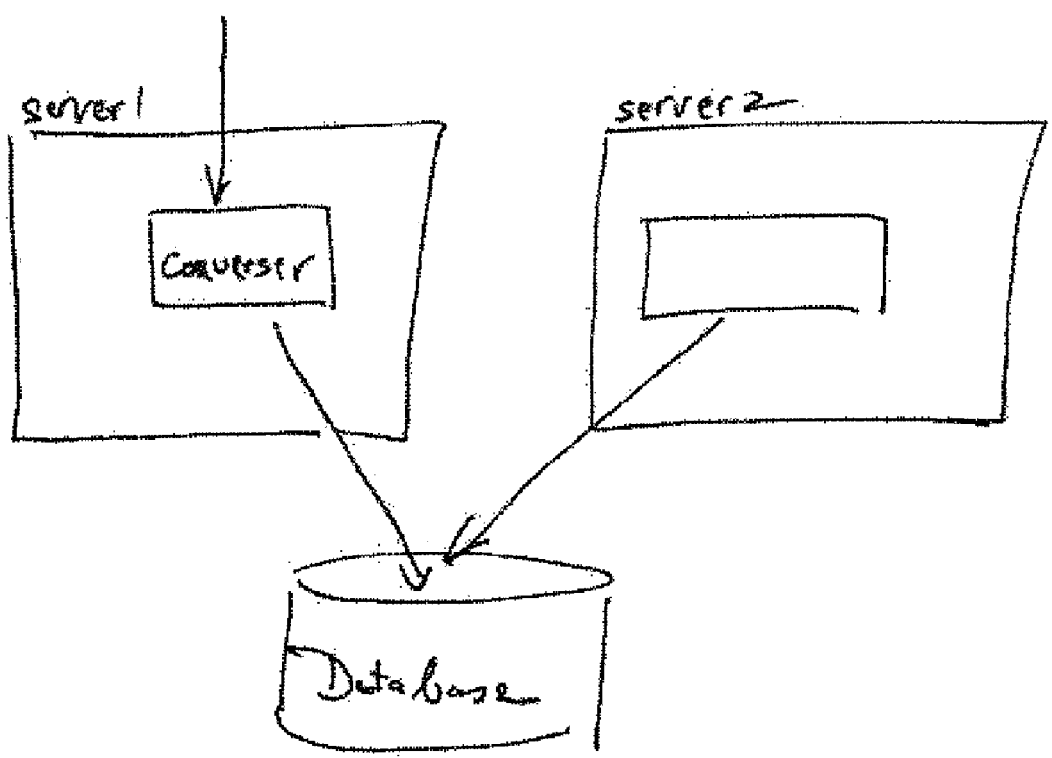
FIG. 51 is a block diagram of one embodiment of a system for accessing, by a server processing user input, a central database.
Figure 52:
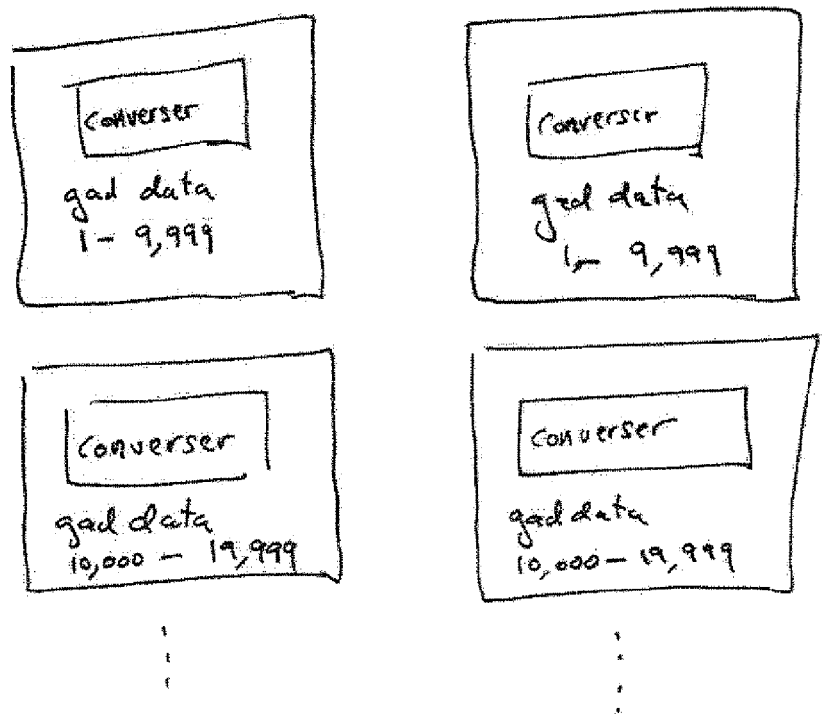
FIG. 52 is a block diagram depicting one embodiment of a server farm providing redundancy and scalability in a system for processing user input.

FIG. 51 depicts conversers accessing GAD-related information stored in a central database. FIG. 52 depicts a scalable system. As shown in FIG. 52, the information associated with GADs numbered 1 through 9,999 is stored on the first two servers (for redundancy and failover) while the data associated with GADs numbered 10,000 through 19,999 is stored on the next pair of servers. It is therefore possible to scale the deployment of the system to support any number of GADs, regardless of the total amount of information being stored.

User-GAD Persistent Information

A GAD can store information associated with a given user, such as nickname or profile. This is different than the user profile within the whole system. For instance, a user could have a different nick-name when addressed by different GADs. This reflects the fact that a GAD emulates a virtual user.

Publishing Through Resources

Format Conversion

The GAD system provides multiple ways to add information to a GAD and also multiple ways to look at it. A user can add information by chatting with the GAD. The GAD system allows users to write or upload documents, called resources. Once these documents are uploaded, they are stored as-is (although users may modify them later) and then the GAD analyzes them. The analysis consists of several steps including the extraction of individual statements or pieces of information from the resource. These pieces of information are then also stored independently and can be used to answer question in the same manner as is the statement had been added through a chat session.

FIG. 31B shows that the user can choose his/her preferred format to publish documents.

Figure 53:
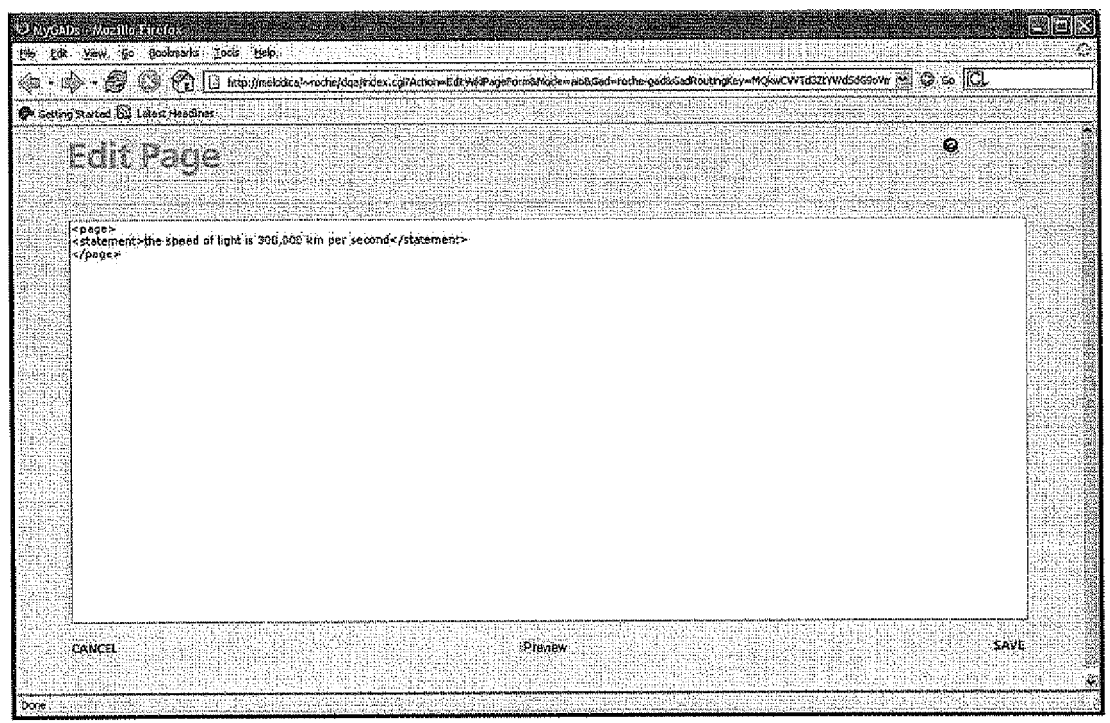
FIG. 53 is a screen shot depicting one embodiment of a user interface for receiving a user-provided resource.
Figure 54:
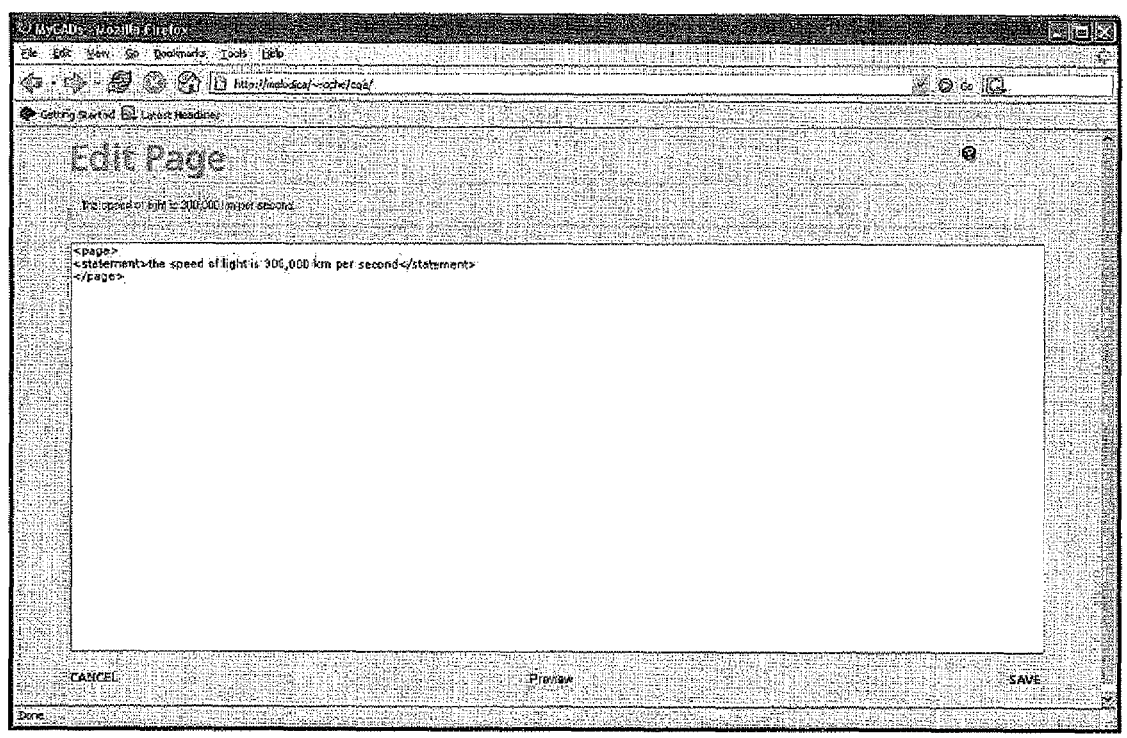
FIG. 54 is a screen shot depicting another embodiment of a user interface element including a preview of a display of user-provided input.

FIG. 31A and FIG. 53 show that an XML page can be used to add one or multiple statements to the information repository of the current GAD. This is particularly useful is the number of statements to be maintained is large (thousands for instance). Each page can also be displayed in the Web interface and the "Preview" button allows the user to see how the page would be displayed before actually processing (see FIG. 32 and FIG. 54).

Figure 33:
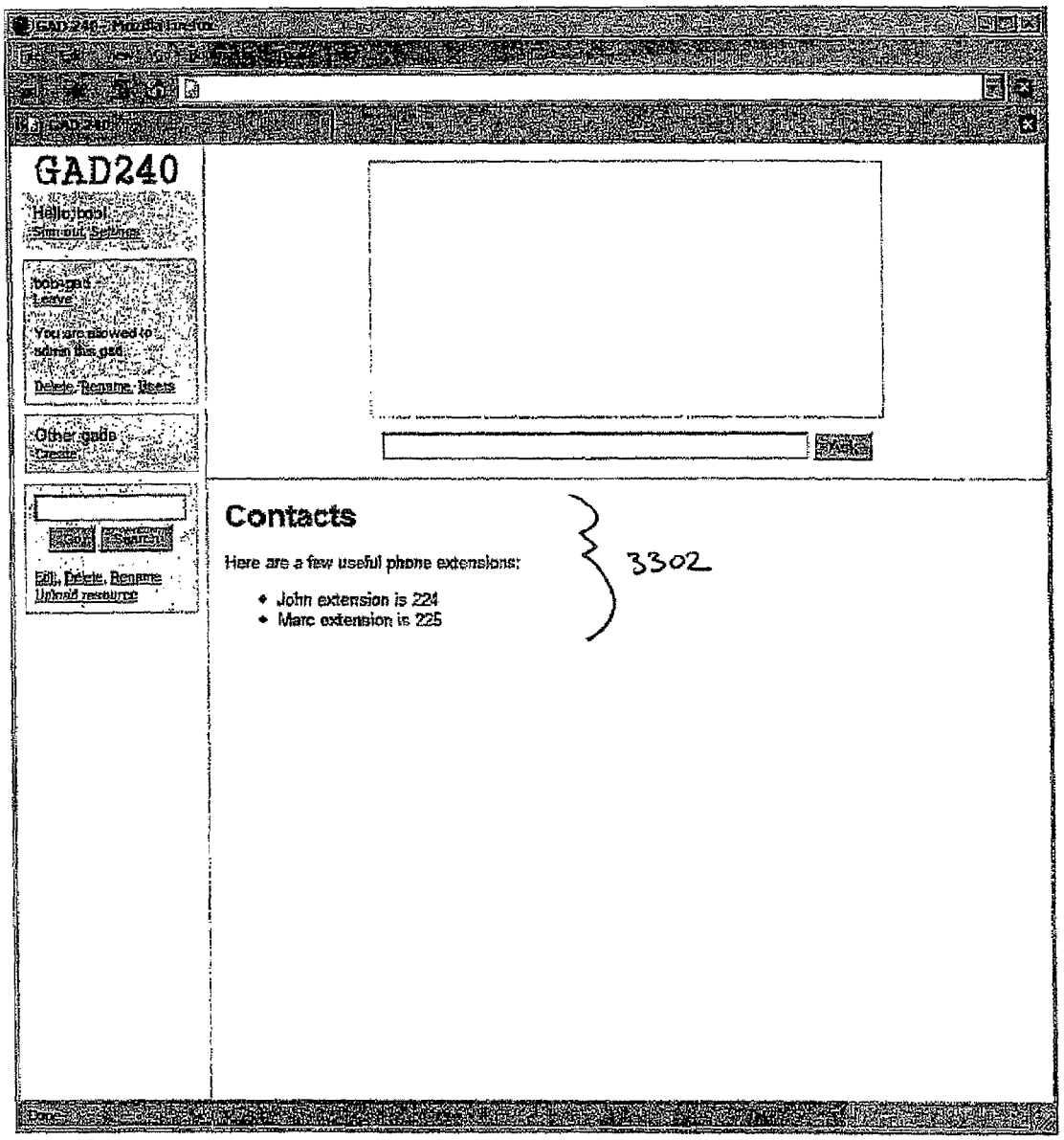
FIG. 33 is a screen shot depicting one embodiment of a user interface element for displaying a page generated based on submitted user-input.
Figure 55:
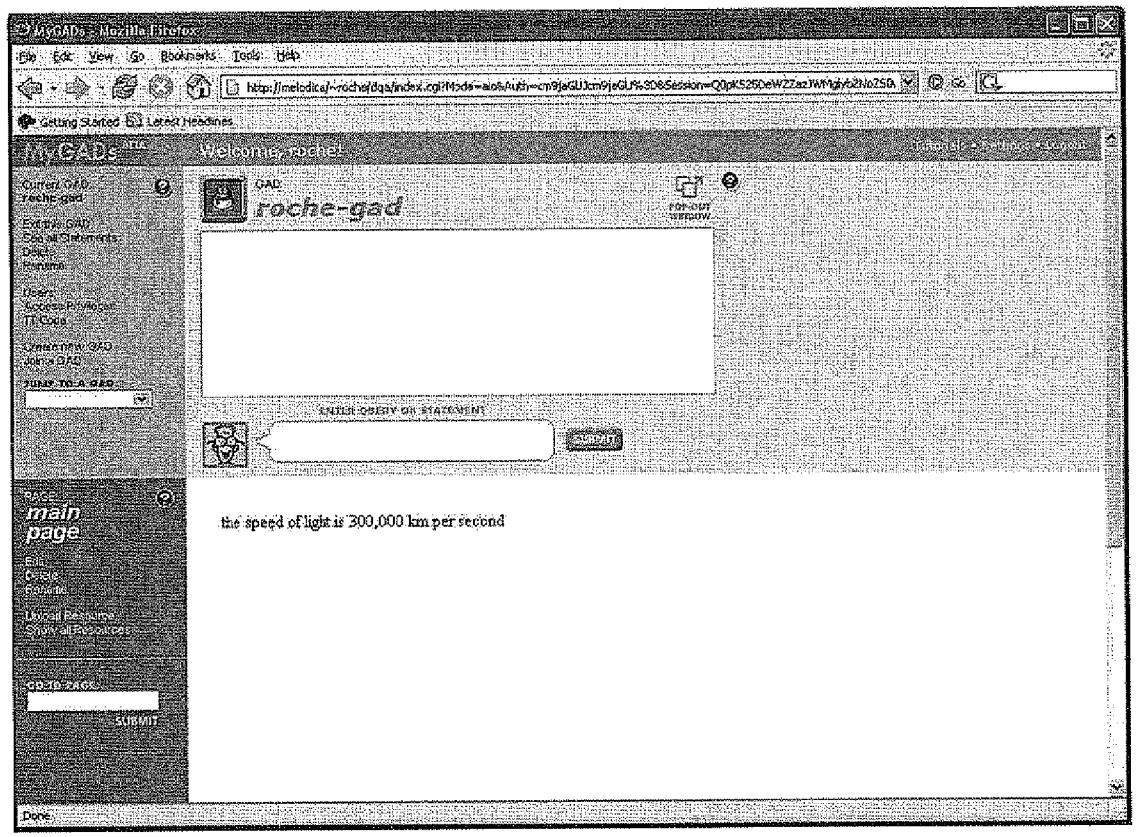
FIG. 55 is a screen shot depicting another embodiment of a user interface element for displaying a page generated based on submitted user-input.
Figure 56:
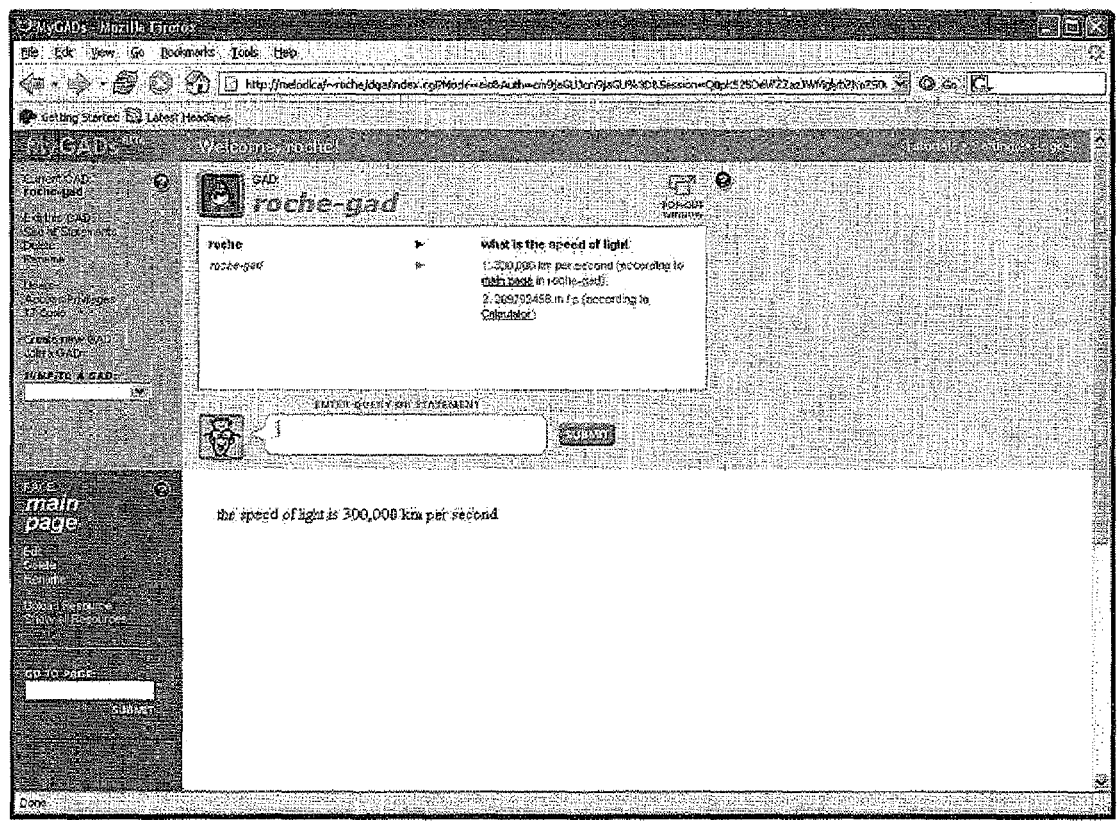
FIG. 56 is a screen shot depicting another embodiment of a user interface element for requesting from an interaction environment retrieval of user-provided input.

FIG. 33 and FIG. 55 shows how the page is displayed once a user has clicked on the "Save" link. At this point, the statements (or, as in that example, the single statement) are also part of the set of statements in the system. FIG. 34 and FIG. 56 show that such a statement is immediately available through the chat-like interface. So if the user types (as in FIG. 56) "what is the speed of light", the system will be able to produce the answer from the statement added through the just published page.

Figure 57:
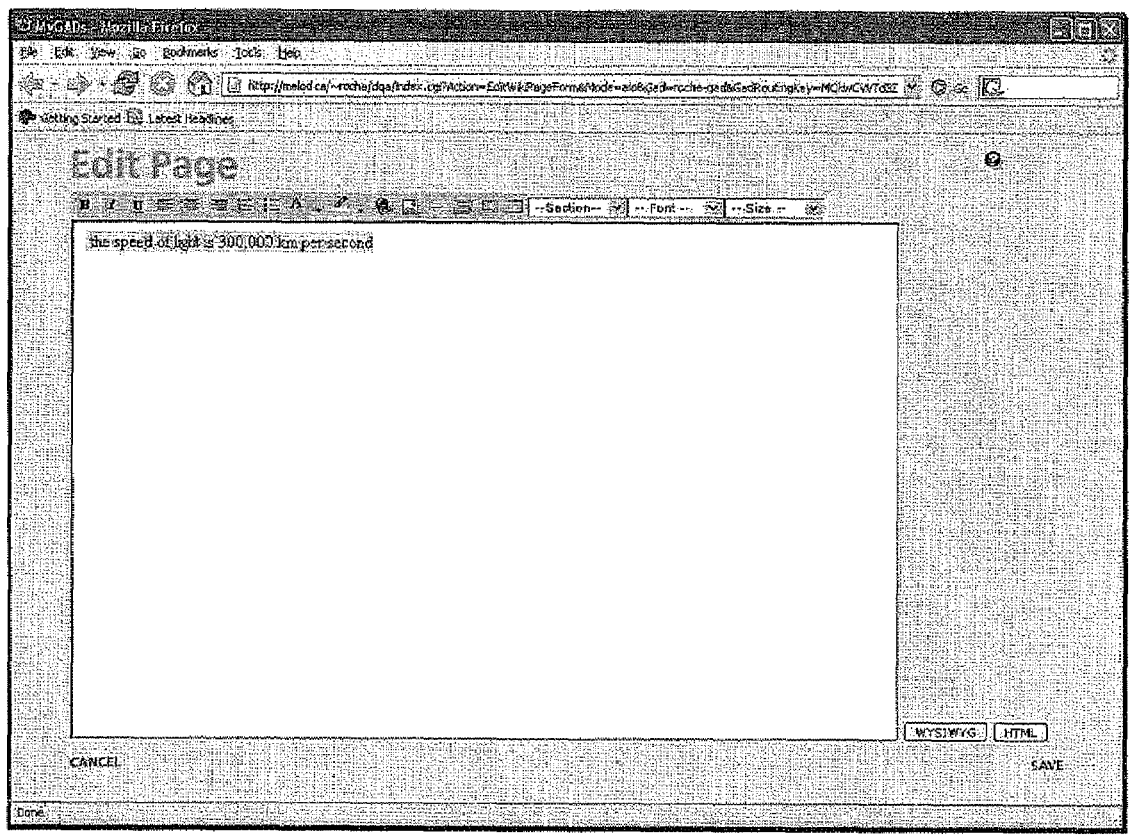
FIG. 57 is a screen shot depicting an embodiment of a what-you-see-is-what-you-get (WYSIWYG) user interface for receiving a user-provided resource.
Figure 58:
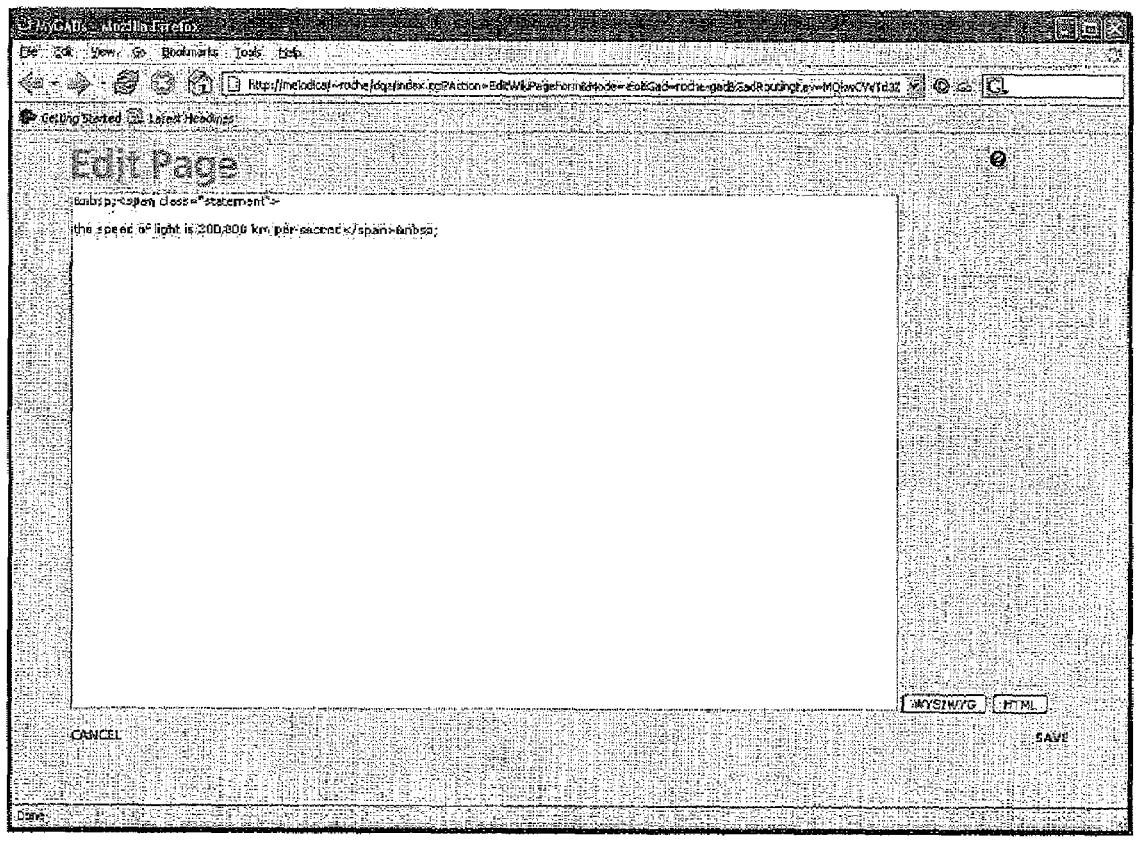
FIG. 58 is a screen shot depicting an embodiment of a hypertext markup language (HTML) user interface for receiving a user-provided resource.

FIG. 57 and FIG. 58 show that the same page can also be edited through a WYSIWYG editor or through HTML. In HTML, the tag "span" is used to indicate statements but could also be used to indicate any GAD specific content.

Figure 59:
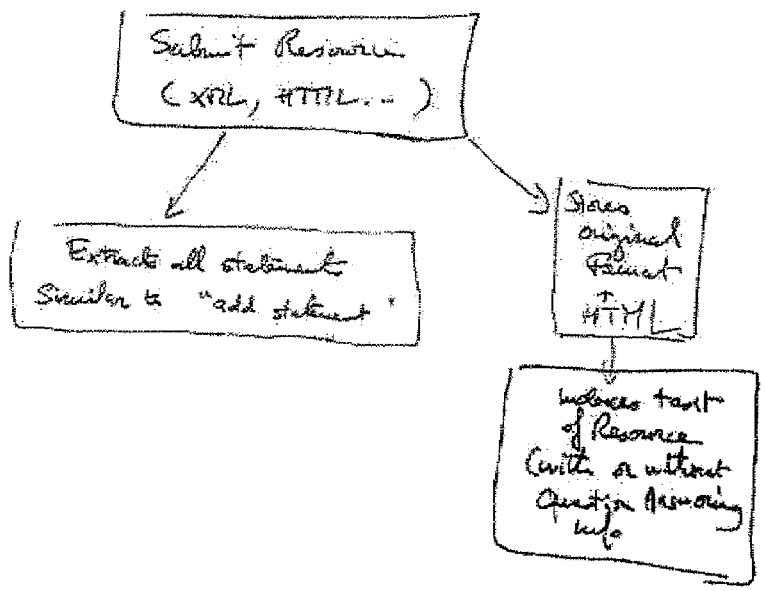
FIG. 59 is a flow diagram depicting one embodiment of the steps taken in a method for publishing a page including user-provided resources.

FIG. 59 shows what happens when a new page is published (whether it's an XML page or an HTML page). The system extracts all the statements from the page and adds them to the GAD as if the user had typed "add statement" for each single statement. The GAD system will also store the original page such that it can be visualized and modified. In addition, the page itself is indexed such that it becomes searchable. This indexing can include the type of indexing used by question-answering systems. In many instances, the page is an HTML page and may or may not contain any explicit statements. In those instances, the page is still useful because it can be displayed and is searchable.

Figure 60:
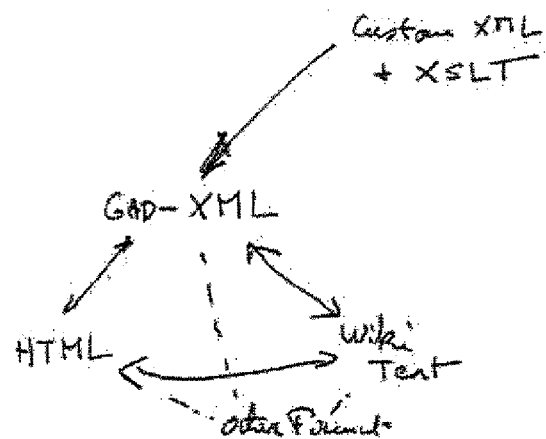
FIG. 60 is a flow diagram depicting one embodiment in the steps taken in a method for transforming a document from one format into a second format.

FIG. 60 shows a document can be published first in one format and then transformed into another one. For instance, the format could be XML (described as "GAD-XML" in the figure) and could then be transformed into HTML and then edited as a HTML document. Alternatively, a Wiki-like format could also be used. The same figure also shows that users could define their own format (noted "Custom XML") and also submit the means to transform this custom format into the regular GAD-XML format. This transformation can be specified using the XSLT format which can be used to map a XML into another XML.

Figure 61:
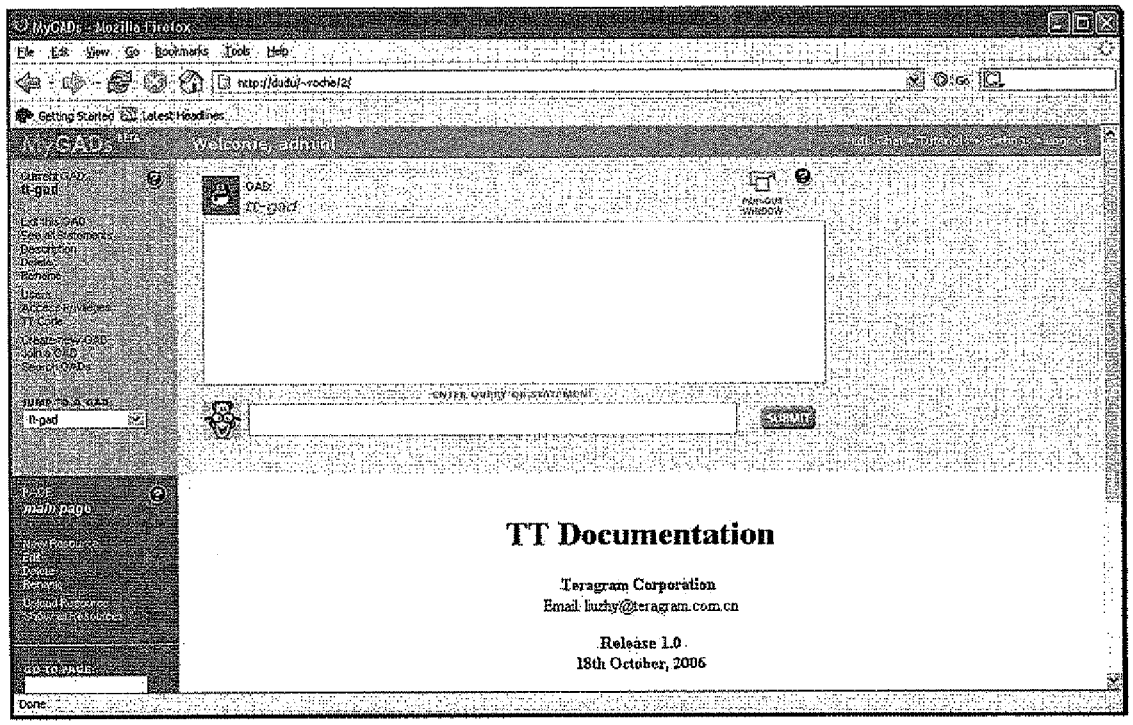
FIG. 61 is a screen shot depicting one embodiment of a user interface for receiving user-provided input.
Figure 62:
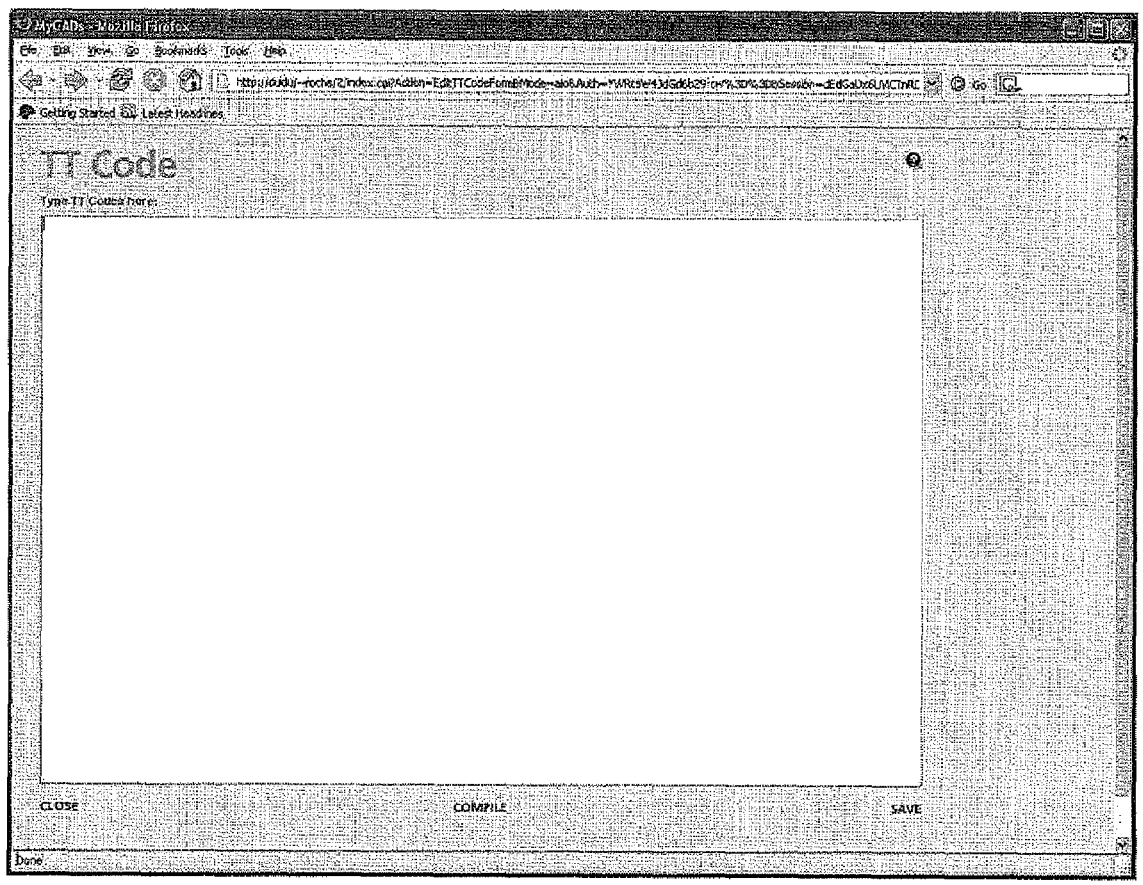
FIG. 62 is a screen shot depicting one embodiment of a user interface for providing, by a user, programming code.

Permissions at the Resource Level
TT: A Programming language for GADs
TT Overview One feature of the GAD system is that it is possible for user to specify code, which can then be executed on the GAD servers based on user-input. FIG. 61 shows one embodiment of a standard view of a GAD. Note the "TT Code" link on the left of the page. When the user first clicks on this link, the system displays the screen shown in FIG. 62. At this point the user (assuming the user has the necessary permission level for this GAD) can enter code in a programming language. In one embodiment, the system expects to receive code written in a particular programming language called TT (which has been designed to simplify the customization of GADs).

Figure 63:
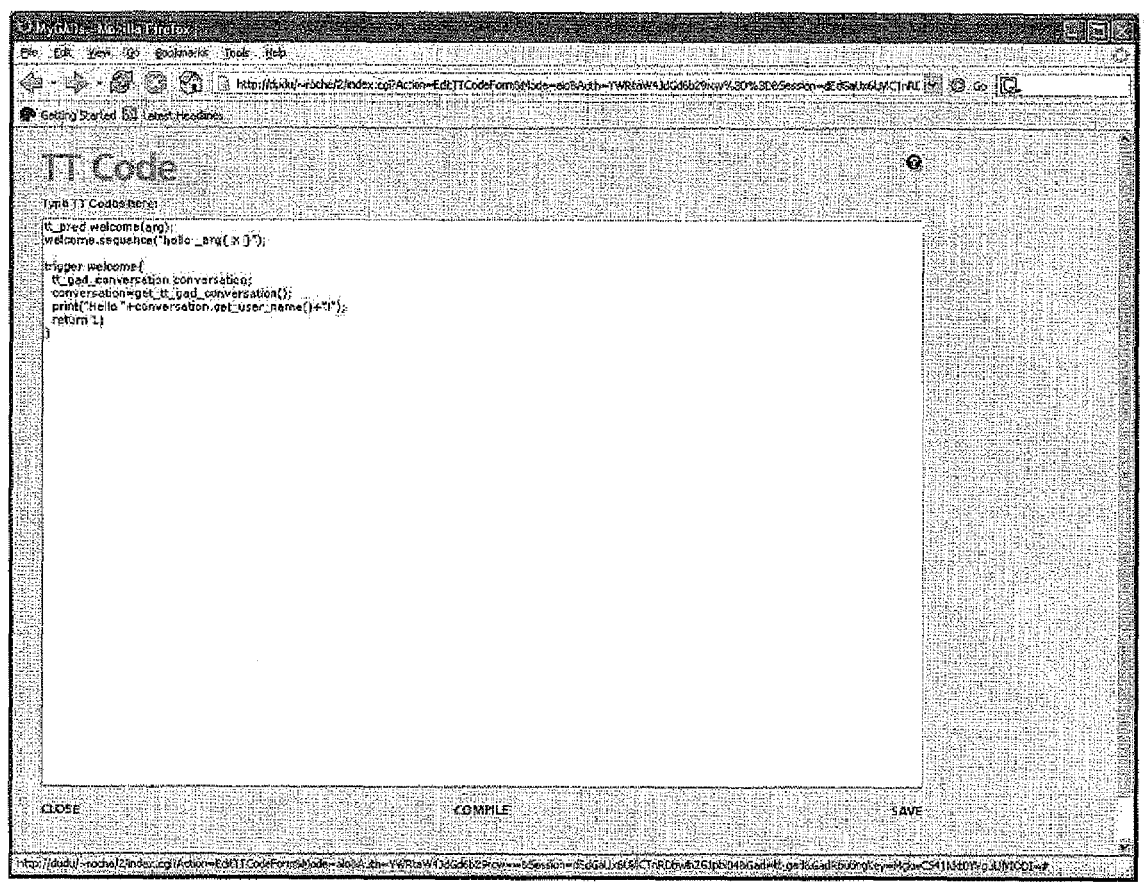
FIG. 63 is a screen shot depicting one embodiment of a user interface element into which a user has provided programming code.

FIG. 37A and FIG. 63 depict embodiments in which a user has entered some code. In FIG. 63, the code is the following:

```
1  tt_pred welcome(arg);
2  welcome.sequence("hello _arg{ X }");
3
4  trigger welcome{
5    tt_gad_conversation conversation;
6    conversation=get_tt_gad_conversation( );
7    print("Hello "+conversation.get_user_name( )+"!");
8    return 1;
9  }
```

This code is designed to allow the following behavior. When a user types "hello", followed by any other text, the GAD system will recognize that this should trigger a particular action. In the embodiment displayed by FIG. 63, the action will simply be to answer back "hello" followed by the user name. The program code shown in FIG. 63 defines a predicate, which describes a particular type of user input. In that embodiment (see line 1), the predicate is called "welcome" and it only has one argument called "arg". Line 2 says that this predicate should be recognized each time the user types the word "hello" followed by any sequence of words (X stands for any sequence of words). In addition, when such an input is detected, the words following the keyword "hello" will be stored in the predicate argument called "arg" (marked by the "_arg{" and "}" symbols). The code associated to the predicate "welcome" is listed between lines 4 and 9. The key word "trigger" indicates that "welcome" is the predicate that should trigger this particular code. Lines 5 and 6 provide a pointer to the current conversation (which contains information related to this particular interaction user-gad). In particular, the conversation contains the name of the current user which can be recovered by the method call "conversation.get_user_name". Line 7 writes back "Hello", followed by the name of the current user. Line 8 indicates that the code associated with the current trigger has been executed without errors.

Figure 64:
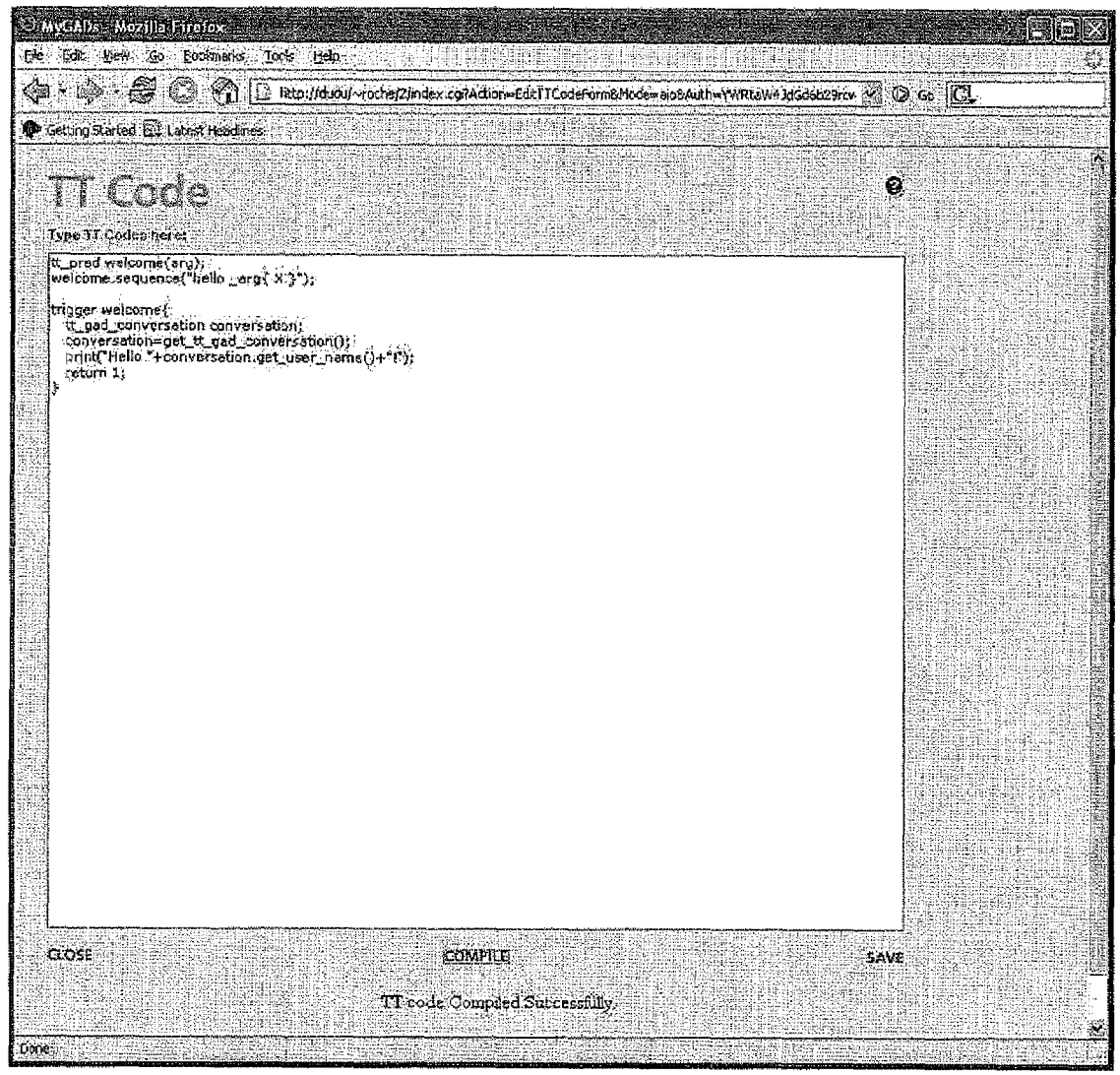
FIG. 64 is a screen shot depicting one embodiment of a user interface displaying to a user an acknowledgement message confirming compilation of user-provided programming code.
Figure 65:
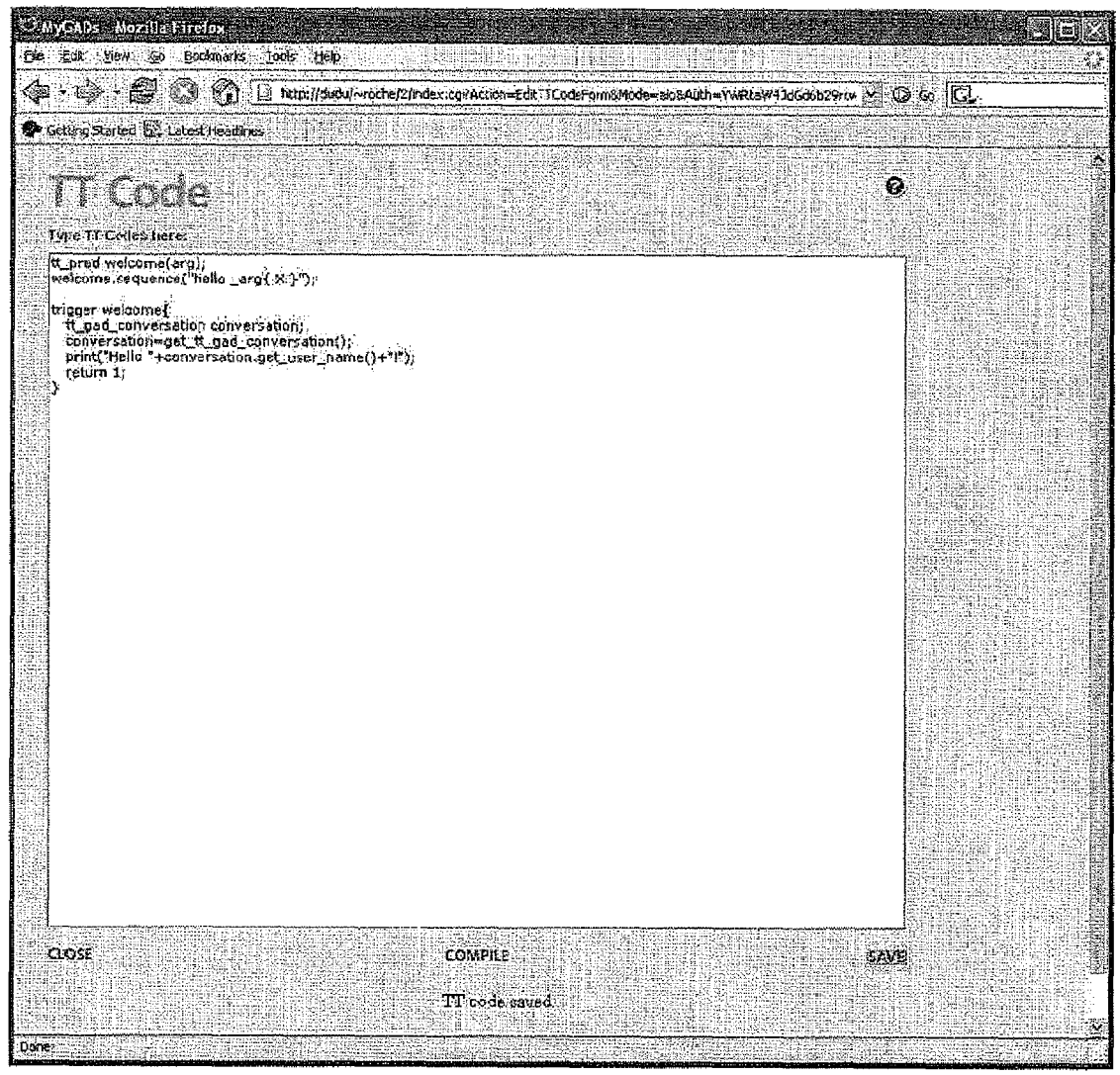
FIG. 65 is a screen shot depicting one embodiment of a user interface displaying to a user an acknowledgement message confirming storage of user-provided programming code.

FIG. 64 shows the screen once the user clicks on the "COMPILE" link. At this point the server just looks for potential errors. The user can then click on the "SAVE" link and see the screen of FIG. 65.

Figure 66:
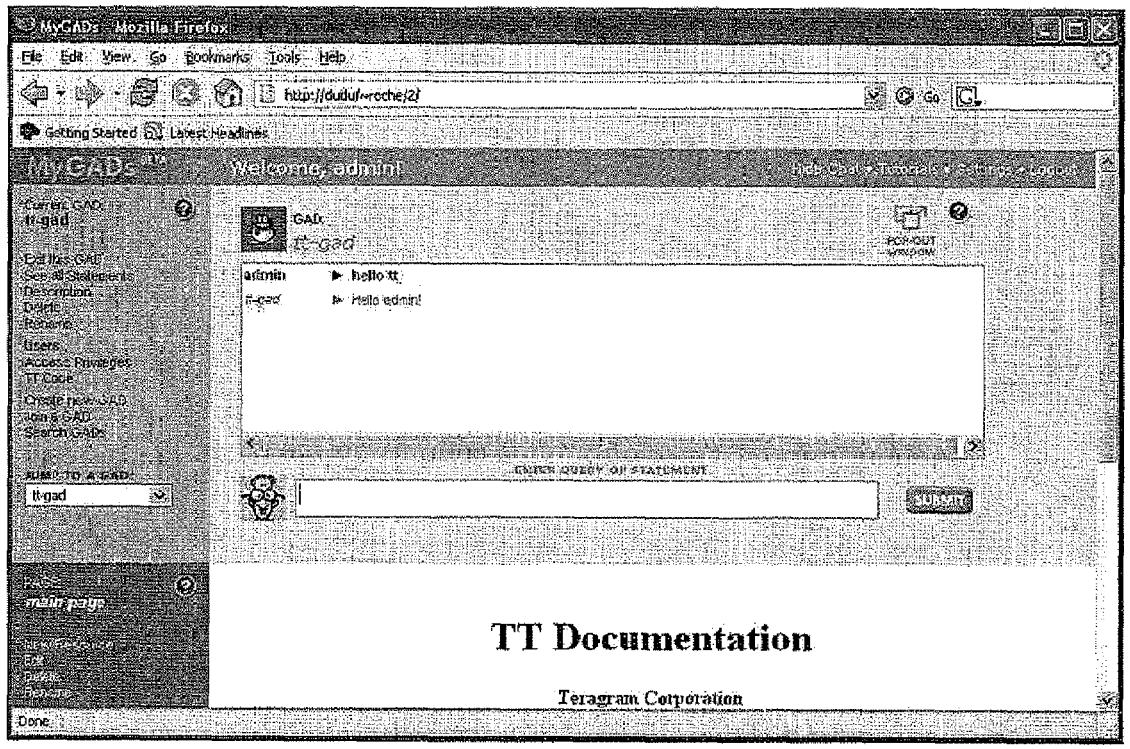
FIG. 66 is a screen shot depicting one embodiment of a user interface element displaying to the user an output resulting from execution of user-provided programming code.

At this point the program is loaded in GAD server (in the case of TT, a compiled version of it is loaded) on the GAD servers and next time the user types any input it will be compared against all possible predicate. FIG. 66 shows that if the user types something like "hello tt", it triggers the TT code that was just typed, which results in the prompting back of "Hello admin!" (note that "admin" is the user name in that case).

Accessing TT Directly Through the Chat-Like Interface

Rather than going through the "TT Code" link as described above, it is also possible to type code interactively within the chat-like interface by first typing the line "switch tt" and then to go back out of the programming environment by simply typing "exit". For instance, the following sequence of instructions shows how this interaction can take place:

```
switch tt
tt code line 1
tt code line 2
tt code line n
exit
this is a cat
```

EXAMPLE 2

JavaScript-GAD Integration

Introduction

This example describes an embodiment of a GAD system hosting a fully GUI-enabled application. In one embodiment, a complete GAD application contains two distinct pieces of programming code:

```
some JavaScript code intended to run on the browser; and
some TT code running on the GAD servers
```

Figure 67:
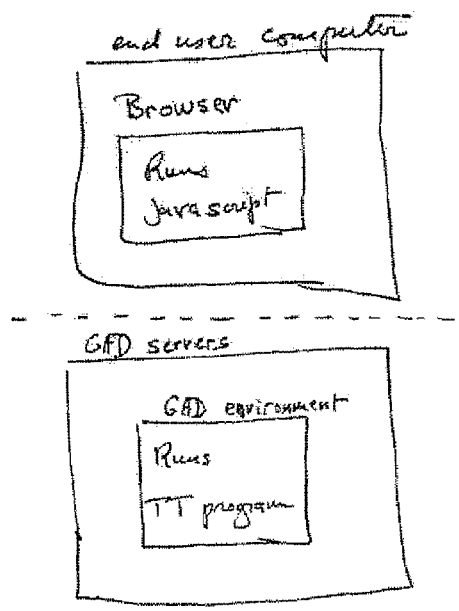
FIG. 67 is a block diagram depicting one embodiment of an application including a client browser component and a server component.

The JavaScript code is associated with a particular GAD page. When this page is loaded the browser runs the JavaScript. Part of the JavaScript code is able to send to the GAD system instructions on how run a TT function. The TT code of that GAD will then execute that function on the GAD server and the result of this function is then sent back to the browser and the JavaScript code can then use the result to display it to the end-user. FIG. 67 shows how an application consists of a JavaScript part handling the GUI and running on the browser and a TT part which runs on the GAD server (within a converser).

Figure 68:
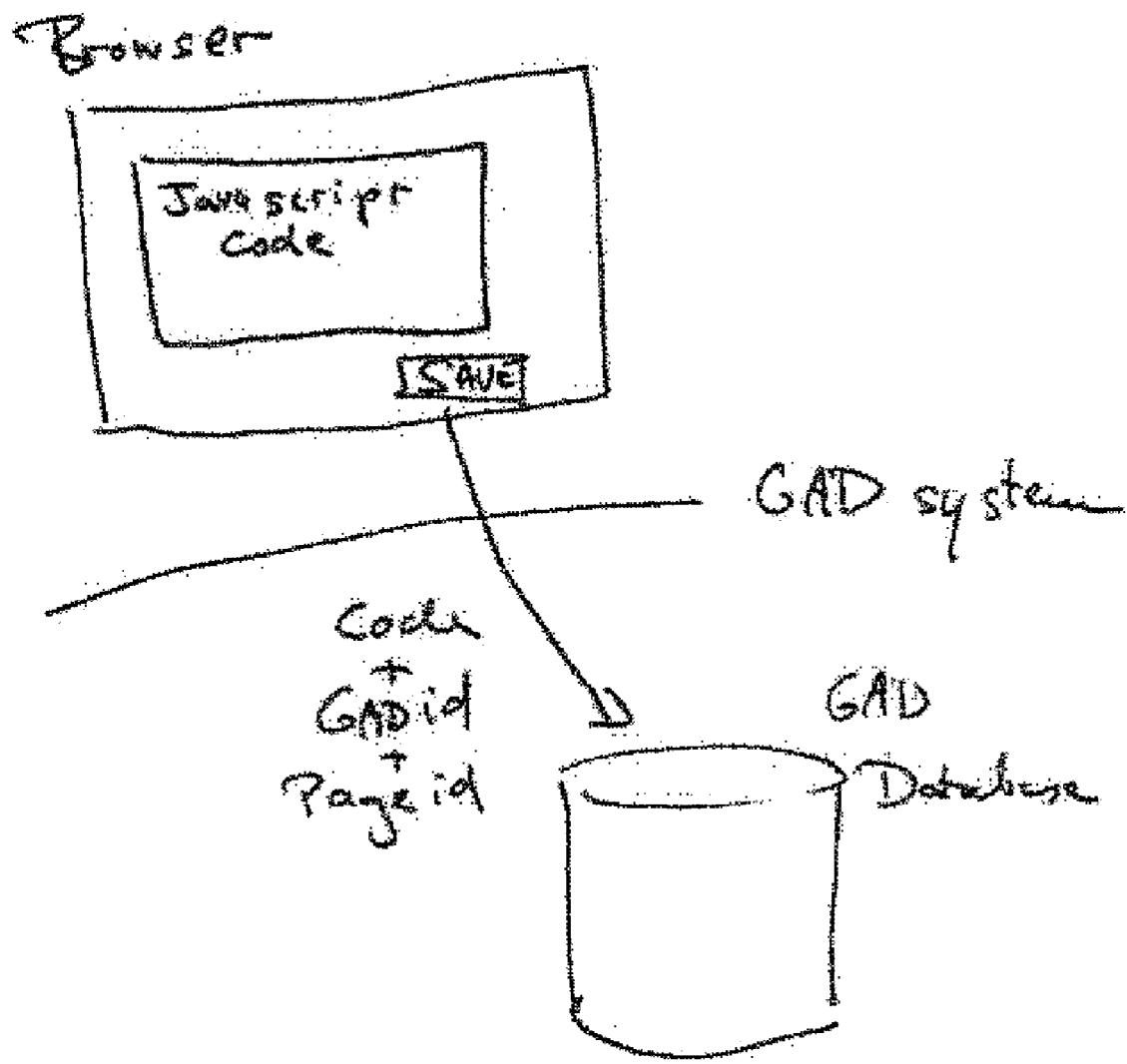
FIG. 68 is a block diagram depicting one embodiment of a system in which JavaScript programming code is uploaded to a server.

FIG. 68 shows that the JavaScript code will first be created and edited by the administrator of the GAD and this code will then be uploaded on the GAD server and stored on a GAD database together with the other web pages.

Figure 69:
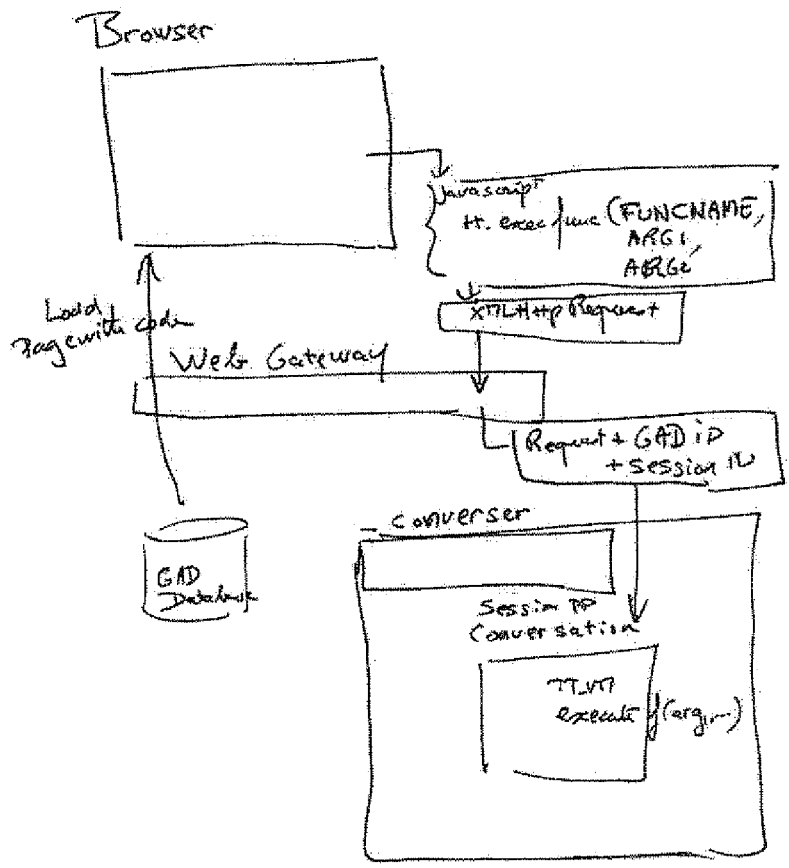
FIG. 69 is a block diagram depicting one embodiment of a system for displaying a page for a user, the page including output resulting from an execution of user-provided programming code.

FIG. 69 shows that when this page is loaded by a regular user of the GAD, the following steps are performed:

the browser gets the page with the JavaScript code from the GAD database through the Web Gateway Whenever the JavaScript code encounters a command like tt.executeFunction (FUNCNAME,ARG1, . . . ARGn) it recognizes that this is a TT function call The browser, executing the JavaScript code, then does an XMLHttpRequest with the arguments specified in the Javascript code. This request is sent to the same Web Gateway. The Web Gateway then forwards this request, together with the GAD ID and the SESSION KEY, to the converser Then the converser executes this function call within the conversation that has the correct SESSION KEY (there is a one to one mapping between session keys and conversations within a converser).

The converser then sends the result of the function (a string in the current implementation) back to the Web Gateway The Web Gateway then puts the answer into the initial XMLHttpRequest which is then sent back to the browser The Browser gets the answer back from its XMLHttpRequest and continues the execution of the JavaScript code Hello World The following is an example of minimal JavaScript code stored in one of the pages associated to a GAD:

```
<script type="text/javascript"><!--
var tt = new TT( );
var res = tt.executeFunction("f1", "name")
document.write(res);
// --></script>
```

Note the line that calls the tt.executeFunction method call. When the browser executes this function it issues the XMLHttpRequest which execute the following function call:

```
string f1(string name){
    string str;
    str="Hello " + name + "!";
    return str
}
"NOTE": An example
```

In this section, an application designed to save notes and to search them later is described. This application demonstrates how the system can be used to build much more elaborate applications.

A Short Description

Figure 70:
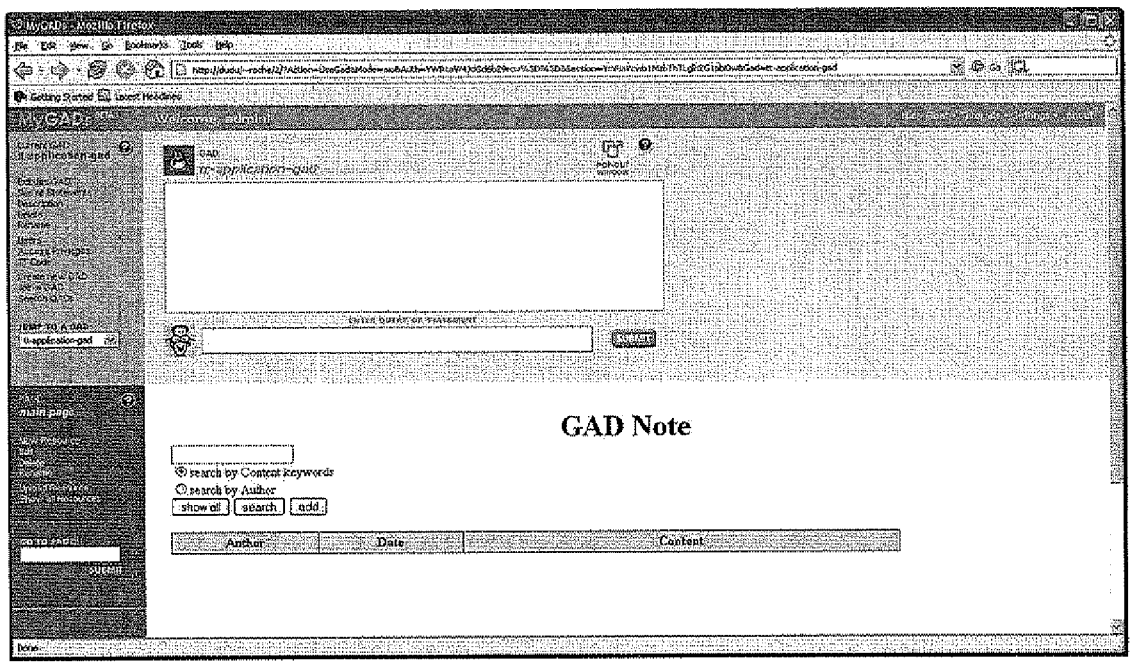
FIG. 70 is a screen shot depicting one embodiment of a page containing HTML and JavaScript.

FIG. 70 shows a page with a GAD called "tt-application-gad". This page is displayed by the end-user browser; the page contains both HTML and JavaScript. The HTML is generally used to display the static part of the page (for instance the title "GAD Note") whereas the Javascript code is used to represent the dynamic part of the page. This page is also called the home page of the application (in that case the application is called "NOTE").

Figure 71:
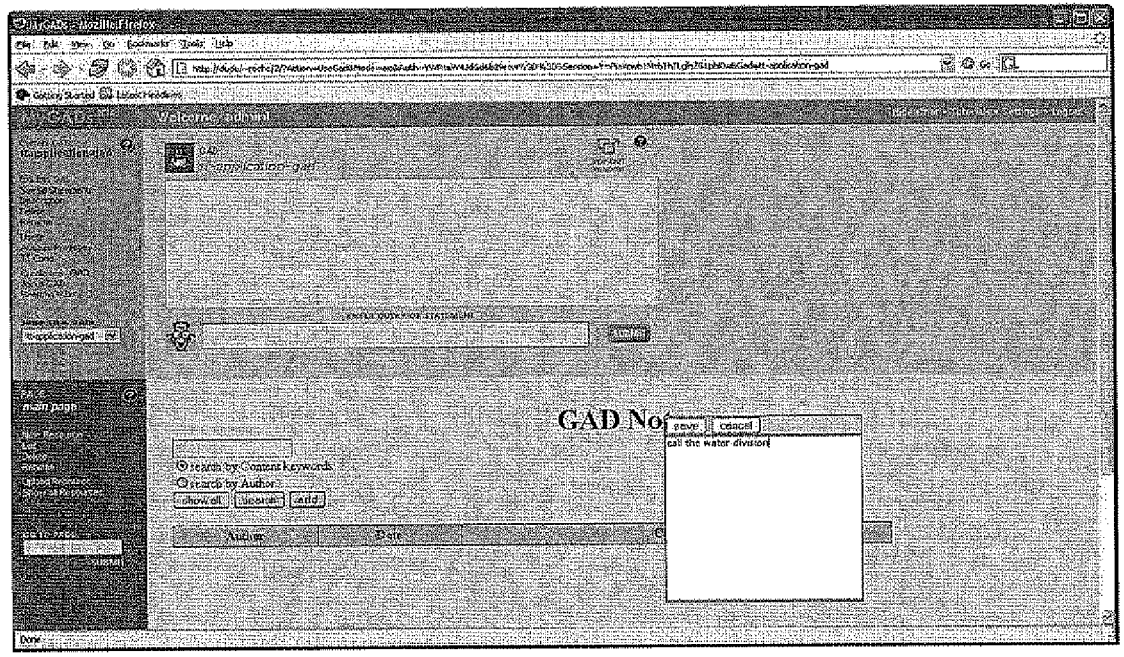
FIG. 71 is a screen shot depicting one embodiment of a user interface element for providing, by a user, information for storage on a server.

FIG. 71 shows what happens when the user clicks on the "add" button. The Javascript part of the code displays a dialog in which the user can type any kind of text to be stored as a note.

Figure 72:
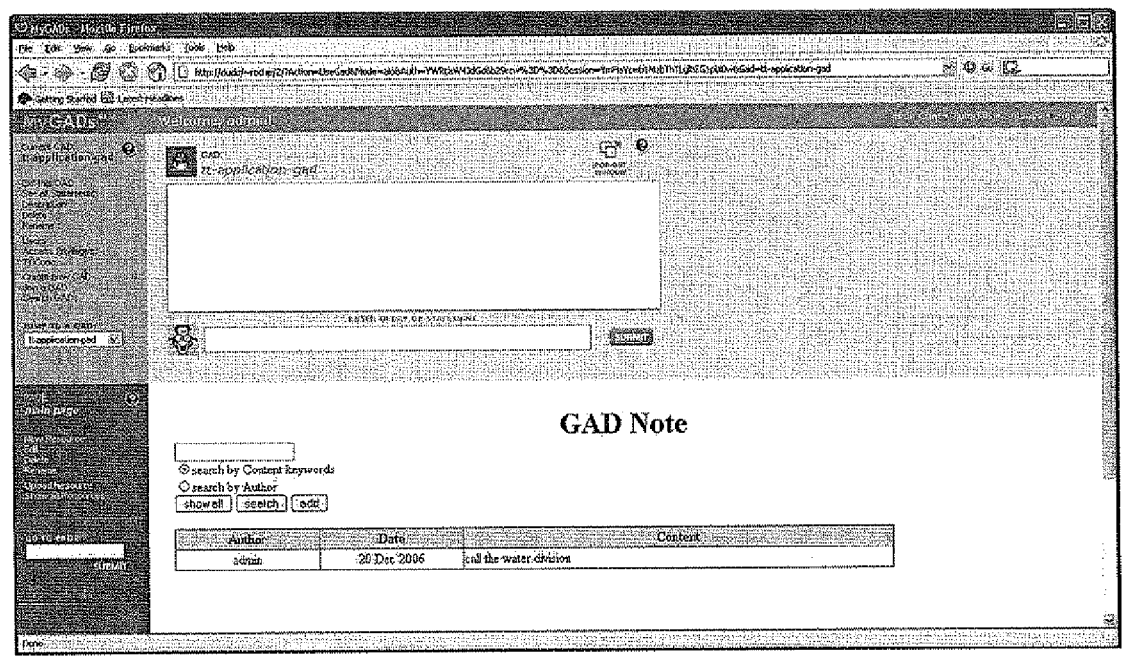
FIG. 72 and FIG. 73 are screen shots depicting embodiments of a page including user-provided information.
Figure 73:
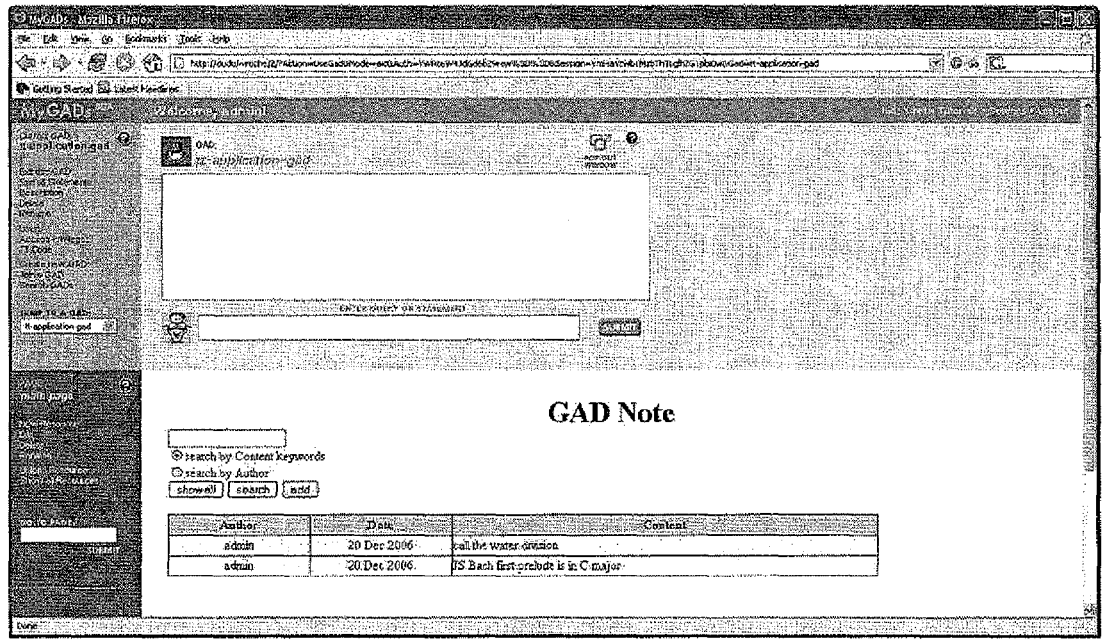

Once the user clicks on the "save" button, the Javascript code makes a XMLHttpRequest request to the GAD servers with, as argument, the content of the note to be added and the fact that the required action is to add a note. The GAD server with the on-going conversation will receive this request and execute the TT code associated with this application (this is the code that has been added by the administrator of this GAD and it is shown below in this document). Once the TT code completes the required action, it gives the result back through the XMLHttpRequest which makes it available to the Javascript code. The Javascript code can now display the list of available notes as shown on FIG. 72. FIG. 73 shows the same page once another note has been added by the same user.

Figure 74:
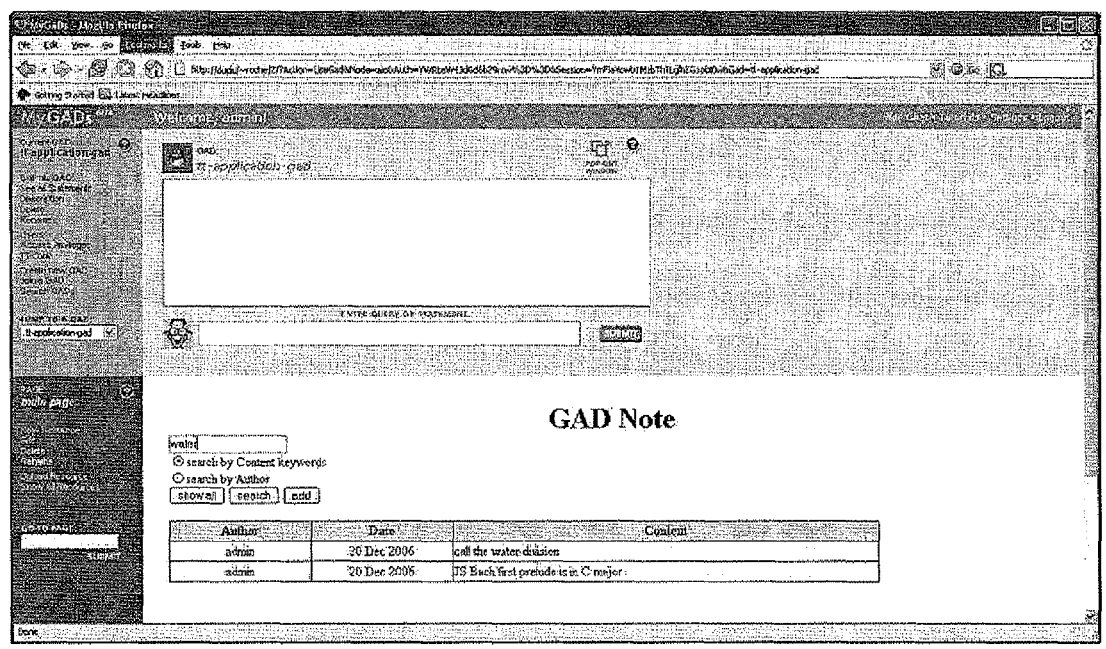
FIG. 74 is a screen shot depicting one embodiment of a page including a user interface element for retrieving user-provided information.
Figure 75:
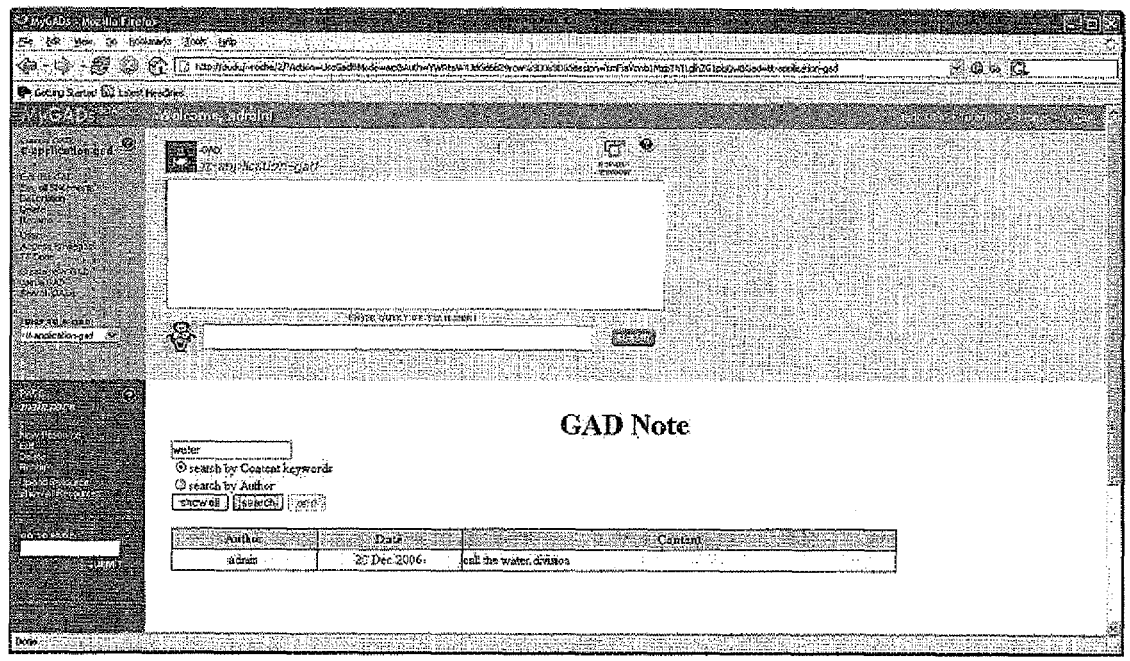
FIG. 75 is a screen shot depicting one embodiment of a page displaying, to a user, retrieved information.

The same application can also be used to do other actions. For instance, FIG. 74 shows that the user can type a search query to retrieve particular notes. FIG. 75 shows the GAD displaying the query results to the user.

Interacting with an Application Using a "Chat" Interface

Figure 76:
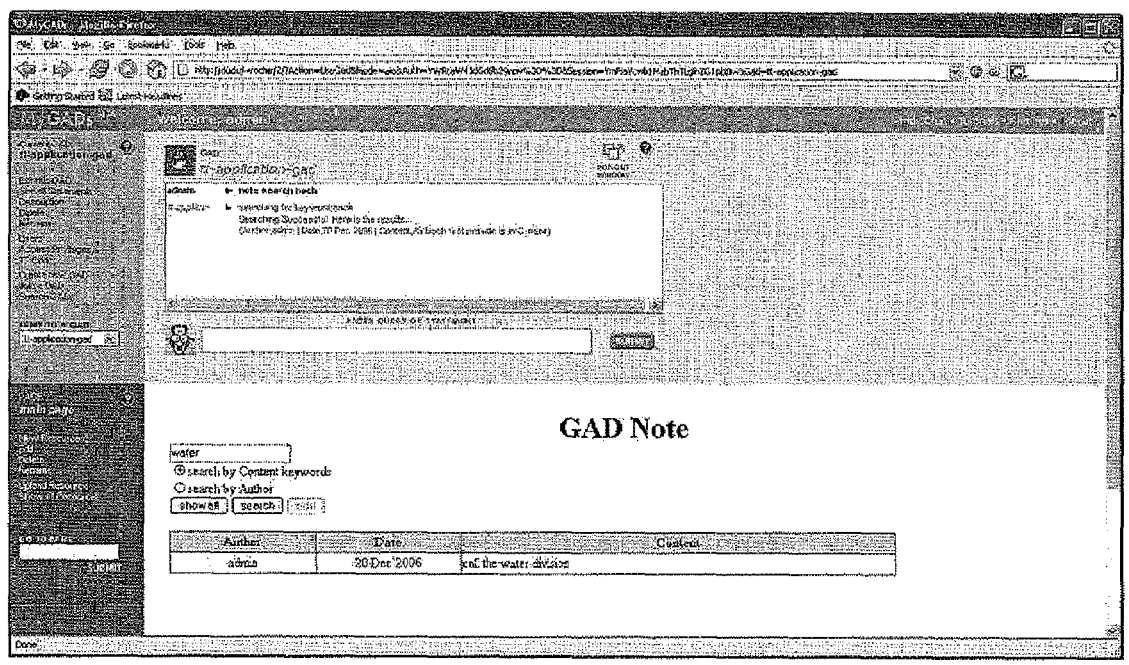
FIG. 76 is a screen shot depicting one embodiment of a chat interface for processing user input.

It is also possible to design the TT code of the application such that some or all the functionalities of this application are accessible directly through the "Chat"/"Instant Message" interface. For instance, FIG. 76 shows that the user can type directly within the search interface ("note search bach"). The TT code of this gad recognizes that this user input should trigger a specific application action and the GAD server executes the corresponding TT code. In that case of the result is displayed directly within the Chat interface (the action could also result in the change of display of the current page).

Figure 77:
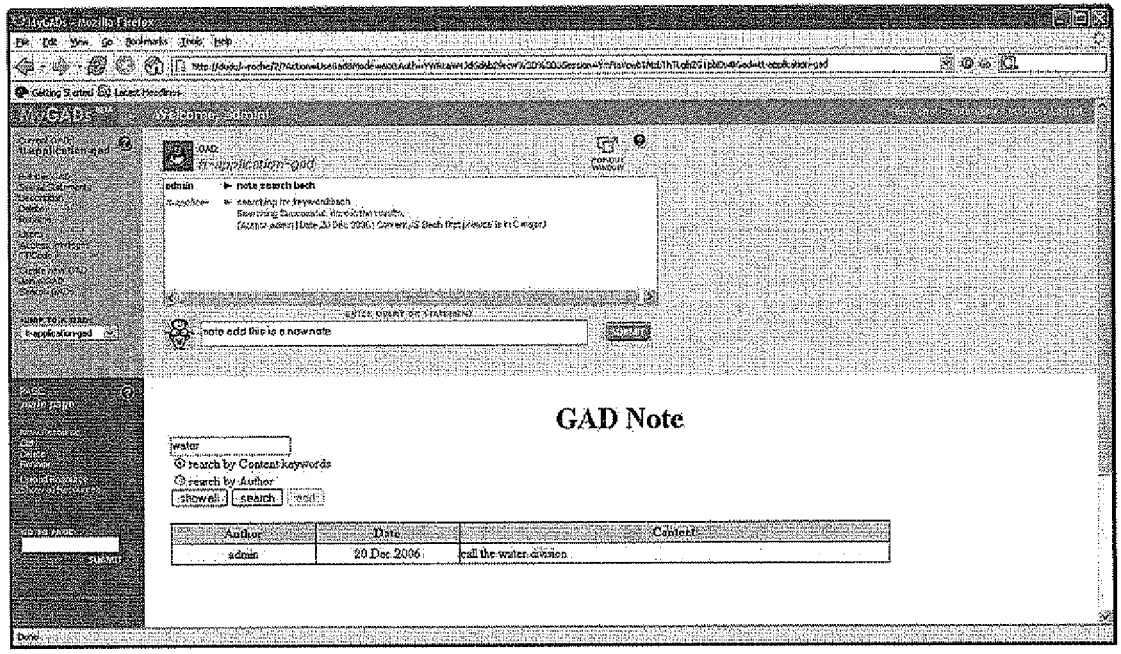
FIG. 77 is a screen shot depicting another embodiment of a chat interface for processing user input in which a user enters a command to store user input.
Figure 78:
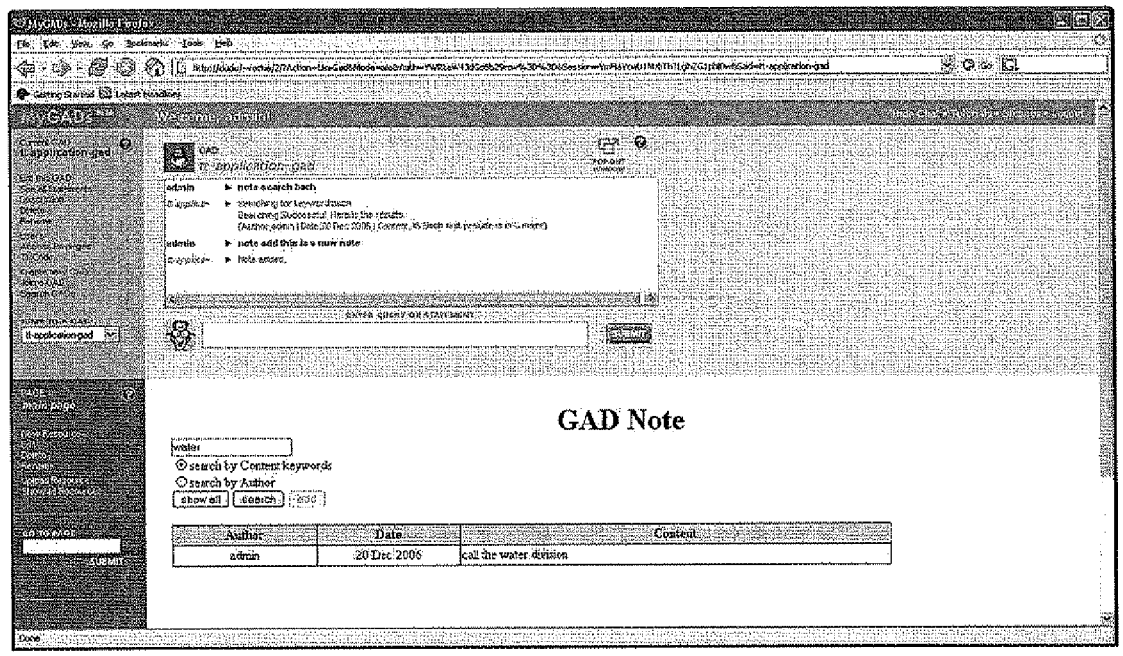
FIG. 78 is a screen shot depicting one embodiment of a modified chat interface reflecting the storage of user-provided input.
Figure 79:
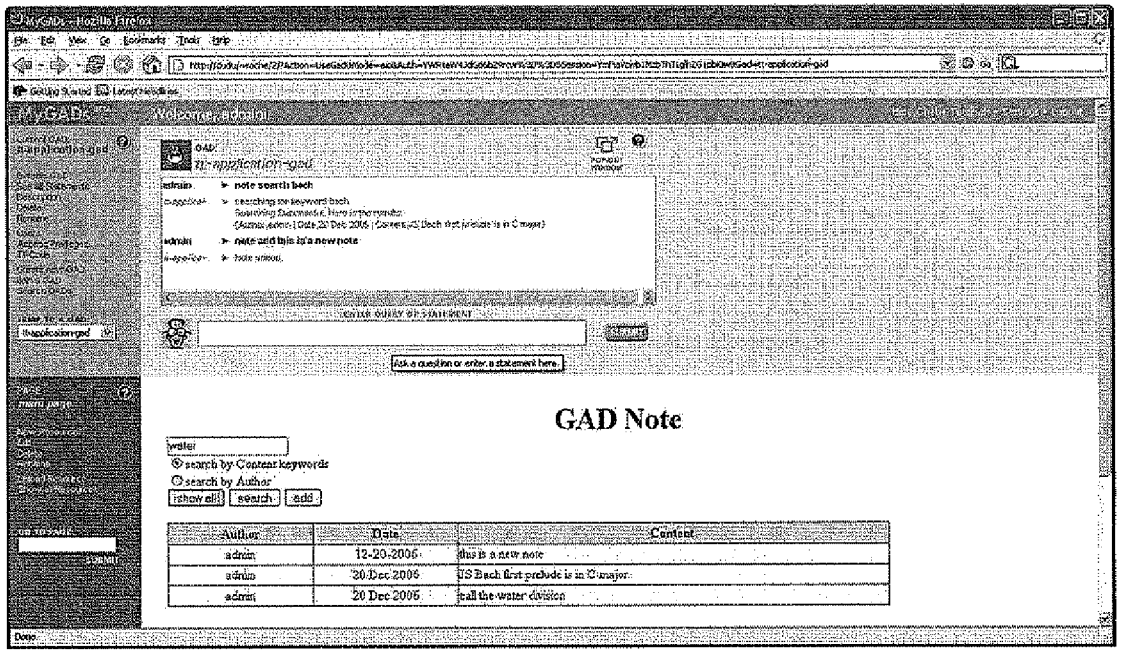
FIG. 79 is a screen shot depicting another embodiment of a modified chat interface reflecting the storage of user-provided input.

FIG. 77 shows another example of chat interaction. In that case, when the user types "note add this is a new note", the GAD server will recognize that it needs to execute part of the TT code which will add a new note with the content "this is a new note". FIG. 78 shows the prompt once the note has been added through the chat interface. FIG. 79 shows the screen after the user pressed the "show all" button. All the notes that have been added, either through the chat interface or through the Javascript/GUI interface, are now visible together. Note that both the chat environment and the GUI interface have access to the same code and to the same data (whether stored permanently on the GAD servers or temporarily within the current conversation which also lives on the GAD servers).

The TT Code

Figure 80:
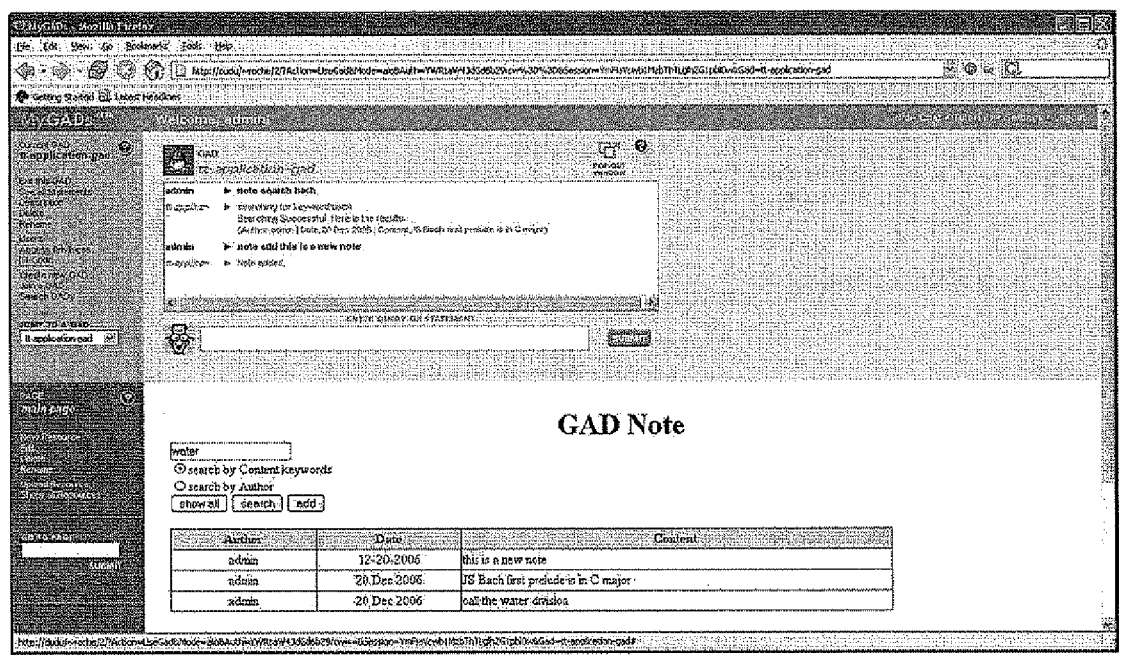
FIG. 80 is a screen shot depicting an embodiment of a user interface element for requesting a display of user-provided programming code.
Figure 81:
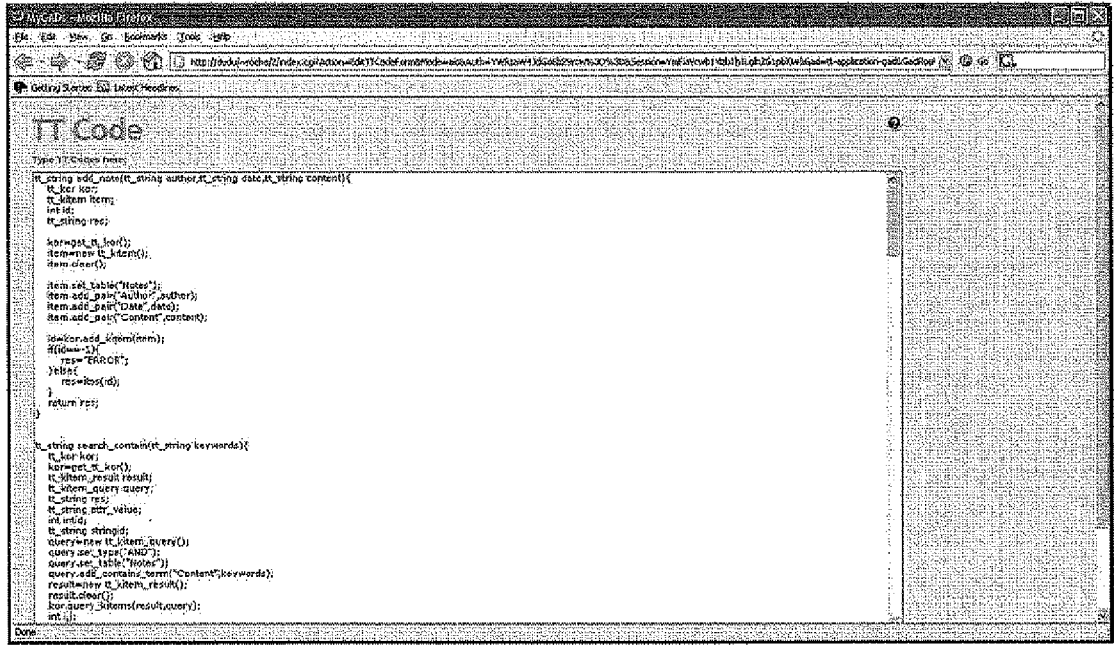
FIG. 81 is a screen shot depicting an embodiment of a user interface element displaying user-provided programming code.
Figure 82:
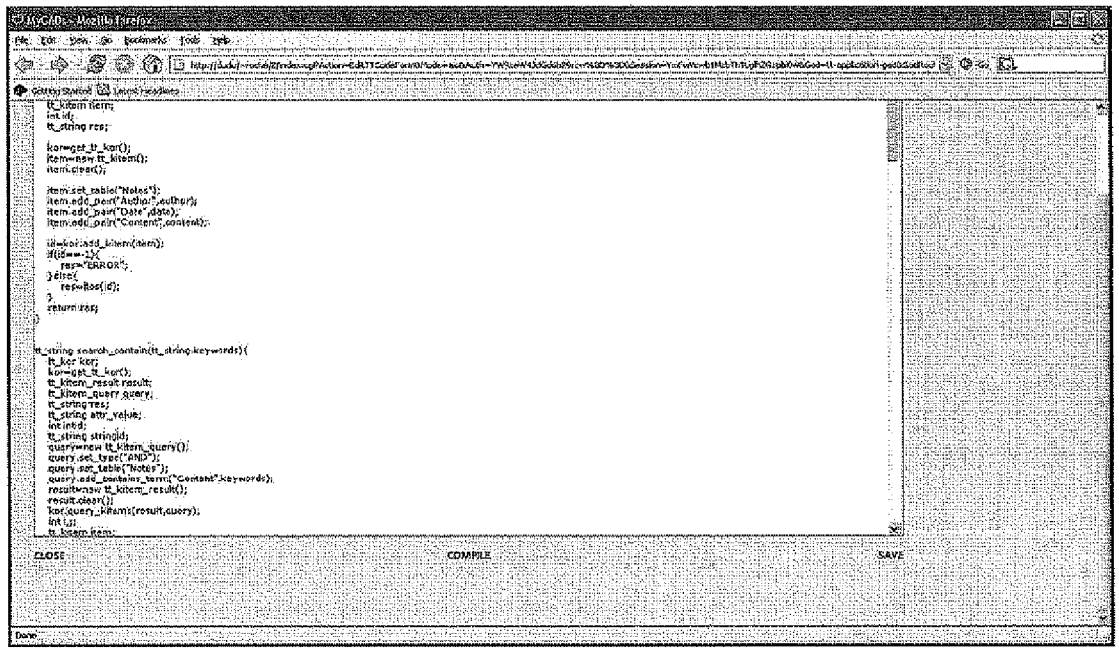
FIG. 82 is a screen shot depicting one embodiment of a user interface element for modifying displayed user-provided programming code.

If the administrator clicks on the "TT code" link visible within the current GAD, as shown on FIG. 80, then window displaying the TT code will be displayed as shown on FIG. 81. As shown on FIG. 82, this window also allows the administrator to change the TT code and to compile it (this will test whether any error was introduced) and then to save the code (which will make it active for the current GAD).

Below is the complete TT code for this sample application. Code in bold print specifies which user input should be recognized in the natural language interface. The function add_note from line 1 to line 23 stores a note permanently in the information repository associated to the current GAD. The function is called with 3 strings as arguments: the author's name (variable "author"), the current date and a string representing the content of the note (variable "content"). TT provides a set of predefined functions which allow the storage of data in a database-like manner. Line 8 creates an empty data structure which will first hold the note in memory. Lines 11 to 14 fill up the content of that item with the note. The model here is that the note will be added in a database table called "Notes" which has at least 3 columns: Author, Date and Content. If the table "Notes" doesn't already exist it is added implicitly. The database in which this content is stored is specific to the current GAD (i.e., it can be re-accessed from another session on the same GAD). Line 16 does the actual storage action and returns a unique identifier for the unit of information being stored.

Function search_contain between line 26 and 73 is used to search for existing note containing a given set of keywords. Lines 35 to 38 prepare a query object which describes the type of content which should be searched in the information repository associated to the current GAD. Lines 39 and 40 prepare an empty result object to hold the result of the information query. Line 41 performs the actual query and the rest of the function enumerates the result and prepares them such that they can either be sent back to the Javascript program or used within another TT function.

The following function search_equal is similar to search_contain except that it will return notes that whose specified fields are equal to a set of keywords. The following function show_all is used to list the entire list of notes stored. Function delnote of line 172 to 186 is used to remove a note from the information repository associated to this GAD. Lines 188 and 189 define how the program will react to user input through the interactive interface. Line 188 defines a predicate called add_note_pred which takes a single argument called note. Line 189 associate a type of string to this predicate. The type of string is defined by "$note add_note{X}$". The symbol $ denotes both the beginning and the end of a line. "note" and "add" are explicit words expected to be typed by the user. The two symbols "_note{" and "}" indicates which part of the user input should be associated with the predicate's argument "note". X stands for any sequence of word. The following user inputs will match this pattern:

note add this is a sample note
note add a reminder for me
note add something with the note argument being respectively "this is a sample note", "a reminder for me" and "something". On the other hand, a user input like:

please note add something will not be matched here because the symbol "note add" is not at the beginning of the line.

When a user enters an input string which matches the query, it will execute the code from line 190 to 215. Line 190 indicates that whenever a string matches the predicate "add_note_pred", it should execute the following lines. This code is similar to the function "add_note" described above (except that "add_note" was designed to interact with the Javascript code). A small different: line 207 assigns to str the content of tf.note which is the note predicate argument associated to the user input. For instance, if the user had typed:

add note this is a note the value of tf:note would be "this is a note".

Similarly, lines 217 to 258 allow the user to search for a note by interacting directly through the chat-line interface rather than through the Javascript code.

| TT Code for the NOTE application |
|---|
| 1 tt_string add_note(tt_string author,tt_string date,tt_string content){ |
| 2     tt_kor kor; |
| 3     tt_kitem item; |
| 4     int id; |

TT Code for the NOTE application

```
5            tt_string res;
6
7            kor=get_tt_kor( );
8            item=new tt_kitem( );
9            item.clear( );
10
11               item.set_table("Notes");
12               item.add_pair("Author",author);
13               item.add_pair("Date",date);
14               item.add_pair("Content",content);
15
16               id=kor.add_kitem(item);
17               if(id==-1){
18                   res="ERROR";
19               }else{
20                   res=itos(id);
21               }
22               return res;
23           }
24
25
26   tt_string search_contain(tt_string keywords){
27           tt_kor kor;
28           kor=get_tt_kor( );
29           tt_kitem_result result;
30           tt_kitem_query query;
31           tt_string res;
32           tt_string attr_value;
33           int intid;
34           tt_string stringid;
35           query=new tt_kitem_query( );
36           query.set_type("AND");
37           query.set_table("Notes");
38           query.add_contains_term("Content",keywords);
39           result=new tt_kitem_result( );
40           result.clear( );
41           kor.query_kitems(result,query);
42           int i,j;
43           tt_kitem item;
44           res="(";
45           for(i=0;i<result.nb_kitems( );i++){
46                item=result.get_kitem_at(i);
47                if(i==0){
48                    for(j=0;j<item.nb_columns( )-1;j++){
49                        res=res+item.column_name(j)+",";
50                    }
51                    res=res+item.column_name(j)+")";
52                }
53                res=res+",(";
54
55                intid=item.kitem_id( );
56                stringid=itos(intid);
57                res=res+stringid;
58                res=res+",";
59
60                for(j=0;j<item.nb_columns( )-1;j++)
61                    {
62                        attr_value=item.content(j);
63                        attr_value=attr_value.encode( );
64                        res=res+attr_value;
65                        res=res+",";
66                    }
67                attr_value=item.content(j);
68                attr_value=attr_value.encode( );
69                res=res+attr_value;
70                res=res+")";
71           }
72           return res;
73   }
74
75
76   tt_string search_equal(tt_string keywords){
77           tt_kor kor;
78           kor=get_tt_kor( );
79           tt_kitem_result result;
80           tt_kitem_query query;
81           tt_string res;
```

-continued

| | TT Code for the NOTE application |
|---|---|
| 82 | tt_string attr_value; |
| 83 | int intid; |
| 84 | tt_string stringid; |
| 85 | query=new tt_kitem_query( ); |
| 86 | query.set_type("AND"); |
| 87 | query.set_table("Notes"); |
| 88 | query.add_equal_term("Author",keywords); |
| 89 | result=new tt_kitem_result( ); |
| 90 | result.clear( ); |
| 91 | kor.query_kitems(result,query); |
| 92 | int i,j; |
| 93 | tt_kitem item; |
| 94 | res="("; |
| 95 | for(i=0;i<result.nb_kitems( );i++){ |
| 96 | item=result.get_kitem_at(i); |
| 97 | if(i==0){ |
| 98 | for(j=0;j<item.nb_columns( )−1;j++){ |
| 99 | res=res+item.column_name(j)+","; |
| 100 | } |
| 101 | res=res+item.column_name(j)+")"; |
| 102 | } |
| 103 | res=res+",("; |
| 104 | |
| 105 | intid=item.kitem_id( ); |
| 106 | stringid=itos(intid); |
| 107 | res=res+stringid; |
| 108 | res=res+","; |
| 109 | |
| 110 | for(j=0;j<item.nb_columns( )−1;j++) |
| 111 | { |
| 112 | attr_value=item.content(j); |
| 113 | attr_value=attr_value.encode( ); |
| 114 | res=res+attr_value; |
| 115 | res=res+","; |
| 116 | } |
| 117 | attr_value=item.content(j); |
| 118 | attr_value=attr_value.encode( ); |
| 119 | res=res+attr_value; |
| 120 | res=res+")"; |
| 121 | } |
| 122 | return res; |
| 123 | } |
| 124 | tt_string show_all( ){ |
| 125 | tt_kor kor; |
| 126 | kor=get_tt_kor( ); |
| 127 | tt_kitem_result result; |
| 128 | tt_kitem_query query; |
| 129 | tt_string res; |
| 130 | tt_string attr_value; |
| 131 | int intid; |
| 132 | tt_string stringid; |
| 133 | query=new tt_kitem_query( ); |
| 134 | query.set_type("AND"); |
| 135 | query.set_table("Notes"); |
| 136 | result=new tt_kitem_result( ); |
| 137 | result.clear( ); |
| 138 | kor.query_kitems(result,query); |
| 139 | int i,j; |
| 140 | tt_kitem item; |
| 141 | res="("; |
| 142 | for(i=0;i<result.nb_kitems( );i++){ |
| 143 | item=result.get_kitem_at(i); |
| 144 | if(i==0){ |
| 145 | for(j=0;j<item.nb_columns( )−1;j++){ |
| 146 | res=res+item.column_name(j)+","; |
| 147 | } |
| 148 | res=res+item.column_name(j)+")"; |
| 149 | } |
| 150 | res=res+",("; |
| 151 | |
| 152 | intid=item.kitem_id( ); |
| 153 | stringid=itos(intid); |
| 154 | res=res+stringid; |
| 155 | res=res+","; |
| 156 | |
| 157 | for(j=0;j<item.nb_columns( )−1;j++) |
| 158 | { |

-continued

TT Code for the NOTE application

```
159                         attr__value=item.content(j);
160                         attr__value=attr__value.encode( );
161                         res=res+attr__value;
162                         res=res+",";
163                     }
164                 attr__value=item.content(j);
165                 attr__value=attr__value.encode( );
166                 res=res+attr__value;
167                 res=res+")";
168             }
169         return res;
170     }
171
172     tt__string delnote(tt__string id){
173             tt__kor kor;
174             tt__string result;
175             kor=get__tt__kor( );
176             int flag;
177             int intid;
178             intid=stoi(id);
179             flag=kor.delete__kitem("Notes",intid);
180             if(flag==0){
181                     result="ERROR";
182             }else{
183                     result="OK";
184             }
185         return result;
186     }
187
188     tt__pred add__note__pred(note);
189     add__note__pred.sequence("$note add __note{ X }$");
190     trigger add__note__pred{
191             tt__string str;
192             tt__kitem item;
193             tt__kor kor;
194             tt__time time;
195             tt__gad__conversation econv;
196             int id;
197
198             econv=get__tt__gad__conversation( );
199             kor=get__tt__kor( );
200             item=new tt__kitem( );
201             item.set__table("Notes");
202             str=econv.get__user__name( );
203             item.add__pair("Author",str);
204             time=get__time( );
205             str=time.get__date( );
206             item.add__pair("Date",str);
207             str=tf.note;
208             item.add__pair("Content",str);
209
210             id=kor.add__kitem(item);
211             if(id!=−1){
212                     econv.set__answer__string("Note added.");
213             }
214         return 1;
215     }
216
217     tt__pred search__note(keyword);
218     search__note.sequence("$note search __keyword{ X }$");
219     trigger search__note{
220             print("searching for keyword:"+tf.keyword);
221             tt__kor kor;
222             kor=get__tt__kor( );
223             tt__kitem__result result;
224             tt__kitem__query query;
225             tt__string res;
226             tt__kitem item;
227             int i,j;
228
229             query=new tt__kitem__query( );
230             query.set__type("AND");
231             query.set__table("Notes");
232             query.add__contains__term("Content",tf.keyword);
233             result=new tt__kitem__result( );
234             result.clear( );
235             kor.query__kitems(result,query);
```

| | TT Code for the NOTE application |
|---|---|
| 236 | if(result.nb__kitems( )>0){ |
| 237 | print("Searching Successful. Here is the results:"); |
| 238 | for(i=0;i<result.nb__kitems( );i++){ |
| 239 | item=result.get__kitem__at(i); |
| 240 | res="("; |
| 241 | for(j=0;j<item.nb__columns( )−1;j++){ |
| 242 | res=res+item.column__name(j); |
| 243 | res=res+","; |
| 244 | res=res+item.content(j); |
| 245 | res=res+" \| "; |
| 246 | } |
| 247 | res=res+item.column__name(j); |
| 248 | res=res+","; |
| 249 | res=res+item.content(j); |
| 250 | |
| 251 | res=res+")"; |
| 252 | print(res); |
| 253 | } |
| 254 | }else{ |
| 255 | print("No Results."); |
| 256 | } |
| 257 | return 1; |
| 258 | } |

The HTML and JavaScript Code

Figure 83:
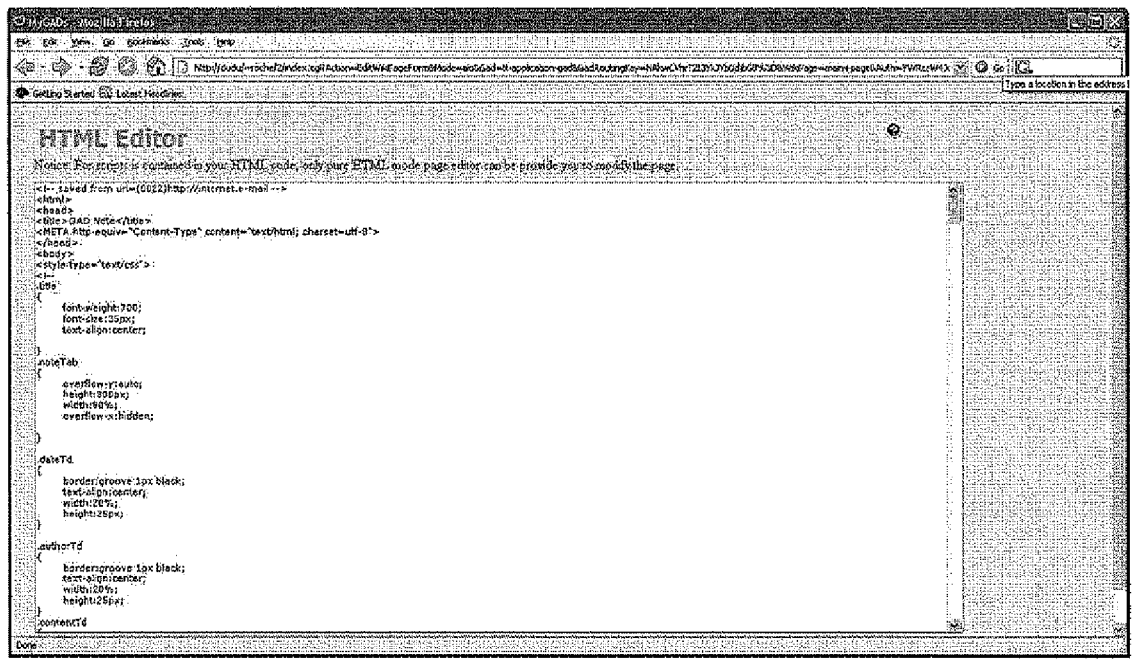
FIG. 83 is a screen shot depicting one embodiment of a user interface element allowing an administrator to modify programming code.

When the administrator clicks on the "edit" link of the main window, a window similar to the one of FIG. 83. In this window, it is possible to modify in any way the HTML and Javascript code used by the end-user browser when looking at that particular page or application. The complete HTML and Javascript code is given below, with sections bolded to display code that makes the HTTPXmlRequest in order to execute the TT code on the GAD servers. Note the method call "tt.executeFunction" on lines 262, 280, 342, 357, 372, 479 and 555 (these lines are bolded in the code below). For instance, on line 262, the function is issuing an HTTPXmlRequest which will be forwarded to the GAD servers which will execute the function "add_note" with the arguments "author", "date" and "content".

| | Javascript Code for a TT Application |
|---|---|
| 1 | <!-- saved from url=(0022)http://internet.e-mail --> |
| 2 | <html> |
| 3 | <head> |
| 4 | <title>GAD Note</title> |
| 5 | <META http-equiv="Content-Type" content="text/html; charset=utf-8"> |
| 6 | </head> |
| 7 | <body> |
| 8 | <style type="text/css"> |
| 9 | <!-- |
| 10 | .title |
| 11 | { |
| 12 | font-weight:700; |
| 13 | font-size:35px; |
| 14 | text-align:center; |
| 15 | |
| 16 | } |
| 17 | .noteTab |
| 18 | { |
| 19 | overflow-y:auto; |
| 20 | height:300px; |
| 21 | width:80%; |
| 22 | overflow-x:hidden; |
| 23 | |
| 24 | } |
| 25 | |
| 26 | .dateTd |
| 27 | { |
| 28 | border:groove 1px black; |
| 29 | text-align:center; |
| 30 | width:20%; |
| 31 | height:25px; |
| 32 | } |
| 33 | |
| 34 | .authorTd |
| 35 | { |

-continued

| Javascript Code for a TT Application |
|---|

```
36        border:groove 1px black;
37        text-align:center;
38        width:20%;
39        height:25px;
40     }
41     .contentTd
42     {
43        border:groove 1px black;
44        width:60%;
45        height:25px;
46     }
47     .th
48     {
49        background-color:#c3d9ff;
50     }
51     .td
52     {
53        background-color:#ffffcc;
54     }
55     .tabRow
56     {
57        width:100%;
58        border-collapse:collapse;
59     }
60
61     .noteEdit
62     { position:absolute;
63        border:solid 1px;
64        display:none;
65        z-index:100;
66        top:60%;
67        left:60%;
68        background-color:#ffffff;
69     }
70
71     .content
72     {
73        width:240px;
74        height:200px
75     }
76     .rMenu
77     {
78        visibility:hidden;
79        position:absolute;
80        border: 1px solid blue;
81     }
82     .menuOption
83     {
84        font-size:15px;
85        border:1px solid black;
86        width:70px;
87        height:25px;
88        text-align:center;
89        background-color:#ffffff;
90     }
91
92     .selectMenu
93     {
94        font-size:15px;
95        border:1px solid black;
96        width:70px;
97        height:25px;
98        text-align:center;
99        background-color:#656a7c;
100       color:#ffffff;
101    }
102    .Shade
103    {
104       display:none;
105       position:absolute;
106       left:0;
107       top:0;
108       margin:0;
109       z-index:50;
110       filter:alpha(opacity=15);
```

| | Javascript Code for a TT Application |
|---|---|
| 111 |     -moz-opacity:0.15; |
| 112 |    background-color:#134; |
| 113 |   } |
| 114 | --> |
| 115 | </style> |
| 116 | <script language="javascript"> |
| 117 | <!-- |
| 118 | window.onload = function( ) |
| 119 | { |
| 120 |   show_all( ); |
| 121 | } |
| 122 | // global variables |
| 123 | |
| 124 | var selectrow;//used to record the row selected by the user |
| 125 | var i = 0; |
| 126 | var undefined; |
| 127 | var editmode;// 0 for add 1 for edit |
| 128 | var author=account;//used to record author of the note |
| 129 | var monthNames=["Jan","Feb","Mar","Apr","May","Jun","Jul","Aug","Sep","Oct","Nov","Dec"]; |
| 130 | var showmode;// 0 represents show_all, 1 represents search |
| 131 | |
| 132 | function Base64( ) |
| 133 | { |
| 134 | |
| 135 | |
| 136 |    this.keyStr = 'ABCDEFGHIJKLMNOPQRSTUVWXYZabcdefghijklmnopqrstuvwxyz0123456789+/='; |
| 137 | |
| 138 |    function _encode(input) |
| 139 |    { |
| 140 |      var output = ''; |
| 141 |      var chr1, chr2, chr3 = ''; |
| 142 |      var enc1, enc2, enc3, enc4 = ''; |
| 143 |      var i = 0; |
| 144 | |
| 145 |      do |
| 146 |        { |
| 147 |          chr1 = input.charCodeAt(i++); |
| 148 |          chr2 = input.charCodeAt(i++); |
| 149 |          chr3 = input.charCodeAt(i++); |
| 150 | |
| 151 |          enc1 = chr1 >> 2; |
| 152 |          enc2 = ((chr1 & 3) << 4) | (chr2 >> 4); |
| 153 |          enc3 = ((chr2 & 15) << 2) | (chr3 >> 6); |
| 154 |          enc4 = chr3 & 63; |
| 155 | |
| 156 |          if (isNaN(chr2)) |
| 157 |           { |
| 158 |             enc3 = enc4 = 64; |
| 159 |           } |
| 160 |          else if (isNaN(chr3)) |
| 161 |           { |
| 162 |             enc4 = 64; |
| 163 |           } |
| 164 | |
| 165 |          output = output + this.keyStr.charAt(enc1) + this.keyStr.charAt(enc2) + this.keyStr.charAt(enc3) + this.keyStr.charAt(enc4); |
| 166 |          chr1 = chr2 = chr3 = ''; |
| 167 |          enc1 = enc2 = enc3 = enc4 = ''; |
| 168 |        } |
| 169 |      while (i < input.length); |
| 170 | |
| 171 |      return output; |
| 172 |    } |
| 173 | |
| 174 |    function _decode(input) |
| 175 |    { |
| 176 |      var output = ''; |
| 177 |      var chr1, chr2, chr3 = ''; |
| 178 |      var enc1, enc2, enc3, enc4 = ''; |
| 179 |      var i = 0; |
| 180 | |

-continued

| Javascript Code for a TT Application |
|---|

```
181             // remove all characters that are not A-Z, a-z, 0-9, +, /, or =
182             var base64test = /[^A-Za-z0-9\+\/\=]/g;
183
184             if (base64test.exec(input))
185                 {
186                     alert('There were invalid base64 characters in the input text. Expect
errors in decoding.');
187                 }
188
189             input = input.replace(/[^A-Za-z0-9\+\/\=]/g, '');
190
191         do {
192             enc1 = this.keyStr.indexOf(input.charAt(i++));
193             enc2 = this.keyStr.indexOf(input.charAt(i++));
194             enc3 = this.keyStr.indexOf(input.charAt(i++));
195             enc4 = this.keyStr.indexOf(input.charAt(i++));
196
197             chr1 = (enc1 << 2) | (enc2 >> 4);
198             chr2 = ((enc2 & 15) << 4) | (enc3 >> 2);
199             chr3 = ((enc3 & 3) << 6) | enc4;
200
201             output = output + String.fromCharCode(chr1);
202
203             if (enc3 != 64)
204                 {
205                     output = output + String.fromCharCode(chr2);
206                 }
207
208             if (enc4 != 64)
209                 {
210                     output = output + String.fromCharCode(chr3);
211                 }
212
213             chr1 = chr2 = chr3 = '';
214             enc1 = enc2 = enc3 = enc4 = '';
215
216         }
217         while (i < input.length);
218
219         return output;
220     }
221
222     this.encode = __encode;
223     this.decode = __decode;
224 }
225
226 document.onclick=function( )
227 {
228     var row=document.getElementById(selectrow);
229     var rmenu=document.getElementById('rMenu');
230     if(rmenu)
231         rmenu.style.visibility='hidden';
232     if(row)
233         row.style.backgroundColor='#ffffff';
234 }
235
236 function currentDate( )//return formatted current date
237 {
238     var time = new Date( );
239     var month = monthNames[parseInt(time.getMonth( ))];
240     var date=(time.getDate( ).length<2)?("0"+time.getDate( )):time.getDate( );
241     var year=time.getFullYear( );
242     var current = date+" "+month+" "+year;
243     return current;
244 }
245
246 function isIE( )
247 {
248     if(window.navigator.userAgent.indexOf('MSIE')>=1)
249             return true;
250 }
251
252 function isFirefox( )
253 {
254     if(window.navigator.userAgent.indexOf('Firefox')>=1)
255             return true;
256 }
```

| Javascript Code for a TT Application |
| --- |

```
257
258     function fillrow(content)
259     {
260        var date=currentDate( );
261        var tt=new TT( );
262        var flag=tt.executeFunction("user.add__note",author,date,content);
263        if(flag!="ERROR")
264        {
265              var row=document.getElementById(selectrow);
266              row.firstChild.firstChild.value=flag;
267              row.childNodes[1].firstChild.innerHTML=author;
268              row.childNodes[2].firstChild.innerHTML=date;
269              row.childNodes[3].firstChild.innerHTML=content;
270              hideNote( );
271        }
272        else alert("edit error");
273     }
274
275     function addKitem(content)
276     {
277        var date=currentDate( );
278        var tt=new TT( );
279
280        var flag=tt.executeFunction("user.add__note",author,date,content);
281
282        if (flag!="ERROR")
283        {
284              var containid = document.createElement('input');
285              containid.type = 'hidden';
286              containid.value = flag;
287              var td4=document.createElement('td');
288              td4.style.display="none";
289              td4.appendChild(containid);
290              var row=document.createElement('tr');
291              row.id='row'+i;
292              var td2=document.createElement('td');
293              td2.className="authorTd td";
294              var authorDiv=document.createElement('div')
295              authorDiv.id='testauthor'+i;
296              authorDiv.innerHTML=author;
297              td2.appendChild(authorDiv);
298              var td1=document.createElement('td');
299              td1.className="dateTd td";
300              var dateDiv=document.createElement('div');
301              td1.appendChild(dateDiv);
302              dateDiv.id='testdate'+i;
303              dateDiv.innerHTML=currentDate( );
304              var td3=document.createElement('td');
305              td3.className="contentTd td";
306              td3.id='content'+i;
307              var contentDiv=document.createElement('div');
308              contentDiv.innerHTML=content;
309              contentDiv.id='testcontent'+i;
310              td3.appendChild(contentDiv);
311              row.appendChild(td4);
312              row.appendChild(td2);
313              row.appendChild(td1);
314              row.appendChild(td3);
315              document.getElementById('noteBody').appendChild(row);
316
317              if(isIE( ))
318                     row.attachEvent("oncontextmenu",showMenu);
319              else
320                     row.addEventListener("contextmenu",showMenu,false);
321              i++;
322              hideNote( );
323        }
324        else alert("error");
325
326
327     }
328
329     function search__Note( )
330     {
331        document.getElementById('addbutton').disabled=true;
332        if (document.getElementById('equalRadio').checked)
333              search__equal( );
```

-continued

Javascript Code for a TT Application

```
334         else search__contain( );
335
336       }
337
338       function search__equal( )
339       {
340         var keywords=document.getElementById("searchNote").value;
341         var tt = new TT( );
342         var searchRes = tt.executeFunction("user.search__equal",keywords);
343         var pat = /\(([^\)]+)\)/;
344         var r, s = searchRes;
345         var data = [ ];
346         while((r = pat.exec(s))!=null){
347                 data.push(r[1]);
348                 s = RegExp.rightContext;
349         }
350         drawRow(data);
351       }
352
353       function search__contain( )//search items which contains content keywords
354       {
355         var keywords=document.getElementById("searchNote").value;
356         var tt = new TT( );
357         var searchRes = tt.executeFunction("user.search__contain",keywords);
358         var pat = /\(([^\)]+)\)/;
359         var r, s = searchRes;
360         var data = [ ];
361         while((r = pat.exec(s))!=null){
362                 data.push(r[1]);
363                 s = RegExp.rightContext;
364         }
365         drawRow(data);
366       }
367
368       function show__all( )
369       {
370         document.getElementById('addbutton').disabled = false;
371         var tt = new TT( );
372         var searchRes = tt.executeFunction("user.show__all");
373         var pat = /\(([^\)]+)\)/;
374         var r, s = searchRes;
375         var data = [ ];
376         while((r = pat.exec(s))!=null){
377                 data.push(r[1]);
378                 s = RegExp.rightContext;
379         }
380         drawRow(data);
381       }
382       function drawRow(data)//draw table of searching results
383       {
384         if(data.length<=0){
385                 var res="<table class='tabRow' id='tabRow'><thead><tr><th class='authorTd th'>Author</th><th class='dateTd th'>Date</th>";
386                 res+="<th class='contentTd th'>Content</th></tr></thead><tbody id='noteBody' onMouseover='this.style.cursor=\"pointer\";' onMouseout='this.style.cursor=\"auto\";'>";
387                 res+="</tbody></table>";
388                 document.getElementById("noteTab").innerHTML=res;
389                 return;
390         }
391
392
393         var count = 0;
394         var classes = ["dateTd", "authorTd", "contentTd"];
395         var base64 = new Base64( );
396         var res="<table class='tabRow'id='tabRow'>";
397         if(data.length>0){
398                 // to generate the header of table
399                 res+="<thead><tr>";
400                 var headers = data[0].split(",");
401                 for(var i=0;i<headers.length;i++){
402                         res+="<th class='"+classes[i]+" th'>"+headers[i]+"</th>";
403                 }
404                 res+="</tr></thead>";
405
406                 // to generate the content of table
407                 if(data.length>1){
```

-continued

| Javascript Code for a TT Application |
|---|

```
408           res+='<tbody id="noteBody" onMouseover="this.style.cursor=\'pointer\';" onMouseout="this.style.cursor=\'auto\';">';
409             for(var j=1;j<data.length;j++){
410               res+="<tr id='row"+(count++)+"'>";
411               var items = data[j].split(",");
412               for(var k=0;k<items.length;k++){
413                 if(k==0){
414                   res+=("<td style='display:none'><input type=hidden value='"+items[k]+"'></td>");
415                   continue;
416                 }
417                 res+=("<td class='"+classes[k-1]+"'td'><div>"+base64.decode(items[k])+"</div></td>");
418               }
419               res+="</tr>";
420             }
421             res+="</tbody>";
422           }
423         }
424         res+="</table>";
425         document.getElementById("noteTab").innerHTML=res;
426         if(isIE())
427           document.getElementById('noteTab').attachEvent("oncontextmenu",showMenu);
428         else
429           document.getElementById('noteTab').addEventListener("contextmenu",showMenu,false);
430
431       }
432
433
434
435       //display the note editor
436       function noteEdit(mode)
437       {
438         editmode=mode;
439         showWindowShade('WindowShade','block');
440         document.getElementById("noteEdit").style.display="block";
441         document.getElementById("content").focus();
442
443         if(selectrow!=undefined)
444           if(editmode==1)
445           {
446             var contentDiv=document.getElementById(selectrow).childNodes[3].firstChild;
447             var content="";
448             for(var i=0;i<contentDiv.childNodes.length;i++)
449             {
450               if(contentDiv.childNodes[i].tagName=="BR")
451                 content+="\r\n";
452               else
453                 content+=contentDiv.childNodes[i].data;
454             }
455
456             document.getElementById('content').value=content;
457           }
458
459       }
460
461       function notesubmit()
462       {
463         var Input=document.getElementById('content').value;
464         Input=Input.replace(/\r\n/g,"<br>");
465         Input=Input.replace(/\r/g,"<br>");
466         Input=Input.replace(/\n/g,"<br>");
467         if(Input=='')
468         {
469           alert('Content is null');
470           return false;
471         }
472         if(selectrow!=undefined)
473           if(editmode==1)
474           {
475
476             var contentTd=document.getElementById(selectrow).childNodes[3];
477             var oldid=document.getElementById(selectrow).firstChild.firstChild.value;
```

-continued

Javascript Code for a TT Application

```
478                    var tt=new TT( );
479                    var delflag=tt.executeFunction("user.delnote",oldid);
480                    if(delflag=="OK")
481                    {
482                            fillrow(Input);
483                            return;
484                    }
485            }
486        addKitem(Input);
487
488    }
489
490    //hide the note editor
491    function hideNote( )
492    {
493       document.getElementById("content").value='';
494       document.getElementById("noteEdit").style.display="none";
495       showWindowShade('WindowShade','none');
496    }
497
498    function showMenu(el)
499    {
500       var lastrow=document.getElementById(selectrow);
501       if(lastrow!=undefined)
502               lastrow.style.backgroundColor='#ffffff';
503       rmenu=document.getElementById('rMenu');
504       if(isIE( ))
505       {
506               window.event.cancelBubble = true;
507               window.event.returnValue = false;
508               if(window.event.srcElement.tagName=='TH')
509                       return false;
510               if(window.event.srcElement.id=='noteTab')
511                       return false;
512               if(window.event.srcElement.tagName=='TD')
513                       row=window.event.srcElement.parentNode;
514               else row=(window.event.srcElement.parentNode).parentNode;
515               var rightedge = document.body.clientWidth-window.event.clientX;
516               if (rightedge < rmenu.offsetWidth)
517                       ex= window.event.clientX − rmenu.offsetWidth;
518               else
519                       ex = window.event.clientX;
520               //row.style.backgroundColor = "#ffffff";
521               selectrow=row.id;
522               ey
=(document.all)?(window.event.clientY+document.body.scrollTop):(window.event.pageY+document.
body.scrollTop);
523       }
524       if(isFirefox( ))
525       {
526               el.preventDefault( );
527               ex=el.clientX;
528               ey=el.clientY+document.body.scrollTop;
529               if(el.target.tagName=='TH')
530                       return false;
531               if(el.target.id=='noteTab')
532                       return false;
533               if(el.target.tagName=='TD')
534                       row=el.target.parentNode;
535               else row=(el.target.parentNode).parentNode;
536               var rightedge = document.body.clientWidth−el.clientX;
537               if (rightedge <rmenu.offsetWidth)
538                       ex= el.clientX − rmenu.offsetWidth;
539               else
540                       ex = el.clientX;
541               selectrow=row.id;
542               //row.style.backgroundColor="#00ff00";
543       }
544       rmenu.style.visibility='visible';
545       rmenu.style.top=ey;
546       rmenu.style.left=ex;
547
548    }
549
550    function delRow( )
551    {
552       var row=document.getElementById(selectrow);
```

| Javascript Code for a TT Application |
| --- |

```
553            var tt=new TT( );
554            var id=row.firstChild.firstChild.value;
555            var flag=tt.executeFunction("user.delnote",id);
556            if(flag=="OK")
557                    document.getElementById('noteBody').removeChild(row);
558            else alert("Note cannot be deleted");
559        }
560
561
562
563        /*function editRow( )
564        {
565          type='edit';
566          noteEdit( );
567        }
568        */
569
570        function showWindowShade(id, displayMode) // set object's display property
according to id and displayMode
571        {
572          el = document.getElementById(id);
573
574          if (el.style.display == displayMode)
575                  return;
576
577          if (displayMode == 'block')
578          {
579                  var biggestHeight = document.body.scrollHeight;
580                  if (getWinHeight( ) > biggestHeight)
581                          biggestHeight = getWinHeight( );
582                  el.style.width=document.body.scrollWidth+'px';
583                  el.style.height=biggestHeight+'px';
584          }
585
586          el.style.display = displayMode;
587        }
588
589        function getWinHeight( )
590        {
591          if (window.innerHeight) return window.innerHeight;
592          else if (document.documentElement && document.documentElement.clientHeight)
593                  return document.documentElement.clientHeight;
594          else if (document.body && document.body.clientHeight)
595                  return document.body.clientHeight;
596          else if (document.body && document.body.parentNode &&
document.body.parentNode.clientHeight)
597                  return document.body.parentNode.clientHeight;
598        }
599        -->
600        </script>
601
602        <div class="title">GAD Note</div>
603        <div id="toolbar">
604        <input type="text" id="searchNote">
605        <div><input type="radio" name="radio" checked>search by Content keywords</div>
606        <div><input type="radio" id="equalRadio" name="radio">search by Author</div>
607        <input type="button" value="show all" id="showbutton" alt="show all notes"
onclick="show_all( );">
608        <input type="button" value="search" id="searchbutton" onclick="search_Note( );">
609        <input type="button" id="addbutton" onClick="noteEdit(0);" value="add"
accesskey="a">
610        </div>
611        <div> </div>
612        <div id="noteTab" class="noteTab">
613        <table class="tabRow" id="tabRow">
614        <thead>
615        <tr>
616        <th class="authorTd th">Author</th>
617        <th class="dateTd th">Date</th>
618        <th class="contentTd th">Content</th>
619        </tr>
620        </thead>
621        <tbody id="noteBody" onMouseover="this.style.cursor='pointer';"
onMouseout="this.style.cursor='auto';"></tbody>
622        </table>
623        </div>
624        <div id="noteEdit" class="noteEdit">
```

-continued

Javascript Code for a TT Application

```
625    <div id="editButton" style="border-bottom:solid 1px;background-color:#c3d9ff;">
626    <input type="button" value="save" onClick="notesubmit( );" accesskey="s">
627    <input type="button" value="cancel" onClick="hideNote( );">
628    </div>
629    <div>
630    <pre style="margin:0pt;"><textarea id="content" class="content"></textarea></pre>
631    </div>
632    </div>
633    <div id="rMenu" class="rMenu">
634    <div id="editMenu" class="menuOption" onMouseover="this.className='selectMenu';"
onMouseout="this.className='menuOption';" onClick="noteEdit(1);">Edit</div>
635    <div id="delMenu" class="menuOption" onMouseover="this.className='selectMenu';"
onMouseout="this.className='menuOption';" onClick="delRow( );">Delete</div>
636    </div>
637    <div class=Shade id="WindowShade" title="click to close note editor" style="CURSOR:
pointer" onclick="hideNote( );"></div>
638    </body>
639    </html>
```

The systems and methods described above may be provided as one or more computer-readable programs embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, LISP, PERL, C, C++, PROLOG, or any byte code language such as JAVA. The software programs may be stored on or in one or more articles of manufacture as object code.

Having described certain embodiments of methods and systems for processing user input, it will now become apparent to one of skill in the art that other embodiments incorporating the concepts of the invention may be used. Therefore, the invention should not be limited to certain embodiments, but rather should be limited only by the spirit and scope of the following claims.

What is claimed is:

1. A method for processing, in a computer server under control of a processor, user input to an interactive information repository comprising:
   (a) receiving a resource in the form of a structured document wherein the structured document includes at least one expression having a semantic structure and a plurality of predefined markers expressed in a programming language, the plurality of predefined markers identifying a display format and an expression type, wherein the expression type includes: (i) a query seeking information from the information repository, (ii) a statement seeking to add new information to the information repository, and (iii) a command to perform an action;
   (b) determining the expression type of the at least one expression based on one of the predefined markers associated with the at least one expression;
   (c) adding expressions that have an expression type of statement to the information repository;
   (d) converting the resource to a viewable display format based on the predefined markers that identify the display format;
   (e) displaying the resource in the viewable display format;
   (f) receiving user input in the form of a natural language expression, the natural language expression having a semantic structure that can be characterized by an expression type, wherein the expression type is representative of at least two types of input that can be supplied to the information repository including a query and a statement;
   (g) determining an expression type for the received natural language expression by evaluating the semantic structure of the expression to determine whether the received expression is a statement comprised of new information;
   (h) responding to input expressions having an expression type determined to be a statement by adding the new information in the statement to the information repository;
   (i) determining an expression type for the received natural language expression by evaluating the semantic structure of the expression to determine whether the received expression is a query seeking an answer to the query from the information repository;
   (j) responding to input expressions having an expression type determined to be a query by (i) searching the information repository for an answer to the query, and (ii) returning the answer to the query if a matching answer is determined.

2. The method of claim 1 wherein the plurality of predefined markers are expressed in an Extensible Markup Language (XML).

3. The method of claim 1 wherein steps (a) and (f) further comprise receiving input via one of a plurality of media gateways.

4. The method of claim 3 wherein an expression comprises one of a character string having a semantic structure and a plurality of words having a semantic structure.

5. The method of claim 4 wherein step (b) further comprises evaluating a linguistic pattern of an expression.

6. The method of claim 4 wherein step (b) further comprises evaluating a word order of an expression.

7. The method of claim 4 wherein steps (c) and (g) further comprise identifying the semantic structure of an expression as one of an implicit question, explicit question, a statement, a command, a command to execute a computer program, a command to store data, a command to modify stored data.

8. The method of claim 4 further comprising the step of querying a database to identify the expression type of the expression.

9. The method of claim 4 further comprising the step of querying a database using a modified version of the expression.

10. The method of claim 1 further comprising storing the resource.

11. A system for processing user input comprising:
a hardware server for hosting:
an information retrieval component in communication with a search index and a collection of information;
a user interface module hosted by the server and in communication with the information retrieval component, the user interface module comprising a transceiver for receiving, (i) during a first session with a user, a resource in the form of a structured document wherein the structured document includes at least one expression having a semantic structure and a plurality of predefined markers expressed in a programming language, the plurality of predefined markers identifying at least one of a display format and an expression type and, (ii) during a second session with a user, user input in the form of a natural language expression, the natural language expression having a semantic structure that can be characterized by an expression type, wherein the expression type is representative of at least two types of input that can be supplied to the collection of information including a query and a statement;
a semantic evaluator for: (i) determining the expression type of the at least one expression based on one of the predefined markers associated with the at least one expression, and (ii) determining the expression type of the user input expression by evaluating the semantic structure of the natural language expression to determine whether (a) the expression type is a statement comprised of new information; or (b) the expression type is a query seeking an answer to the query from the collection of information;
a display component for: (i) converting the resource to a viewable display format based on the predefined markers that identify a display format, and (ii) displaying the resource in the viewable display format; and
a response generating component for responding to the natural language input expression based on the determined expression type wherein a response to a query expression type is (i) search the collection of information for an answer to the query, and (ii) return the answer to the query if a matching answer is determined, and a response to a statement expression type is to add the new information to the collection of information.

12. The system of claim 11 wherein the plurality of predefined markers are expressed in an Extensible Markup Language (XML).

13. The system of claim 11 wherein the transceiver receives input via one of a plurality of media gateways.

14. The system of claim 11 wherein the transceiver receives input via one of a plurality of media gateways.

15. The system of claim 11 wherein an expression comprises one of a character string having a semantic structure and a plurality of words having a semantic structure.

16. The system of claim 11 wherein the semantic evaluator evaluates a linguistic pattern of an expression.

17. The system of claim 11 wherein the semantic evaluator evaluates a word order of the expression.

18. The system of claim 11 wherein the semantic evaluator identifies the semantic structure of the expression as one of an implicit question, explicit question, a statement, a command, a command to execute a computer program, a command to store data, a command to modify stored data.

19. The system of claim 11 wherein the semantic evaluator queries a database to identify the expression type of the expression.

20. The system of claim 11 wherein the semantic evaluator queries a database using a modified version of the expression.

21. The system of claim 11 wherein the display component further comprises a means for transforming the resource from Extensible Markup Language (XML) into Hypertext Markup Language.

* * * * *